(12) United States Patent
Nakanishi

(10) Patent No.: US 8,450,589 B2
(45) Date of Patent: *May 28, 2013

(54) NONVOLATILE STORAGE MODULE, ACCESS MODULE, MUSICAL SOUND DATA FILE GENERATION MODULE AND MUSICAL SOUND GENERATION SYSTEM

(75) Inventor: Masahiro Nakanishi, Kyoto (JP)

(73) Assignee: Panasonic Corporation, Osaka (JP)

( * ) Notice: Subject to any disclaimer, the term of this patent is extended or adjusted under 35 U.S.C. 154(b) by 465 days.

This patent is subject to a terminal disclaimer.

(21) Appl. No.: 12/936,239

(22) PCT Filed: Mar. 16, 2009

(86) PCT No.: PCT/JP2009/001156
§ 371 (c)(1),
(2), (4) Date: Oct. 4, 2010

(87) PCT Pub. No.: WO2009/125541
PCT Pub. Date: Oct. 15, 2009

(65) Prior Publication Data
US 2011/0029583 A1    Feb. 3, 2011

(30) Foreign Application Priority Data

| Apr. 10, 2008 | (JP) | 2008-102390 |
| Apr. 30, 2008 | (JP) | 2008-118649 |
| May 19, 2008 | (JP) | 2008-131078 |
| Jun. 2, 2008 | (JP) | 2008-144455 |
| Jun. 17, 2008 | (JP) | 2008-158034 |

(51) Int. Cl.
*G10H 7/00* (2006.01)

(52) U.S. Cl.
USPC .............................. 84/604; 84/602

(58) Field of Classification Search
USPC .................................................. 84/602–608
See application file for complete search history.

(56) References Cited

U.S. PATENT DOCUMENTS

| RE30,736 E * | 9/1981 | Hiyoshi et al. ................... 84/604 |
| 4,903,565 A * | 2/1990 | Abe ................................. 84/611 |

(Continued)

FOREIGN PATENT DOCUMENTS

| JP | 03-174592 | 7/1991 |
| JP | 2000-284783 | 10/2000 |

(Continued)

OTHER PUBLICATIONS

International Preliminary Report on Patentability and Written Opinion for corresponding International Application No. PCT/JP2009/001156 mailed Dec. 9, 2010 and English translation.

(Continued)

*Primary Examiner* — David S. Warren
(74) *Attorney, Agent, or Firm* — Renner, Otto, Boisselle & Sklar, LLP

(57) ABSTRACT

Musical sound data groups are recorded in nonvolatile memory banks by multiplexing the data without being compressed. A data reader reads the musical sound data in parallel from the plurality of nonvolatile memory banks according to reading instructions from an access module. In a musical sound generation system that cannot expect which pitch of the musical sound data is instructed to be read, since a plurality of pieces of data can be read in parallel from the plurality of nonvolatile memory banks, a sound production delay time can fall within an allowable time. Thus, by using a currently dominant large-capacity multi level NAND flash memory as a memory for the musical sound data, a high sound quality and compact musical sound generation system can be realized.

10 Claims, 80 Drawing Sheets

U.S. PATENT DOCUMENTS

| | | | |
|---|---|---|---|
| 5,081,897 A * | 1/1992 | Takauji | 84/604 |
| 5,416,264 A * | 5/1995 | Toda et al. | 84/603 |
| 7,002,068 B2 * | 2/2006 | Koseki et al. | 84/604 |
| 8,035,021 B2 * | 10/2011 | Shirahama et al. | 84/605 |
| 8,129,608 B2 * | 3/2012 | Lee | 84/741 |
| 8,183,452 B2 * | 5/2012 | Shirahama | 84/602 |
| 8,263,849 B2 * | 9/2012 | Chamberlin et al. | 84/603 |
| 2003/0131714 A1 * | 7/2003 | Iguchi et al. | 84/604 |
| 2003/0196539 A1 * | 10/2003 | Koseki et al. | 84/604 |
| 2003/0196540 A1 * | 10/2003 | Ishii | 84/617 |
| 2006/0000343 A1 * | 1/2006 | Koseki et al. | 84/604 |
| 2006/0005691 A1 * | 1/2006 | Koseki et al. | 84/604 |
| 2006/0196345 A1 * | 9/2006 | Arai | 84/604 |
| 2006/0212550 A1 | 9/2006 | Oda | |
| 2008/0148923 A1 * | 6/2008 | Choo | 84/609 |
| 2008/0307949 A1 * | 12/2008 | Lee | 84/741 |
| 2009/0158918 A1 * | 6/2009 | Norman | 84/603 |
| 2010/0011156 A1 * | 1/2010 | Yim et al. | 711/103 |
| 2010/0147138 A1 * | 6/2010 | Chamberlin et al. | 84/603 |
| 2010/0217922 A1 * | 8/2010 | Nakanishi | 711/103 |
| 2010/0236384 A1 * | 9/2010 | Shirahama et al. | 84/605 |
| 2011/0029583 A1 * | 2/2011 | Nakanishi | 707/812 |
| 2011/0094368 A1 * | 4/2011 | Kunimoto et al. | 84/605 |
| 2011/0232460 A1 * | 9/2011 | Shirahama | 84/605 |
| 2011/0246188 A1 * | 10/2011 | Nakanishi | 704/207 |
| 2012/0325073 A1 * | 12/2012 | Chamberlin et al. | 84/603 |

FOREIGN PATENT DOCUMENTS

| | | |
|---|---|---|
| JP | 2003-108122 | 4/2003 |
| JP | 2006-259903 | 9/2006 |

OTHER PUBLICATIONS

International Search Report for corresponding International Application No. PCT/JP2009/001156 mailed Jun. 23, 2009.

Form PCT/ISA/237 for corresponding International Application No. PCT/JP2009/001156 dated Jun. 23, 2009.

* cited by examiner

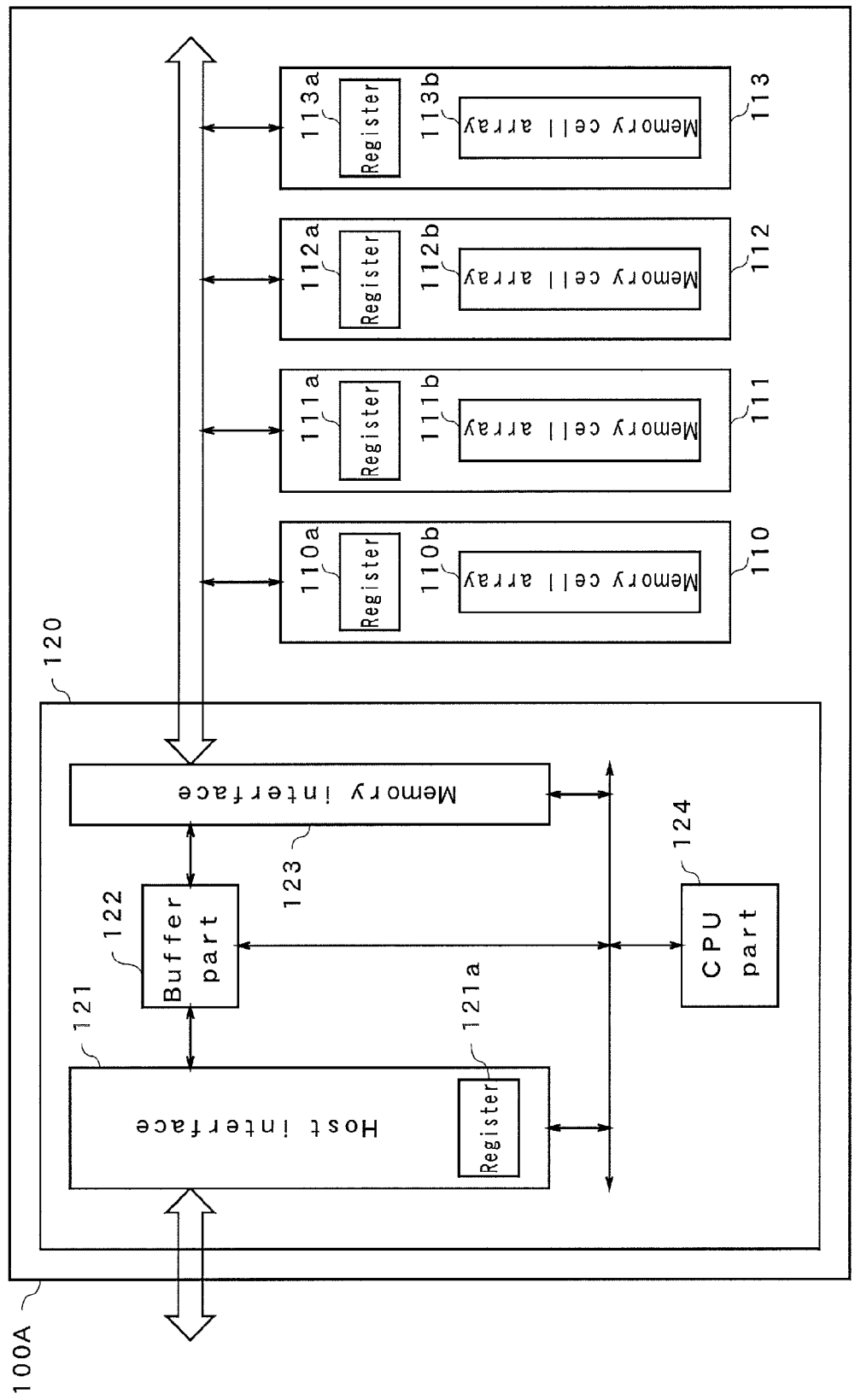

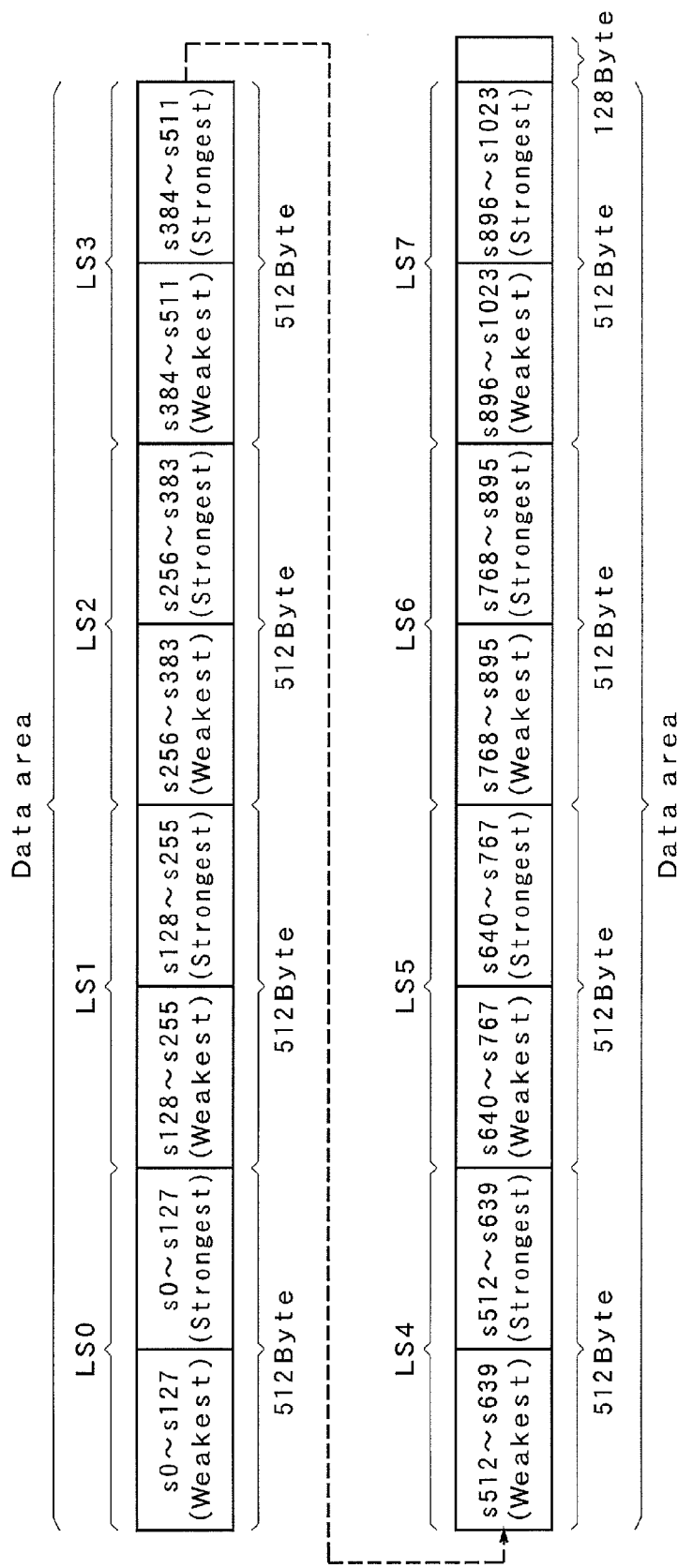

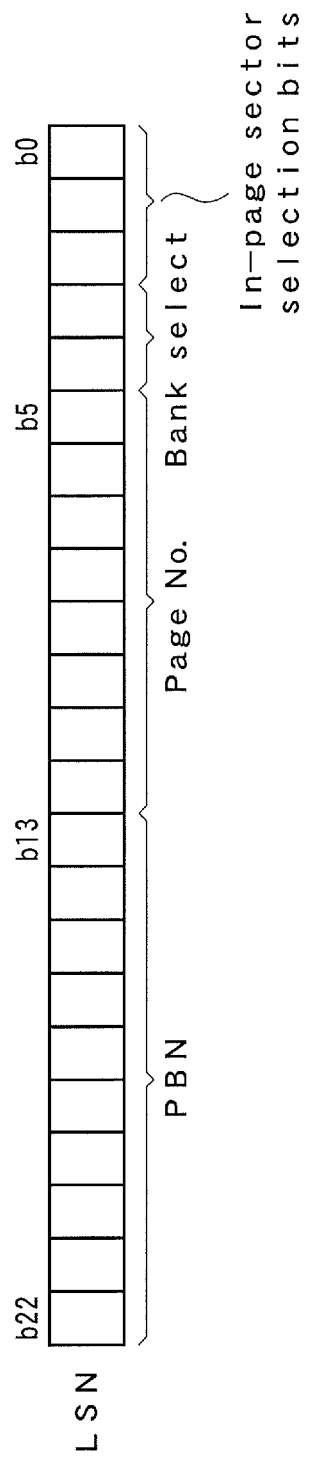
F I G. 4

| CHN | LSN | Reading instruction receipt flag RR | Read command issuance flag RC | Data transfer completion flag TE |
|---|---|---|---|---|
| 0 | | 0→1→0 | 0→1→0 | 0→1→0 |
| 1 | | 0→1 | 0→1→0 | 0→1 |
| 2 | | 0→1 | 0→1 | 0 |
| 3 | | 0→1 | 0→1 | 0 |
| 4 | | 0 | 0 | 0 |
| 5 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |

F I G. 6
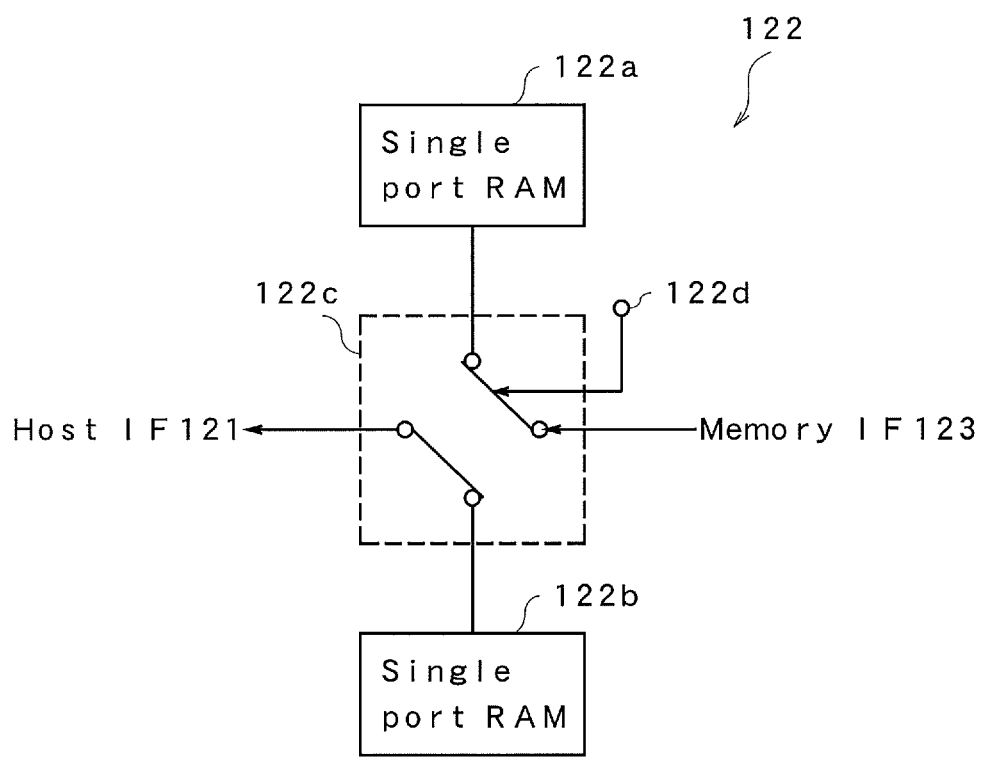

FIG. 8A

| CHN | SON | KON | PD | NN | TP | LD | F | SC | WE | EE | DQ | M | D |
|---|---|---|---|---|---|---|---|---|---|---|---|---|---|
| 0 | 0→1 | 0→1→0 | 0 | 0x19 | 0x41 | 0x0→0x41/0x7F | 0 | 0 | 0 | 1→0 | 0 | 0 | 0 |
| 1 | 0→1 | 0→1→0 | | 0x1C | 0x40 | 0x0→0x40/0x7F | 0 | 0 | 0 | 1→0 | 0 | 0 | 0 |
| 2 | 0→1 | 0→1→0 | | 0x1E | 0x40 | 0x0→0x40/0x7F | 0 | 0 | 0 | 1→0 | 0 | 0 | 0 |
| 3 | 0→1 | 0→1→0 | | 0x20 | 0x43 | 0x0→0x43/0x7F | 0 | 0 | 0 | 1→0 | 0 | 0 | 0 |
| 4 | 0→1 | 0→1→0 | | 0x25 | 0x41 | 0x0→0x41/0x7F | 0 | 0 | 0 | 1→0 | 0 | 0 | 0 |
| 5 | 0→1 | 0→1→0 | | 0x29 | 0x3F | 0x0→0x3F/0x7F | 0 | 0 | 0 | 1→0 | 0 | 0 | 0 |
| 6 | 0→1 | 0→1→0 | | 0x2C | 0x40 | 0x0→0x40/0x7F | 0 | 0 | 0 | 1→0 | 0 | 0 | 0 |
| 7 | 0→1 | 0→1→0 | | 0x2F | 0x41 | 0x0→0x41/0x7F | 0 | 0 | 0 | 1→0 | 0 | 0 | 0 |
| 8 | 0(Free) | 0 | | 0x0 | 0x0 | 0x0 | 0 | 0 | 0 | 1 | 0 | 0 | 0 |
| 9 | 0(Free) | 0 | | 0x0 | 0x0 | 0x0 | 0 | 0 | 0 | 1 | 0 | 0 | 0 |
| 10 | 0(Free) | 0 | | 0x0 | 0x0 | 0x0 | 0 | 0 | 0 | 1 | 0 | 0 | 0 |
| 11 | 0(Free) | 0 | | 0x0 | 0x0 | 0x0 | 0 | 0 | 0 | 1 | 0 | 0 | 0 |
| 12 | 0(Free) | 0 | | 0x0 | 0x0 | 0x0 | 0 | 0 | 0 | 1 | 0 | 0 | 0 |
| 13 | 0(Free) | 0 | | 0x0 | 0x0 | 0x0 | 0 | 0 | 0 | 1 | 0 | 0 | 0 |
| 14 | 0(Free) | 0 | | 0x0 | 0x0 | 0x0 | 0 | 0 | 0 | 1 | 0 | 0 | 0 |
| 15 | 0(Free) | 0 | | 0x0 | 0x0 | 0x0 | 0 | 0 | 0 | 1 | 0 | 0 | 0 |
| 16 | 0(Free) | 0 | | 0x0 | 0x0 | 0x0 | 0 | 0 | 0 | 1 | 0 | 0 | 0 |
| 17 | 0(Free) | 0 | | 0x0 | 0x0 | 0x0 | 0 | 0 | 0 | 1 | 0 | 0 | 0 |
| 18 | 0(Free) | 0 | | 0x0 | 0x0 | 0x0 | 0 | 0 | 0 | 1 | 0 | 0 | 0 |
| 19 | 0(Free) | 0 | | 0x0 | 0x0 | 0x0 | 0 | 0 | 0 | 1 | 0 | 0 | 0 |
| 20 | 0(Free) | 0 | | 0x0 | 0x0 | 0x0 | 0 | 0 | 0 | 1 | 0 | 0 | 0 |
| 21 | 0(Free) | 0 | | 0x0 | 0x0 | 0x0 | 0 | 0 | 0 | 1 | 0 | 0 | 0 |
| 22 | 0(Free) | 0 | | 0x0 | 0x0 | 0x0 | 0 | 0 | 0 | 1 | 0 | 0 | 0 |
| 23 | 0(Free) | 0 | | 0x0 | 0x0 | 0x0 | 0 | 0 | 0 | 1 | 0 | 0 | 0 |
| 24 | 0(Free) | 0 | | 0x0 | 0x0 | 0x0 | 0 | 0 | 0 | 1 | 0 | 0 | 0 |
| 25 | 0(Free) | 0 | | 0x0 | 0x0 | 0x0 | 0 | 0 | 0 | 1 | 0 | 0 | 0 |
| 26 | 0(Free) | 0 | | 0x0 | 0x0 | 0x0 | 0 | 0 | 0 | 1 | 0 | 0 | 0 |
| 27 | 0(Free) | 0 | | 0x0 | 0x0 | 0x0 | 0 | 0 | 0 | 1 | 0 | 0 | 0 |
| 28 | 0(Free) | 0 | | 0x0 | 0x0 | 0x0 | 0 | 0 | 0 | 1 | 0 | 0 | 0 |
| 29 | 0(Free) | 0 | | 0x0 | 0x0 | 0x0 | 0 | 0 | 0 | 1 | 0 | 0 | 0 |
| 30 | 0(Free) | 0 | | 0x0 | 0x0 | 0x0 | 0 | 0 | 0 | 1 | 0 | 0 | 0 |
| 31 | 0(Free) | 0 | | 0x0 | 0x0 | 0x0 | 0 | 0 | 0 | 1 | 0 | 0 | 0 |

FIG. 8B

| CHN | SON | KON | PD | NN | TP | LD | F | SC | WE | EE | DQ | M | D |
|---|---|---|---|---|---|---|---|---|---|---|---|---|---|
| 0 | 0→1 | 0→1 |  | 0x28 | 0x41 | 0x0→0x41/0x7F | 0 | 0 | 0 | 1→0 | 0 | 0 | 0 |
| 1 | 0→1 | 0→1 |  | 0x29 | 0x40 | 0x0→0x40/0x7F | 0 | 0 | 0 | 1→0 | 0 | 0 | 0 |
| 2 | 0→1 | 0→1 |  | 0x2A | 0x3E | 0x0→0x3E/0x7F | 0 | 0 | 0 | 1→0 | 0 | 0 | 0 |
| 3 | 0→1 | 0→1 |  | 0x2B | 0x3F | 0x0→0x3F/0x7F | 0 | 0 | 0 | 1→0 | 0 | 0 | 0 |
| 4 | 0→1 | 0→1 |  | 0x2C | 0x3F | 0x0→0x3F/0x7F | 0 | 0 | 0 | 1→0 | 0 | 0 | 0 |
| 5 | 0→1 | 0→1 |  | 0x2D | 0x3F | 0x0→0x3F/0x7F | 0 | 0 | 0 | 1→0 | 0 | 0 | 0 |
| 6 | 0→1 | 0→1 |  | 0x2E | 0x3D | 0x0→0x3D/0x7F | 0 | 0 | 0 | 1→0 | 0 | 0 | 0 |
| 7 | 0→1 | 0→1 |  | 0x2F | 0x40 | 0x0→0x40/0x7F | 0 | 0 | 0 | 1→0 | 0 | 0 | 0 |
| 8 | 0→1 | 0→1 |  | 0x30 | 0x42 | 0x0→0x42/0x7F | 0 | 0 | 0 | 1→0 | 0 | 0 | 0 |
| 9 | 0→1 | 0→1 |  | 0x31 | 0x41 | 0x0→0x41/0x7F | 0 | 0 | 0 | 1→0 | 0 | 0 | 0 |
| 10 | 0→1 | 0→1 |  | 0x32 | 0x41 | 0x0→0x41/0x7F | 0 | 0 | 0 | 1→0 | 0 | 0 | 0 |
| 11 | 0→1 | 0→1 |  | 0x33 | 0x42 | 0x0→0x42/0x7F | 0 | 0 | 0 | 1→0 | 0 | 0 | 0 |
| 12 | 0→1 | 0→1 |  | 0x34 | 0x40 | 0x0→0x40/0x7F | 0 | 0 | 0 | 1→0 | 0 | 0 | 0 |
| 13 | 0→1 | 0→1 | 1 | 0x35 | 0x3F | 0x0→0x3F/0x7F | 0 | 0 | 0 | 1→0 | 0 | 0 | 0 |
| 14 | 0→1 | 0→1 |  | 0x36 | 0x42 | 0x0→0x42/0x7F | 0 | 0 | 0 | 1→0 | 0 | 0 | 0 |
| 15 | 0→1 | 0→1 |  | 0x37 | 0x42 | 0x0→0x42/0x7F | 0 | 0 | 0 | 1→0 | 0 | 0 | 0 |
| 16 | 0→1 | 0→1 |  | 0x38 | 0x3F | 0x0→0x3F/0x7F | 0 | 0 | 0 | 1→0 | 0 | 0 | 0 |
| 17 | 0→1 | 0→1 |  | 0x39 | 0x3F | 0x0→0x3F/0x7F | 0 | 0 | 0 | 1→0 | 0 | 0 | 0 |
| 18 | 0→1 | 0→1 |  | 0x3A | 0x3F | 0x0→0x3F/0x7F | 0 | 0 | 0 | 1→0 | 0 | 0 | 0 |
| 19 | 0→1 | 0→1 |  | 0x3B | 0x3E | 0x0→0x3E/0x7F | 0 | 0 | 0 | 1→0 | 0 | 0 | 0 |
| 20 | 0→1 | 0→1 |  | 0x3C | 0x3E | 0x0→0x3E/0x7F | 0 | 0 | 0 | 1→0 | 0 | 0 | 0 |
| 21 | 0→1 | 0→1 |  | 0x3D | 0x40 | 0x0→0x40/0x7F | 0 | 0 | 0 | 1→0 | 0 | 0 | 0 |
| 22 | 0→1 | 0→1 |  | 0x3E | 0x3F | 0x0→0x3F/0x7F | 0 | 0 | 0 | 1→0 | 0 | 0 | 0 |
| 23 | 0→1 | 0→1 |  | 0x3F | 0x40 | 0x0→0x40/0x7F | 0 | 0 | 0 | 1→0 | 0 | 0 | 0 |
| 24 | 0→1 | 0→1 |  | 0x40 | 0x40 | 0x0→0x40/0x7F | 0 | 0 | 0 | 1→0 | 0 | 0 | 0 |
| 25 | 0→1 | 0→1 |  | 0x41 | 0x42 | 0x0→0x42/0x7F | 0 | 0 | 0 | 1→0 | 0 | 0 | 0 |
| 26 | 0→1 | 0→1 |  | 0x42 | 0x41 | 0x0→0x41/0x7F | 0 | 0 | 0 | 1→0 | 0 | 0 | 0 |
| 27 | 0→1 | 0→1 |  | 0x43 | 0x41 | 0x0→0x41/0x7F | 0 | 0 | 0 | 1→0 | 0 | 0 | 0 |
| 28 | 0→1 | 0→1 |  | 0x44 | 0x40 | 0x0→0x40/0x7F | 0 | 0 | 0 | 1→0 | 0 | 0 | 0 |
| 29 | 0→1 | 0→1 |  | 0x45 | 0x3E | 0x0→0x3E/0x7F | 0 | 0 | 0 | 1→0 | 0 | 0 | 0 |
| 30 | 0→1 | 0→1 |  | 0x46 | 0x3F | 0x0→0x3F/0x7F | 0 | 0 | 0 | 1→0 | 0 | 0 | 0 |
| 31 | 0→1 | 0→1 |  | 0x47 | 0x3F | 0x0→0x3F/0x7F | 0 | 0 | 0 | 1→0 | 0 | 0 | 0 |

FIG. 8C

| CHN | SON | KON | PD | NN | TP | LD | F | SC | WE | EE | DQ | M | D |
|---|---|---|---|---|---|---|---|---|---|---|---|---|---|
| 0 | 1→0→1 | 1 |  | 0x48 | 0x28 | 0x41/0x7F→0x28/0x7F | 0→1→0 | *→0 | 0 | 0→1→0 | 0 | 0 | 0 |
| 1 | 1→0→1 | 1 |  | 0x49 | 0x29 | 0x40/0x7F→0x29/0x7F | 0→1→0 | *→0 | 0 | 0→1→0 | 0 | 0 | 0 |
| 2 | 1→0→1 | 1 |  | 0x4A | 0x29 | 0x3E/0x7F→0x29/0x7F | 0→1→0 | *→0 | 0 | 0→1→0 | 0 | 0 | 0 |
| 3 | 1→0→1 | 1 |  | 0x4B | 0x29 | 0x3F/0x7F→0x29/0x7F | 0→1→0 | *→0 | 0 | 0→1→0 | 0 | 0 | 0 |
| 4 | 1→0→1 | 1 |  | 0x4C | 0x28 | 0x3F/0x7F→0x28/0x7F | 0→1→0 | *→0 | 0 | 0→1→0 | 0 | 0 | 0 |
| 5 | 1→0→1 | 1 |  | 0x4D | 0x28 | 0x3F/0x7F→0x28/0x7F | 0→1→0 | *→0 | 0 | 0→1→0 | 0 | 0 | 0 |
| 6 | 1→0→1 | 1 |  | 0x4E | 0x26 | 0x3D/0x7F→0x26/0x7F | 0→1→0 | *→0 | 0 | 0→1→0 | 0 | 0 | 0 |
| 7 | 1→0→1 | 1 |  | 0x4F | 0x26 | 0x40/0x7F→0x26/0x7F | 0→1→0 | *→0 | 0 | 0→1→0 | 0 | 0 | 0 |
| 8 | 1→0→1 | 1 |  | 0x50 | 0x26 | 0x42/0x7F→0x26/0x7F | 0→1→0 | *→0 | 0 | 0→1→0 | 0 | 0 | 0 |
| 9 | 1→0→1 | 1 |  | 0x51 | 0x26 | 0x41/0x7F→0x26/0x7F | 0→1→0 | *→0 | 0 | 0→1→0 | 0 | 0 | 0 |
| 10 | 1→0→1 | 1 |  | 0x52 | 0x26 | 0x41/0x7F→0x26/0x7F | 0→1→0 | *→0 | 0 | 0→1→0 | 0 | 0 | 0 |
| 11 | 1→0→1 | 1 |  | 0x53 | 0x28 | 0x42/0x7F→0x28/0x7F | 0→1→0 | *→0 | 0 | 0→1→0 | 0 | 0 | 0 |
| 12 | 1→0→1 | 1 |  | 0x54 | 0x28 | 0x40/0x7F→0x28/0x7F | 0→1→0 | *→0 | 0 | 0→1→0 | 0 | 0 | 0 |
| 13 | 1→0→1 | 1 |  | 0x55 | 0x28 | 0x3F/0x7F→0x28/0x7F | 0→1→0 | *→0 | 0 | 0→1→0 | 0 | 0 | 0 |
| 14 | 1→0→1 | 1 |  | 0x56 | 0x28 | 0x42/0x7F→0x28/0x7F | 0→1→0 | *→0 | 0 | 0→1→0 | 0 | 0 | 0 |
| 15 | 1→0→1 | 1 | 1 | 0x57 | 0x28 | 0x3F/0x7F→0x28/0x7F | 0→1→0 | *→0 | 0 | 0→1→0 | 0 | 0 | 0 |
| 16 | 1→0→1 | 1 |  | 0x58 | 0x28 | 0x3F/0x7F→0x28/0x7F | 0→1→0 | *→0 | 0 | 0→1→0 | 0 | 0 | 0 |
| 17 | 1→0→1 | 1 |  | 0x59 | 0x28 | 0x3F/0x7F→0x28/0x7F | 0→1→0 | *→0 | 0 | 0→1→0 | 0 | 0 | 0 |
| 18 | 1→0→1 | 1 |  | 0x5A | 0x28 | 0x3E/0x7F→0x28/0x7F | 0→1→0 | *→0 | 0 | 0→1→0 | 0 | 0 | 0 |
| 19 | 1→0→1 | 1 |  | 0x5B | 0x28 | 0x3F/0x7F→0x28/0x7F | 0→1→0 | *→0 | 0 | 0→1→0 | 0 | 0 | 0 |
| 20 | 1→0→1 | 1 |  | 0x5C | 0x28 | 0x40/0x7F→0x28/0x7F | 0→1→0 | *→0 | 0 | 0→1→0 | 0 | 0 | 0 |
| 21 | 1→0→1 | 1 |  | 0x5D | 0x28 | 0x3F/0x7F→0x28/0x7F | 0→1→0 | *→0 | 0 | 0→1→0 | 0 | 0 | 0 |
| 22 | 1→0→1 | 1 |  | 0x5E | 0x28 | 0x40/0x7F→0x27/0x7F | 0→1→0 | *→0 | 0 | 0→1→0 | 0 | 0 | 0 |
| 23 | 1→0→1 | 1 |  | 0x5F | 0x27 | 0x40/0x7F→0x27/0x7F | 0→1→0 | *→0 | 0 | 0→1→0 | 0 | 0 | 0 |
| 24 | 1→0→1 | 1 |  | 0x60 | 0x27 | 0x42/0x7F→0x27/0x7F | 0→1→0 | *→0 | 0 | 0→1→0 | 0 | 0 | 0 |
| 25 | 1→0→1 | 1 |  | 0x61 | 0x27 | 0x3F/0x7F→0x27/0x7F | 0→1→0 | *→0 | 0 | 0→1→0 | 0 | 0 | 0 |
| 26 | 1→0→1 | 1 |  | 0x62 | 0x27 | 0x41/0x7F→0x27/0x7F | 0→1→0 | *→0 | 0 | 0→1→0 | 0 | 0 | 0 |
| 27 | 1→0→1 | 1 |  | 0x63 | 0x27 | 0x41/0x7F→0x27/0x7F | 0→1→0 | *→0 | 0 | 0→1→0 | 0 | 0 | 0 |
| 28 | 1→0→1 | 1 |  | 0x64 | 0x27 | 0x40/0x7F→0x27/0x7F | 0→1→0 | *→0 | 0 | 0→1→0 | 0 | 0 | 0 |
| 29 | 1→0→1 | 1 |  | 0x75 | 0x27 | 0x3F/0x7F→0x27/0x7F | 0→1→0 | *→0 | 0 | 0→1→0 | 0 | 0 | 0 |
| 30 | 1→0→1 | 1 |  | 0x66 | 0x27 | 0x3F/0x7F→0x27/0x7F | 0→1→0 | *→0 | 0 | 0→1→0 | 0 | 0 | 0 |
| 31 | 1→0→1 | 1 |  | 0x67 | 0x27 | 0x3F/0x7F→0x27/0x7F | 0→1→0 | *→0 | 0 | 0→1→0 | 0 | 0 | 0 |

FIG. 9

| Sound code | Frequency (Hz) | Note number NN (Hexadecimal) | PBN | Leading PBN | Note |
|---|---|---|---|---|---|
| C−2 | 8.176 | 00 | | | |
| ..... | ..... | ..... | | | |
| A−1 | 27.5 | 15 | 0~7 | 0 | Lowest piano sound |
| ..... | ..... | ..... | ..... | ..... | ..... |
| C3 | 261.626 | 3C | 312~319 | 312 | Middle piano range |
| C#3 | 277.183 | 3D | 320~327 | 320 | Middle piano range |
| D3 | 293.665 | 3E | 328~335 | 328 | Middle piano range |
| D#3 | 311.127 | 3F | 336~343 | 336 | Middle piano range |
| E3 | 329.628 | 40 | 344~351 | 344 | Middle piano range |
| F3 | 349.228 | 41 | 352~359 | 352 | Middle piano range |
| F#3 | 369.994 | 42 | 360~367 | 360 | Middle piano range |
| G3 | 391.995 | 43 | 368~375 | 368 | Middle piano range |
| G#3 | 415.305 | 44 | 376~383 | 376 | Middle piano range |
| A3 | 440.000 | 45 | 384~391 | 384 | Middle piano range |
| A#3 | 466.164 | 46 | 392~399 | 392 | Middle piano range |
| B3 | 493.883 | 47 | 400~407 | 400 | Middle piano range |
| C4 | 523.251 | 48 | 408~415 | 408 | Middle piano range |
| ..... | ..... | ..... | ..... | ..... | ..... |
| C7 | 4186.009 | 6C | 696~703 | 696 | Highest piano sound |
| ..... | ..... | ..... | | | |
| G8 | 12543.854 | 7F | | | |

F I G. 1 0
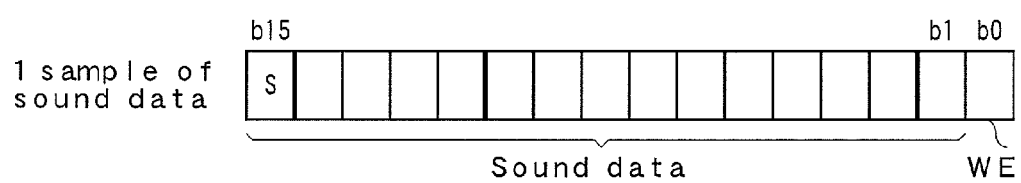

FIG. 11

| Item | Parameter example | Note |
|---|---|---|
| Name of tone | Piano | |
| Sampling frequncy | 44.1 kHz | |
| Sampling period | 22.7 μsec. | |
| Sound time per note | 40 sec. | |
| Number of samples per note | 1764000 samples | |
| Occupied capacity per note | 8 MByte | |
| Capacity per sample | 2 Byte | |
| Assigned bit to flag | b0 | |
| Number of touches TN | 2 | Number of sound data corresponding to key strength |
| Total notes | 88 notes | |
| The lowest note name | A-1 | |
| The highest note name | C7 | |
| Maximum sound channels | 32 | Condition: Sound delay is less than 1ms. |
| Reverb | ON | Reverb is used at defoult |
| Chorus | OFF | Chorus is not used at defoult |

FIG. 12

| Item | Parameter example | Note |
|---|---|---|
| Bus number | 1 | |
| Memory number per bus | 4 | |
| Page size | 4 kByte | |
| Page number TPN per 1 physical block | 256 | |
| Number of physical block TPBN per memory bank | 1024 | |
| Sector size | 512 Byte | Read out data size per 1 read command |
| Read time TR | 50 μsec. | Read out time from memory cell array to I/O register |
| Transfer time TT | 12.8 μsec. | Transfer time from I/O register to memory IF103 |

F I G. 1 3 A
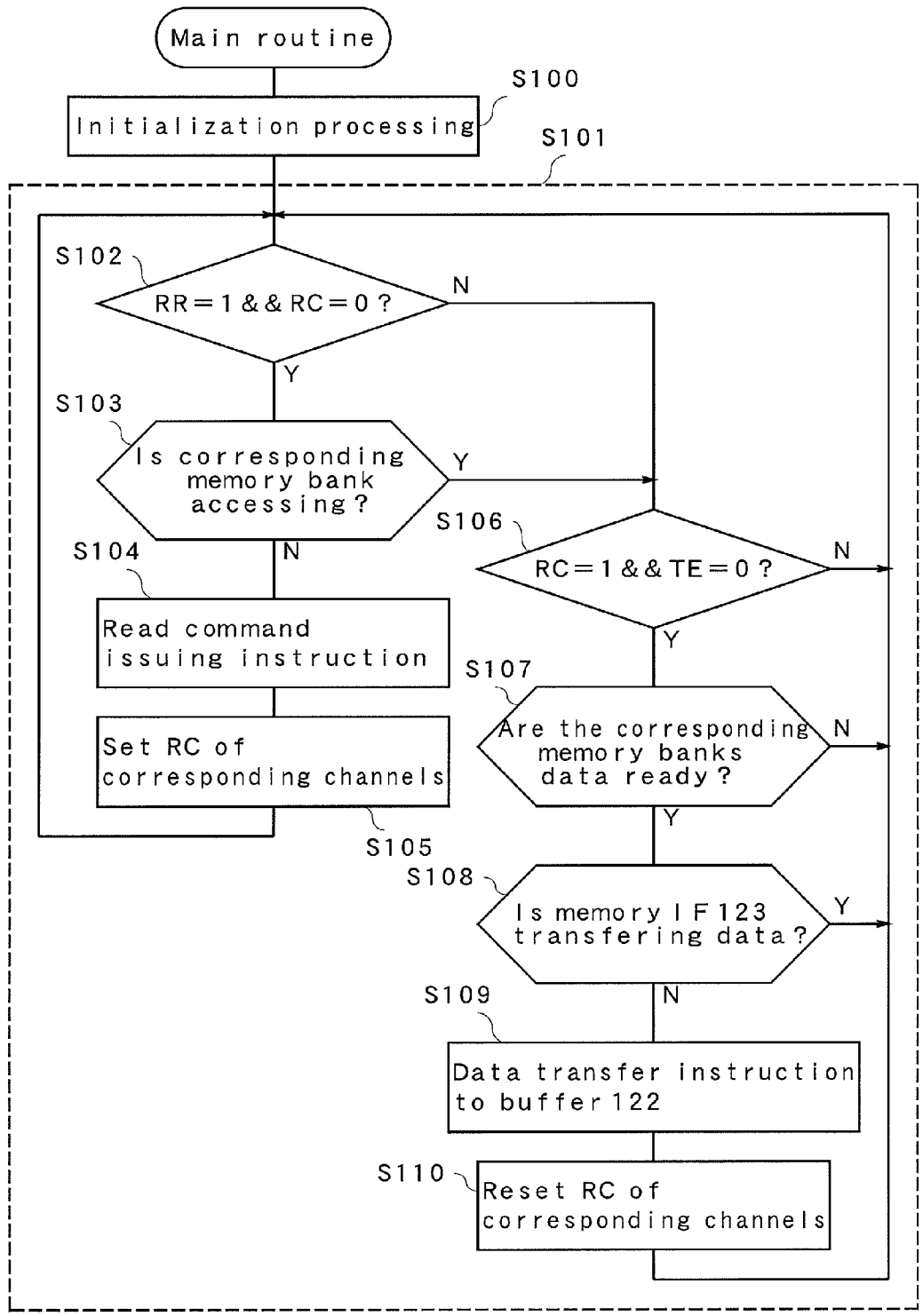

FIG. 16
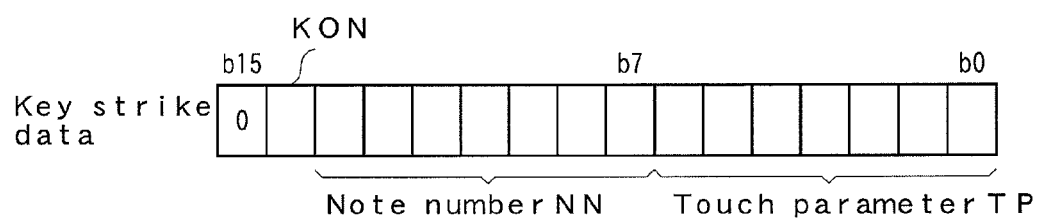
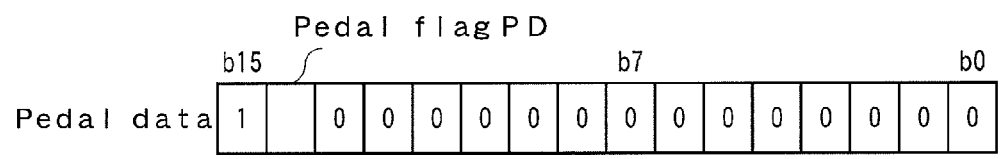
FIG. 17
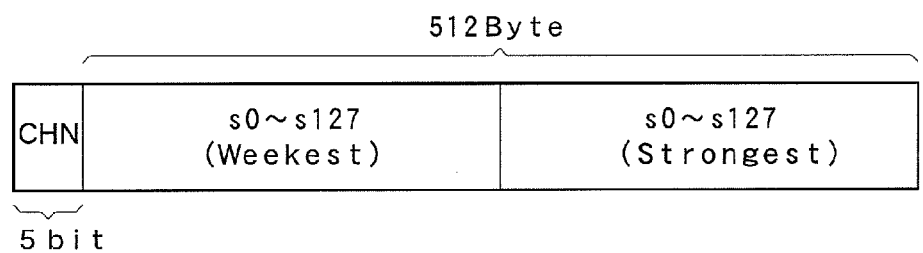

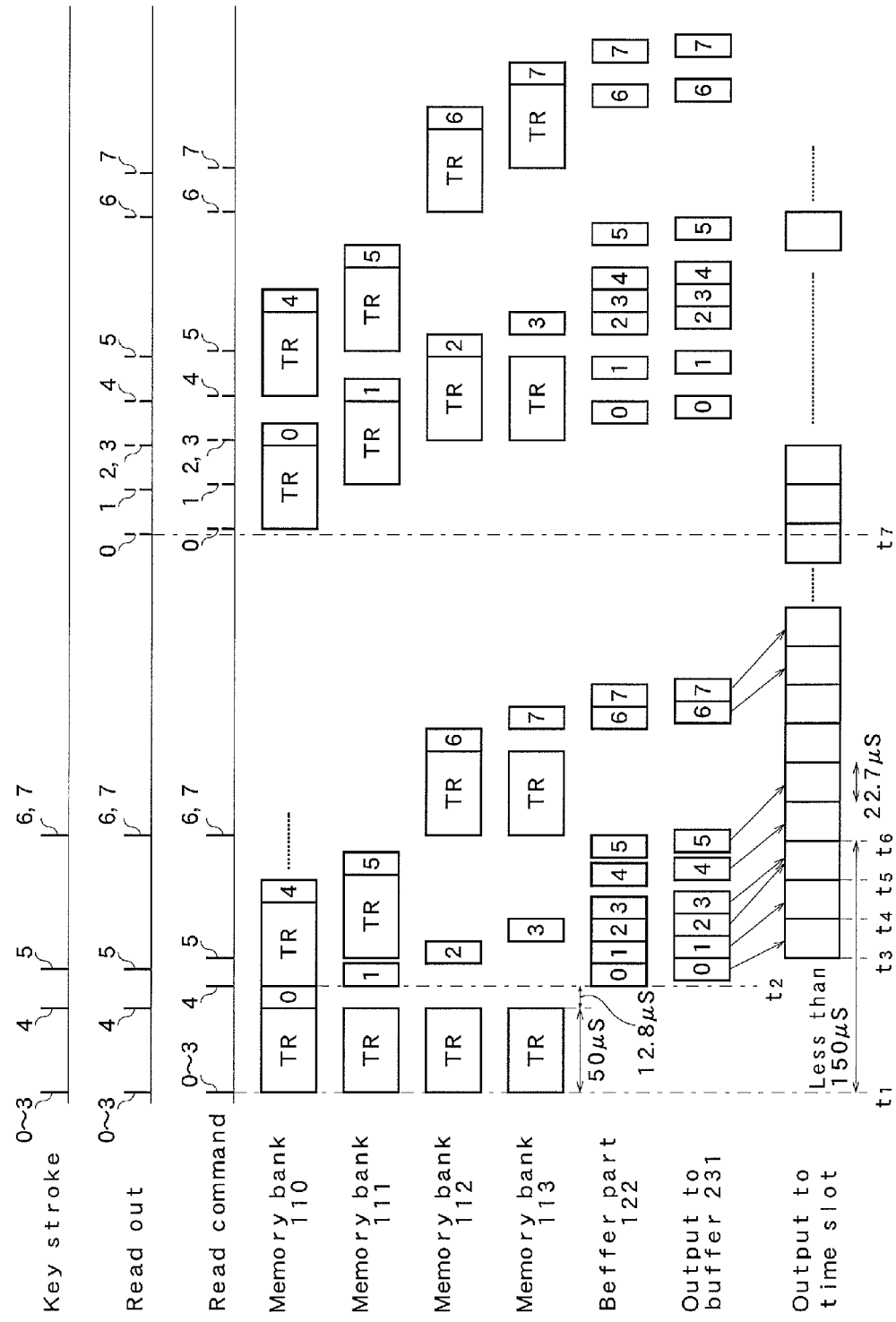

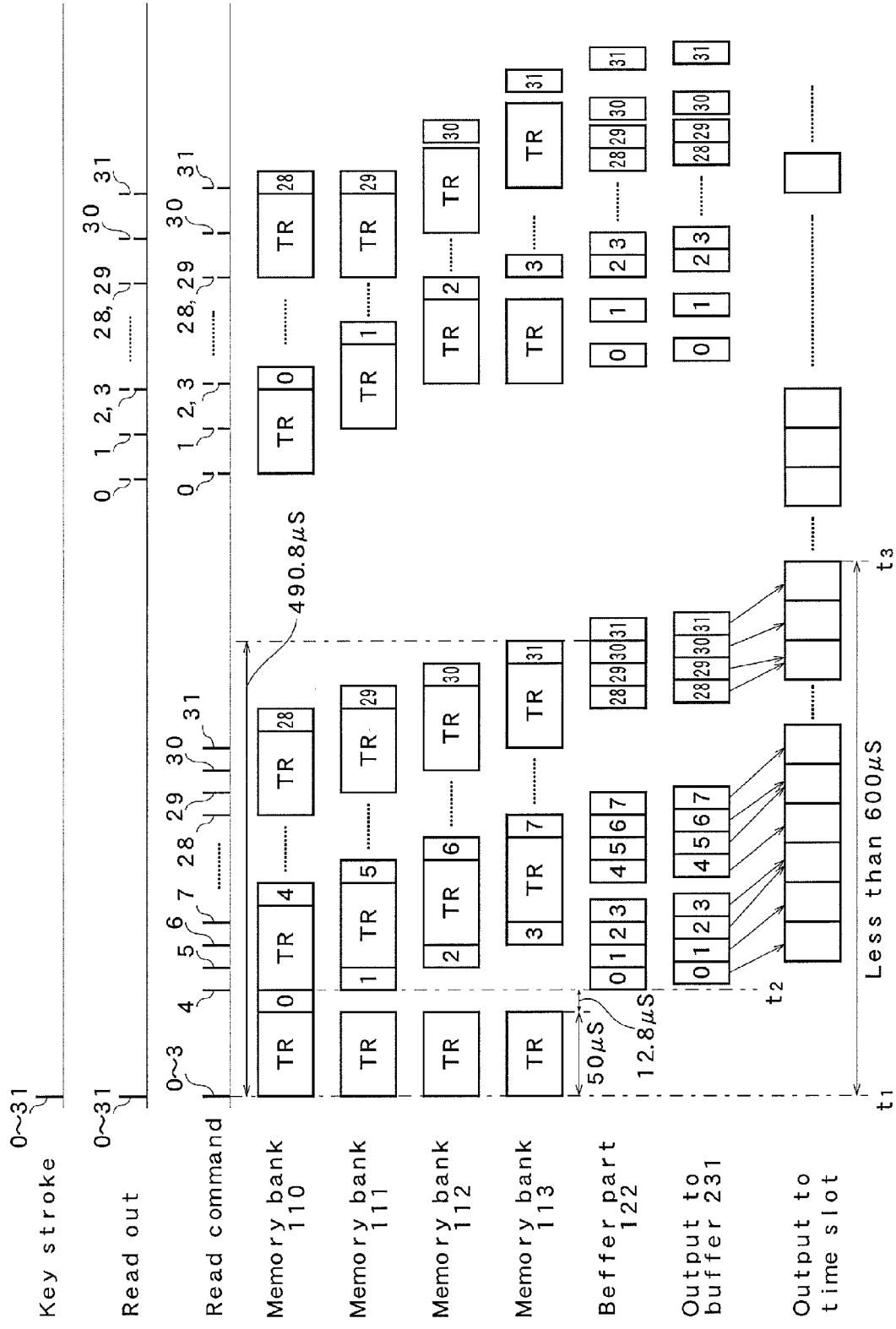

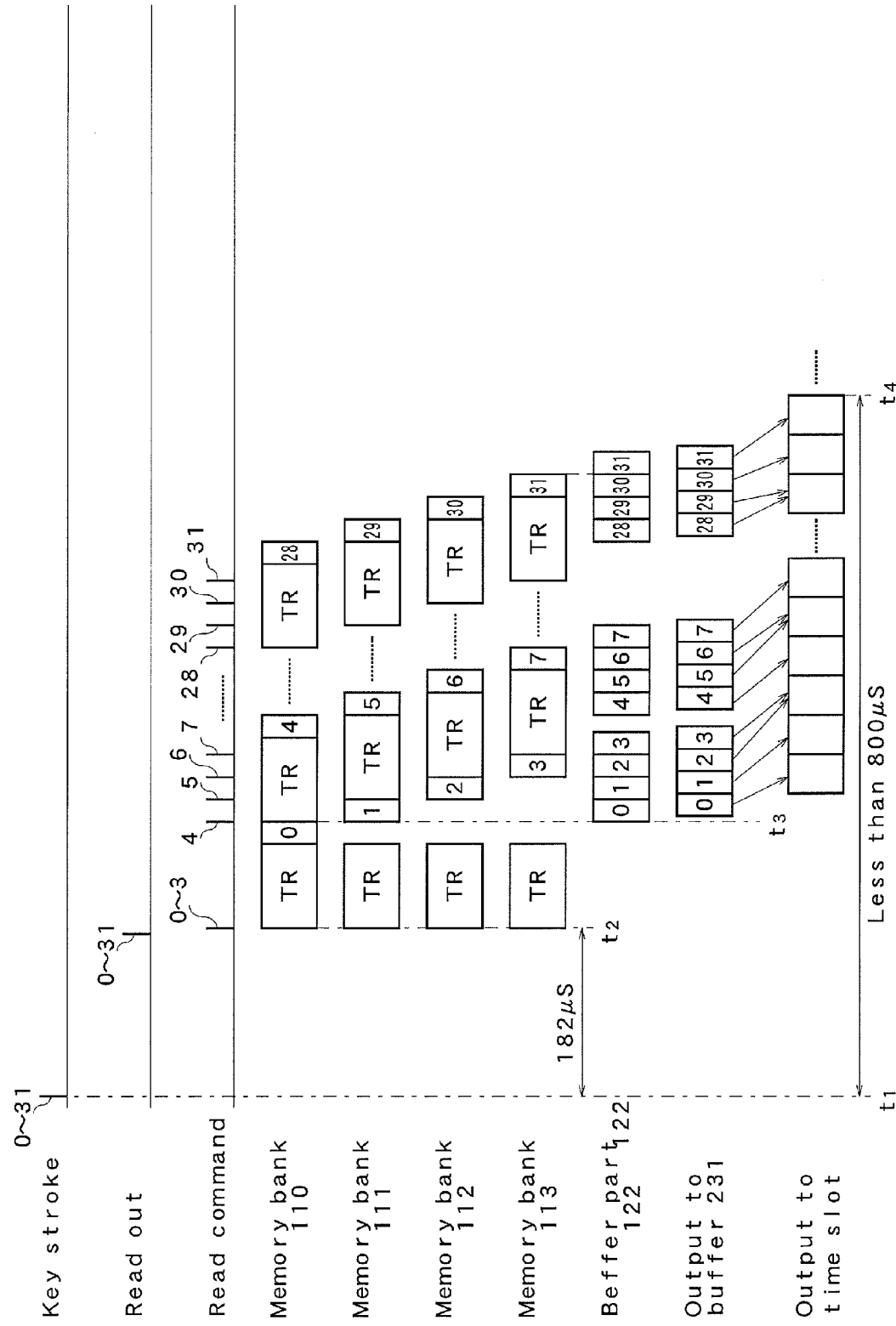

| CHN | LSN | Reading instruction receipt flag RR | Read command issuance flag RC | Data transfer completion flag TE |
|---|---|---|---|---|
| 0 | | 0→1→0 | 0→1→0 | 0→1→0 |
| 1 | | 0→1 | 0→1→0 | 0→1 |
| 2 | | 0→1 | 0→1 | 0 |
| 3 | | 0→1 | 0→1 | 0 |
| 4 | | 0 | 0 | 0 |
| 5 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |
| 0 | | 0 | 0 | 0 |

F I G. 3 1
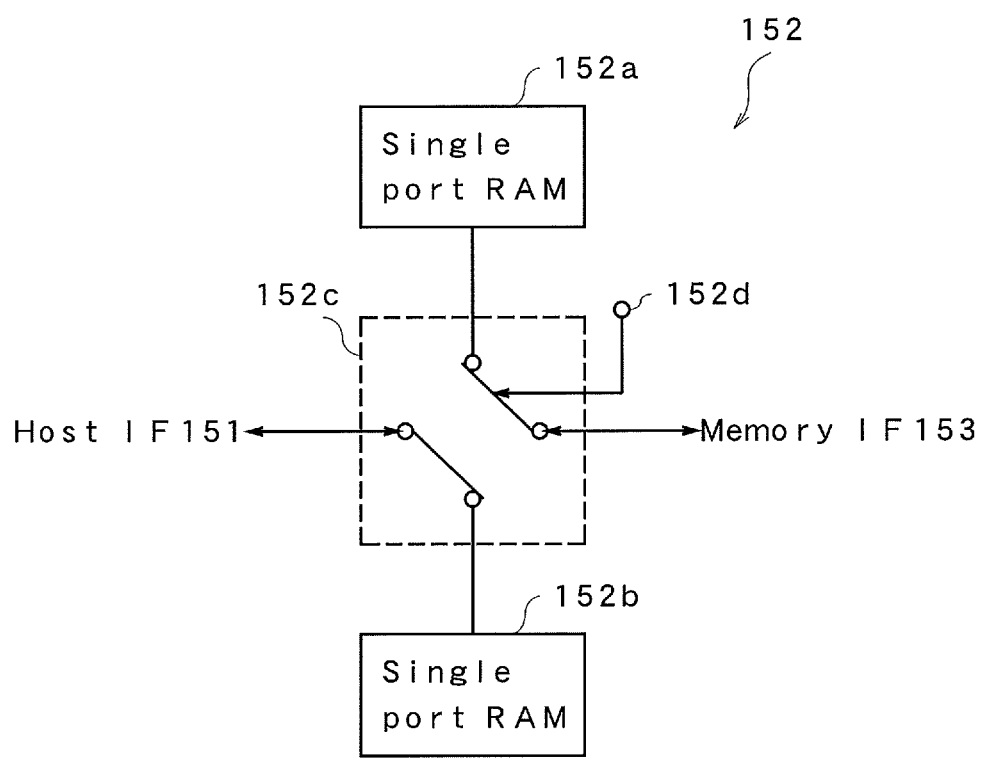

F I G. 32

| Sound code | Frequency (Hz) | Note number NN (Hexadecimal) | CLN | Leading CLN | Note |
|---|---|---|---|---|---|
| C-2 | 8.176 | 00 | | | |
| ..... | ..... | ..... | ..... | ..... | ..... |
| A-1 | 27.5 | 15 | 128~1151 | 128 | Lowest piano sound |
| ..... | ..... | ..... | ..... | ..... | ..... |
| C3 | 261.626 | 3C | 40064~41087 | 40064 | Middle piano range |
| C#3 | 277.183 | 3D | 41088~42111 | 41088 | Middle piano range |
| D3 | 293.665 | 3E | 42112~43135 | 42112 | Middle piano range |
| D#3 | 311.127 | 3F | 43136~44159 | 43136 | Middle piano range |
| E3 | 329.628 | 40 | 44160~45183 | 44160 | Middle piano range |
| F3 | 349.228 | 41 | 45184~46207 | 45184 | Middle piano range |
| F#3 | 369.228 | 42 | 46208~47231 | 46208 | Middle piano range |
| G3 | 391.995 | 43 | 47232~48255 | 47232 | Middle piano range |
| G#3 | 415.305 | 44 | 48256~49279 | 48256 | Middle piano range |
| A3 | 440.000 | 45 | 49280~50303 | 49280 | Middle piano range |
| A#3 | 466.164 | 46 | 50304~51327 | 50304 | Middle piano range |
| B3 | 493.883 | 47 | 51328~52351 | 51328 | Middle piano range |
| C4 | 532.251 | 48 | 52352~53375 | 52352 | Middle piano range |
| ..... | ..... | ..... | ..... | ..... | ..... |
| C7 | 4186.009 | 6C | 89216~90239 | 89216 | Highest piano sound |
| ..... | ..... | ..... | ..... | ..... | ..... |
| G8 | 12543.854 | 7F | | | |

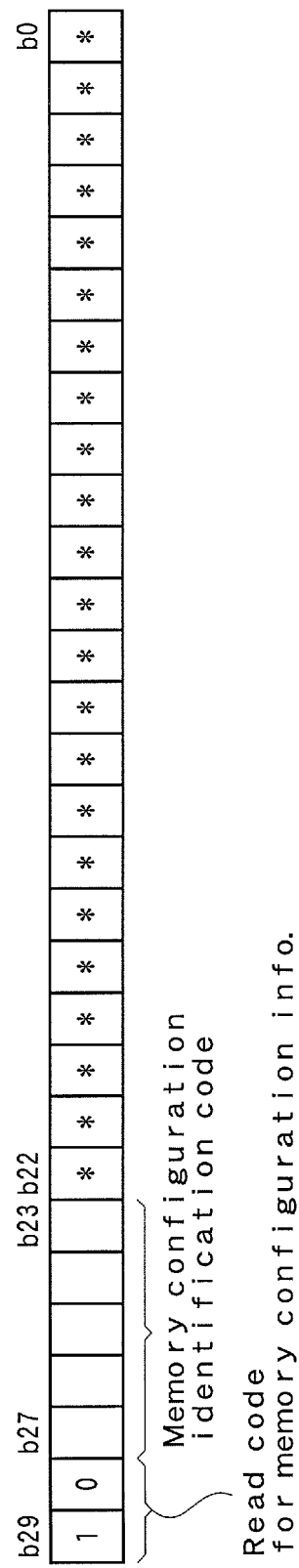

F I G. 3 5
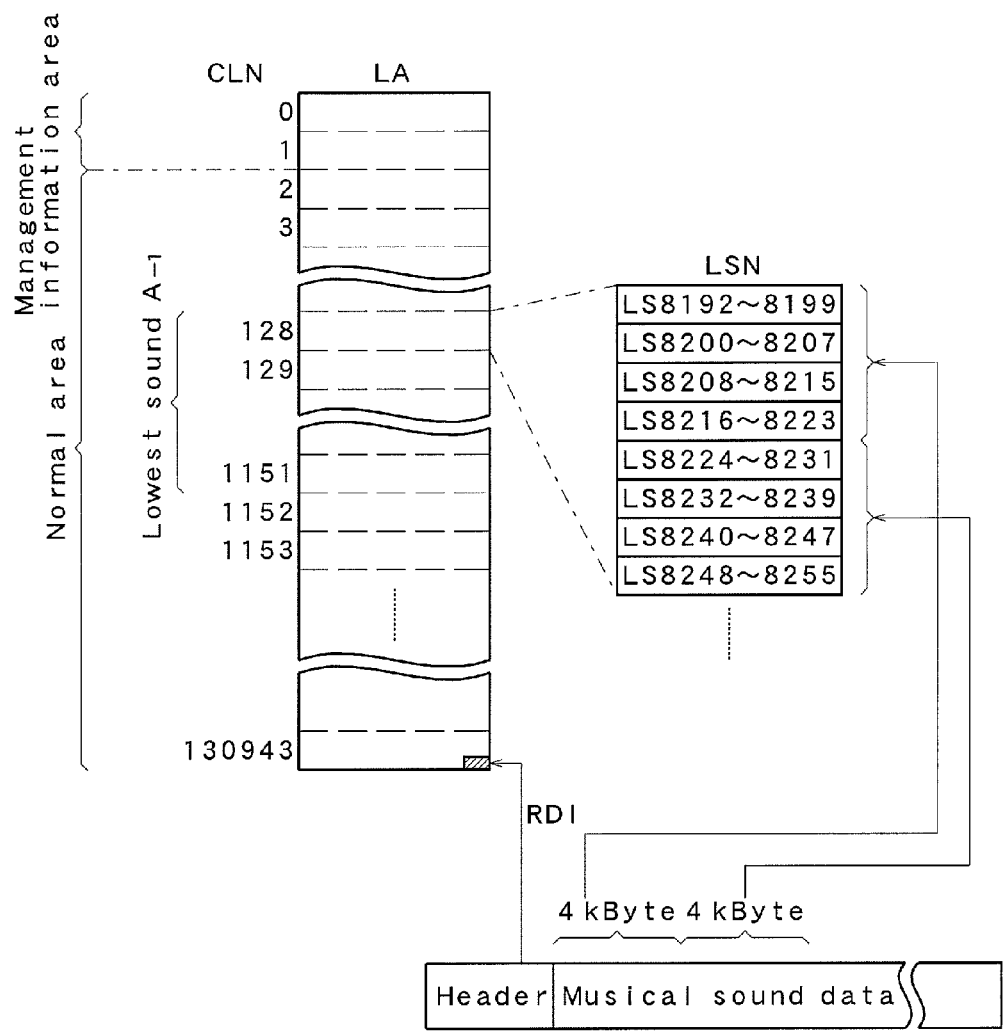

F I G. 3 8
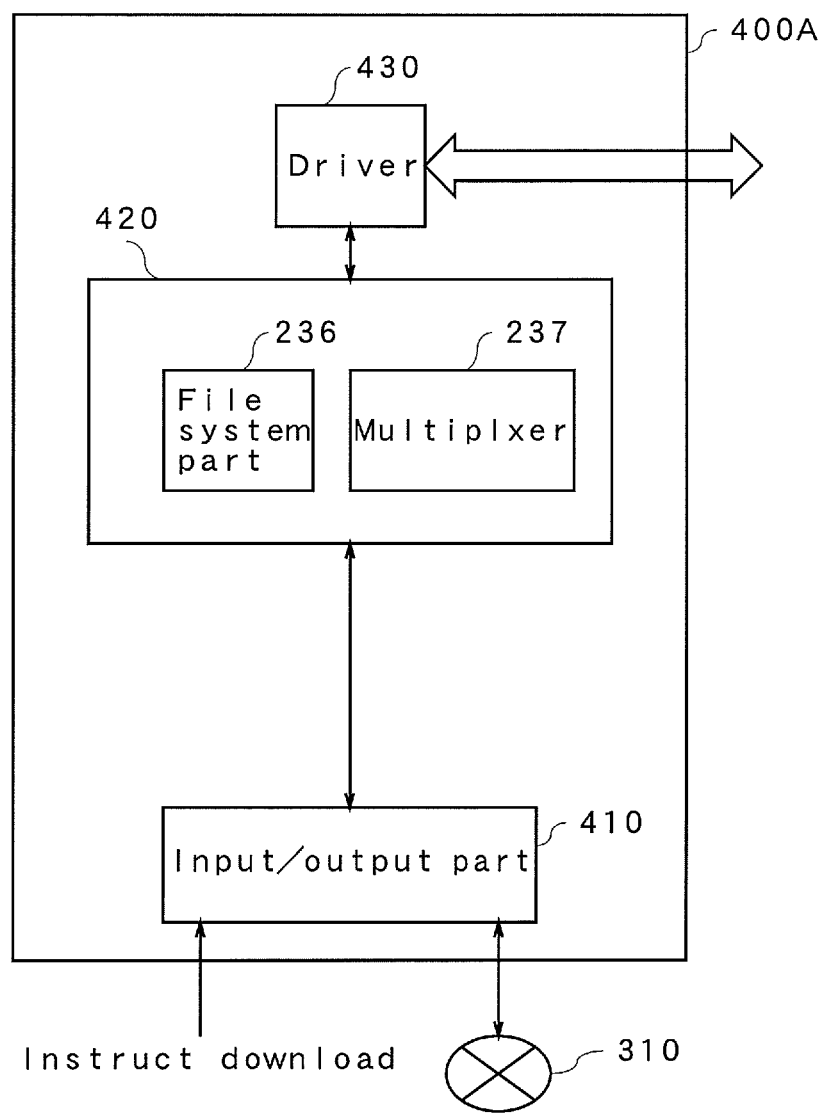

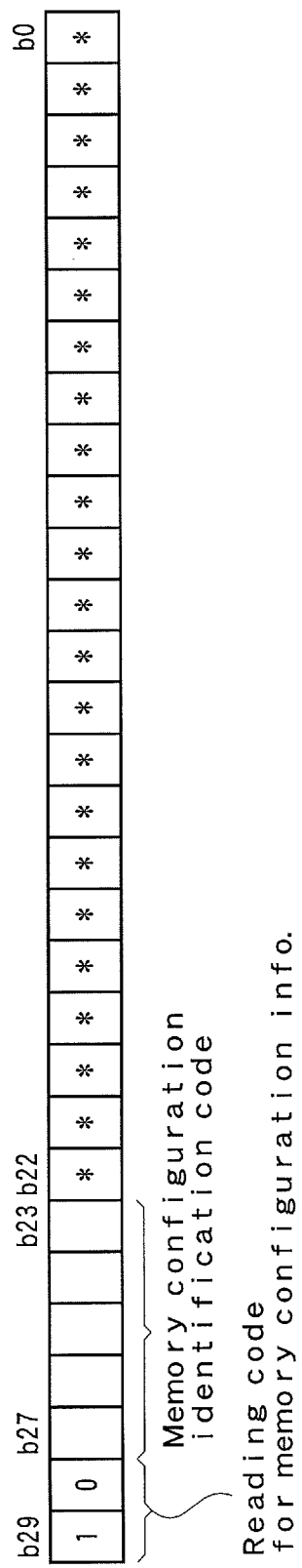

F I G. 46A
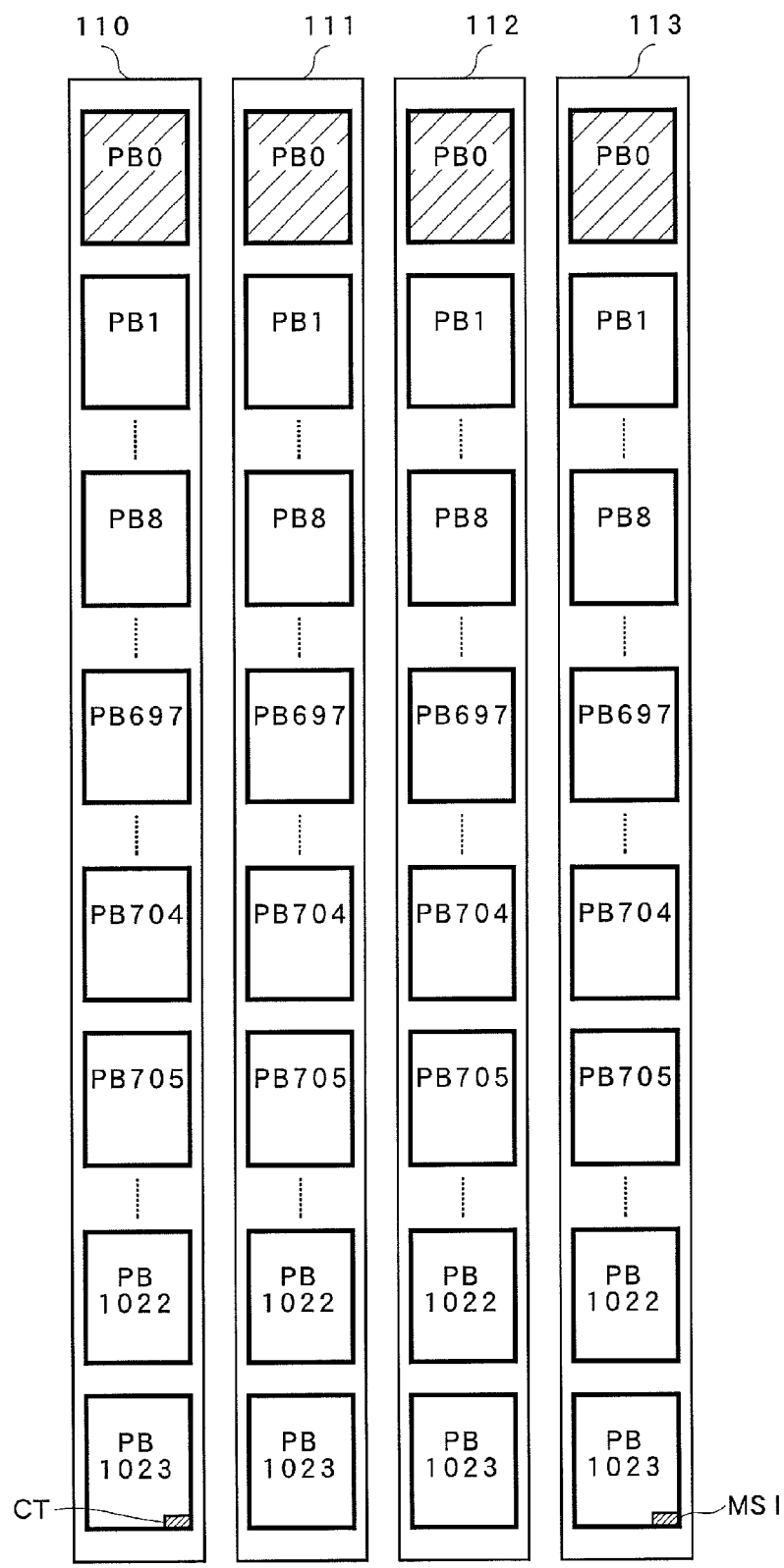

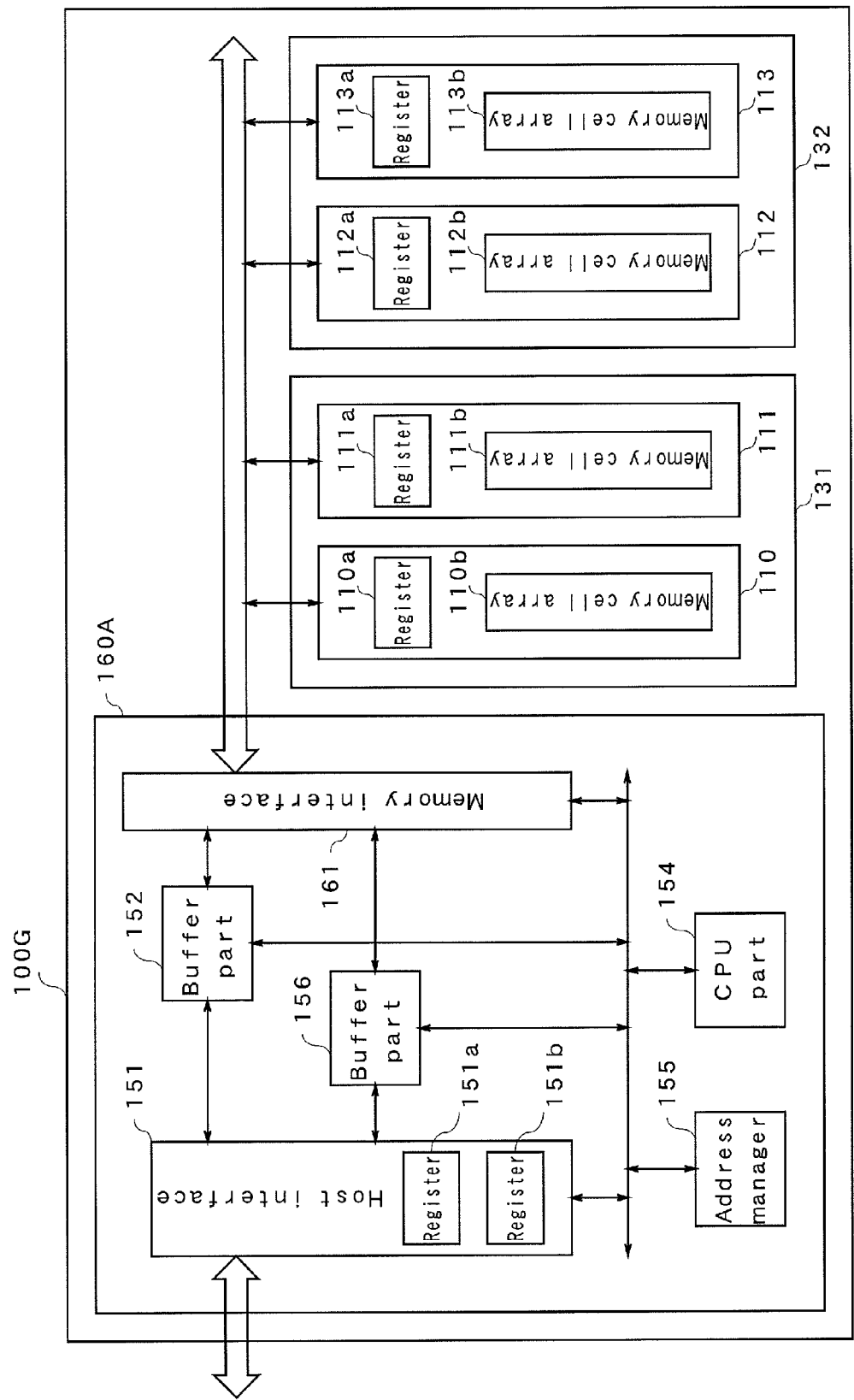

F I G. 5 2 B
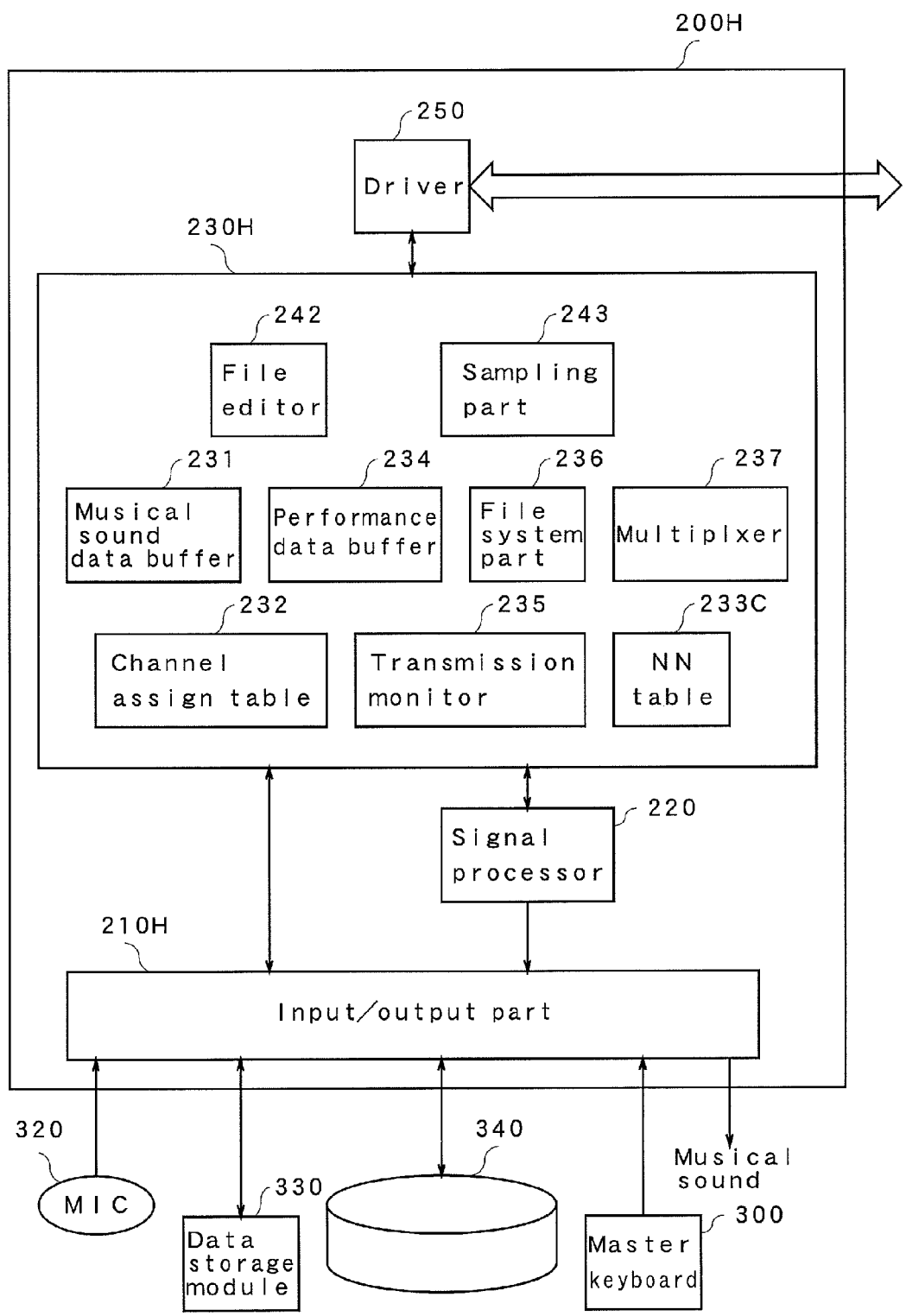

F I G. 5 6

| Item | Parameter example | Note |
|---|---|---|
| Name of tone | Piano | Set by user |
| Sampling frequncy | 44.1 kHz | Based on sampling part |
| Sampling period | 22.7 μsec. | Based on sampling part |
| Sound time per note | 40 sec. | Based on recording time |
| Number of samples per note | 1764000samples | Based on recording time |
| Occupied capacity per note | 8MByte | Actual use capacity=6.729MByte |
| Capacity per sample | 2Byte | Based on sampling part |
| Assigned bit to flag | b0 | Automatically set by CPU part 230 |
| Number of touches TN | 2 | Set by user |
| Total notes | 88 ノート | Automatically set by CPU part 230 |
| The lowest note name | A-1 | Set by user |
| The highest note name | C7 | Set by user |
| Maximun sound channels | 32 | Depend on memory configuration info. |
| Reverb | ON | Set by user |
| Chorus | OFF | Set by user |

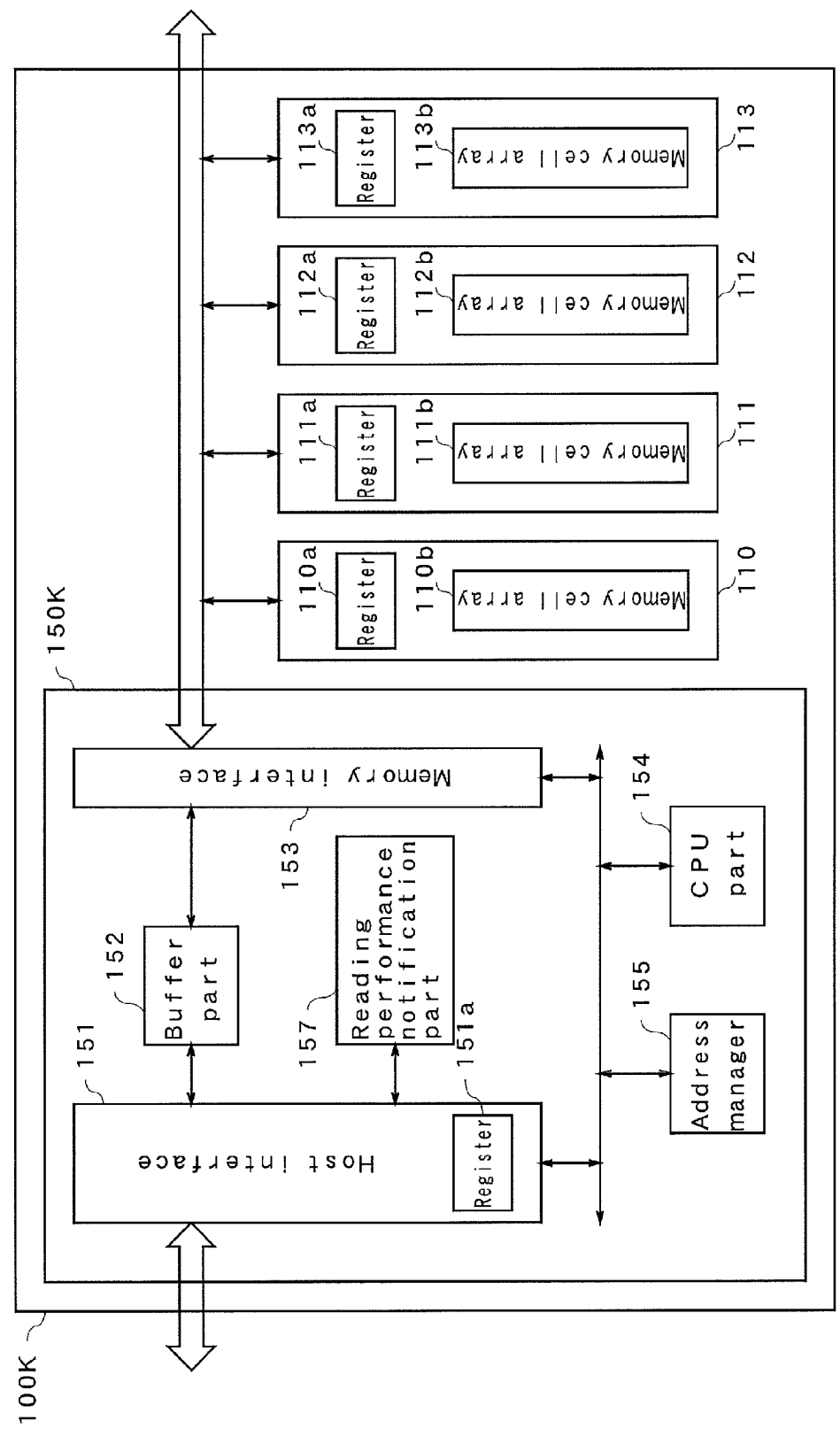

F I G. 6 1

| Parallel number | RR512 | Maximun sound channels | No. of sound channels |
|---|---|---|---|
| 1 | 8 MByte / sec. | 9 | 8 |
| 2 | 16 MByte / sec. | 18 | 16 |
| 4 | 32 MByte / sec. | 36 | 32 |

NONVOLATILE STORAGE MODULE, ACCESS MODULE, MUSICAL SOUND DATA FILE GENERATION MODULE AND MUSICAL SOUND GENERATION SYSTEM

TECHNICAL FIELD

The present invention relates to a nonvolatile storage module that stores musical sound data such as musical instrument sound in, e.g. a semiconductor memory card, an access module that reads the sound data from the nonvolatile storage module and applies signal processing to the musical sound data to generate musical sound, a musical sound generation system in which the access module is added to the nonvolatile storage module as a structural element, and a musical sound data file generation module that generates a sound material file group as a musical sound data file.

BACKGROUND ART

Demand for a nonvolatile storage module including a rewritable nonvolatile memory, mainly semiconductor memory cards, is increasing as a detachable storage device. Although the semiconductor memory card is much more expensive than an optical disc, a tape media and the like, due to merits such as compact size, light weight, resistance to seismic shocks and convenience in handling, its demand as a recording medium for portable equipment such as digital still cameras and mobile phones has been expanded.

The semiconductor memory card includes a flash memory as a nonvolatile main memory, and has a data reader that controls the flash memory. The data reader controls reading/writing with respect to the flash memory according to a reading/writing instruction from the access module such as the digital still camera. There are also nondetachable nonvolatile storage modules that are incorporated into the digital still camera or portable audio equipment main unit, or incorporated into a personal computer in place of a hard disc.

The flash memory includes a memory cell array and I/O register (RAM) that temporarily holds data read from the memory cell array or temporarily holds externally written data. Since the flash memory requires a relatively long time to write data to or erase data from memory cells forming the memory cell array, the flash memory is structured to be capable of writing data to or erasing data from a plurality of memory cells all together. Specifically, the flash memory is configured of a plurality of physical blocks and the physical blocks each have a plurality of pages. Data erasure is performed in physical block units and data writing is performed page units.

There exists a musical sound generation system which holds musical sound data of an electronic musical instrument or the like in a ROM. The musical sound generation system is a system that generates sound of the musical instrument (hereinafter referred to as musical sound) in response to a keystroke operation such as stroking a key. The musical sound generation system generally has 32 channels or more of sound production channels and for example, assigns the sound production channel in the order of keystrokes to generate the musical sound. Since the musical sound needs to be generated in response to a random key striking operation in this system, a mask ROM having a high random reading rate is used as the ROM for the musical sound data.

According to Patent document 1, with technical progress of the flash memory, it is estimated that a bit unit cost of the flash memory becomes lower than a bit unit cost of the mask ROM. The document discloses a technique of reducing system costs by using the flash memory having a lower random reading rate than the mask ROM as the ROM for musical sound data.

As estimated, to address a demand for larger capacity and lower costs, a gigabit class of multi-level NAND flash memory has become dominant by value multiplexing and process shrinking. As a result, the flash memory has a much more inexpensive bit unit cost and much larger capacity per unit area than the mask ROM and therefore, the possibility of a lower price and smaller size of the system has been increased more and more.

A binary NAND flash memory (product number: TC58V64FT) used in an embodiment of Patent document 1 is an old-type of small-capacity and high-speed flash memory in binary NAND flash memories, in which a capacity is 64 Mbits and a read time (hereinafter referred to as TR) required to access from the memory cell array to the I/O register and read data is 7 μs.

[Patent document 1] Japanese Unexamined Patent Publication No. 2000-284783

DISCLOSURE OF INVENTION

Problem to be Solved by the Invention

Here, to keep high sound quality, a high-quality musical sound generation system that stores musical sound data obtained by digitally recording sound of a musical instrument such as a piano in a mask ROM or NAND flash memory in an uncompressed form is considered. In this case, assuming that a sampling frequency is 44.1 kHz, sound production time per key is 40 seconds, word length per sample of musical sound data is 2 Bytes, a total number of keys of the piano is 88, and when two touches at the strongest key strike and weakest key strike are recorded, as represented by an expression (1), a capacity of about 621 MBytes is required.

$$44.1 \times 40 \times 2 \times 2 \times 88 \cong 621 \text{ MBytes} \quad (1)$$

Accordingly, when using the above-mentioned binary NAND flash memory having the capacity of 64 Mbits, as represented by an expression (2), about 78 NAND flash memories need to be installed.

$$621 \text{ MBytes} \div 64 \text{ Mbit} \cong 78 \quad (2)$$

Therefore, it is difficult to reduce the musical sound generation system in size.

On the contrary, when using a currently dominant gigabit-class of multi-level NAND flash memory, by installing only one or a few multi-level NAND flash memories, the musical sound data of 621 MBytes can be stored in the uncompressed form.

However, in the case of the multi-level NAND flash memory, due to extension of a page size to increase a speed at which large-capacity data is read/written at one time and value multiplexing, a read time TR has an excessively large value of 50 μs. In the musical sound generation system, it is generally required to produce sound of 32 channels at the same time. However, when it is attempted to generate the musical sound of 32nd channel, as represented by an expression (3), a sound production delay time becomes at least 1.6 ms.

$$\text{Sound production delay time} = 50 \text{ μs} \times 32 = 1.6 \text{ ms} \quad (3)$$

The sound production delay time is time from a key striking operation to start of sound production and its allowable range is generally smaller than or equal to 1 ms. When the time exceeds 1 ms, a sense of discomfort occurs in playing, impairing the musical sound generation system effectiveness.

Thus, an object of the present invention is to provide a nonvolatile storage module, an access module and a musical sound generation system that can achieve a high sound quality and compact musical sound generation system even when the currently dominant large-capacity multi-level NAND memory such as a multi-level NAND flash memory is used as a memory for the musical sound data. Another object of the present invention is to enable easy updating of tone and application to the high sound quality and compact electronic musical instruments with automatic accompaniment and karaoke machines, and to provide a musical sound data file generation module that generates a musical sound data file based on a sound material file group recorded in a data storage module.

To solve the problems, a nonvolatile storage module of the present invention for reading data according to an external reading instruction comprises: a plurality of nonvolatile memory banks, each banks already recording the same musical sound data therein; and a data reader that reads data from any of said nonvolatile memory banks according to one external reading instruction and, when another reading instruction is issued before the reading is completed, reads data from a nonvolatile memory bank other than the nonvolatile memory bank that is being read in parallel.

To solve the problems, a nonvolatile storage module of the present invention for reading and writing data according to an external access instruction comprises: a plurality of nonvolatile memory banks, each banks recording the same musical sound data therein; and a data reader/writer that reads data from any of said nonvolatile memory banks according to one external reading instruction and, when another reading instruction is issued before the reading is completed, reads data from a nonvolatile memory bank other than the nonvolatile memory bank that is being read in parallel, reads memory configuration information representing structures of said nonvolatile memory banks as well as write the musical sound data by multiplexing the data to said nonvolatile memory bank.

Said nonvolatile memory banks may record at least one of audio data, performance data, image data and text data and memory configuration information representing configurations of said nonvolatile memory banks in addition to the multiplexed musical sound data; and said data reader/writer may write the musical sound data by multiplexing the data and writes at least one of the audio data, performance data, image data and text data.

Said nonvolatile memory banks may hold memory configuration information representing the configurations of said nonvolatile memory banks and reading performance information.

Said nonvolatile memory bank may hold the memory configuration information representing the configurations of said nonvolatile memory banks and reading performance information.

To solve the problems, an access module of the present invention is an access module for issuing a reading instruction to a nonvolatile storage module, wherein said nonvolatile storage module includes: a plurality of nonvolatile memory banks, each banks recording the same musical sound data therein; and a data reader that reads data from any of said nonvolatile memory banks according to one external reading instruction and, when another reading instruction is issued before the reading is completed, reads data from a nonvolatile memory bank other than the nonvolatile memory bank that is being read in parallel; and said access module further include: a signal processor that performs musical sound generation processing for a plurality of channels every sampling cycle by time division multiplexing processing based on the musical sound data read from said nonvolatile storage module.

To solve the problems, an access module of the present invention is an access module for writing data to a nonvolatile storage module and issuing a reading instruction to the nonvolatile storage module, wherein said nonvolatile storage module includes: a plurality of nonvolatile memory banks, each banks recording the same musical sound data therein; a memory that holds memory configuration information representing configurations of said nonvolatile memory banks; and a data reader/writer that reads data from any of said nonvolatile memory banks according to one external reading instruction and, when another reading instruction is issued before the reading is completed, reads data from a nonvolatile memory bank other than the nonvolatile memory bank that is being read in parallel, reads the memory configuration information representing the configurations of said nonvolatile memory banks and writes the musical sound data by multiplexing the data to said nonvolatile memory banks; and wherein said access module further includes: a file system part that manages the musical sound data held in said nonvolatile memory as a file; and a signal processor that performs musical sound generation processing for a plurality of channels every sampling cycle by time division multiplexing processing based on the musical sound data read from said nonvolatile storage module.

To solve the problems, an access module of the present invention is an access module for issuing a reading instruction to a nonvolatile storage module, wherein said nonvolatile storage module includes: a plurality of nonvolatile memory banks, each banks recording the same musical sound data therein; and a data reader/writer that reads data from any of said nonvolatile memory banks according to one external reading instruction and, when another reading instruction is issued before the reading is completed, reads data from a nonvolatile memory bank other than the nonvolatile memory bank that is being read in parallel, reads the memory configuration information representing configurations of said nonvolatile memory banks and writes musical sound data by multiplexing the data to said nonvolatile memory banks; and said access module includes: a sound production channel number determination part that determines the number of sound production channels so that a sound production delay time is smaller than or equal to a predetermined time based on reading performance information and recorded data characteristic information that are acquired from said nonvolatile storage module; and issues the reading instruction to said nonvolatile storage module within a scope of the determined number of sound production channels.

To solve the problems, a musical sound data file generation module of the present invention for generating a musical sound data file in a nonvolatile storage module including a plurality of nonvolatile memory banks comprises: a file editor that edits a sound material file group recorded in a data storage module to the musical sound data file; a multiplexer that multiplexes said musical sound data based on said memory configuration information notified from said nonvolatile storage module; and a file system part that writes the musical sound data multiplexed by said multiplexer as the musical sound data file to at least two said nonvolatile memory banks in said nonvolatile storage module.

To solve the problems, a musical sound generation system of the present invention comprises an access module and a nonvolatile storage module for reading and writing data according to a reading/writing instruction from said access module, wherein said nonvolatile storage module includes: a plurality of nonvolatile memory banks, each banks recording the same musical sound data therein; and a data reader/writer that reads data from any of said nonvolatile memory banks according to one external reading instruction and, when another reading instruction is issued before the reading is completed, reads data from a nonvolatile memory bank other than the nonvolatile memory bank that is being read in parallel, reads memory configuration information representing configurations of said nonvolatile memory banks and writes musical sound data by multiplexing the data to said nonvolatile memory banks; and said access module includes: a multiplexer that multiplexes the musical sound data based on said memory configuration information read from said nonvolatile storage module; a file system part that writes the same musical sound data file multiplexed by said multiplexer to at least two said nonvolatile memory banks in said nonvolatile storage module and reads said musical sound data file; and a signal processor that performs musical sound generation processing for a plurality of channels every sampling cycle by time division multiplexing processing based on the musical sound data read from said nonvolatile storage module.

Said access module further may include a file editor that edits a sound material file group stored in a data storage module to one of the musical sound data file.
Effectiveness of the Invention According to the present invention, the musical sound data is multiplexed and recorded in a plurality of nonvolatile memory banks without being compressed and a data reader reads the musical sound data from the plurality of nonvolatile memory banks in parallel according to a reading instruction from an access module. For this reason, in a system that cannot expect which pitch of the musical sound data is instructed to be read, such as a musical sound generation system, the plurality of pieces of data can be read from the plurality of nonvolatile memory banks in parallel, thereby making a sound production delay time shorter than its allowable time. Therefore, even when the currently dominant large-capacity multi-level NAND flash memory is used as a memory for the musical sound data, an inexpensive and compact musical sound generation system can be realized.

According to the present invention, the musical sound data is multiplexed and recorded in the plurality of nonvolatile memory banks without being compressed and the data reader reads the musical sound data from the plurality of nonvolatile memory banks in parallel according to the reading instruction from the access module, and therefore, similar effects can be obtained.

Further, since the musical sound data can be managed as a file by providing a file system part in the access module, the musical sound data downloaded via the Internet or the like is written to the nonvolatile storage module, thereby enabling updating of the tone.

Furthermore, when the musical sound data multiplexed as a file is written by a writing module, the musical sound data downloaded via the Internet or the like is written to the nonvolatile storage module, thereby enabling updating of the tone.

Further, when the file system part multiplexes and manages the musical sound data in a logical address space and holds audio data, image data and text data, the present invention can also be applied to systems such as an electronic musical instrument that has audio data as background sound and karaoke machine that can generate background sound of the musical sound data while displaying background image and lyrics.

Since the musical sound data can be managed as the file by providing the file system part in the access module, by editing a sound material file group recorded by a user to one piece of musical sound data and multiplexing the musical sound data by a multiplexer and writing the multiplexed musical sound data as the musical sound data file to the nonvolatile storage module by the file system part, the musical sound data file can be generated based on the sound material file group recorded in the data storage module such as a linear PCM recorder. Further, by writing musical material data recorded by the user to the nonvolatile storage module, the tone can be easily updated.

Further, since a sound production channel number determiner determines the number of sound production channels so that the sound production delay time of the access module is smaller than or equal to a predetermined time based on reading performance information and recorded data characteristic information acquired from the nonvolatile storage module, a high sound quality and compact musical sound generation system can be realized irrespective of a reading performance of the nonvolatile storage module.

BRIEF DESCRIPTION OF DRAWINGS

FIG. 1A is a block diagram illustrating a nonvolatile storage module of a musical sound generation system according to embodiment 1 of the present invention.

FIG. 3 is a diagram illustrating a record format in a page using P0 of PB0 as an example.

FIG. 4 is a bit format illustrating correspondence between LSN and a physical address.

FIG. 5 is a memory map illustrating a register 121a in a host interface in the present embodiment.

FIG. 6 is a block diagram illustrating a configuration of a buffer part 122.

FIG. 8A is an explanatory diagram illustrating a channel assign table 232.

FIG. 8B is an explanatory diagram illustrating the channel assign table 232.

FIG. 8C is an explanatory diagram illustrating the channel assign table 232.

FIG. 9 is an explanatory diagram illustrating an NN table 233A.

FIG. 10 is a bit format illustrating one sample of musical sound data.

FIG. 11 is an explanatory diagram illustrating characteristic information of piano musical sound data recorded in a nonvolatile storage module 100.

FIG. 12 is an explanatory diagram illustrating memory configuration information of the nonvolatile storage module 100.

FIG. 13A is a flow chart illustrating normal processing of a CPU part 124.

FIG. 16 is a bit format illustrating performance data transferred from a master keyboard.

FIG. 17 is a bit format illustrating the musical sound data read onto an external bus from the nonvolatile storage module 100.

FIG. 24A is a time chart of the musical sound generation system in embodiment 1 of the present invention.

FIG. 24B is a time chart of the musical sound generation system in embodiment 1 of the present invention.

FIG. 24C is a time chart of the musical sound generation system in embodiment 1 of the present invention.

FIG. 30 is a memory map illustrating a register 151a in a host interface in the present embodiment.

FIG. 31 is a block diagram illustrating a structure of a buffer part 152.

FIG. 32 is an explanatory diagram illustrating an NN table 233C.

FIG. 33A is a bit format illustrating reading instruction information sent from an access module 200C to a nonvolatile storage module 100C.

FIG. 35 is an explanatory diagram illustrating file allocation of the musical sound data acquired via the Internet 310.

FIG. 38 is a block diagram illustrating a writing module of a data writing system in embodiment 4 of the present invention.

FIG. 42A is a bit format illustrating reading instruction information sent from an access module 200A to a nonvolatile storage module 100E.

FIG. 46A is an explanatory diagram illustrating a storage state of the nonvolatile memory banks 110 to 113 prior to writing of the musical sound data.

FIG. 51 is a block diagram illustrating a nonvolatile storage module of a musical sound generation system in embodiment 7 of the present invention.

FIG. 52B is a block diagram illustrating an access module 200H of embodiment 8 of the present invention.

FIG. 56 is an explanatory diagram illustrating characteristic information of a recorded piano sound material.

FIG. 60A is a block diagram illustrating a nonvolatile storage module of a musical sound generation system in embodiment 11 of the present invention.

FIG. 61 is an explanatory diagram illustrating relationship between reading performance information and the maximum number of sound production channels.

DESCRIPTION OF REFERENCE NUMERALS

Figure 1B:
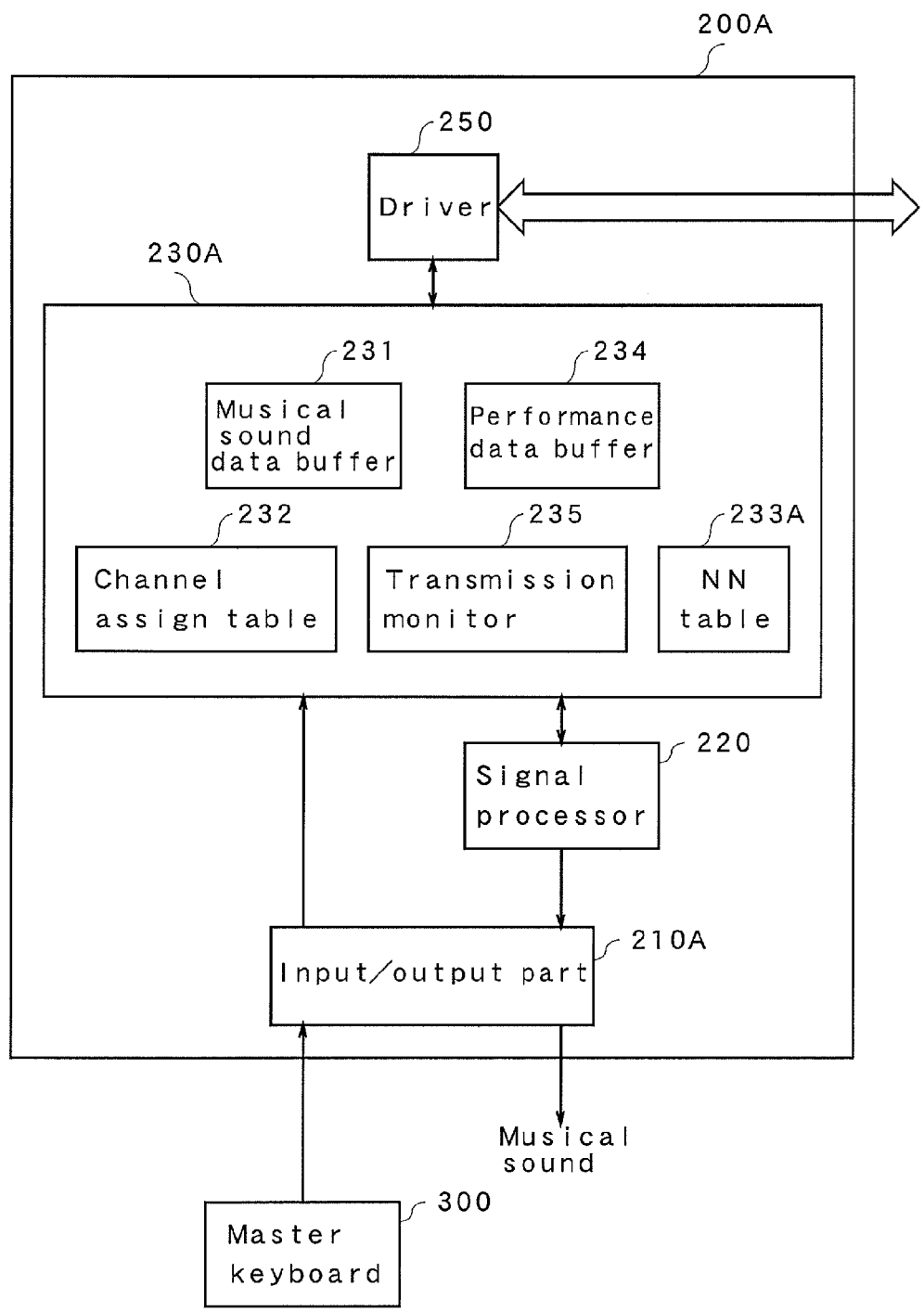
FIG. 1B is a block diagram illustrating an access module of the musical sound generation system according to embodiment 1 of the present invention.

100A to 100K Nonvolatile storage module
110 to 113 Nonvolatile memory bank
110a to 113a I/O register
110b to 113b Memory cell array
120, 140 Data reader
121 Host interface
121a Register
122 Buffer part
122a, 122b Single port RAM
122c RAM switching circuit
123, 141, 153, 161, 162 Memory interface
124, 154, 230C, 230E, 420 CPU part
131, 132 Flash memory
150C, 150E, 150H, 160A, 160B Data reader/writer
151 Host interface
151a, 151b Register
152, 156 Buffer part
152a, 152b Single port RAM
152c RAM switching circuit
155 Address manager
157 Reading performance notification part
200A to 200K Access module
210A, 210C, 210E, 210H, 410 Input/output part
220, 222, 224 Signal processor
231 Musical sound data buffer
231a, 231b Dual port RAM
231c Multiplexer
231d Demultiplexer
232 Channel assign table
233A, 233C NN table
234 Performance data buffer
235 Transmission monitor
236 File system part
237 Multiplexer
238 Contents identifier
239 Audio buffer
240 Karaoke buffer
242 File editor
243 Sampling part
245 Sound production channel number determiner
250, 430 Driver
300 Master keyboard
310 Internet
320 Microphone
330, 500 Data storage module
340 Hard disc
400A Data writing module
400B Musical sound data file generation module

BEST MODE FOR CARRYING OUT THE INVENTION (Embodiment 1)

FIGS. 1A and 1B are block diagrams illustrating a musical sound generation system in embodiment 1 of the present invention. The musical sound generation system includes a nonvolatile storage module 100A shown in FIG. 1A and an access module 200A shown in FIG. 1B. The nonvolatile storage module 100A includes four nonvolatile memory banks 110 to 113 provided in parallel with each other and a data reader 120. The data reader 120 includes a host interface 121, buffer part 122, memory interface 123 and CPU part 124.

The access module 200A includes an input/output part 210A, signal processor 220, CPU part 230A and driver 250, and can simultaneously output musical sound of 32 channels. Hereinafter a channel number is defined as CH0 to CH31. The CPU part 230A includes a musical sound data buffer 231, a channel assign table 232, an NN table 233A, performance data buffer 234 and a transfer monitor 235.

Next, each part of the nonvolatile storage module 100A will be described in detail. The nonvolatile memory banks 110 to 113 are each a flash memory and include I/O registers 110a to 113a and memory cell arrays 110b to 113b, respectively. Each of the I/O registers 110a to 113a is a RAM having a capacity of 4096 Bytes+128 Bytes. The memory cell arrays 110b to 113b each have 1024 physical blocks. The physical block is an erasing unit of the flash memory. Hereinafter, it is defined that the physical block is PB, a logical sector is LS, a physical block number is PBN, a logical sector number is LSN, a physical block, for example, having the physical block number PBN of 0 is PB0 and a logical sector, for example, having the logical sector number LSN of 0 is LS0.

Figure 2:
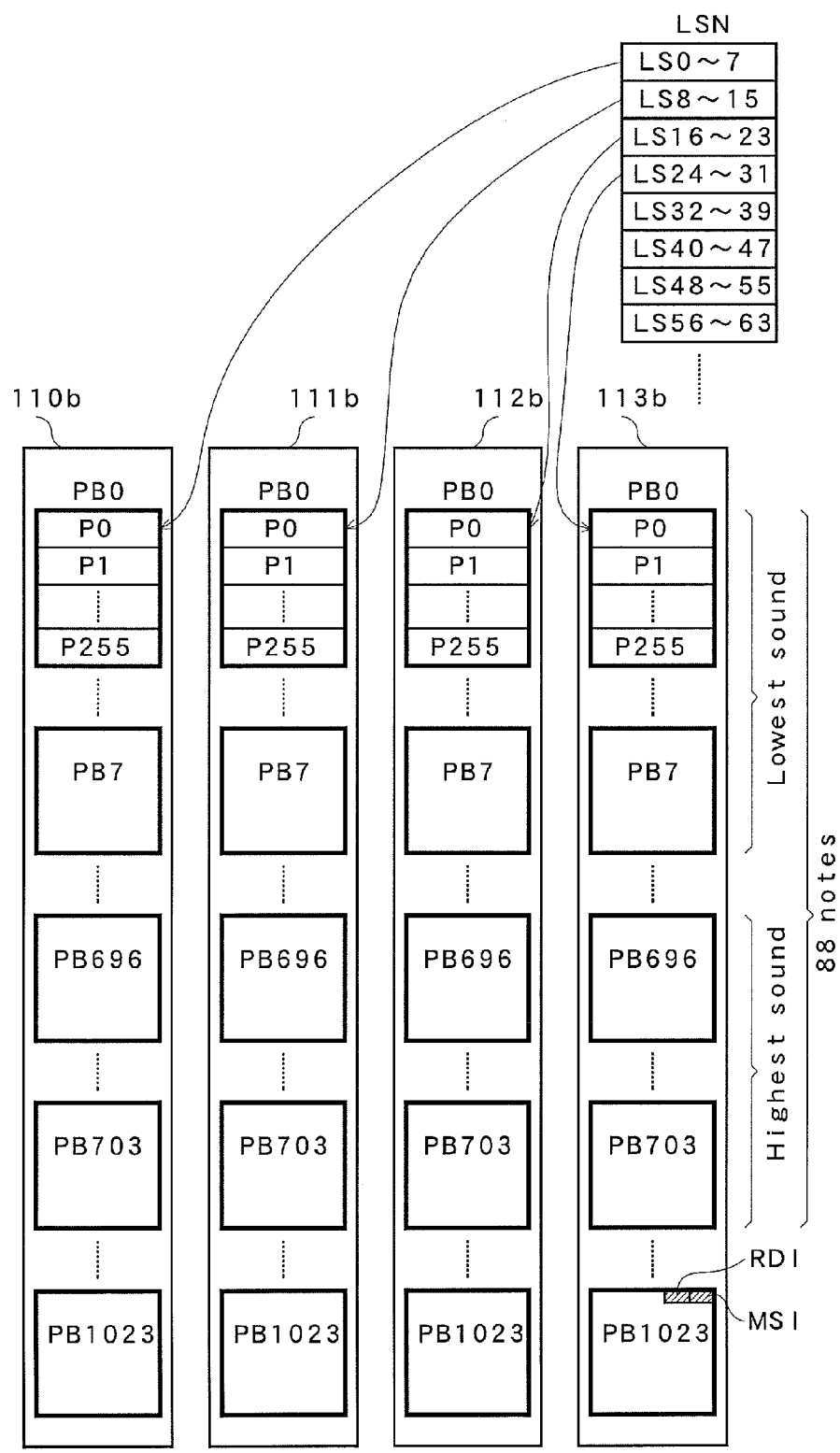
FIG. 2 is an explanatory diagram illustrating relationship between structures in nonvolatile memory banks 110 to 113 and LSN.

FIG. 2 is an explanatory diagram illustrating relationship between structures in the memory cell arrays 110b to 113b and logical sector number LSN. The memory cell arrays 110b to 113b each have physical blocks PB0 to PB1023. Each physical block is constituted of 256 pages (P0 to P255), respectively.

FIG. 3 is a diagram illustrating a record format in each page using the page 0 of the physical block PB0 as an example. Each page of the whole physical block includes a data area of 4096 Bytes and redundancy area of 128 Bytes. In the present embodiment, the data area is divided into eight sectors. Each sector has a capacity of 512 Bytes. The redundancy area is not used. Details of recorded data will be described later.

FIG. 4 is a bit format illustrating correspondence between the logical sector number LSN and physical addresses. In FIG. 4, bits b0 to b2 represent in-page sector selection bits, b3, b4 represent a bank select, b5 to b12 represent a page number and b13 to b22 represent the physical block number. When the bank select b3, b4 has a value 0, the nonvolatile memory bank 110 is selected, when the bank select has a value 1, the nonvolatile memory bank 111 is selected, when the bank select has a value of 2, the nonvolatile memory bank 112 is selected and when the bank select has a value of 3, the nonvolatile memory bank 113 is selected.

The bit format shown in FIG. 4 is an example of the case where the number of parallely provided nonvolatile memory banks is four, and the number of bits assigned to the bank select may be changed depending on the parallel number. For example, when the parallel number is two, the number of bits assigned to the bank select is one (b3) and accordingly, the page number is assigned to b11 to b4 and PBN is assigned to b21 to b12. The in-page sector selection bits are bits corresponding to a quotient obtained by dividing the page by a sector size. In the present embodiment, the page size is 4096+128 Bytes and the sector size is 512 Bytes, that is, as shown in FIG. 3, one page is divided into eight sectors and these sectors are selected according to low-order three bits of the above-mentioned physical address. The page size and sector size are not limited to the above-mentioned values and the in-page sector selection bits may be changed depending to the values.

Next, the data reader 120 will be described. The host interface 121 is connected to the access module 200A via an external bus. The host interface 121 is a block that receives musical sound data reading instruction information from the access module 200A and transfers the musical sound data read from the nonvolatile memory banks 110 to 113 via the buffer part 122 to the access module 200A.

The host interface 121 includes a register 121a. FIG. 5 is a memory map illustrating the register 121a. For each of 32 channels, the register 121a has the LSN, a reading instruction receipt flag RR, a read command issuance flag RC and a data transfer completion flag TE. The reading instruction receipt flag RR (hereinafter referred to as RR) is a flag that has a value 0 when the reading instruction information is not transferred from the access module 200A and has a value 1 when the instruction information is transferred from the access module 200A. The read command issuance flag RC (hereinafter referred to as RC) is a flag set when an instruction to output a read command to the nonvolatile memory bank is issued to the memory interface 123. The data transfer completion flag TE (hereinafter referred to as TE) is a flag set when data transfer from the I/O register of each nonvolatile memory to the buffer part 122 is completed and is used to determine whether or not data can be further written to the buffer part 122.

Next, a structure of the buffer part 122 is shown in FIG. 6. The buffer part 122 is a block that temporarily holds the musical sound data read from the nonvolatile memory banks 110 to 113. The buffer part 122 includes single port RAMs 122a, 122b of 4 kBytes and a RAM switching circuit 122c. When a RAM switching terminal 122d has a value 0, the RAM switching circuit 122c connects an input terminal from the memory interface (IF) 123 to an input/output port of the single port RAM 122a and connects an output terminal to the host interface (IF) 121 to an input/output port of the single port RAM 122b. When the RAM switching terminal 122d has a value 1, the RAM switching circuit 122c connects the input terminal from the memory interface 123 to an input/output port of the single port RAM 122b and connects the output terminal to the host interface 121 to an input/output port of the single port RAM 122a. The RAM switching terminal 122d is toggle-controlled by the CPU part 124.

Size of each of the single ports RAM 122a, 122b used as a buffer for the musical sound data is 512 Bytes. In consideration of versatility, however, the size is set to be same as a size of a data area in the page, that is, 4 kBytes.

The memory interface 123 is connected to the nonvolatile memory banks 110 to 113 via a memory bus, and reads the musical sound data stored in the nonvolatile memory banks 110 to 113 to the buffer part 122 according to an instruction of the CPU part 124. The memory interface 123 decodes the two bits of bank select corresponding to CHN as described above, generates four CE signals (chip enable signals) for selecting the nonvolatile memory banks 110 to 113 and feeds the CE signal to each of the nonvolatile memory banks 110 to 113 independently via the memory bus.

The memory interface 123 also manages a data ready flag DRF and an access flag AF for each of the nonvolatile memory banks 110 to 113. The data ready flag DRF is a flag that is set to have a value 1 when the value of a busy signal changes from 1 to 0 and has a value 0 when transfer of the musical sound data of 512 Bytes from the I/O register to the buffer part 122 is completed. The access flag AF is a flag that indicates whether or not each of the memory banks 110 to 113 is being accessed.

The CPU part 124 is a block that is connected to the host interface 121, buffer part 122 and memory interface 123, and controls the whole of the data reader 120.

Next, each block of the access module 200A will be described in detail referring to FIG. 1B. Performance data is generated in response to an operation such as striking an external master keyboard 300 and is taken into the CPU part 230A via the input/output part 210A. The input/output part 210A includes a terminal that inputs the performance data from the master keyboard 300, a DA converter that digital-analog converts the musical sound generated by the signal processor 220, an amplifier that amplifies the converted musical sound and a line-out terminal that outputs the output to the outside.

The signal processor 220 is a block that generates the musical sound. The signal processor 220 performs an interpolation operation and level control of the musical sound data of 32 channels at a maximum, which is supplied from the CPU part 230A, and then performs effect processing such as mixing and reverb of the sound production channel. The signal processor 220 is configured of a digital signal processor (hereinafter referred to as DSP), a ROM that stores a program of the DSP and a RAM for a delay element necessary for effector processing or for temporarily storing a parameter.

The CPU part 230A is a block that performs channel assign processing of the performance data received by the input/output part 210A, transfers the reading instruction information to the nonvolatile storage module 100A via the driver 250 and supplies the musical sound data read from the nonvolatile storage module 100A and part of the performance data to the signal processor 220.

Figure 7:
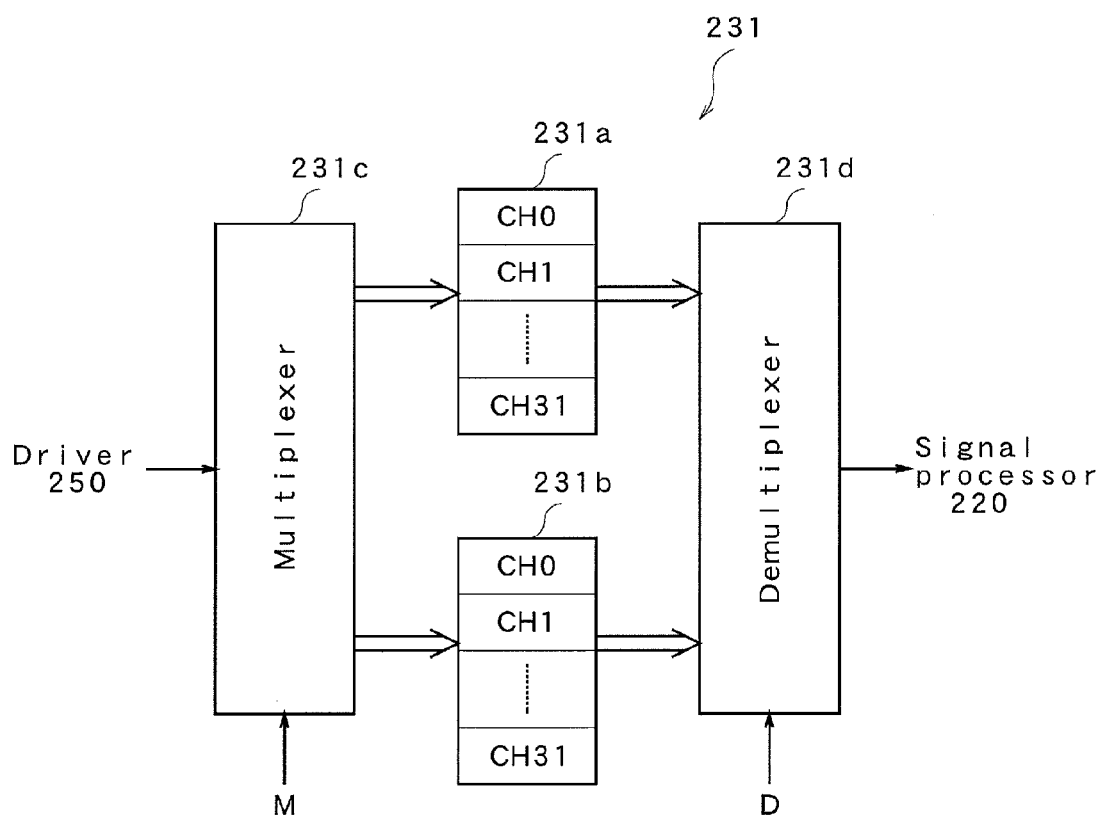
FIG. 7 is a block diagram illustrating a musical sound data buffer 231 in the present embodiment.

FIG. 7 is a block diagram illustrating the musical sound data buffer 231 included in the CPU part 230A. The musical sound data buffer 231 has dual port RAMs 231a, 231b of 16 kBytes, a multiplexer 231c and a demultiplexer 231d.

FIGS. 8A to 8C are explanatory diagrams illustrating the channel assign table 232 included in the CPU part 230A. The channel assign table 232 holds following information representing a status such as a sound production state of all channels, that is, CH0 to CH31. The information will be described below.

A sound producing flag SON is a flag that indicates whether or not the corresponding channel is producing sound, and indicates that the channel is producing sound in the case of a value 0 and that the channel is a blank channel in the case of a value 1.

A KON flag is a flag that has a value 1 in a period from key strike to key detachment.

A note number NN is a hexadecimal number corresponding to a piano key position.

A touch parameter TP is strength information corresponding to strength of key strike.

Level data LD corresponds to volume of the musical sound that is determined depending on the strength of key strike.

A forced sound-deadening flag F is a flag that forcedly deadens the musical sound.

A sector counter SC is a counter counted up each time the musical sound data of one sector, that is, 128 samples is read.

A wave end flag WE is a flag indicating that a last sample of the musical sound data, that is, s1763999 is processed for generation of the musical sound.

An envelope end flag EE is a flag set to have a value 1 when the volume of the musical sound that changes depending on the state of key strike or sustain pedal (hereinafter referred to as envelope ENV) becomes an inaudible level.

A musical sound data reading request flag DQ is a flag set when the number of samples of the musical sound data used to generate the musical sound by the signal processor 220 reaches a predetermined threshold (for example, 96 samples).

A selection flag M is a flag that selects which of the dual port RAM 231$a$ and dual port 231$b$ in the musical sound data buffer 231 the musical sound data is written into.

A selection flag D is a flag that selects which of the musical sound data stored in the dual port RAM 231$a$ and musical sound data stored in the dual port 231$b$ is transferred to the signal processor 220.

The flags D and M select the dual port RAM 231$a$ in the case of a value 0 and dual port RAM 231$b$ in the case of value 1.

FIG. 9 is an explanatory diagram illustrating the NN table 233A held in the CPU part 230A. The NN table is a table that shows relationship between the note number NN and the physical block number that stores the musical sound data corresponding to the NN.

The performance data buffer 234 is a FIFO that holds a plurality of pieces of performance data inputted from the master keyboard 300.

The transfer monitor 235 in the CPU part 230A monitors data transfer and, when the data is temporarily stored in an area corresponding to the channel of either the dual port RAM 231$a$ or 231$b$, transfers a transfer completion flag TRNF to the signal processor 220.

[Initial State]

First, contents of initialization performed by manufacturers prior to shipment of the nonvolatile storage module 100A will be described. In the present embodiment, in the case where piano musical sound data is digitally recorded at a sampling frequency of 44.1 kHz, the musical sound data of about 40 seconds for each pitch is recorded in the nonvolatile storage module 100A without being compressed. It is assumed that a time from striking a piano key to sufficient sound attenuation is 40 seconds. In this case, as expressed by an expression (4), 1764000 samples are obtained.

$$44.1 \text{ kHz} \times 40 \text{ seconds} = 1764000 \text{ samples} \quad (4)$$

Here, for two types of the strongest touch and weakest touch, as shown in FIG. 2, the piano musical sound data digitally recorded in advance, which ranges from the lowest sound to highest sound in 88 keys, is written to the physical blocks PB0 to PB703 of the nonvolatile memory bank 110 in ascending order. The same data is written to each of the nonvolatile memory banks 111 to 113 in a similar manner. Whereby, the same data is multiplexed and recorded in the four parallel nonvolatile memory banks. Data of the piano lowest sound is recorded in PB0 to PB7 of each memory bank, and the musical sound data of 1764000 samples from a starting sample (s0) immediately after key strike to an ending sample (s1763999) is stored from P0 of PB0 in ascending order. However, as shown in FIG. 3, the two types of musical sound data with the weakest touch and strongest touch are written as a pair in units of 512 Bytes.

Here, as shown in FIGS. 2 and 3, P0 of PB0 of the nonvolatile memory bank 110 corresponds to LS0 to 7, and P0 of PB0 of the nonvolatile memory bank 111 corresponds to LS8 to 15. Similarly, P0 of PB0 of the nonvolatile memory bank 112 corresponds to LS16 to 23, and P0 of PB0 of the nonvolatile memory bank 113 corresponds to LS24 to 31. These are the same data as described above. This relationship follows a bit format of LSN in FIG. 4.

FIG. 10 is a bit format illustrating one sample of the musical sound data. In FIG. 10, a sign bit indicating positive or negative is written to b15, and 15 bits of b15 to b1 are used as one sample of the musical sound data. The wave end flag WE is recorded in b0. The flag WE is a flag that indicates whether or not a concerned sample is a last sample and, when the flag has a value 1, the concerned sample is the last sample.

For convenience, it is assumed that all physical blocks are normal blocks. It is assumed that, as shown in FIG. 4, a logical address is not converted into the physical address. However, if there is an initial defective block, use of the initial defective block is prevented according to a logical-physical conversion method. Since logical-physical conversion is a common technique and is not a subject matter of this application, description thereof is omitted.

In initialization, characteristic information of piano musical sound data recorded in the nonvolatile storage module 100A (hereinafter referred to as recorded data characteristic information (RDI)) and information related to a memory configuration of the nonvolatile storage module 100A (hereinafter referred to as memory configuration information MSI) are written to the page P0 of the last physical block PB1023 of the nonvolatile memory bank 113.

FIG. 11 is an explanatory diagram illustrating an example of the recorded data characteristic information. The characteristic information contains at least information on the sampling frequency (in this case, 44.1 kHz) of the musical sound data. The reverb and chorus are used in the effect processing. In a table of FIG. 11, information in note columns is not actually recorded, but is reference information.

FIG. 12 is an explanatory diagram illustrating an example of the memory configuration information of the nonvolatile storage module 100. Here, the sector size in FIG. 12 represents size of data read according to each reading instruction. The read time TR represents time required to read data from the memory cell array to the I/O register. A transfer time TT represents time required to transfer data from the I/O register to the memory interface 123. In a table in FIG. 12, information in note columns is not actually recorded, but is reference information.

Operations of the musical sound generation system thus configured in embodiment 1 of the present invention will be described.

[Initializing Processing at Power-On]

Figure 13B:
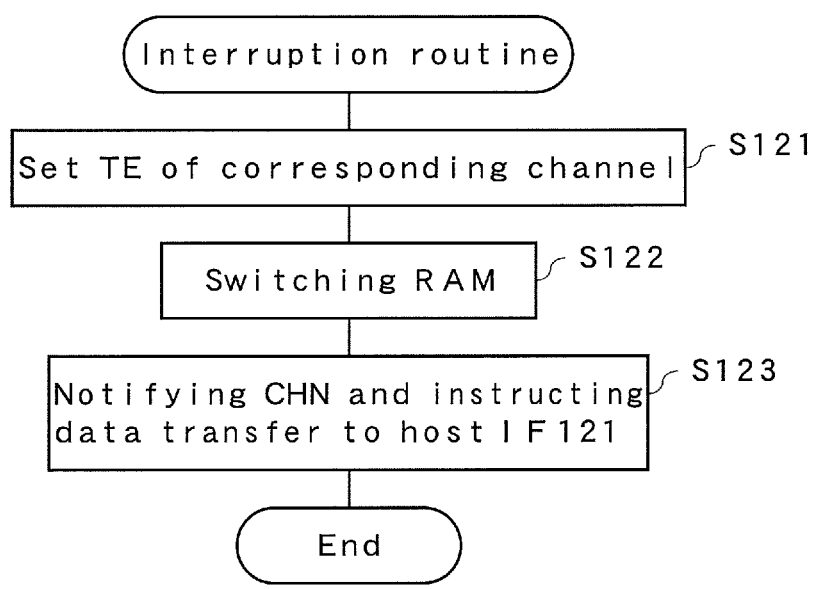
FIG. 13B is a flow chart illustrating interruption processing of the CPU part 124.

Upon power-on, each of the access module 200A and nonvolatile storage module 100A starts initializing processing. FIG. 13A is a flow chart illustrating normal processing of the CPU part 124, and FIG. 13B is a flow chart illustrating interruption processing of the CPU part 124.

As shown in the flow chart in FIG. 13A, the CPU part 124 of the nonvolatile storage module 100A performs the initializing processing in S100. In the initializing processing, the single ports RAMs 122$a$, 122$b$ of the buffer part 122 and register 121$a$ of the host interface 121 are cleared. After that, the CPU part notifies that initialization is completed via the host interface 121.

Figure 14A:
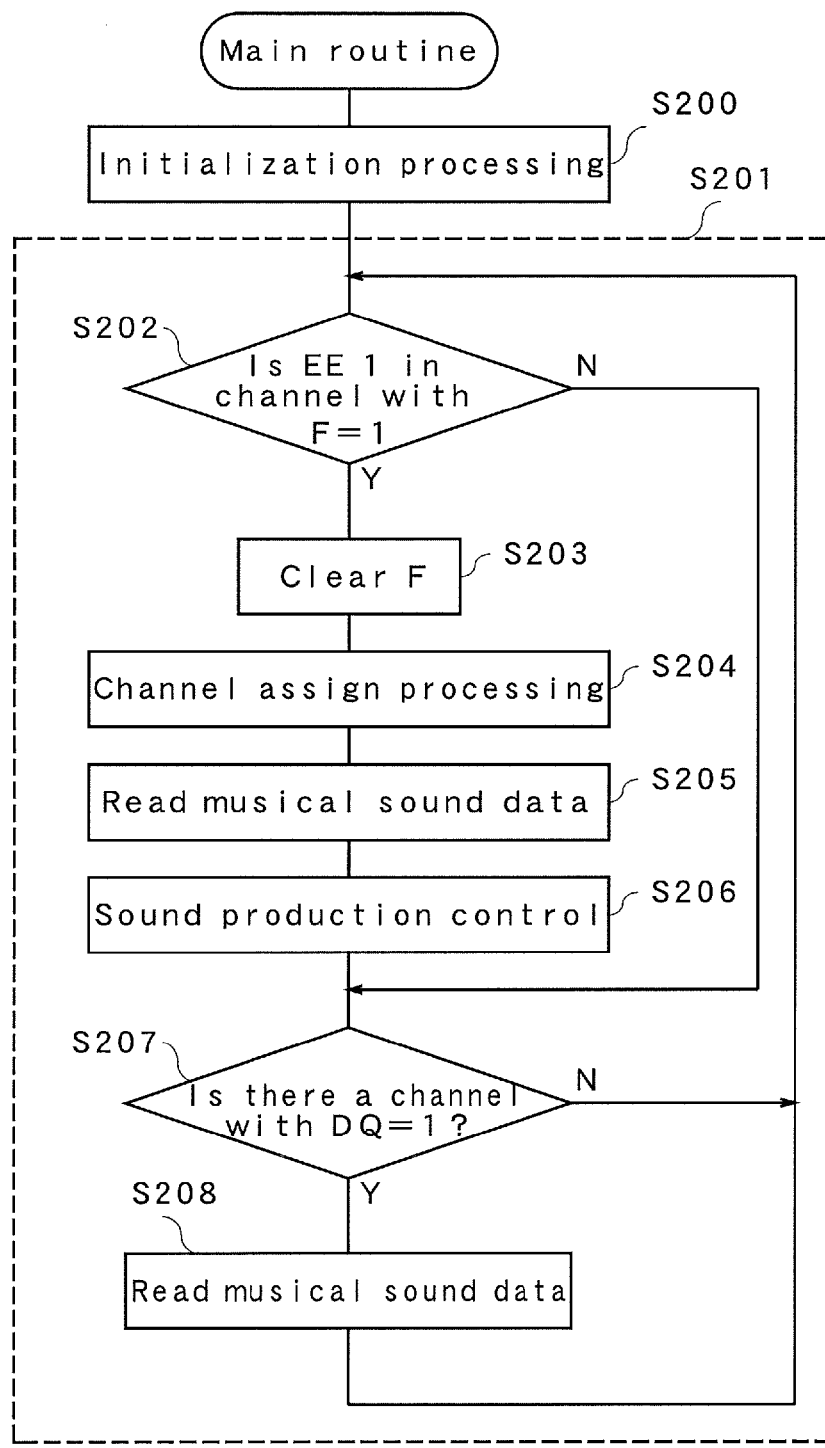
FIG. 14A is a flow chart illustrating normal processing of a CPU part 230.

As shown in the flow chart in FIG. 14A, the CPU part 230A of the access module 200A performs the initializing processing in S200. In the initializing processing, the signal processor 220 is reset and the dual port RAMs 231$a$, 231$b$ in the musical sound data buffer 231 are cleared. By resetting the signal processor 220, the signal processor 220 starts count-up of a program counter of the internal DSP. Initializing setting of the channel assign table 232 shown in FIG. 8A to FIG. 8C, that is, following processing is performed.

(1) Set the value of SON to 0, that is, set CH0 to 31 to the blank channels.
(2) Set the values of KON, PD, NN, TP, LD, F, SC, WE, DQ, M and D to 0.
(3) Set the value of EE to 1.

Figure 15:
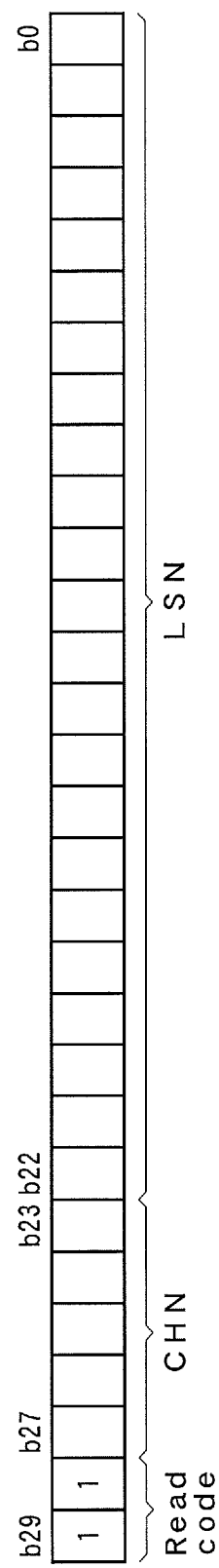
FIG. 15 is a bit format illustrating reading instruction information sent from an access module 200 to the nonvolatile storage module 100.

After that, the access module 200A transfers the reading instruction information for the recorded data characteristic information and memory configuration information to the nonvolatile storage module 100A. FIG. 15 is a bit format illustrating the reading instruction information issued from the access module 200A to the nonvolatile storage module 100A. Although b29 and b28 are added so as to be used for an instruction other than the reading instruction, since no instruction other than the reading instruction is issued in the present embodiment, the value of b29, b28 is fixed to 11. The characteristic information is written within 512 Bytes from an address 0 of P0 of PB1023 of the nonvolatile memory bank 113. Following the bit format in FIG. 4, in the reading instruction information shown in FIG. 15, b24, b23, b22 to b13, and b4, b3 each has the value 1 and the other bits each has the value 0. The access module 200A transfers the reading instruction information to the nonvolatile storage module 100A, thereby capable of reading the recorded data characteristic information and memory configuration information.

When acquiring the recorded data characteristic information shown in FIG. 11, the CPU part 230A sets a sampling cycle (22.7 µs) to a timer in the signal processor 220, and determines one cycle of a time slot of signal processing in one sampling time. This timer functions as a timer that controls one cycle of DSP in the signal processor 220. The CPU part 230A writes one sample capacity (2 Bytes) and flag assignment bit (b0) in the recorded data characteristic information as parameters of the RAM in the signal processor 220, and uses the parameters to determine at which bit position in the bit format shown in FIG. 10 the musical sound data is located.

The CPU part 230A determines a channel frame of the channel assign table 232 and the number of channels in the time slot of the signal processor 220 according to the maximum number of sound production channels (32CH) in the recorded data characteristic information. The signal processor 220 determines the effect processing by the reverb and chorus. In the case shown, it is determined only reverb is performed as the effect processing.

Further, when acquiring the memory configuration information shown in FIG. 12, the CPU part 230A finds the parallel number by calculating an expression (5) based on the number of buses (1) and the number of memory banks per bus (4).

$$\text{Parallel number} = \text{the number of buses} \times \text{the number of memory banks per bus} \quad (5)$$

The bit format of LSN is determined based on the parallel number thus obtained. Since the parallel number is a value 4 in the present embodiment, the number of bits of the bank select is a value 2, and the bit format of LSN is as shown in FIG. 4. Further, for example, when the parallel number is two, the number of bits assigned to the bank select is one (b3) and accordingly, the page number is assigned to b11 to b4 and PBN is assigned to b21 to b12.

Relationship between CHN and bank select is given by an expression (6). % is an operator representing modulo.

$$\text{Bank select} = \text{CHN} \% \text{parallel number} \quad (6)$$

Since the parallel number is a value 4 in the present embodiment, the relationship between CHN and bank select has following four cases (a) to (d).

(a) CH0, 4, 8, 12, 16, 20, 24, 28
... bank select=0 (nonvolatile memory bank 110)
(b) CH1, 5, 9, 13, 17, 21, 25, 29
... bank select=1 (nonvolatile memory bank 111)
(c) CH2, 6, 10, 14, 18, 22, 26, 30
... bank select=2 (nonvolatile memory bank 112)
(d) CH3, 7, 11, 15, 19, 23, 27, 31
... bank select=3 (nonvolatile memory bank 113)

Referring to the sector size (512 Bytes) in the memory configuration information shown in FIG. 12, the CPU part 230A manages size of the data read from the nonvolatile storage module 100A as 512 Bytes. By calculating an expression (7), the total number of samples per sector (hereinafter referred to as usn) is determined.

$$usn = \text{sector size/size of one sample/the number of touches} \quad (7)$$

Since the sector size is 512 Bytes, size of one sample is 2 Bytes, and the number of touches is two in the present embodiment, usn is 128 samples.

Further, the CPU part 230A calculates the number of necessary physical blocks per note by calculating an expression (8) based on an occupied capacity per note in the recorded data characteristic information in FIG. 11, and a page size and the number of pages per physical block TPN (in this case, 256) in the memory configuration information.

$$\text{The number of necessary physical blocks per note} = \text{occupied capacity per note}/(\text{page size} \times \text{TPN}) = 8 \quad (8)$$

Then, the CPU part 230A determines PBN corresponding to each note from the lowest sound $A_{-1}$ to highest sound $C_7$, and generates the NN table 233A shown in FIG. 9.

In the above-mentioned main routine, the CPU part 230A reads the recorded data characteristic information and memory configuration information and sets various parameters, thereby completing the initializing processing (S200). Then, the CPU part 230A proceeds to normal operation processing S201 and enables interruption to accept the performance data from the external master keyboard 300.

[Processing at Normal Operation]
(1) Description of General Operations

General operations from inputting of the performance data to generation of the musical sound will be described referring to mainly a flow chart of the CPU part 230A. The flow chart consists of two routines: a main routine shown in FIG. 14A and an interruption routine shown in FIG. 14B. The interruption routine is a routine activated when the performance data is transferred to the access module 200A by the performance operation of the master keyboard 300. When the master keyboard 300 performs the performance operation during processing of the main routine, the main routine is immediately shifted to the interruption routine. The interruption routine permits multiplex interruption, that is, next interruption is accepted even during the interruption routine.

First, if the master keyboard 300 does not perform the performance operation after shifting to the normal operation processing S201, in all channels, the forced sound-deadening flag F has the value 0 and the reading request flag DQ has the value 0. Accordingly, S202 and S207 branch to No, and branch processing in S202 and S207 is permanently repeated.

Figure 14B:
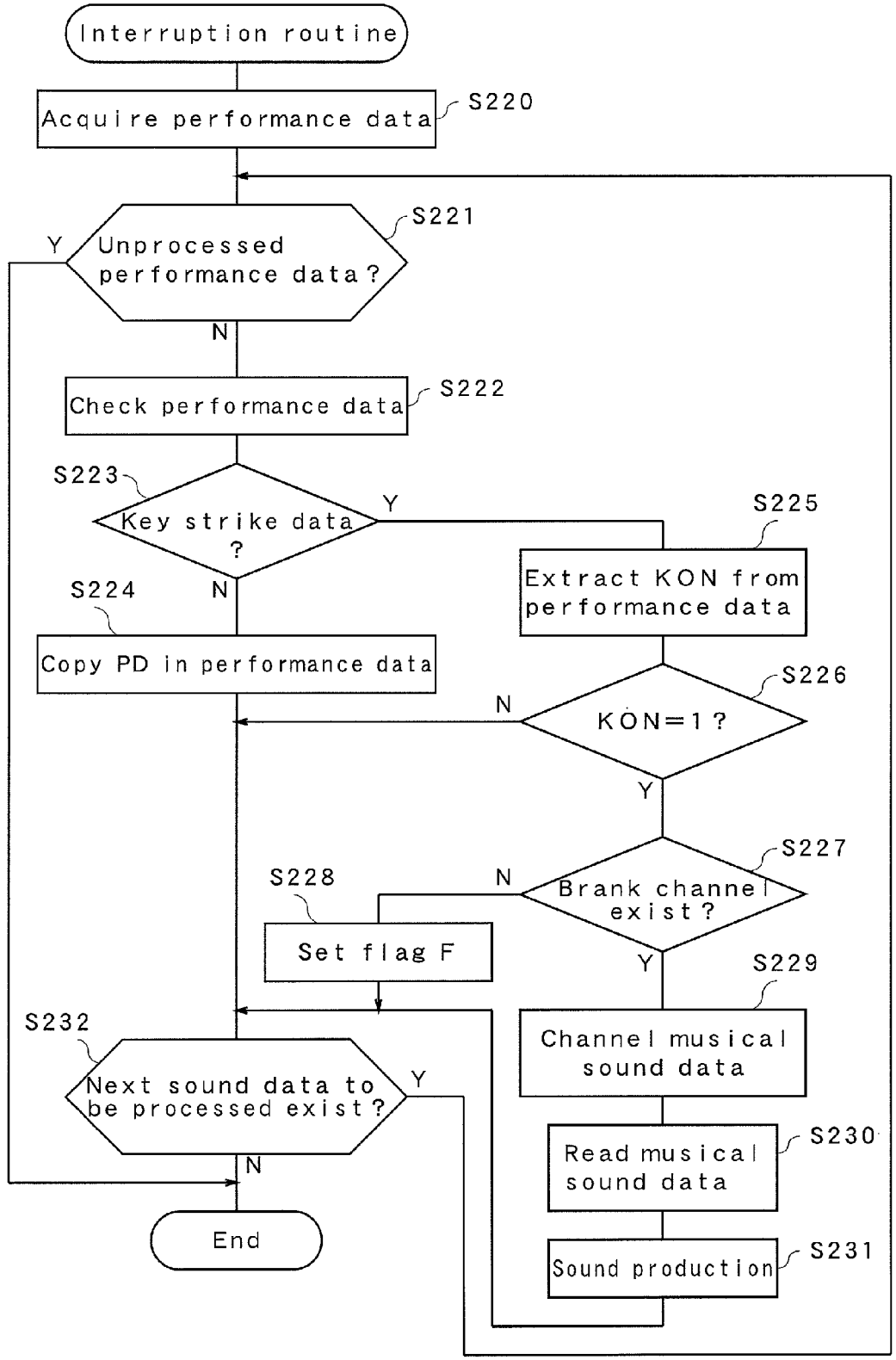
FIG. 14B is a flow chart illustrating interruption processing of the CPU part 230.

When the master keyboard 300 performs the performance operation, the interruption routine shown in FIG. 14B is activated. The interruption processing will be described.

FIG. 16 is a bit format illustrating the performance data transferred from the master keyboard. The performance data is classified into two types of data: key strike data generated in response to key strike and pedal data generated in response to an ON/OFF operation of the sustain pedal. These data are identified based on the value of b15. In the key strike data, the KON flag, note number NN and touch parameter TP are as described above. In the pedal data, PD is a flag that has the value 1 when the sustain pedal is turned ON. The sustain pedal is a pedal that keeps sound even after key detachment, and is provided also in the actual piano. In the interruption routine, the performance data transferred from the master keyboard 300 via the input/output part 210A is acquired in the performance data buffer 234 (S220). The format of the performance data is, as shown in FIG. 16, either key strike data or pedal data. When there is unprocessed performance data already acquired in the performance data buffer 234 (S221), the performance data acquired this time is checked (S222). Specifically, the data is identified as the key strike data or pedal data by checking b15 of the performance data shown in FIG. 16. When the performance data is the pedal data (S223), b14 of the pedal data in FIG. 16, that is, the PD flag is copied to PD in the channel assign table 232 as it is (S224) and the process proceeds to S232. On the other hand, when the performance data is the key strike data (S223), the KON flag is extracted from b14 of the key strike data in FIG. 16 (S225), the value of KON is checked in S226. When the KON has the value 0, that is, in the case of key detachment, the process proceeds to S232.

When the KON has the value 1, that is, in the case of key strike, it is checked whether or not the blank channel exists in the channel assign table 232 (S227). Specifically, it is checked whether or not the sound producing flag SON having the value 0 exists from CH0 in ascending order, and when the sound producing flag SON having the value 0 exists, the corresponding performance data is assigned to a first found channel (S229). In the channel assign processing, information of the channel to be assigned is set as follows.

(1) Set the value of SON to 1.
(2) Copy NN and TP from the key strike data.
(3) Set values of SC, WE, EE, DQ, M and D to 0.

After the channel assign processing, the musical sound data reading instruction information shown in FIG. 15 is transferred to the nonvolatile storage module 100A. The reading instruction information is obtained according to a following procedure.

(a) Referring to the NN table 233A, find a starting PBN based on NN of the key strike data.
(b) Find a temporary LSN based on the starting PBN, SC and expression (9).

$$\text{Temporary LSN} = (\text{starting PBN} << 13) + [\{(\text{SC \& 0xFFE8}) << 2\} | (\text{SC \& 0x0007})] \quad (9)$$

In this regard, however, the temporary LSN is LSN in the case where the bank select is unspecified, and in this case, the value of (b4, b3) is set to 0. "&" is an AND operator, "|" is an OR operator and >> is an operator that shifts the bit to left. "0x" is a sign representing hexadecimal. The physical block number PBN from b13 to 22 in FIG. 4 can be obtained by shifting the starting PBN in the NN table by 13 bits in the expression (9). The page number can be obtained by masking b0 to b2 of the sector counter SC and shifting by two bits. Further, the temporary LSN can be obtained by adding the low order three bits of the sector count.

(c) Find the bank select based on CHN of the assigned CHN and expression (6).
(d) Find LSN according to an expression (10) based on the above-mentioned temporary LSN and bank select.

$$\text{LSN} = \text{temporary LSN} | (\text{bank select} >> 3) \quad (10)$$

(e) Assign CHN to b27 to 23.

In this manner, by determining LSN of a reading destination and transferring the reading instruction information to the nonvolatile storage module 200 according to the format shown in FIG. 15, desired musical sound data is read (S230).

The musical sound data read from the nonvolatile storage module 100A according to the reading instruction in S230 is transferred to the access module 200A. FIG. 17 is a bit format illustrating the musical sound data read onto the external bus from the nonvolatile storage module 100A. As shown in FIG. 17, the data includes data of the weakest touch, strongest touch and channel of the musical sound data. In the access module 200A, the musical sound data is transferred to the musical sound data buffer 231 in the CPU part 230A, and temporarily stored in an area corresponding to CH0 of the dual port RAM 231a via the multiplexer 231c (M=0) in FIG. 7. When the musical sound data is temporarily stored in the dual port RAM 231a, a channel of a storage determination is determined according to CHN of the external format of the musical sound data in FIG. 17.

For each of the weakest touch and strongest touch, all samples of the starting sector, that is, 512 Bytes from s0 to s127, are temporarily stored in the area corresponding to CH0 of the dual port RAM 231a. After that, the transfer monitor 235 of the CPU part 230A transfers the transfer completion flag TRNF to the signal processor 220. Processing of the CPU part after S230 and transfer (including monitoring of transfer) of the musical sound data to the musical sound data buffer 231 are performed in parallel.

Following S230, sound production by the signal processor 220 is performed (S231). In controlling sound production, the level data LD is calculated by the operation of TP/0x7F, and the calculated level data LD is set to LD in the channel assign table 232, and KON extracted in S225 is set to KON in the channel assign table 232. 0x7F represents a maximum value of TP. That is, the level data LD has a value that is equal to or larger than 0 and equal to or smaller than 1 according to the touch parameter TP. Operations of the signal processor 220 will be described later.

When no blank channel exists in S227, that is, the values of all SON in the channel assign table 232 are 1, the value of the forced sound-deadening flag F in the channel assign table 232 is set to 1 (S228), and the process proceeds to S232.

Then, existence or absence of the musical sound data to be processed next is checked (S232) and, when the musical sound data to be processed next exists, the process returns to S221. Since the previous performance data has been processed in S221, the process proceeds to processing after S222 without preconditions. When no musical sound data to be processed next exists, the interruption routine is finished. In this case, the process returns to the main routine, and processing that is being performed at shift to the interruption routine is continued.

Next, operations of the signal processor 220 will be described referring to mainly a flow chart in FIG. 18. First, a value of an initial flag INI is set to 1 according to an expression (11).

$$\text{INI} = \text{KON \& EE} \quad (11)$$

Here, the reason why EE is used as a calculation element of INI in the expression (11) will be described. When key strike is newly made in a state where all channels produce sound (the value of EE is 0) as described later, it is needed to prevent occurrence of noise. For this reason, after rapid sound deadening of a channel corresponding to the new key strike is performed, that is, waiting until EE has the value 1 and SON has the value 0, sound production corresponding to the new v is started.

However, to reduce a delay time from the new key strike to start of sound reproduction, it is needed to perform the channel assign processing corresponding to the new key strike (S229) and the reading instruction of the musical sound data (S230) simultaneously with the instruction of the rapid sound deadening. However, assumed that KON of the channel to which the new key strike is assigned immediately before the new key strike is made has the value 1. In this case, the channel corresponding to the new key strike performs new sound production control following rapid sound deadening while the value of KON still remains to be 1 without becoming 0. In this case, since KON cannot be used as an element of determining the sound production start time, EE is used as the calculation element of INI in the expression (11). The expression (11) can be applied to any case other than the above-mentioned operations.

At this time, when the transfer completion flag TRNF is transferred from the CPU part 230A to the RAM in the signal processor 220, since both values of INI and TRNF become 1 (S301), initial setting of various parameters is performed in S302. In the initial setting of the parameters, the value of sn held in the counter in the signal processor 220 is set to 0 and the value of the transfer completion flag TRNF held in the RAM in the signal processor 220 is set to 0.

After S301 or S302, interpolation processing is performed (S303). The interpolation processing is processing that changes tone of the musical sound according to strength of key strike, that is, the value of the touch parameter TP. It is known that the tone at strong key strike has higher components than the tone at weak key strike. Thus, in the present embodiment, the musical sound data of the strongest touch as a representative of the tone at strong key strike is linearly interpolated with the musical sound data of the weakest touch as a representative of the tone at weak key strike. Here, the tone can be changed according to TP by linearly interpolating two points based on the touch parameter TP. Specifically, interpolation processing according to an expression (12) is performed. Here, w is a value of one sample of the musical sound data after interpolation, wa is a value of one sample of the musical sound data corresponding to the weakest touch, wb is a value of one sample of the musical sound data corresponding to the strongest touch and $\alpha$ is an interpolation coefficient having a value of 0 to 1.

$$w = wb \times \alpha + wa(1-\alpha) \tag{12}$$

Where, $\alpha = TP/0x7F$

After the interpolation processing, an envelope (hereinafter referred to as ENV) is calculated according to an expression (13) (S304).

$$ENV = LD \times REL \tag{13}$$

Where, REL is determined as follows.
(a) In the case of F=1,
REL=g.
(b) In the case of F=0, KON=0 and PD=0,
REL=REL_old×0.5.
(c) In other cases,
REL=1.
REL is an attenuation parameter, REL_old is REL of a previous sampling period, and g is an attenuation variable.

The attenuation variable g becomes 0.875 in a sampling cycle when F=1 is transferred from the CPU part 230A, and becomes 0.750 in a next sampling period. Hereinafter, g gradually decreases by 0.125 and, after when reaching 0, keeps the value 0. By setting in this manner, ENV reaches the value 0 at an eighth sampling cycle after F=1 is transferred. REL_old is held in the RAM in the signal processor 220 and is updated to REL each time the expression (13) is calculated, and REL gradually gets closer to 0 exponentially.

Figure 19:
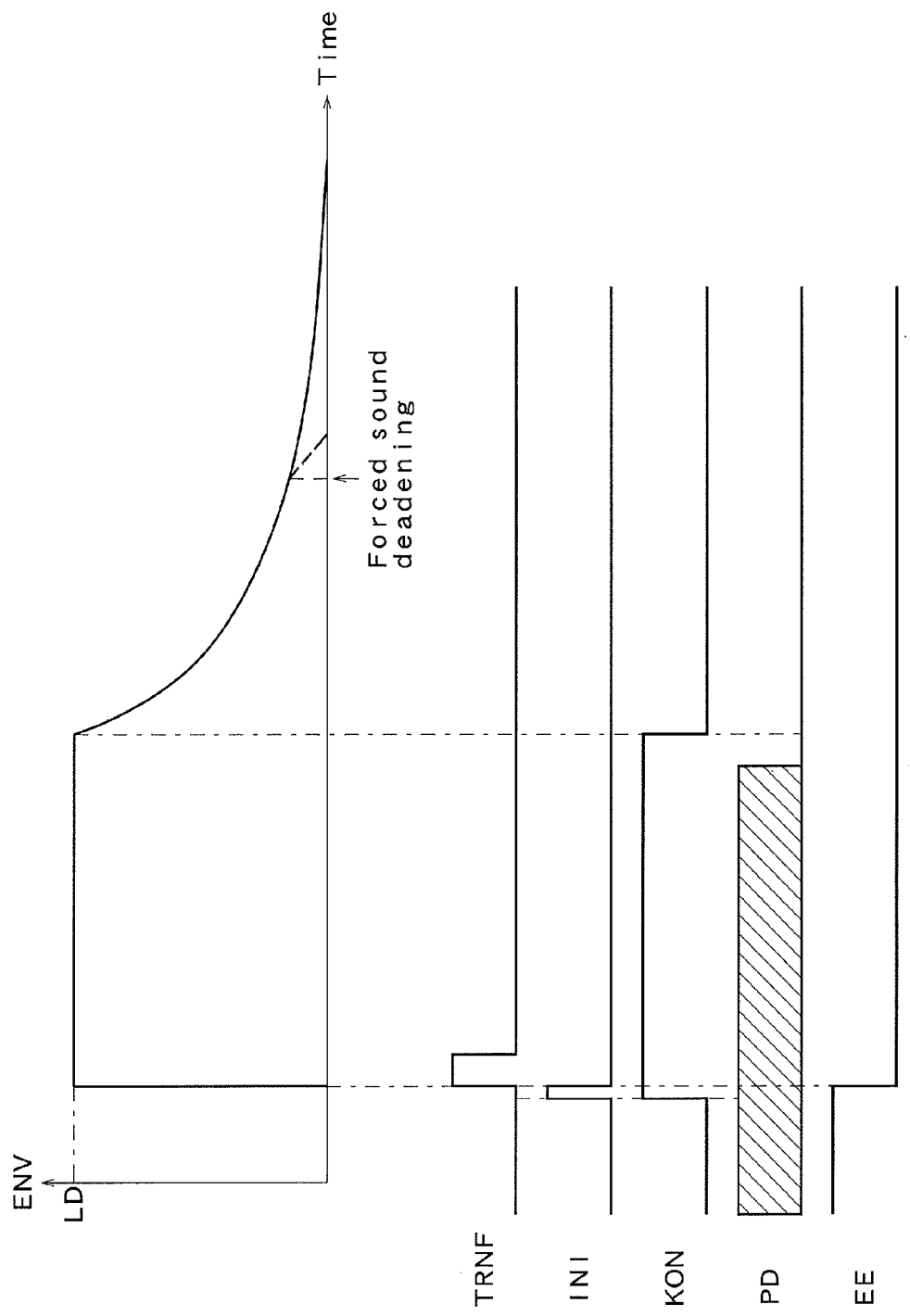
FIG. 19 is a graph illustrating change of LD with time after key strike in the case of PD having a value 0.
Figure 20:
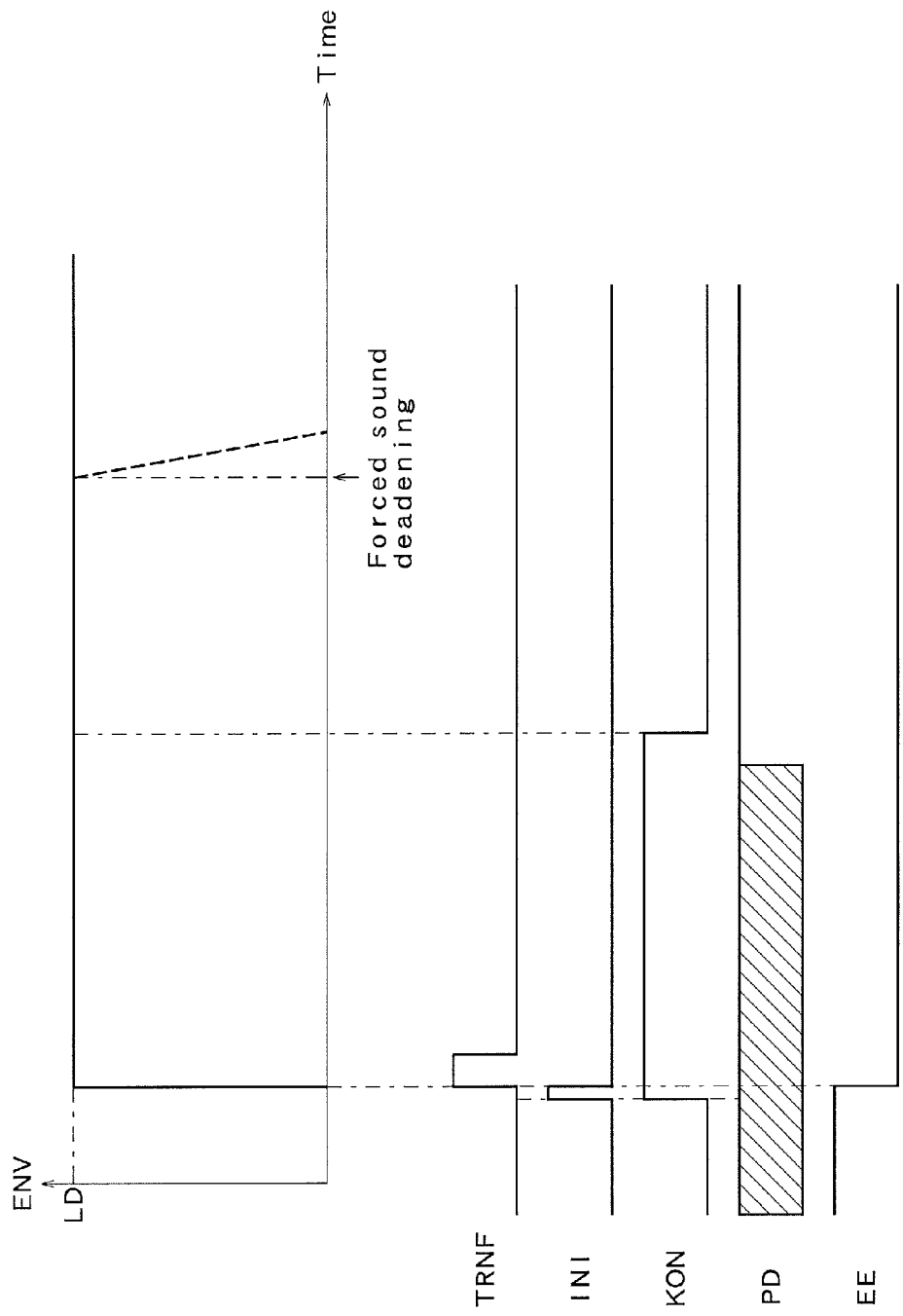
FIG. 20 is a graph illustrating change of LD with time after key strike in the case of PD having a value 1.

FIGS. 19 and 20 illustrate change of ENV with time. FIG. 19 illustrates the case where PD has the value 0, that is, the sustain pedal is turned OFF. In this case, while KON has the value 1, as represented in the above-mentioned (c), ENV does not change, and when KON has the value 0, that is, the key is detached, the ENV exponentially attenuates. FIG. 20 illustrates the case where PD has the value 1, that is, the sustain pedal is turned ON. In this case, even when KON has the value 1, the state of the above-mentioned (c) continues and the value of ENV at key strike is kept. In both cases in FIGS. 19 and 20, when the forced sound deadening is instructed, that is, the value of F becomes 1, the state of the above-mentioned (a) is achieved and REL becomes a time-varying parameter g. Accordingly, at the eighth sampling cycles shown by dashed line, ENV linearly attenuates to the value 0. One sampling cycle is calculated according to an expression (14).

$$1/\text{sampling frequency}(44.1 \text{ kHz}) \approx \text{about } 22.7 \text{ μs} \tag{14}$$

Accordingly, eight sampling cycles is about 182 μs.

After calculation of ENV, ENV is compared with a threshold ENVth (S305). ENVth is a value of a level at which sound is not audible enough. When ENV is less than ENVth in S305, the value of EE of the corresponding channel in the channel assign table 232 of the CPU part 230A is updated to 1 and the value of SON is updated to 0 (S306). The channel having SON whose value is updated to 0 is hereinafter managed as the blank channel.

Next, digital data W after the envelope processing is found according to an expression (15) (S307).

$$W = w \times ENV \tag{15}$$

Since the musical sound data is data obtained by digitally recording the piano sound for each key as described above, even when the level of ENV does not change with time, a peak value of W attenuates with time, and therefore, this sounds to be attenuated aurally.

Next, when the value of WE reaches 1, that is, the musical sound data corresponding to arbitrary key strike reaches a last sample (s1763999 sample), or the value of EE reaches 1, that is, an inaudible level (S308), it is no need to continue signal processing and output any more. Accordingly, since increment of the sector number sn and a toggle operation of the selection flag D become unnecessary, the process jumps to S314. In other cases, the process shifts to S309 and sn is incremented. As shown in FIG. 10, the wave end flag WE is a flag recorded in b0 of the musical sound data acquired from the musical sound data buffer 234, and only in the s1763999 sample, WE has the value 1. Until the musical sound data with b0 having the value 0 is read in S303, the value of WE of the corresponding channel remains to be 1.

When sn has a value 96 as a result of increment of the sector number sn in S310, the process proceeds to S311. To read the next musical sound data of one sector, SC of the corresponding channel in the channel assign table 232 is incremented, and the value of the musical sound data reading request flag DQ is set to 1. When sn is not 96, the process proceeds to S312 without performing this processing.

Next, in S312, it is determined whether or not sn is 127, that is, the sound data reaches the last sample (s127) in the musical sound data of one sector, and when the sound data reaches the last sample, the selection flag D is toggled, that is, a current value is reversed in logic. In this operation, by toggling D of the corresponding channel in the channel assign table 232 (for example, changing from the value 0 to 1) and switching an input of the demultiplexer 231d of the musical sound data buffer 231, for example, the source for reading the musical sound data is switched from the dual port RAM 231a to the dual port RAM 231b.

Next, in S314, CHN held in the signal processor 220 is incremented and, when the value of CHN is not 0, the process returns to S301 to process the next channel. In this regard, however, CHN is held in a five-bit counter and CH0 to CH31 are circularly updated. When CHN has the value 0 in S315, that is, processing up to CH31 is completed, the process shifts to mixing processing (S316).

In the mixing processing, Wn of CH0 to 31 are subjected to the mixing processing according to an expression (16).

$$Wx=(W0+W1+\ldots+W31)/32 \qquad (16)$$

Here, Wn (n is an integer 0 to 31 corresponding to CHN) is W of arbitrary channel and Wx is a mixing result. Following mixing, the effect processing is further performed in S317.

Figure 21:
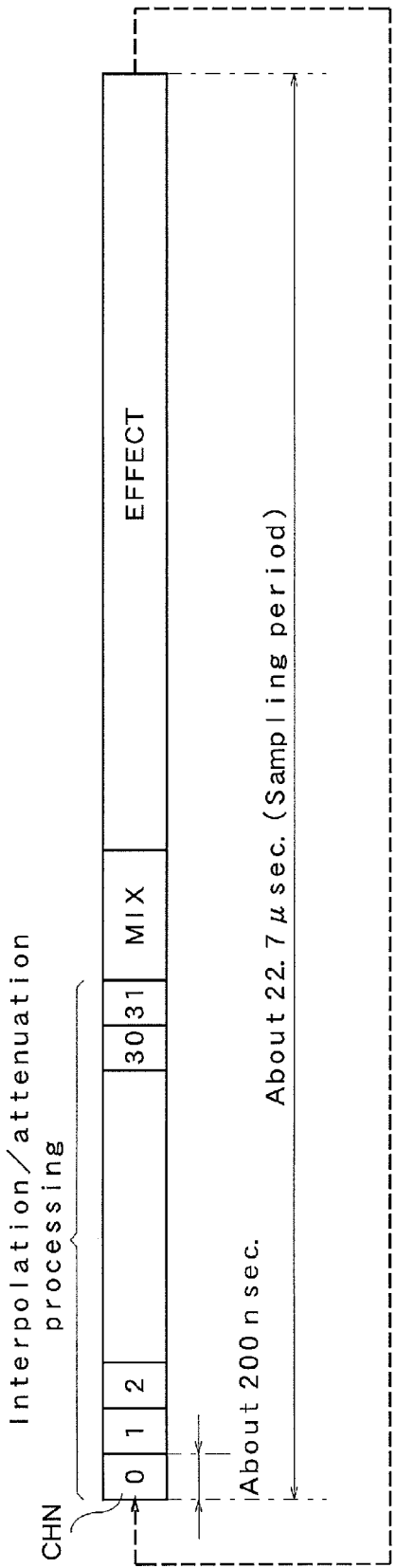
FIG. 21 is a time slot chart illustrating signal processing in one sampling cycle.

FIG. 21 is a time slot chart illustrating signal processing in one sampling cycle. In FIG. 21, the left hand side is earlier in time, and following the interpolation processing and level control of CM0 to 31, mixing processing (MIX) of the musical sound of CH0 to 31 and effect processing (EFFECT) such as the reverb and chorus are performed. The series of processing is circularly performed every sampling cycle of 22.7 μs.

The above-mentioned signal processing is repeatedly performed every sampling cycle (22.7 μs), the processed musical sound data is digital-analog converted by the DA converter of the input/output part 210A every 22.7 μs and the result is outputted as desired musical sound to the outside via the line-out terminal. The musical sound is produced as piano sound via an external amplifier and a speaker.

Now, returning to a description of the main routine of the CPU part 230A in FIG. 14A, processing after S202 will be described. The CPU part 230A checks F of all channels in the channel assign table 232 in S202. When there is a channel with EE having the value 1 among channels with F having the value 1, the value of F of the corresponding channel is cleared to 0 (S203) and the channel assign processing of the channel is performed (S204). Clearing of EE is performed by the signal processor 220 in S302 as described above.

Next, the reading instruction of the musical sound data (S205) and sound production control of the signal processor 220 (S206) are performed. S205 and S206 are the same processing as the above-mentioned S230 and S231.

Next, in S207, a channel with DQ having the value 1 is searched, and when such a channel exists, the reading instruction for the musical sound data of the channel is issued. Search of the channel assign table 232 in S207 and S202 is performed from CH0 in ascending order.

Next, reading of the musical sound data from the nonvolatile storage module 100A will be described referring to mainly flow charts in FIG. 13A, FIG. 13B, FIG. 22A and FIG. 22B. The CPU part 124 performs two routines of the main routine shown in FIG. 13A and an interruption routine shown in FIG. 13B. The interruption routine does not permit multiplex interruption. That is, even when interruption is made during the interruption routine, the interruption is masked.

First, in the main routine, the processing is shifted to the normal processing (S101) after the above-mentioned initializing processing (S100). Since all values of the reading instruction receipt flag RR and read command issuance flag RC in the register 121a of the host interface 121 shown in FIG. 5 are 0 before the reading instruction information is transferred from the access module 200A, the determination branch processing in S102 and S106 is continuously repeated.

Figure 22A:
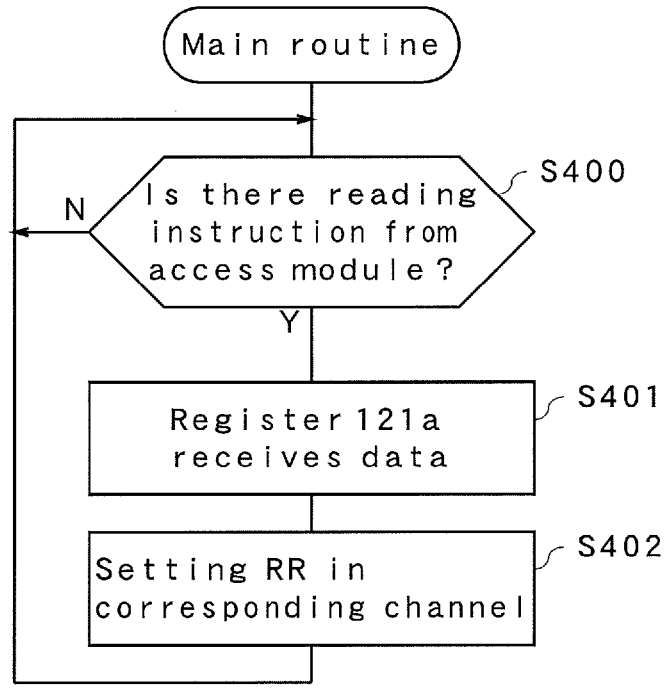
FIG. 22A is a flow chart illustrating processing of a host interface 121.

When receiving the reading instruction information from the access module 200A, the host interface 121 shifts from S400 to S401 in the main routine in FIG. 22A, and CHN and LSN in the reading instruction information are held in the register 121a (S401). After that, in the register 121a, the value of RR corresponding to CHN given to the reading instruction information in FIG. 15 is set to 1 (S402). After that, the process returns to S400, and a loop of S400 to S402 is repeatedly performed until the CPU part 124 instructs data transfer, that is, data transfer from the buffer part 122 to the access module 200A. The example in FIG. 5 shows the state where the reading instruction of CH0 to 3 is issued and each flag changes according to processing described below. Specifically, the reading instructions of CH0 to 3 and read commands of the nonvolatile memory banks 110 to 113 are completed, the musical sound data is transferred from the nonvolatile memory banks 110, 111 to the buffer part 122 and, in only CH0, transfer of the musical sound data from the buffer part 122 to the access module 200A is completed. According to the operation, the value of each flag in the register 121a changes.

In the processing of the CPU part 124, since the values of RR of CH0 to 3 are 1, S102 is shifted to S103. In S103, it is determined whether or not the nonvolatile memory banks corresponding to CH0 to 3 are being accessed. Since the musical sound data is not read from the nonvolatile memory banks 110 to 113 at this time, the access flag (value 0) is notified from the memory interface 123 to the CPU part 124. The CPU part 124 recognizes that the corresponding nonvolatile memory banks are not being accessed based on the access flag (value 0) and the process shifts to S104.

In S104, the CPU part 124 instructs the memory interface 123 to output the read command corresponding to CH0 to the nonvolatile memory bank 110. Further, the CPU part 124 sets a value of RC of the corresponding channel in the register 121a to 1 (S105). The above-mentioned processing is performed for the channels with RR having the value 1 in the register 121a, that is, CH0 to 3.

Figure 23:
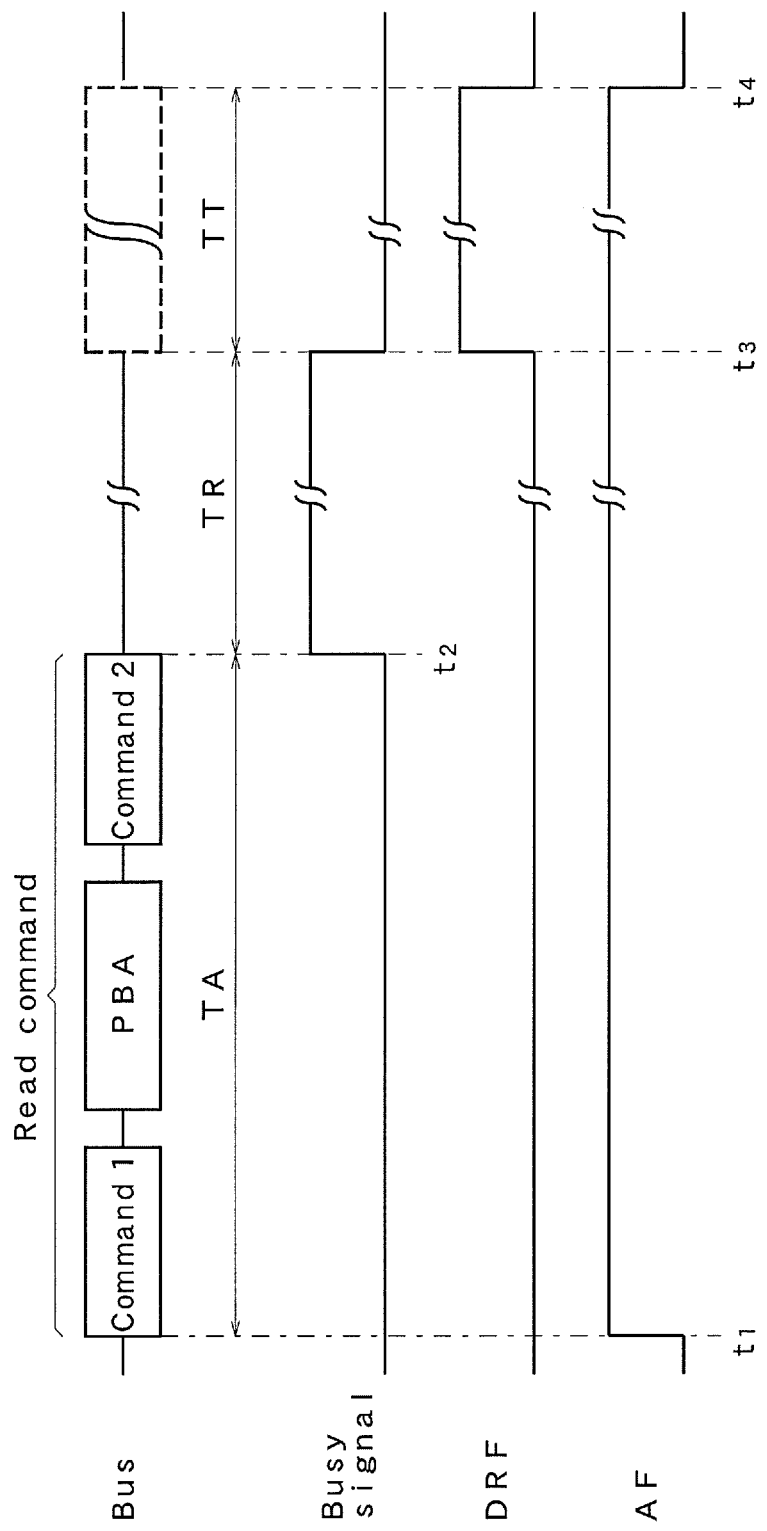
FIG. 23 is a time chart illustrating a read command issued from a data reader 120 to the nonvolatile memory bank.

FIG. 23 is a time chart illustrating the read command issued by the data reader 120 to the nonvolatile memory bank. A command 1 is a command to notify start of transfer of the physical address and a command 2 is a command to instruct the I/O registers 110a to 113a to read the musical sound data stored at the physical address from the memory cell arrays 110b to 113b.

Here, in the read command, as shown in FIG. 23, the physical address is outputted immediately after outputting of the command 1 at time t1 and then, the command 2 is outputted. Because this addressing time TA is approximately a few hundreds of ns, it can be ignored in terms of time. During the read time TR from completion of the command 2 to data reading completion time t3 (in the present embodiment, for example, 50 μs), the musical sound data is read to the I/O register in any of the nonvolatile memory banks.

A physical address PBA is a physical address designated by PBN, page number and in-page sector selection bits in FIG. 4 in units of 512 Bytes. The physical address designate a start address (byte unit) where the musical sound data to be read is stored, and the musical sound data from the start address to a last address in the corresponding page is read to the I/O register in TR. After that, by giving 512 read clocks during the musical sound data transfer time TT, desired musical sound data of 512 Bytes is read from the I/O register to the buffer part 122.

The bank select is information corresponding to CHN as described above, is encoded in the memory interface 123 and functions as four CE signals (chip enable signals) for selecting the nonvolatile memory banks 110 to 113. The memory interface 123 feeds the CE signal to each of the nonvolatile memory banks 110 to 113 via the memory bus. As shown in FIG. 23, the access flag AF has the value 1 from the t1 when the command 1 is given to t4 when the musical sound data transfer period (TT) is finished.

When the read commands corresponding to CH0 to 3 are issued to the nonvolatile memory banks 110 to 113, respectively, since all values of RC of CH0 to 3 are 0, S102 is shifted to S106. Then, processing of transferring the musical sound data according to the read command (FIG. 23) to the buffer part 122 is performed.

In S106, it is checked whether or not the nonvolatile memory banks corresponding to the channels with the data transfer completion flag TE having the value 0, that is, all of CH0 to 3, are data ready (S107). The data ready means that when the value of the data ready flag DRF managed by the memory interface 123 is 1, that is, data ready, desired musical sound data is already read from the memory cell array to the I/O register. Here, the data ready flag DRF is set to the value of 1 at time t3 when the value of the busy signal changes 1 to 0 and becomes 0 at the time t4 when the musical sound data of 512 Bytes is transferred from the I/O register to the buffer part 122.

The above-mentioned CE signal and read clock are individually inputted to each of the nonvolatile memory banks 110 to 113 from the memory interface 123 via the memory bus, and the busy signal is individually inputted from each of the nonvolatile memory banks 110 to 113 to the memory interface 123 via the memory bus.

The process shifts from S107 to S108 if data ready, and returns to S102 if not data ready. The process shifts from S108 to S109 when the memory interface 123 is not transferring data, and returns to S102 when the memory interface 123 is transferring data. In S109, the CPU part 124 issues a transfer instruction to the memory interface 123 so as to transfer the musical sound data from the nonvolatile memory bank with DRF having the value 1 to the buffer part 122. After that, the value of the read command issuance flag RC of the corresponding channel is reset to 0 (S110) and the process returns to S102.

The reason why the process does not return to S106 after S110 is that when the nonvolatile memory bank that is not being accessed exists, the read command is issued in advance. The reason why existence or absence of data transfer of the memory interface 123 is checked in S108 is that, since the nonvolatile memory banks 110 to 113 share the memory bus, the musical sound data cannot be read from different nonvolatile memory banks at the same time.

After the data transfer instruction in S109, when the memory interface 123 finishes data transfer from any of the nonvolatile memory banks to the buffer part 122, using the completion of data transfer as a trigger, the CPU part 124 shifts to the interruption routine.

In the interruption routine shown in FIG. 13B, the value of TE of the corresponding channel in the register 121a is set to 1 (S121). Next, an input value to the RAM switching terminal 122d of the RAM switching circuit 122c is toggled and switched (S122). For example, by changing the value 0 to the value 1, a transfer destination from the memory interface 123 is switched to the single port RAM 122b, and a transfer source to the host interface 121 is switched to the single port RAM 122a.

After that, the CPU part 104 notifies CHN of a channel that completes data transfer to the buffer part 122 to the host interface 121, and instructs transfer of the musical sound data temporarily stored in the buffer part 122 to the access module 200A (S123).

Figure 22B:
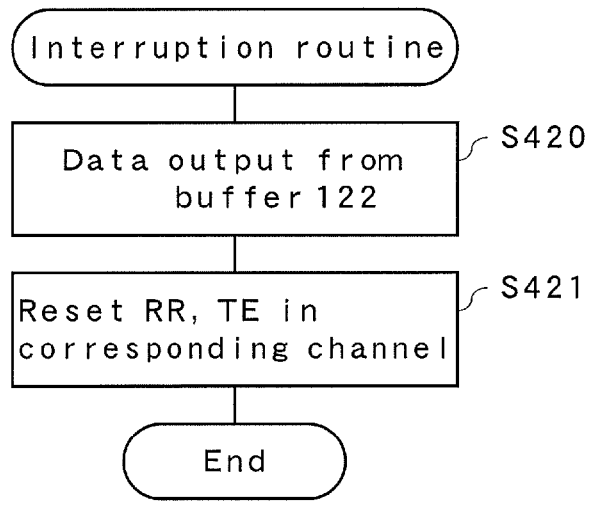
FIG. 22B is a flow chart illustrating interruption processing of the host interface 121.

Next, the host interface 121 shifts to S420 in FIG. 22B due to interruption corresponding to the data transfer instruction of the CPU part 124 in S123. In S420, the host interface 121 transfers the musical sound data from the buffer part 122 to the access module 200A. At this time, in S123, CHN informed by the CPU part 124 is added to the musical sound data and transferred to the access module 200A (FIG. 17). After that, the values of RR and TE of the corresponding channel in the register 121a are reset to 0 (S421). An area where RR in the register 121a has the value 0 becomes a free area for next new reading instruction information. When RR has the value 0, RC also has the value 0 in S109 and TE also has the value 0 in S421. In temporarily storing the reading instruction information in the register 121a, the area is used from the top in order, and when reaching the bottom, it returns to the top again, that is, the area is circularly used.

When receiving the musical sound data from the host interface 121, the access module 200A temporarily stores the musical sound data in the area of the musical sound data buffer 231 that corresponds to CHN added to the musical sound data. Subsequent processing of the access module 200A is as described above. The transfer time of the musical sound data to the buffer part 122 or from the buffer part 122 is about 12.8 μs according to an expression (17). That is, given that the bus widths of the memory bus and the external bus are 1 Byte, the data is transferred at the frequency of 40 MHz.

$$512\ \text{Bytes} \times (25\ \text{ns}/\ \text{Bytes}) = 12.8\ \mu s \tag{17}$$

(2) Description of Sound Production Delay Time

In consideration of the above-mentioned processing, operations from key strike to musical sound production and a sound production delay time as to various key strike methods will be described referring to time charts shown in FIGS. 24A to 24C and channel assign table 232 in FIGS. 8A to 8C.

(2-1) Case of Discrete Key Strike

FIG. 24A is a time chart illustrating operations in the case of discrete key strike, and FIG. 8A illustrates change of the parameters in the channel assign table 232 corresponding to the discrete key strike. First, the case where four keys having NN of 0x19, 0x1C, 0x1E, 0x20 are simultaneously struck at time t1 in a silent state by the master keyboard 300 and then, the key having NN of 0x25, key having NN of 0x29, and finally, keys having NN of 0x2C, 0x2F are touched at regular intervals of a few dozens of μs will be described. The key strikes are assigned to CH0 to 7, respectively, by the channel assign processing of the CPU part 230A, and the reading instructions of CH0 to 7 are transferred from the access module 200A to the nonvolatile storage module 100A at timings obtained by adding processing delay of the CPU part 230A to key strike timings.

According to the operation in S103 described above, while the corresponding nonvolatile memory bank is being accessed, that is, the access flag has the value 1, the next read command cannot be issued. For this reason, concerning issuance timings of the read commands to the nonvolatile memory banks 110 to 113, the reading instructions of CH0 to 7 are transferred from the access module 200A to the nonvolatile storage module 100A at the timings shown in FIG. 24A. In response to the issuance timings, the musical sound data is read from the memory cells of the respective memory banks 110 to 113 to the I/O register during the access time TR.

According to the above described S108, the musical sound data read to the I/O registers 110a to 113a of the nonvolatile memory banks 110 to 113 is sequentially transferred to the buffer part 122 from time t2 so that the transfer periods of the channel 0 to 3 do not overlap each other as shown.

Here, since the nonvolatile memory banks 110 to 113 share the same memory bus, it is needed to prevent the TA period shown in FIG. 23 from overlapping each other. However, because TA is ignorable time as described above (a few hundreds of ns), disclosed time of TR in FIGS. 24A to 24C is expressed as the substantially same time.

The host interface 121 transfers the musical sound data temporarily stored in the buffer part 122 to the access module 200A. The CPU part 230A stores the transferred musical sound data in the musical sound data buffer 231. Although outputting from the buffer part 122 is performed in the order of issuance of the read commands, that is, in ascending order from CH0, the musical sound data of, e.g. CH1 can be transferred to the buffer part 122 earlier than the musical sound data of CH0 due to variation in characteristics of the nonvolatile memory banks. In consideration of such passing, the musical sound data having been read from the nonvolatile storage module 100A onto the external bus has a format in which CHN is added as shown in FIG. 17. Whereby, based on the CHN, the CPU part 230A can store the musical sound data in the area corresponding to CHN of the musical sound data buffer 231.

The signal processor 220 performs musical data sound generation processing using the musical sound data stored in the musical sound data buffer 231 as described above. The signal processor 220 performs processing of CH0 to 31 every sampling cycle in a time division method. That is, the musical sound data of each channel is used in order from s0 every 22.7 µs.

In CH0, s0 is used in a first time slot starting from time t3 in FIG. 24A. Although s0 of CH1, CH2 . . . are used in order from the time slot after the above-mentioned first time slot, since the transfer time of the musical sound data to the musical sound data buffer 231 (12.8 µs) is different from a cycle of the time slot (22.7 µs), for example, s0 of the CH2 and s0 of CH3 are both used from a third time slot starting from a time t5.

At the 127th time slot enumerating from the time slot using s0 in each channel, the musical sound data of 512 Bytes is run out. For this reason, as described above, it is needed to previously acquire the next musical sound data of 512 Bytes at a time t7 when sn becomes 96. Sn is not limited to 96 and may be another value as long as the musical sound data of 512 Bytes can be acquired so as to be in time for processing of the next musical sound data of 512 Bytes.

In response to this, at the timings expressed by broken lines in FIG. 24A, the reading instructions of CH0 to 7 are transferred from the access module 200A to the nonvolatile storage module 100A. An interval between the reading instructions is basically an interval between the time slots, that is, every 22.7 µs. As described above, since the transfer time of the musical sound data to the musical sound data buffer 231 (12.8 µs) is different from the cycle of the time slot (22.7 µs), multiple channels can have the same reading instruction time (for example, CH2 and CH3).

Next, sound production delay time will be described. The sound production delay time is a time taken from key strike time to generation of the musical sound corresponding to s0. In the case shown in FIG. 24A, the sound production delay time of CH3 is the largest from t1 to t6 and thus, it can be said the sound production delay time is smaller than or equal to 150 µs. Since the time is sufficiently smaller than 1 ms that falls within the allowable scope of the sound production delay time, in the case of shown in FIG. 24A, the musical sound generation system in the present embodiment can be used as a musical sound generation system for electronic musical instruments and the like.

(2-2) Case of Concentrated Key Strike

Next, the case where sound is produced at one time using all of the 32 channels will be described. FIG. 24B is a time chart illustrating operations in the case where 32 keys are simultaneously struck at time t1 with the master keyboard 300, and FIG. 8B illustrates change in the parameters in the channel assign table 232 that correspond to this key strike. Such a key strike method is not often performed in normal performance.

In such a case, as shown in FIG. 8B for example, the 32 keys corresponding to NN of 0x28 to 0x47 are simultaneously struck. The key strikes are assigned to CH0 to 31 by the channel assign processing of the CPU part 230A. Then, the access module 200A transfers the reading instruction information of CH0 to 31 to the nonvolatile storage module 100A at timing obtained by adding processing delay of the CPU part 230A to the key strike timing. Thereafter, as in the above-mentioned case (1-1), the access module 200A intermittently transfers the musical sound data corresponding to CH0 to 31 to the musical sound data buffer 231 in series from time t2 to time t3 to generate the musical sound.

In this case, CH31 has the longest sound production delay time. In this case, a period from time t2 to time t3 is 490.8 µs, and the sound production delay time can be said to be a period from t1 to t3, that is, smaller than or equal to 600 µs in FIG. 24B. Since the time is smaller than 1 ms that falls within the allowable scope of the sound production delay time, also in the case shown in FIG. 24B, the musical sound generation system in the present embodiment can be used as the musical sound generation system for electronic musical instruments and the like.

(2-3) Concentrated Key Strike after Rapid Sound Deadening

Finally, the case where sound is produced at one time using all of the 32 channels after the rapid sound deadening will be described referring to FIGS. 24C and 8C. For example, while in the state of key strike described in (2-2), that is, the 32 keys corresponding to NN of 0x28 to 0x47 are struck as shown in FIG. 8B, when 32 keys corresponding to NN of 0x48 to 0x67 are newly touched at time t1, sound of channels exceeding the maximum number of sound production channels (32 channels) is produced.

In controlling sound production of channels exceeding the maximum number of sound production channels, the already-produced sound of 32 channels is rapidly deadened in advance, and the values of EE of the 32 channels are set to 1. The new key strike needs to be assigned to the 32 channels after the already-produced sound of 32 channels deadens to an inaudible level. In such a case, the sound production delay time becomes the longest.

A period when such rapid sound deadening is performed is a period of 182 µs corresponding to eighth sampling cycles immediately after key strike in FIG. 24C. In FIG. 8C, all channels are channels in which new key strike is performed while sound is produced without detachment from the already-touched keys (FIG. 24B). Accordingly, the values of both KON and SON start from 1. Then, the value of EE becomes 1 and the value of SON becomes 0 by the rapid sound deadening processing of the signal processor 220, resulting in that the reading instruction information of CH0 to 31 is transferred to the nonvolatile storage module 100A by the channel assign processing of the CPU part 230A. A time chart after this is similar to the time chart in FIG. 24B.

In this case, CH31 is the longest sound production delay time, and the sound production delay time can be said to be a period from time t1 to the time t4, that is, smaller than or equal to 800 µs in FIG. 24C. Since the time is smaller than 1 ms that falls within the allowable scope of the sound production delay time, the musical sound generation system in the present embodiment can be used as the musical sound generation system for electronic musical instruments and the like.

As described above, in the musical sound generation system in the present embodiment, the musical sound data is multiplexed by being recorded in each of the nonvolatile memory banks 110 to 113, and the data reader 120 reads the musical sound data from the plurality of nonvolatile memory banks in parallel according to the reading instruction from the access module 200A. For this reason, even in a system that cannot expect which pitch of musical sound data is instructed to be read, such as a musical sound generation system, a plurality of pieces of data can be read from the plurality of nonvolatile memory banks in parallel. Accordingly, the sound production delay time can be made shorter than 1 ms that falls within the allowable scope. That is, even the currently dominant large-capacity multi-level NAND flash memory is used as the ROM for musical sound data, an inexpensive and compact musical sound signal generation device can be realized.

The nonvolatile storage module 100A may be a removable storage device such as a memory card or memory part incorporated into the electronic musical instruments or the like. The access module 150 may be a device such as an electronic musical instrument or an access circuit part incorporated into a device such as the electronic musical instrument.

(Embodiment 2)

Figure 25:
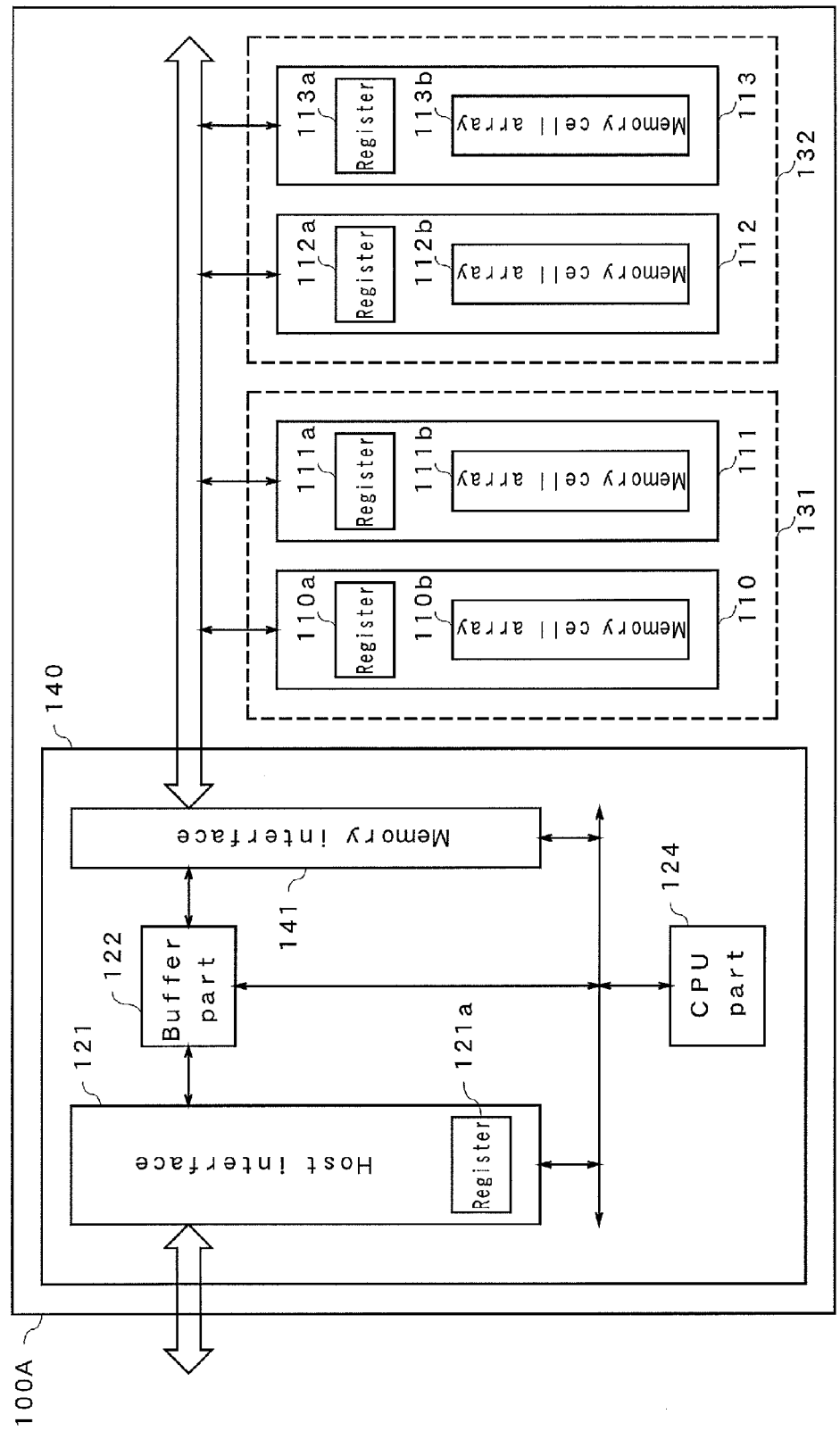
FIG. 25 is a block diagram illustrating a nonvolatile storage module of a musical sound generation system in embodiment 2 of the present invention.

FIG. 25 is a block diagram illustrating a musical sound generation system in embodiment 2 of the present invention. The nonvolatile memory banks 110 to 113 each are one flash memory (chip) in the musical sound generation system in embodiment 1 in FIG. 1, while the nonvolatile memory banks 110, 111 are built in one flash memory 131 and the nonvolatile memory banks 112, 113 are built in one flash memory 132 in the present embodiment. A data reader 140 has a memory interface 141 in addition to the interface 121, buffer part 122 and CPU part 124.

Generally, the flash memories are classified into a type that has only one memory bank in the flash memory chip and a type that has two or more memory banks in the flash memory chip. The musical sound generation system in embodiment 2 uses a latter type. The nonvolatile memory banks 110, 111 included in the flash memory 131 and the nonvolatile memory banks 112, 113 included in the flash memory 132 can individually read the musical sound data as in embodiment 1. However, embodiment 2 is different from embodiment 1 in that there are two flash memory chips and thus, each of the number of CE signals, read clocks and busy signals that are connected to the memory interface 123 via the memory bus is two.

In the bit format shown in FIG. 4, b3, LSB of the bank select is added at the head of b22 of PBN (b22 to b13) and used as a physical block address of the flash memory 131 or flash memory 132. In the bit format, b4, MSB of the bank select is encoded in the memory interface 141 and used as the two CE signals.

A busy signal of the flash memory 131 is shared by the nonvolatile memory banks 110, 111. A data ready flag of each of the nonvolatile memory banks 110, 111 may be generated by the busy signal. Similarly, a busy signal of the flash memory 132 is shared by the nonvolatile memory banks 112, 113. A data ready flag of each of the nonvolatile memory banks 112, 113 may be generated by the data ready flag. As shown in FIG. 23, the access flag may be controlled so as to have the value 1 by the time when the musical sound data transfer time (TT) of the musical sound data from the command 1 is finished as in embodiment 1.

As described above, since the musical sound generation system in embodiment 2 performs the same operations as those of the musical sound generation system in embodiment 1, the sound production delay time can be made smaller than 1 ms that falls within the allowable scope. In other words, even when a currently dominant large-capacity multiple-level NAND flash memory is used as a ROM for musical sound data, an inexpensive and compact musical sound signal generation device can be realized.

(Embodiment 3)

Figure 26A:
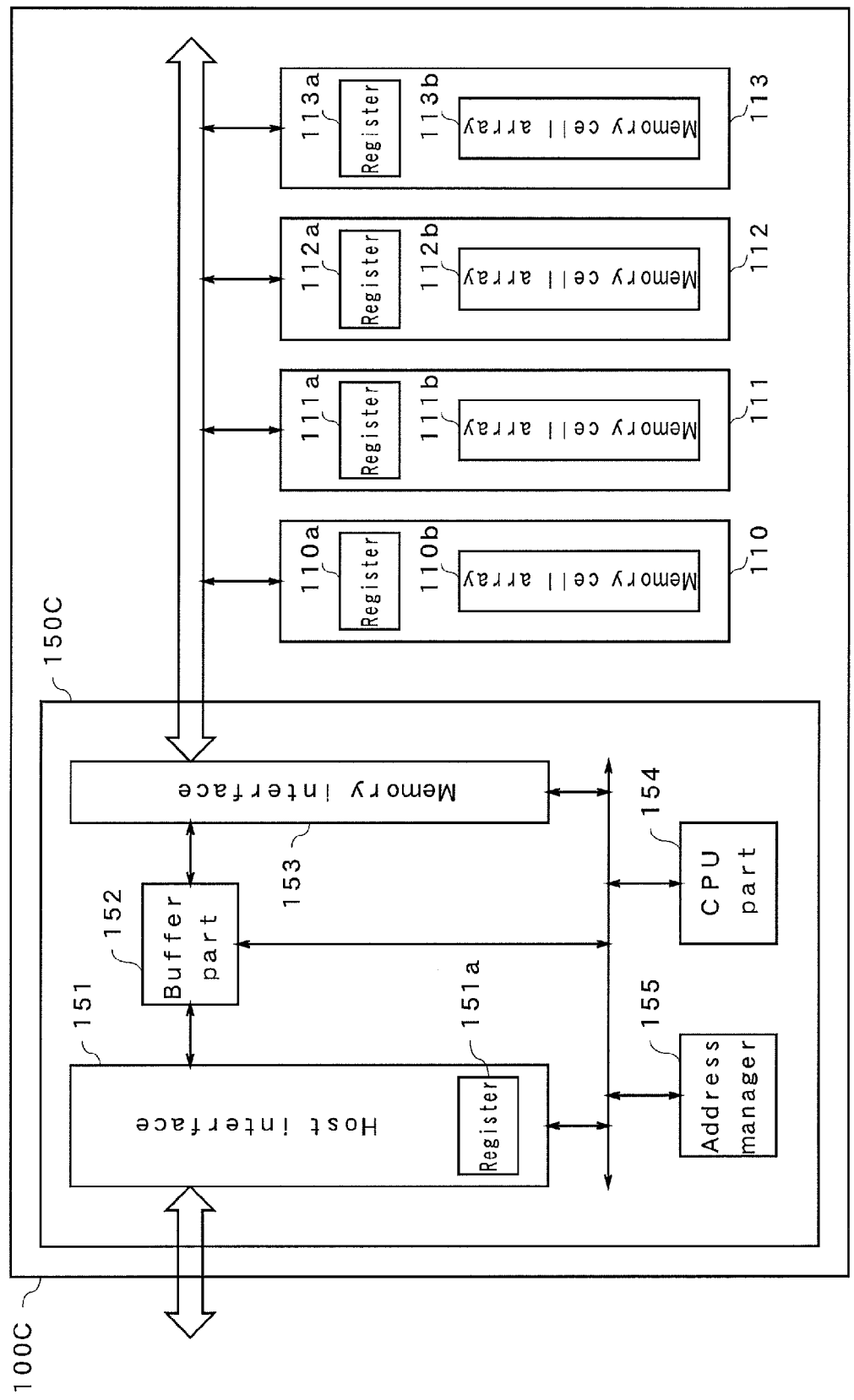
FIG. 26A is a block diagram illustrating a nonvolatile storage module of a musical sound generation system in embodiment 3 of the present invention.
Figure 26B:
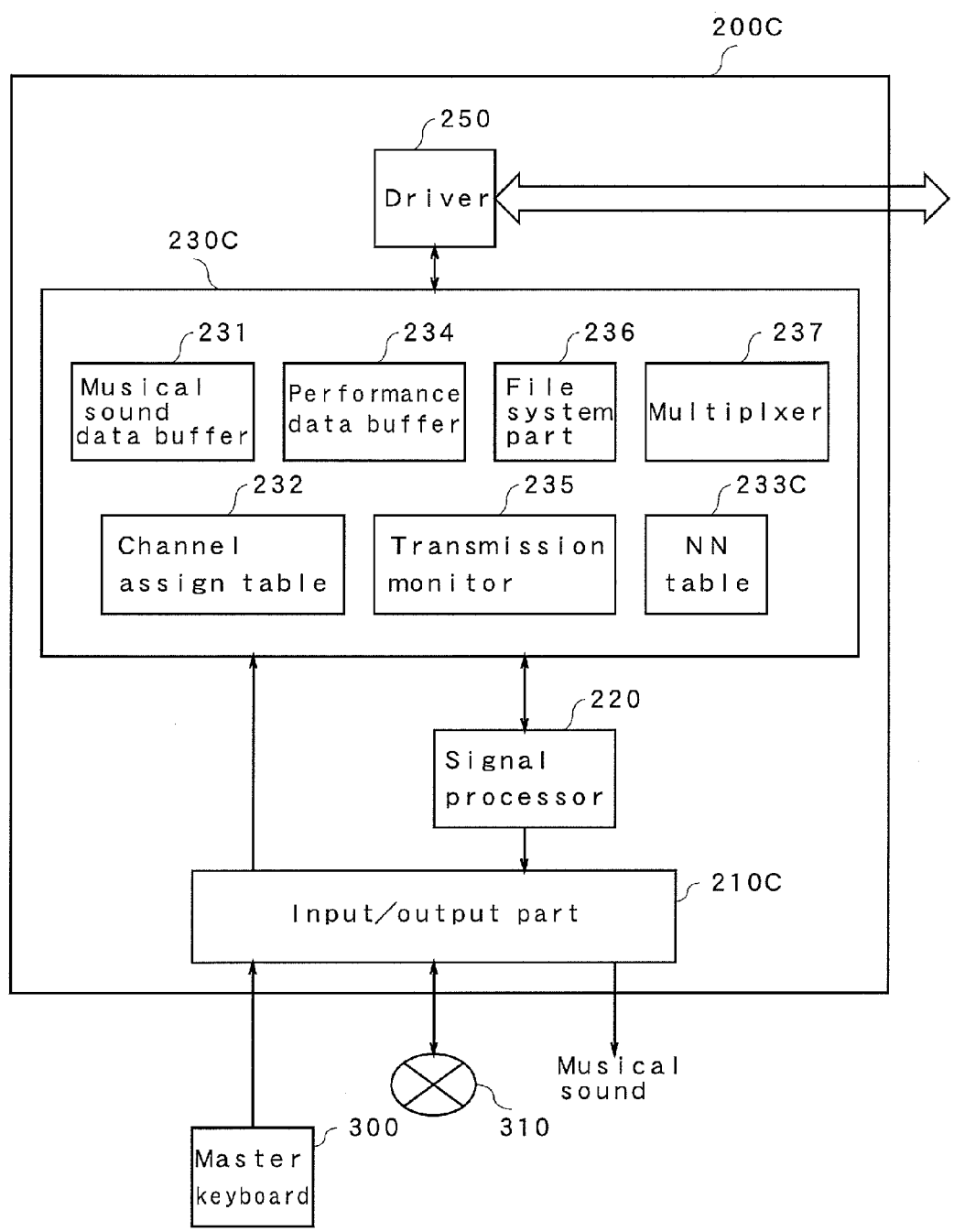
FIG. 26B is a block diagram illustrating an access module of the musical sound generation system in embodiment 3 of the present invention.

FIGS. 26A and 26B are block diagrams illustrating a musical sound generation system in embodiment 3 of the present invention. The musical sound generation system includes a nonvolatile storage module 100C shown in FIG. 26A and an access module 200C shown in FIG. 26B. The nonvolatile storage module 100C includes four nonvolatile memory banks 110 to 113 provided in parallel with each other and data reader/writer 150C. The data reader/writer 150C includes a host interface 151, a buffer part 152, a memory interface 153, a CPU part 154 and an address manager 155.

The access module 200C includes an input/output part 210C, a signal processor 220, a CPU part 230C and a driver 250, and can simultaneously output the musical sound of 32 channels. Hereinafter, channel number is referred to as CH0 to CH31. The CPU part 230C includes a file system part 236 and a multiplexer 237 in addition to the musical sound data buffer 231, the channel assign table 232, an NN table 233C, the performance data buffer 234 and the transfer monitor 235.

The nonvolatile memory banks 110 to 113 of the nonvolatile storage module 100C are the same as those in embodiment 1. Hereinafter, it is defined that a physical block is PB, logical sector is LS, cluster is CL, physical block number is PBN, logical sector number is LSN and cluster number is CLN. For example, the physical block having the physical block number PBN of 0 is referred to as PB0, a logical sector having the logical sector number LSN of 0 is referred to as LS0 and a cluster having the cluster number CLN of 0 is referred to as CL0.

Figure 27A:
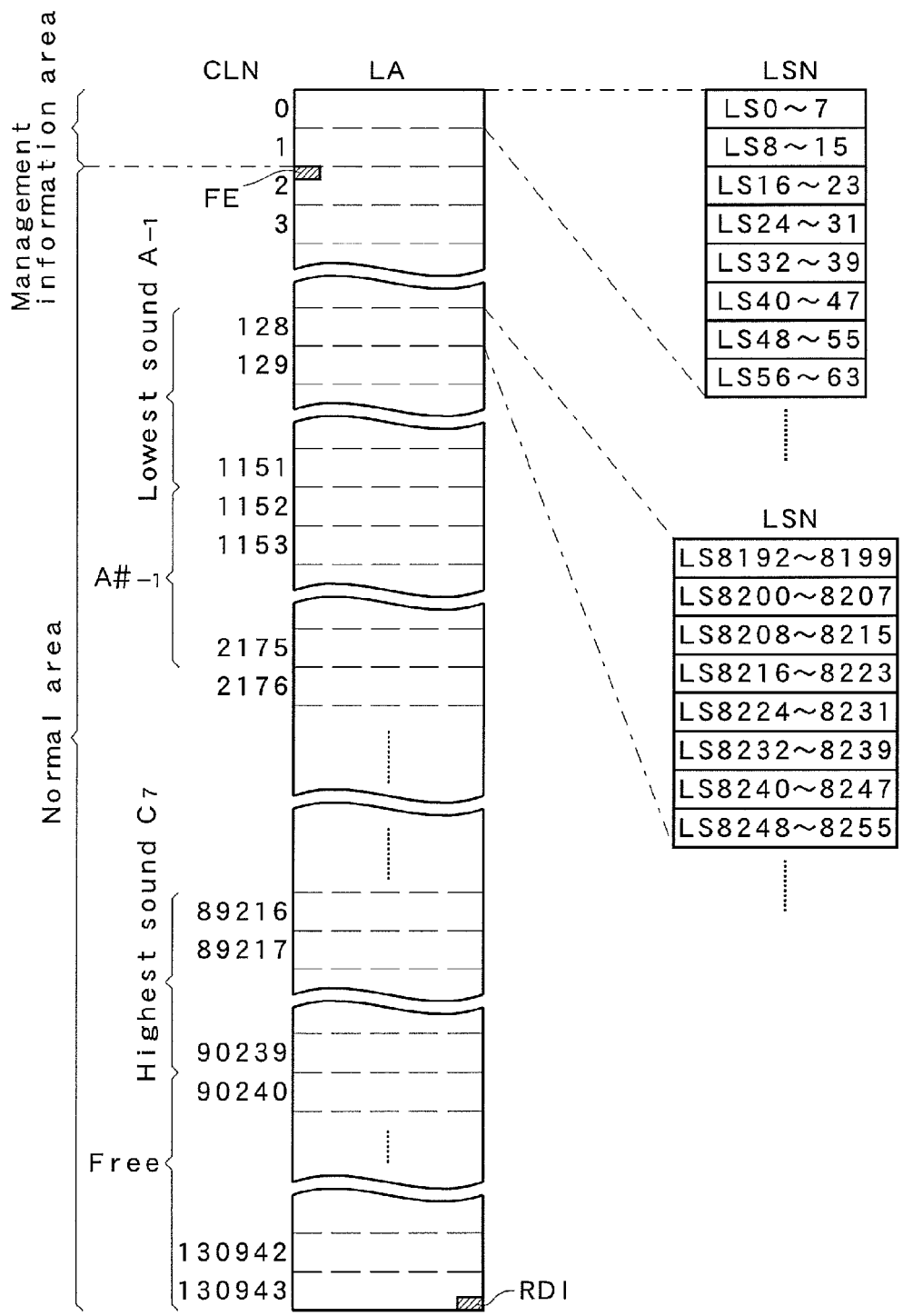
FIG. 27A is an explanatory diagram illustrating relationship between logical addresses and LSN.
Figure 27B:
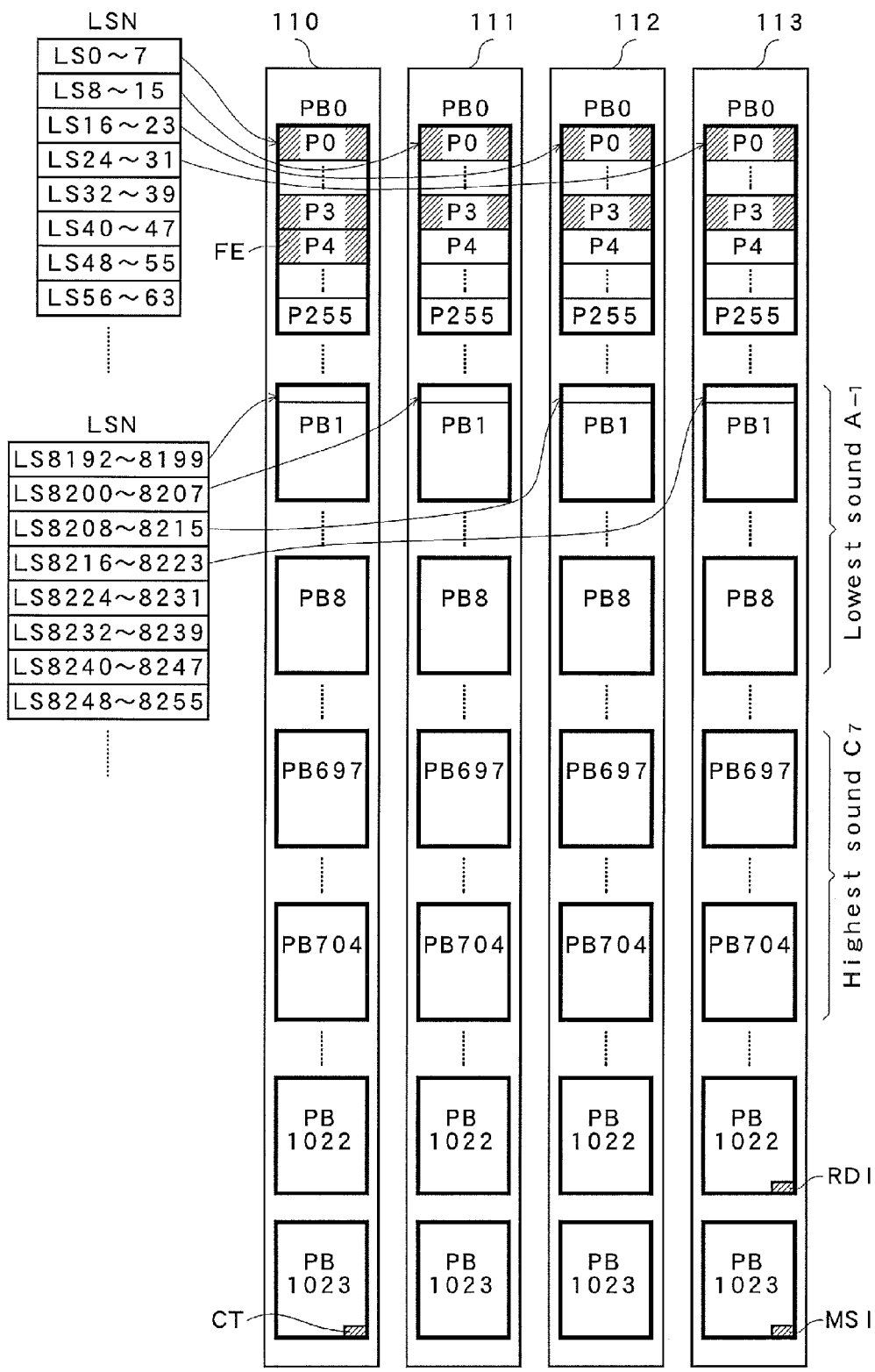
FIG. 27B is an explanatory diagram illustrating structures of the nonvolatile memory banks 110 to 113 and LSN.

FIG. 27A is an explanatory diagram illustrating relationship between a logical address space and cluster number CLN and logical sector number LSN, and FIG. 27B is an explanatory diagram of the physical address space illustrating relationship between the logical sector number LSN and structures in the memory cell arrays 110b to 113b. Here, the logical address space includes CL0 to CL130943. One cluster has a capacity of 32 kBytes. Meanwhile, the memory cell arrays 110b to 113b each have physical blocks PB0 to PB1023. Each physical block is formed of 256 pages (P0 to P255). Here, the musical sound data is held in PB1 to PB704 of each of the nonvolatile memory banks 110 to 113. Here, it is assumed that the logical address space corresponds to PB0 to PB1022. That is, PB1023 is an area where data cannot be read/written by logical address designation (hereinafter referred to as system area). This area is provided to prevent accidental erasure by a user, and a manufacturer can write data to the area by direct physical address designation.

Figure 28:
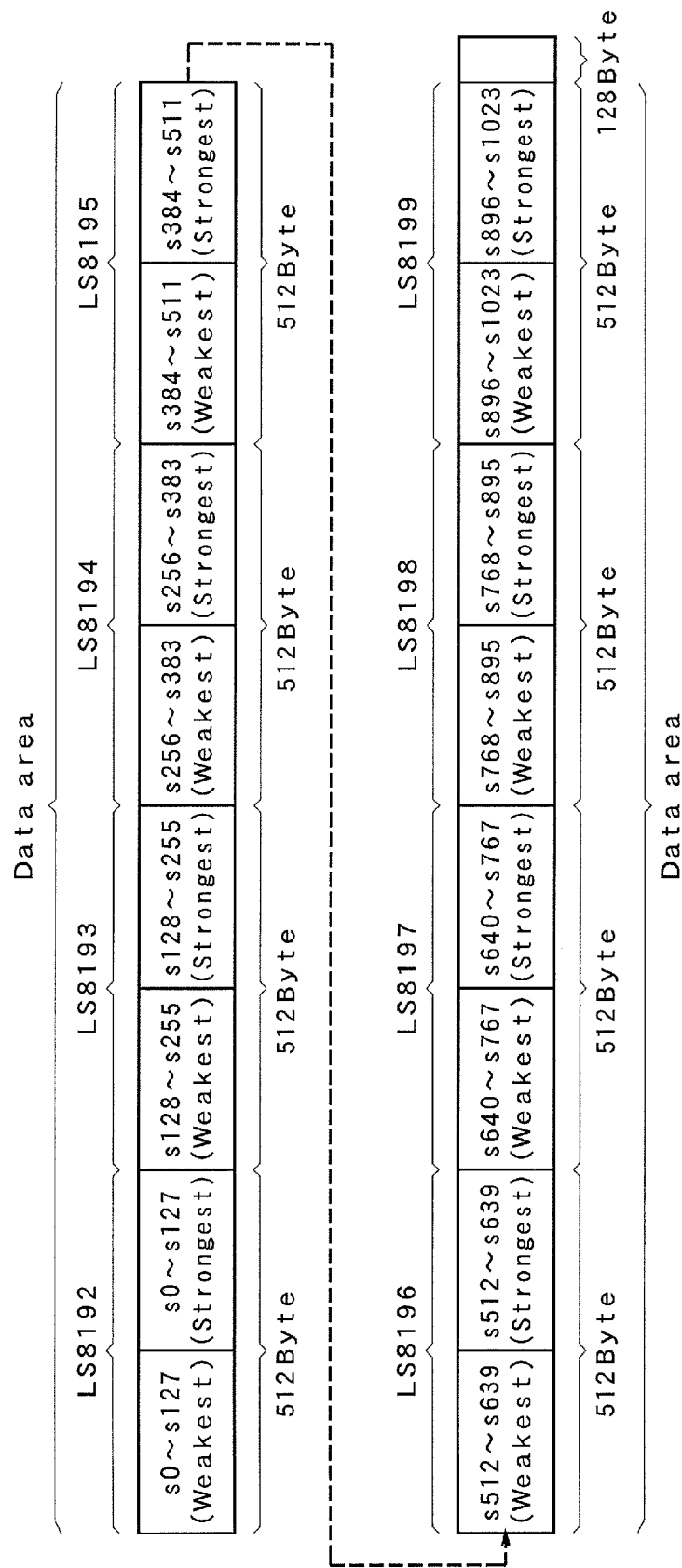
FIG. 28 is a diagram illustrating a record format in a page using P0 of PB0 as an example.

FIG. 28 is a diagram illustrating a record format in each page where the musical sound data is recorded using the page P0 of the physical block PB1 as an example. Each page of all physical blocks is formed of a data area of 4096 Bytes and a redundancy area of 128 Bytes. In the present embodiment, the data area is divided into eight sectors. Each sector has a capacity of 512 Bytes. The redundancy area is not used. Details of recorded data will be described below.

Figure 29:
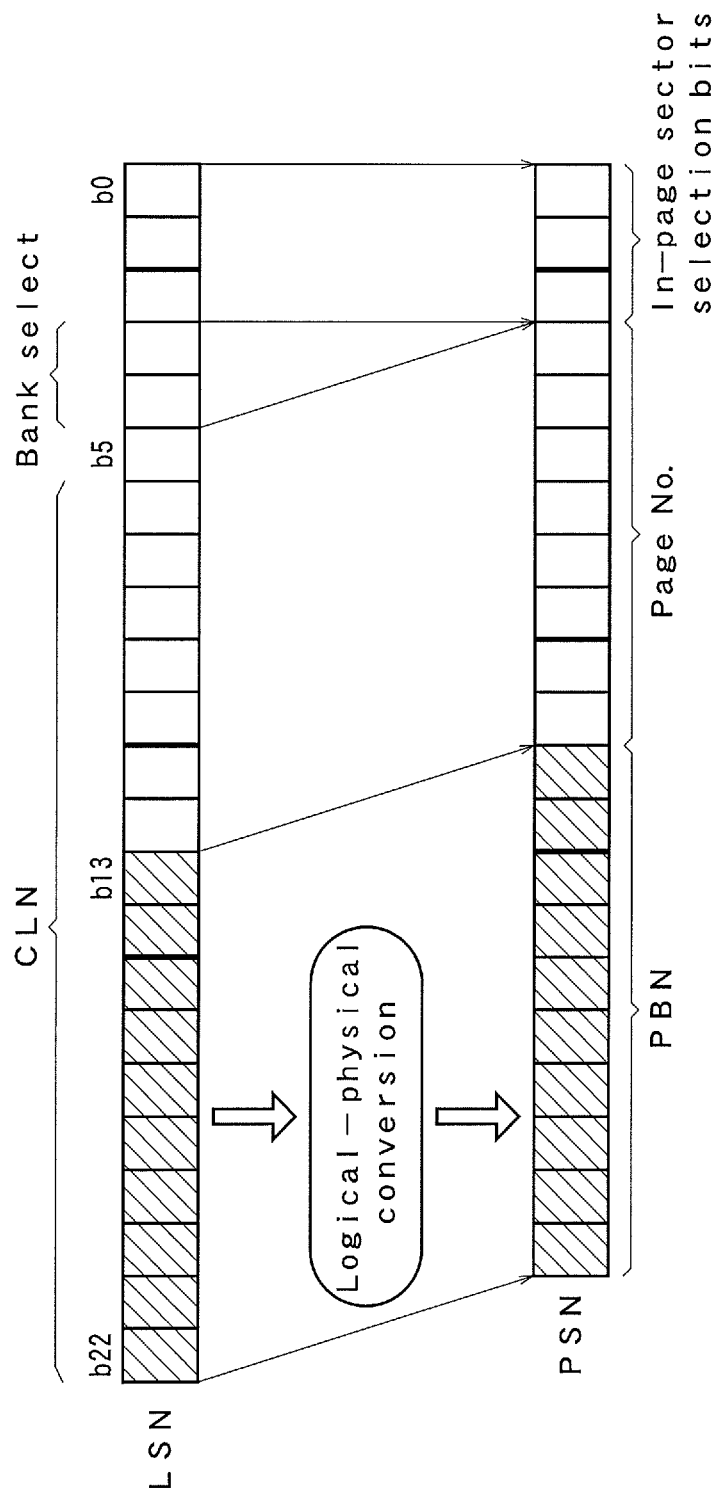
FIG. 29 is a bit format illustrating correspondence of PSN (physical sector number) and LSN.

FIG. 29 is a bit format illustrating correspondence relationship of the logical sector number LSN and physical sector number PSN. In FIG. 29, bit b0 to b2 of LSN represent in-page sector selection bits, b3, b4 represents the bank select, b5 to b12 represent the page number and b13 to b22 represent a logical block number LBN. The cluster number CLN corresponds to b22 to b5. The nonvolatile memory bank 110 is selected when the bank select b3, b4 has a value 0, nonvolatile memory bank 111 is selected when the bank select b3, b4 has a value 1, the nonvolatile memory bank 112 is selected when the bank select b3, b4 has the value 2 and the nonvolatile memory bank 113 is selected when the bank select b3, b4 has the value 3. PBN is determined by logical-physical converting b22 to b13 of LSN. b12 to b5 and b2 to b0 of LSN correspond to b10 to b3 and b2 to b0 of PSN, respectively.

However, the bit format of LSN in FIG. 29 is an example in the case where the number of parallelly provided nonvolatile memory banks is four, and the number of bits assigned to the bank select may change depending on the above-mentioned parallel number. For example, when the parallel number is two, the number of bits assigned to the bank select is one (b3) and accordingly, the page number is assigned to b11 to b4 and LBN is assigned to b21 to b12. The in-page sector selection bits are bits corresponding to a quotient obtained by dividing a page by a sector size. In the present embodiment, a page size is 4096+128 Bytes and the sector size is 512 Bytes, that is, as shown in FIG. 28, one page is divided into eight sectors, and these sectors are selected according to low-order three bits of the above-mentioned physical address. The page size and sector size are not limited to the above-mentioned values, and the in-page sector selection bits may be changed depending to the values.

Next, the data reader/writer 150C will be described. The host interface 151 is connected to the access module 200C via an external bus. The host interface 151 is a block that receives reading instruction information for the musical sound data from the access module 200C and transfers the musical sound data read from the nonvolatile memory banks 110 to 113 into the buffer part 152 to the access module 200C. This reading function is the same as that in embodiment 1. The reader/writer 150C has a writing function to write the musical sound data inputted by a user as a file into the nonvolatile storage module 100C.

The host interface 151 includes a register 151a. FIG. 30 is a memory map illustrating the register 151a. The register 151a has LSN, a reading instruction receipt flag RR, read command issuance flag RC and data transfer completion flag TE for 32 channels. Prior to reading the musical sound data corresponding to one reading instruction information, the register 151a holds reading instruction information next to the reading instruction information. The reading instruction receipt flag RR (hereinafter referred to as RR) is a flag that has the value 0 while the reading instruction information is not transferred from the access module 200C and has the value 1 when the instruction information is transferred. The read command issuance flag RC (hereinafter referred to as RC) is a flag set when an instruction to output the read command to the nonvolatile memory bank is issued to the memory interface 153. The data transfer completion flag TE (hereinafter referred to as TE) is a flag set when data transfer from an I/O register of each nonvolatile memory to the buffer part 152 is completed and is used to determine whether or not data can be further written to the buffer part 152.

Next, a configuration of the buffer part 152 is shown in FIG. 31. The buffer part 152 is a block that temporarily holds the musical sound data read from the nonvolatile memory banks 110 to 113 and musical sound data to be written to the nonvolatile memory banks 110 to 113. The buffer part 152 includes single ports RAM 152a, 152b of 4 kBytes and a RAM switching circuit 152c. When a RAM switching terminal 152d has the value 0, the RAM switching circuit 152c connects an input of the memory interface (IF) 153 to an input/output port of the single port RAM 152a and an output to the host interface (IF) 151 to an input/output port of the single port RAM 152b. When the RAM switching terminal 152d has the value 1, the RAM switching circuit 152c connects an input/output end of the memory interface 153 to the input/output port of the single port RAM 152b and an input/output end of the host interface 151 to the input/output port of the single port RAM 152a. The RAM switching terminal 152d is toggle-controlled by the CPU part 154.

In each of the single ports RAM 152a, 152b, a size as a buffer ring for the musical sound data is 512 Bytes. In consideration of versatility, however, the size is set to be the same as a size of the data area of a page, that is, 4 kBytes.

The memory interface 153 is connected to the nonvolatile memory banks 110 to 113 via a memory bus, and functions to read the musical sound data stored in the nonvolatile memory banks 110 to 113 to the buffer part 152 or write data in the buffer part 152 to the nonvolatile memory banks 110 to 113 according to the instruction of the CPU part 154. The memory interface 153 decodes the two bits of bank select corresponding to the channel number CHN, generates four CE signals (chip enable signals) for selecting the nonvolatile memory banks 110 to 113 and feeds the CE signal to each of the nonvolatile memory banks 110 to 113 via the memory bus.

The memory interface 153 manages a data ready flag DRF and an access flag AF of each of the nonvolatile memory banks 110 to 113. The data ready flag DRF is a flag that has the value set to 1 when a value of the busy signal changes from 1 to 0, and to 0 when transfer of the musical sound data of 512 Bytes from the I/O register to the buffer part 152 is finished. The access flag AF is a flag that indicates whether or not each of the memory banks 110 to 113 is being accessed.

The CPU part 154 is a block that is connected to the host interface 151, buffer part 152, memory interface 153 and address manager 155, and controls the whole of the data reader/writer 150C.

The address manager 155 has a function to convert a logical address into a physical address, and changes the physical block or perform wear leveling when the physical block becomes a bad block during writing of the musical sound data. RAM is hold in the address manager 155, and the RAM holds a logical-physical conversion table.

Next, each block in the access module 200C will be described in detail with reference to FIG. 26B. Performance data is generated by operation such as striking of the external master keyboard 300, and is taken into the CPU part 230C via the input/output part 210C. The access module 200C is connected with the Internet 310 and can download necessary data according to a user's download instruction. The input/output part 210C includes a terminal that inputs the performance data from the master keyboard 300, a DA converter that digital-analog converts the musical sound generated by the signal processor 220, an amplifier that amplifies the converted musical sound and a line-out terminal that externally outputs the output.

The signal processor 220 is a block that generates musical sound by performing mixing of a sound production channel and effect processing such as reverb after performing an interpolation operation and level control of the musical sound data of 32 channels at maximum, which are supplied from the CPU part 230C. The signal processor 220 is configured of a digital signal processor (hereinafter referred to as DSP), a ROM that stores a program of the DSP and a RAM necessary for a delay element for effector processing or for temporarily storing a parameter.

The CPU part 230C is a block that performs channel assign processing of the performance data received by the input/output part 210C, transfers reading instruction information to the nonvolatile storage module 100C via the driver 250 as well as supplies musical sound data read from the nonvolatile storage module 100C and part of the performance data to the signal processor 220.

Since the musical sound data buffer 231, channel assign table 232, performance data buffer 234, transfer monitor 235 that are included in the CPU part 230C are the same as those in embodiment 1, detailed description thereof is omitted.

FIG. 32 is an explanatory diagram illustrating an NN table 233C held in the CPU part 230C. An NN table is a table indicating relationship between a note number NN and a cluster number that stores the musical sound data corresponding to the NN.

The file system part 236 in the CPU part 230C manages the musical sound data as a file. Details of the file system part 236 will be described later.

The multiplexer 237 in the CPU part 230C multiplexes the musical sound data in writing the musical sound data as a file. Details of the multiplexer 237 will be described later.

[Initial State]

First, contents of initialization performed by a manufacturer prior to shipment of the nonvolatile storage module 100C will be described.

A writing device on the side of the manufacturer, for example, a personal computer that conforms to a FAT file system, physically formats the nonvolatile storage module 100C. After that, as shown in FIG. 27A, the writing device allocates management information such as the FAT table and route directory entry in a management information area (CL0, CL1) in a logical address space, and allocates the musical sound data in a normal area (cluster CL2 and subsequent clusters).

Here, as shown in FIG. 27A, FIG. 27B, P0 of PB0 of the nonvolatile memory bank 110 corresponds to LS0 to 7, and P0 of PB0 of the nonvolatile memory bank 111 corresponds to LS8 to 15. Similarly, P0 of PB0 of the nonvolatile memory bank 112 corresponds to LS16 to 23, and P0 of PB0 of the nonvolatile memory bank 113 corresponds of to LS24 to 31. This relationship follows the bit format of LSN, PSN shown in FIG. 29.

Next, the musical sound data is allocated from the cluster (CL128) offset from the front logical address by 4 MBytes and from a lowest sound name ($A_{-1}$) in order.

By this allocation, the management information is written to the area of P0 to P3 of PB0 of the nonvolatile memory banks 110 to 113, and the musical sound data is written to PB1 and subsequent PBs. CL128 as a starting address of the musical sound data, a file name or information on time when the musical sound data is stored are held in a file entry (FE). As shown in FIG. 27A, the file entry (FE) is allocated in leading 512 Bytes of CL2 and, in terms of a physical space, as shown in FIG. 27B, is written to P4 of PB0 of the nonvolatile memory bank 110.

The logical address of the file entry can be followed from the route directory entry in the management information. For simplification of description hereinafter, logical-physical conversion processing is not performed herein. That is, in FIG. 29, b22 to b13 of LSN correspond to b20 to b11 of PSN, respectively. Since the FAT file system is a common technique, detailed description thereof is omitted.

In the present embodiment, in the case where the piano musical sound data is digitally recorded at a sampling frequency of 44.1 kHz, the musical sound data is recorded to the nonvolatile module 110 for each note for about 40 seconds in an uncompressed form. This data is the same as that in embodiment 1.

Here, for the two types of the strongest touch and weakest touch, the piano musical sound data digitally recorded in advance is written to the physical blocks PB1 to PB704 of the nonvolatile memory bank 110 as shown in FIG. 27B, and the musical sound data of 88 keys ranging from the lowest piano sound to the highest piano sound is written in ascending order. The same data is also written to each of the nonvolatile memory banks 111 to 113 in a similar manner. Whereby, the same data is multiplexed and recorded in the four parallel nonvolatile memory banks. For example, in FIG. 27B, data LS8192 to LS8199, data LS8200 to LS8207, data LS8208 to LS8215 and data LS8216 to LS8223 that are written to P0 of PB1 of the nonvolatile memory banks, respectively, are the same as one another.

Data of the piano lowest sound is recorded in PB1 to PB8 in each memory bank, and the musical sound data of 1764000 samples from a starting sample (s0) immediately after key strike to an ending sample (s1763999) are stored from P0 of PB1 in ascending order. However, as shown in FIG. 28, the two types of musical sound data with the weakest touch and strongest touch are written as a pair in units of 512 Bytes. The bit format representing one sample of the musical sound data is the same as that in embodiment 1 shown in FIG. 10.

As shown in FIG. 29, the logical address and physical address are logical-physical converted. For convenience, it is assumed that all physical blocks are normal blocks. However, when there is an initial defective block, use of the initial defective block is prevented according to the logical-physical conversion method. A logical-physical conversion table (CT in the figure) managed by the address manager 155 is held in PB1023 of the nonvolatile memory bank 110. Since the logical-physical conversion is a common technique, detailed description thereof is omitted.

In initialization, as shown in FIG. 27B, characteristic information of the piano musical sound data (hereinafter referred to as recorded data characteristic information and shown as RDI in the figure) recorded in the nonvolatile storage module 100C is written to a last page of the physical block PB1022 of the nonvolatile memory bank 113, and the information related to a memory configuration (hereinafter referred to as memory configuration information and shown as MSI in the figure) in the nonvolatile storage module 100C is written to a last page of the physical block PB1023. The recorded data characteristic information and memory configuration information are the same as those in embodiment 1.

Operations of the musical sound generation system thus configured in embodiment 3 of the present invention will be described.

[Initializing Processing at Power-on]

After power-on, each of the access module 200C and nonvolatile storage module 100C starts initializing processing. Since normal processing and interruption processing of the CPU part 154 are almost the same as those in embodiment 1, they will be described with reference to flow charts in FIGS. 13A and 13B.

As shown in the flow chart in FIG. 13A, the CPU part 154 of the nonvolatile storage module 100C performs the initializing processing in S100. In the initializing processing, the single port RAMs 152a, 152b in the buffer part 152 and register 151a of the host interface 151 are cleared. The address manager 155 reads the logical-physical conversion table recorded in PB1023 of the nonvolatile memory bank 110 to an internal RAM. When reading of the logical-physical conversion table is completed, the nonvolatile storage module 100C notifies access permission to the access module 200C. After that, the nonvolatile storage module 100C notifies that initialization is completed via the host interface 151.

As shown in a flow chart in FIG. 14A, the CPU part 230C of the access module 200C performs initializing processing in S200. In the initializing processing, the CPU part 230C reads the FAT table and file entry that are recorded in PB0 of the nonvolatile memory banks 110 to 113 to the file system part 236 and the file system part 236 recognizes the starting cluster number (CL128) of the musical sound data stored in the nonvolatile storage module 100C.

After that, the access module 200C transfers the reading instruction information for the recorded data characteristic information and memory configuration information to the nonvolatile storage module 100C. Thus, the CPU part 230C reads the recorded data characteristic information stored in PB1022 of the nonvolatile memory bank 113 and memory configuration information stored in PB1023. FIG. 33A illustrates the reading instruction information for reading the memory configuration information. In FIG. 33A, b27 to b23 are a memory configuration information identification code. * is a sign indicating that any values are available. In the initializing processing, the CPU part 230C resets the signal processor 220 and clears the dual port RAMs 231a, 231b in the musical sound data buffer 231. By resetting the signal processor 220, the signal processor 220 starts count-up of a program counter of the internal DSP. Further, in the initializing processing, as that in embodiment 1, the CPU part 230C performs initial setting of the channel assign table 232.

When acquiring the recorded data characteristic information shown in FIG. 11, the CPU part 230C sets a sampling cycle (22.7 μs) in a timer in the signal processor 220, and determines one cycle of the signal processing time slot in one sampling time. This timer functions as a timer that controls of one cycle of DSP in the signal processor 220. The CPU part 230C writes one sample capacity (2 Bytes) and flag assignment bit (b0) in the recorded data characteristic information as parameters of the RAM in the signal processor 220, and uses them as the parameters to determine at which bit position in the bit format shown in FIG. 10 the musical sound data is located.

The CPU part 230C determines a channel frame of the channel assign table 232 according to the maximum number of sound production channels (32CH) in the recorded data characteristic information as well as the number of channels in a time slot of the signal processor 220. The signal processor 220 determines the effect processing by reverb and chorus. In the case shown, it is determined that only reverb is performed as the effect processing.

Further, when acquiring the memory configuration information shown in FIG. 12, the CPU part 230C, as in embodiment 1, finds the parallel number by calculating the expression (5) based on the number of buses (1) and the number of memory banks per bus (4). The bit format of LSN is determined by the parallel number thus obtained. In the present embodiment, since the parallel number is a value four, the number of bits of the bank select is two and the bit format of the LSN is as shown in FIG. 29. For example, when the parallel number is a value two, the number of bits assigned to the bank select is one (b3) and, accordingly, the page number is assigned to b11 to b4 and PBN is assigned to b21 to b12.

Relationship between CHN and bank select is given according to the expression (6).

Since the parallel number is a value four in the present embodiment, the relationship between the CHN and bank select has following four cases (a) to (d).

(a) CH0, 4, 8, 12, 16, 20, 24, 28
. . . bank select=0 (nonvolatile memory bank 110)
(b) CH1, 5, 9, 13, 17, 21, 25, 29
. . . bank select=1 (nonvolatile memory bank 111)
(c) CH2, 6, 10, 14, 18, 22, 26, 30
. . . bank select=2 (nonvolatile memory bank 112)
(d) CH3, 7, 11, 15, 19, 23, 27, 31
. . . bank select=3 (nonvolatile memory bank 113)

Since the bit format of LSN is as shown in FIG. 29, the relationship between LSN and CHN at LS8192 to LS8223 shown in FIG. 27A is as shown in following (e) to (h).

(e) CH0, 4, 8, 12, 16, 20, 24, 28
. . . LS8192 to LS8199
(f) CH1, 5, 9, 13, 17, 21, 25, 29
. . . LS8200 to LS8207
(g) CH2, 6, 10, 14, 18, 22, 26, 30
. . . LS8208 to LS8215
(h) CH3, 7, 11, 15, 19, 23, 27, 31
. . . LS8216 to LS8223

The CPU part 230C refers the sector size (512 Bytes) in the memory configuration information shown in FIG. 12 and manages the size of a data reader from the nonvolatile storage module 100C as 512 Bytes. The total number of samples per sector (hereinafter referred to as usn) is determined by calculating the expression (7). Since the sector size is 512 Bytes, a size of one sample is 2 Bytes and the number of touches is two in the present embodiment, usn is 128 samples.

Further, the CPU part 230C calculates the number of necessary physical blocks per note by calculating the expression (8) based on the occupied capacity per note in the recorded data characteristic information and a page size in the memory configuration information and the number of pages per physical block TPN (in this case, 256) in FIG. 11. Then, the CPU part 230C determines PBN corresponding to each of notes from the lowest sound $A_{-1}$ to the highest sound $C_7$ based on the starting cluster (CL128) of the musical sound data extracted from the file entry by the file system part 236 to generate the NN table 233C shown in FIG. 32.

In the above-described main routine, the CPU part 230C reads the recorded data characteristic information and memory configuration information and sets various parameters, thereby finishing the initializing processing (S200). Then, the CPU part 230C goes to the normal operation processing S201 and enables interruption to accept the performance data from the external master keyboard 300.

[Processing at Normal Operation]
(1) Description of General Operations

General operations from inputting of the performance data to generation of the musical sound are the same as those in embodiment 1 and thus, description thereof is omitted. When the master keyboard 300 performs the performance operation, the interruption routine shown in FIG. 14B is activated. Differences in the interruption processing will be described.

The performance data transferred from the master keyboard has a same bit format as that in embodiment 1 shown in FIG. 16. The performance data is classified into key strike data generated in response to key strike and pedal data. Those pieces of data are identified based on the value of b15.

When KON has the value 1, that is, the key is struck, it is checked whether or not a blank channel exists in the channel assign table 232 (S227). Specifically, it is checked whether or not a sound producing flag SON having the value of 0 exists from CH0 in ascending order and, when such flag SON exists, the performance data is assigned to a first found channel (S229).

Now, after the channel assign processing, the reading instruction information for the musical sound data in FIG. 33 is transferred to the nonvolatile storage module 100C. The reading instruction information is obtained in the following procedure.

(a) Referring the NN table 233C based on NN of the key strike data, find a starting CLN.
(b) Find the temporary LSN according to an expression (18) based on the starting CLN and SC.

$$\text{Temporary LSN} = (\text{starting CLN} << 6) + [\{SC\ \&\ 0xFFE8\} << 2] | (SC\ \&\ 0x0007)] \quad (18)$$

The temporary LSN is LSN in the case where the bank select is unspecified, and in this case, the value of (b4, b3) is set to 0. In addition, & is an AND operator, | is an OR operator and << is an operator that shifts the bit to left. "0x" is a sign representing hexadecimal. The logical block number LSN of b5 to 22 in FIG. 29 can be obtained by shifting the starting CLN in the NN table by six bits in the expression (18). The page number can be obtained by masking b0 to b2 of the sector counter SC and shifting by two bits. Further, the temporary LSN can be obtained by adding low order three bits of the sector count.

(c) Find the bank select based on CHN of the assigned CHN and the above described expression (6).
(d) Find LSN according to expression (10) based on the temporary LSN and bank select.
(e) Assign CHN to b27 to 23.

Figure 33B:
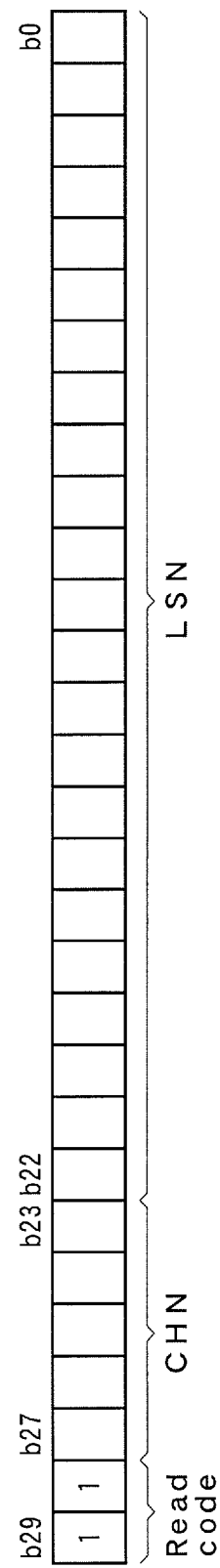
FIG. 33B is a bit format illustrating memory configuration information reading instruction information.

In this manner, LSN of the reading destination is determined, and the reading instruction information in the format shown in FIG. 33B is transferred to the nonvolatile storage module 200 to read desired musical sound data (S230).

The musical sound data read from the nonvolatile storage module 100C according to the reading instruction in S230 is transferred to the access module 200C. Subsequent processing is the same as that in embodiment 1.

Next, since operations of the signal processor 220 and a main routine of the CPU part 230C in FIG. 14A are the same as those in embodiment 1, description thereof is omitted.

In all of the cases where discrete key strike is performed, concentrated key strike is performed, and the concentrated key strike after rapid sound deadening is performed, as shown in the time charts in FIGS. 24A to 24C, a sound production delay time is smaller than the value of 1 ms that falls within an allowable scope of the sound production delay time. Therefore, the musical sound generation system in the present embodiment can be used as the musical sound generation system for electronic musical instruments and the like.

Figure 34:
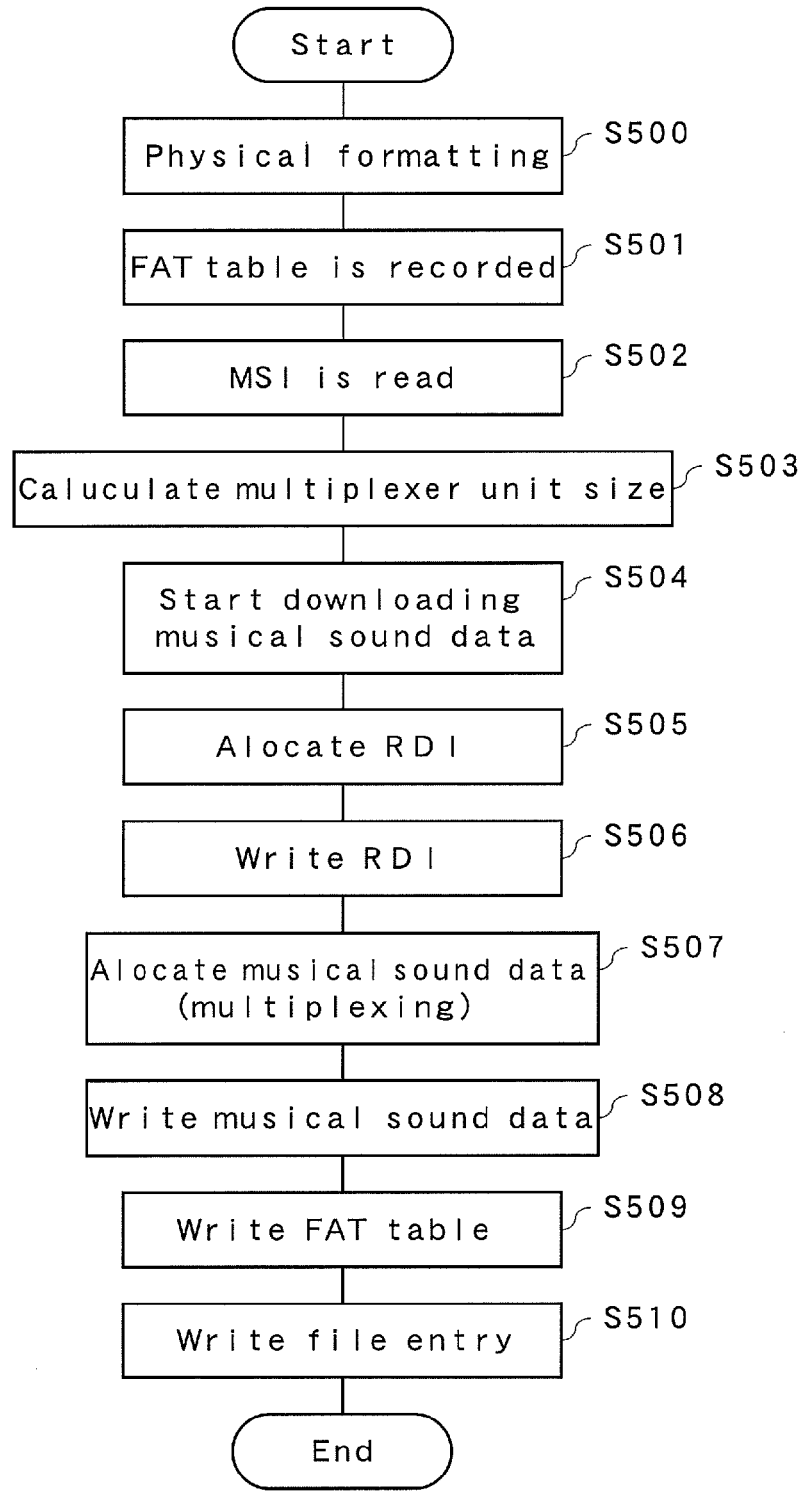
FIG. 34 is a flow chart illustrating musical sound data writing processing of the access module 200C.

Next, musical sound data writing processing of the access module will be described with reference to mainly FIG. 34. FIG. 34 is a flow chart illustrating the musical sound data writing processing of the access module 200C.

First, prior to writing of the musical sound data, the access module 200C performs physical formatting (S500) to erase data stored in the nonvolatile storage module 100C. FIG. 35 is an explanatory diagram illustrating file allocation of the musical sound data acquired via the Internet 310. By the physical formatting, the file system part 236 logically erases the logical address space once, and transfers an erasure instruction to the nonvolatile storage module 100C via the driver 250. Detailed description of specification of the erasure instruction is omitted.

Here, for convenience, in FIG. 29, b22 to b13 of LSN is assumed to correspond to b20 to b11 of PSN, respectively.

Thus, according to the above-mentioned erasure instruction, PB0 to PB1022 of the nonvolatile memory banks 110 to 113 are physically erased. As described above, since PB1023 does not fall within a scope of the logical address, PB1023 is not physically erased. A FAT table or the like that indicates that the physical blocks PB0 to 1022 are erased is recorded in PB0 (S501).

Figure 36A:
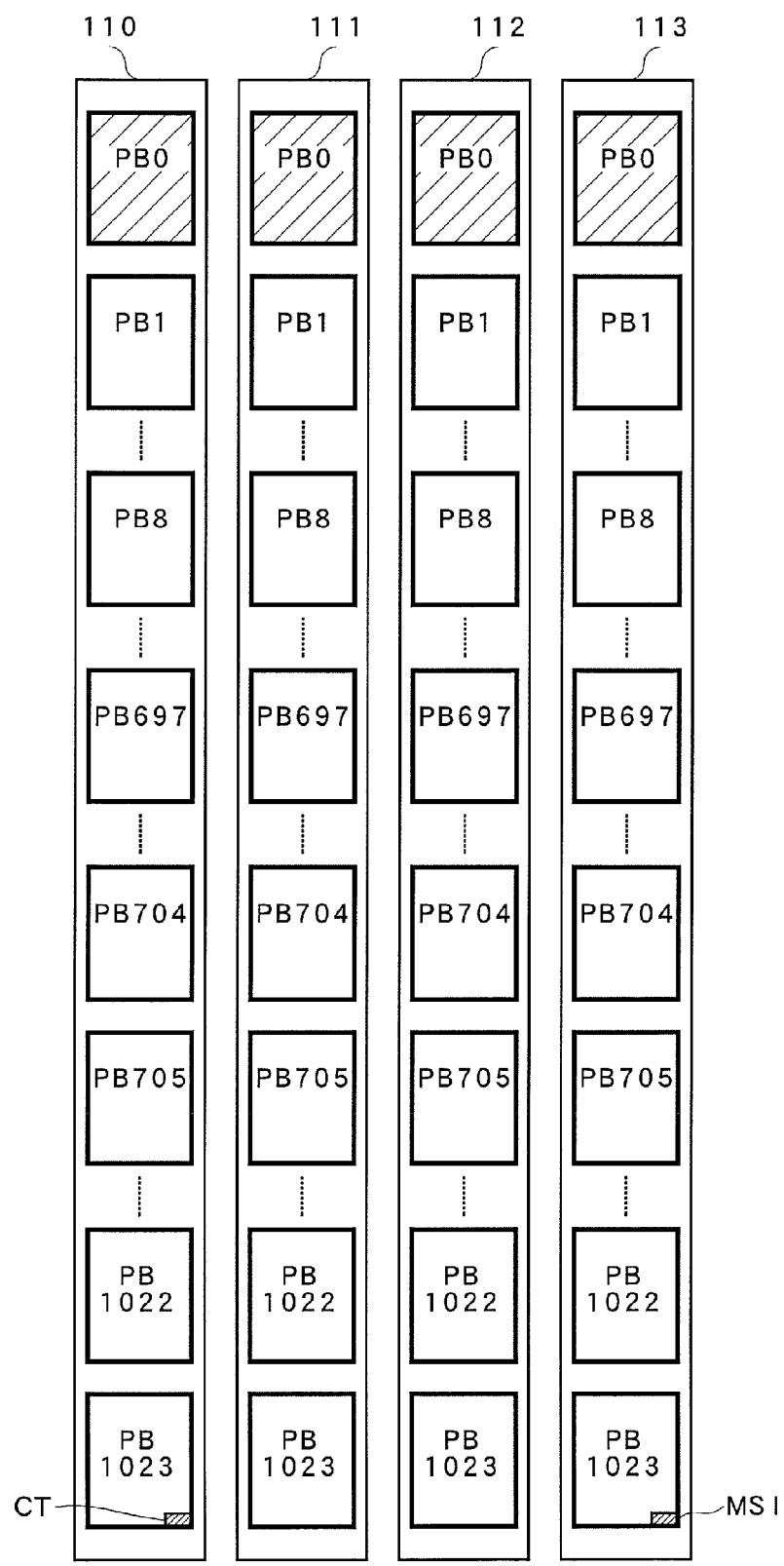
FIG. 36A is an explanatory diagram illustrating a storage state of the nonvolatile memory banks 110 to 113 prior to writing of the musical sound data.

FIG. 36A is an explanatory diagram illustrating a storage state of the nonvolatile memory banks 110 to 113 prior to writing of the musical sound data. In FIG. 36A, a FAT table for managing that the whole of the normal area has been logically erased is recorded in PB0 of each of the nonvolatile memory banks 110 to 113 by writing after the above-mentioned physical formatting (S500). Accordingly, PB1 to PB1022 of the nonvolatile memory banks 110 to 113 are wholly erased.

Next, the memory configuration information (MSI) stored in PB1023 of the nonvolatile memory bank 113 is read (S502). The multiplexer 237 sets the page size (4 k Bytes) of the memory configuration information to a multiplexer unit size (S503).

Next, the CPU part 230C starts downloading of the musical sound data via the Internet 310 according to a user's downloading instruction inputted from the input/output part 210C (S504).

As shown in FIG. 35, information downloaded via Internet is a format formed of a header and musical sound data. The header includes a musical sound data length, recorded data characteristic information RDI and the like. The recorded data characteristic information is allocated to an ending LSN of CL130943 (S505) and written via the driver 250 according to writing instruction information (S506).

The nonvolatile storage module 100C writes the transferred recorded data characteristic information to an ending PSN of P255 of PB1022 of the nonvolatile memory bank 113 by the data reader/writer 150C.

In writing by the data reader/writer 150C, when the physical block to which data is written becomes a bad block, the address manager 155 searches another free physical block, rewrites the information to the free block and registers the free block in the logical-physical conversion table. Such replacement of the physical block is performed for each of the nonvolatile memory banks 110 to 113. That is, replacement of the physical block is not performed between different nonvolatile memory banks.

Next, as shown in FIG. 35, the multiplexer 237 of the CPU part 230C multiplexes the parallel number (four) of musical sound data every multiplexer size (4 k Bytes) and allocates the data to the logical address space (S507). The multiplexer 237 passes the multiplexed musical sound data to the file system part 236. The file system part 236 allocates the multiplexed musical sound data to the logical address space. In FIG. 35, for convenience, the starting cluster to which the musical sound data is allocated is CL128, however, any free cluster may be used as the starting cluster.

Figure 37:
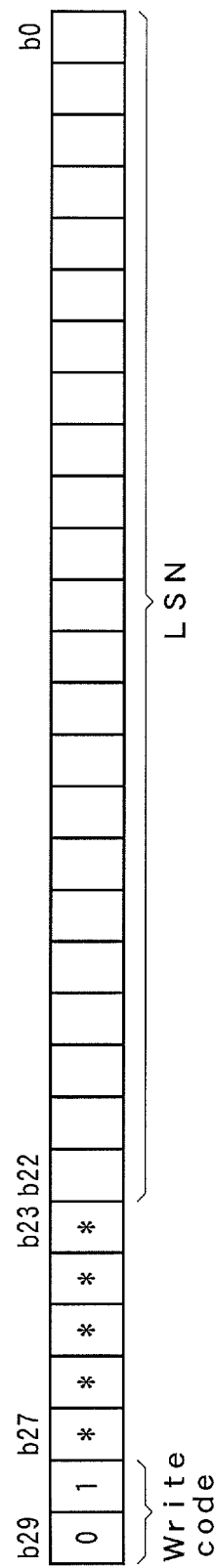
FIG. 37 is a bit map illustrating writing instruction information of the musical sound data.

With the above-mentioned allocation, the CPU part 230C writes the musical sound data via the driver 250 according to the writing instruction information (S508). FIG. 37 is a bit map illustrating the writing instruction information of the musical sound data.

After that, to register a set of the musical sound data and recorded data characteristic information corresponding to the musical sound data as one musical sound data file, writing of the FAT table (S509) and writing of the file entry are performed (S510).

Figure 36B:
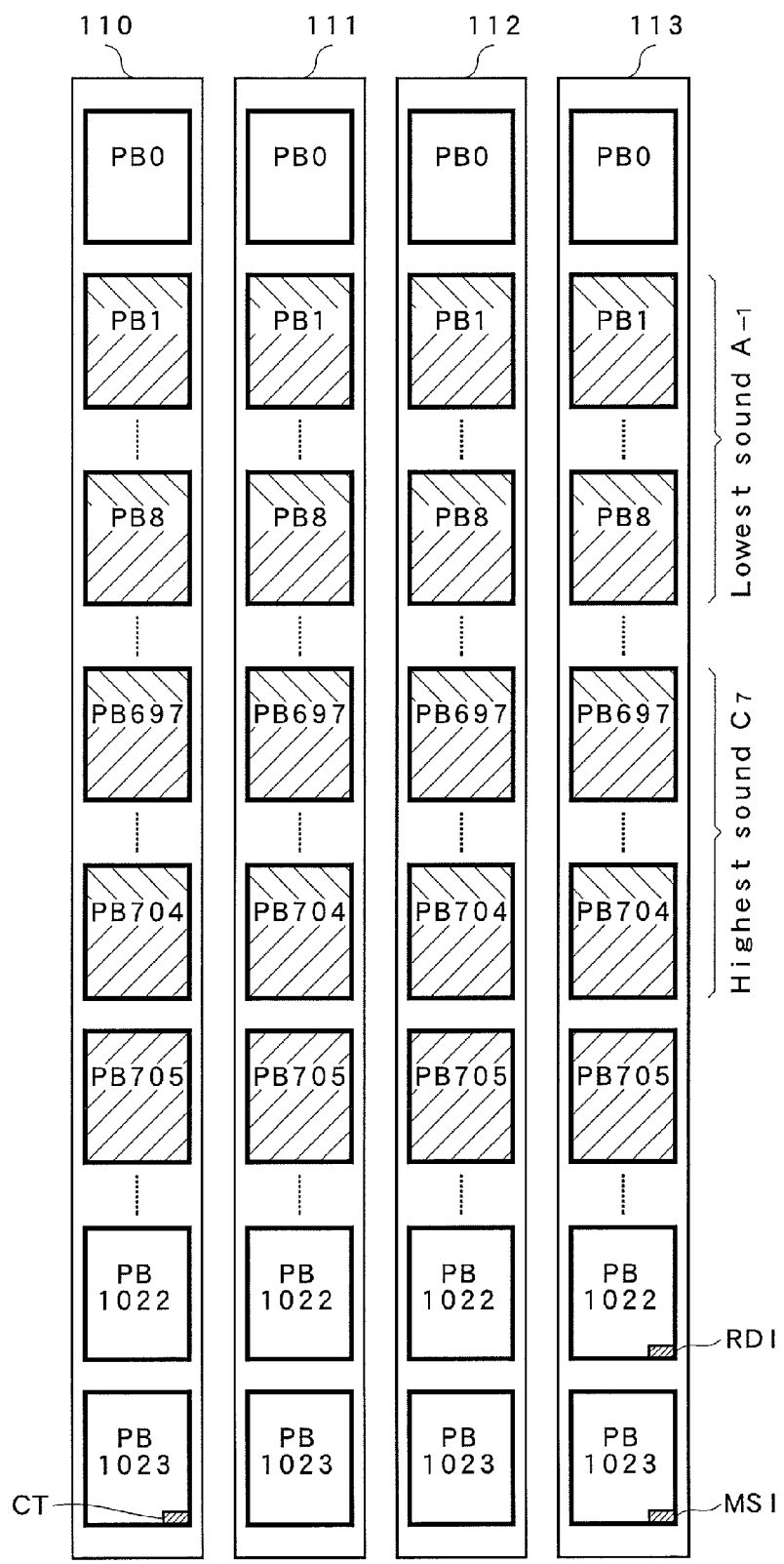
FIG. 36B is an explanatory diagram illustrating a storage state of the nonvolatile memory banks 110 to 113 after writing of the musical sound data.

By multiplexing the musical sound data from the lowest sound to the highest sound and writing the multiplexed data to the nonvolatile memory banks 110 to 113 in this manner, the storage state changes from a state shown in FIG. 36A to a state shown in FIG. 36B. FIG. 36B is an explanatory diagram illustrating of the storage state of the nonvolatile memory banks 110 to 113 after writing of the musical sound data. In FIG. 36B, the musical sound data is stored in PB1 to PB704 of the nonvolatile memory banks 110 to 113, and the recorded data characteristic information is stored in PB1022 of the nonvolatile memory bank 113. Since the management information such as the FAT table and file entry is updated from the information stored in PB0 of the nonvolatile memory banks 110 to 113, the information is stored in PB705 in another physical blocks of the nonvolatile memory banks 110 to 113. Any free physical block other than PB705 may be used.

As described above, the musical sound data acquired by the access module 200C via the Internet or the like is multiplexed and allocated to the logical address space based on the memory configuration information and, with the allocation, the musical sound data is written to the nonvolatile storage module. The nonvolatile storage module that holds the musical sound data thus acquired is connected to the access module 200C. Then, by producing sound in response to strike of the master keyboard 300, the tone can be easily updated.

Since the musical sound data stored in the nonvolatile storage module is managed by the file system part 236 as the musical sound data file, the musical sound data can be managed or edited by a device such as the personal computer using the same file system (FAT file system). Further, the musical sound data can be easily copied to other recording devices, recording media and the like.

In writing the musical sound data to the nonvolatile memory banks 110 to 113, when a bad block occurs, logical-physical conversion may be appropriately performed by the address manager 155 and the musical sound data may be written to a free normal block.

Although the access module 200C acquires the musical sound data to be written to the nonvolatile storage module 100C via the Internet 310, the access module 200C may acquire the musical sound data by other devices such as the personal computer.

Further, in terms of musical sound generation, the musical sound generation system in embodiment 3 has the same effects as the musical sound generation system in embodiment 1. Since this musical sound generation system is a system based on the versatile FAT file system, the musical sound data can be written by the access module. Therefore, since the musical sound data rewritten according to user's preference can be used, the system can be said as a very versatile system.

(Embodiment 4)

Next, a data writing system in embodiment 4 of the present invention will be described with reference to FIG. 38. The data writing system in the present embodiment is configured of a data writing module 400A and nonvolatile storage module 100C. The nonvolatile storage module 100C is the same as the nonvolatile storage module 100C in embodiment 3. The data writing module 400A is an extract of a data writing function of the access module 200C in embodiment 3 and, as shown in FIG. 38, includes an input/output part 410, a CPU part 420 and a driver 430. The CPU part 420 includes the file system part 236 and multiplexer 237 in the form of embodiment 3. The data writing module 400A is connected with the Internet 310, enabling downloading of necessary data according to a user's downloading instruction. Since the data writing module 400A performs the data writing processing of the access module 200C in the form embodiment 3, detailed description thereof is omitted.

The data writing module 400A may be a personal computer or a module incorporated into the personal computer or the like.

(Embodiment 5)

Figure 39A:
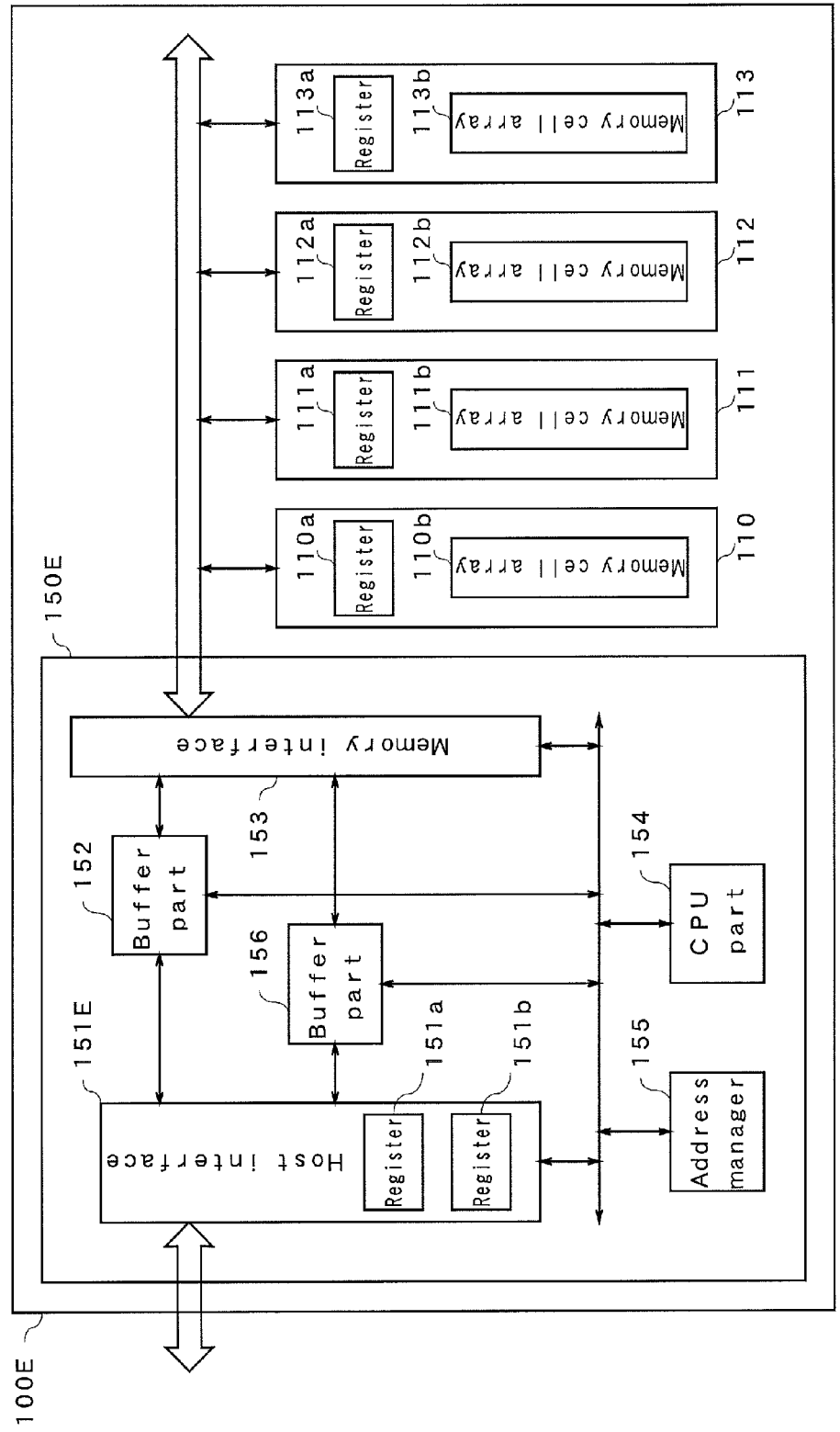
FIG. 39A is a block diagram illustrating a nonvolatile storage module of a musical sound generation system in embodiment 5 of the present invention.
Figure 39B:
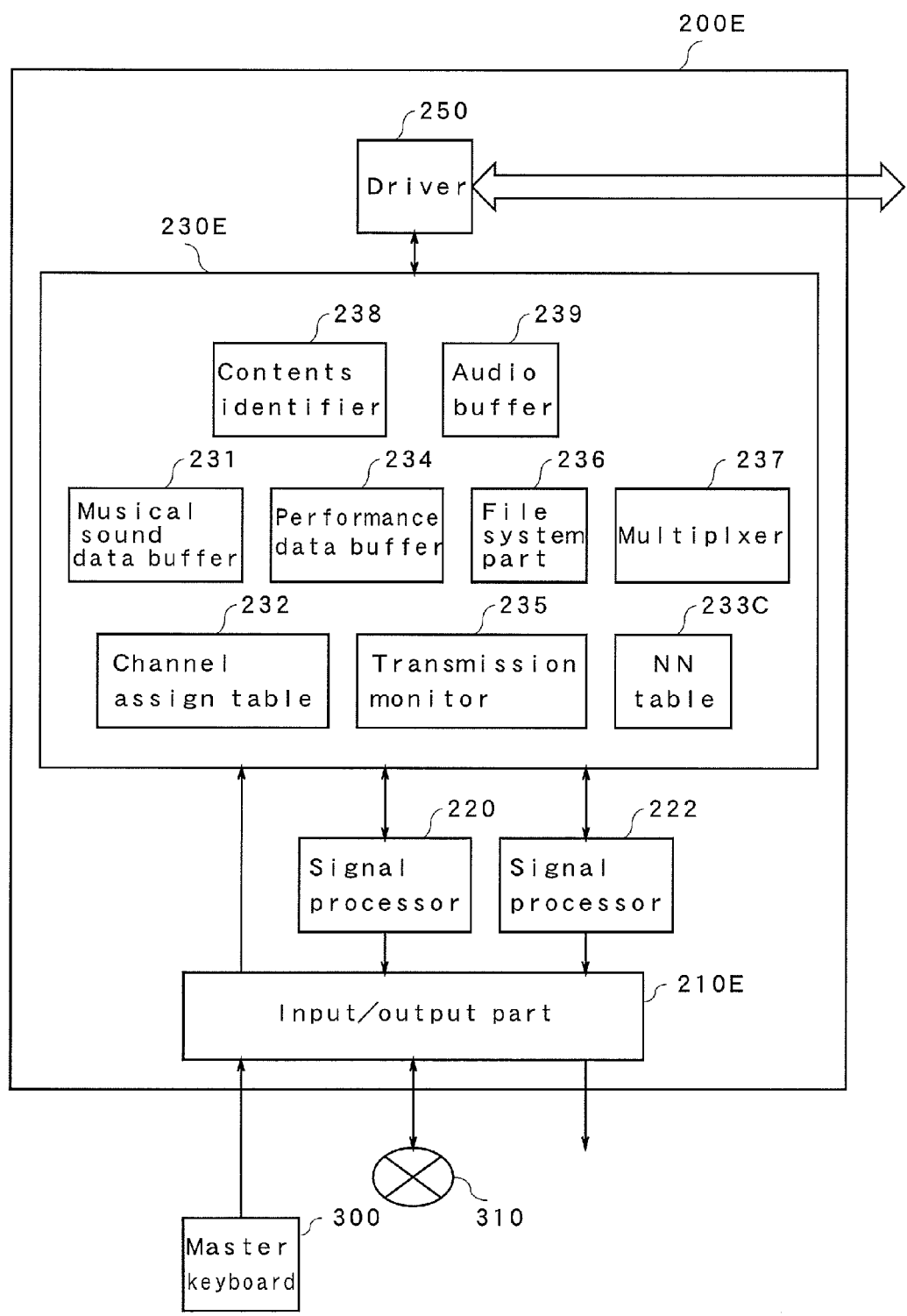
FIG. 39B is a block diagram illustrating an access module of the musical sound generation system in embodiment 5 of the present invention.

FIGS. 39A and 39B are block diagrams illustrating a musical sound generation system in embodiment 5 of the present invention. The musical sound generation system includes a nonvolatile storage module 100E shown in FIG. 39A and an access module 200E shown in FIG. 39B. The nonvolatile storage module 100E includes the four nonvolatile memory banks 110 to 113 provided in parallel with each other and data reader/writer 150E. The data reader/writer 150E includes a host interface 151E, the buffer part 152, the memory interface 153, the CPU part 154, the address manager 155 and a buffer part 156.

The access module 200E includes an input/output part 210E, signal processors 220, 222, a CPU part 230E and a driver 250, and can simultaneously output the musical sound of 32 channels. Hereinafter, the channel number is defined as CH0 to CH31. The CPU part 230E includes a contents identifier 238 and an audio data buffer 239 in addition to the musical sound data buffer 231, channel assign table 232, NN table 233C, performance data buffer 234, transfer monitor 235, file system part 236 and multiplexer 237.

Next, the nonvolatile memory banks 110 to 113 of the nonvolatile storage module 100E is the same as those in embodiment 3, and relationship among a logical address space, cluster number CLN and logical sector number LSN, and relationship between logical sector number LSN and structures in the memory cell arrays 110b to 113b are also the same as those in embodiment 3. Also in the present embodiment, the musical sound data is held in PB1 to PB704 of each of the nonvolatile memory banks 110 to 113. An area following CL90240 in the logical space and PB705 in the physical space is an area where the user writes audio data and the like without multiplexing. Here, it is assumed that the logical address space corresponds to PB0 to PB1022. That is, PB1023 is an area where data cannot be read/written by logical address designation (hereinafter referred to as system area). This area is provided to prevent accidental erasure by a user, and the manufacturer can write data to the area by direct physical address designation.

The record format in each page where the musical sound data is recorded is the same as that in FIG. 28, and correspondence relationship between the logical sector number LSN and physical sector number PSN is also the same as that in FIG. 29.

Next, the data reader/writer 150E will be described. The host interface 151E is connected to the access module 200E via an external bus. The host interface 151E is a block that receives the reading instruction information for the musical sound data from the access module 200E and transfers the musical sound data read from the nonvolatile memory banks 110 to 113 via the buffer part 152 to the access module 200E. The reader/writer 150E has a writing function to write the musical sound data inputted by the user to the nonvolatile storage module 100E as a file.

The host interface 151E includes registers 151a, 151b therein. The register 151a is the same as that in FIG. 39. The register 151b is a register for audio data and accepts the reading instruction information.

The buffer part 152 and memory interface 153 are the same as those in embodiment 3.

The CPU part 154 is a block that is connected to the host interface 151E, buffer part 152, memory interface 153, address manager 155 and buffer part 156, and controls the whole of the data reader/writer 150E.

The address manager 155 has a function to convert between the logical address and the physical address, and changes the physical block or perform wear leveling when the physical block becomes a bad block during writing of the musical sound data and the like. The address manager 155 has the RAM, and the RAM holds a logical-physical conversion table.

The buffer part 156 is a buffer that temporarily holds the audio data when the audio data is written or read.

Next, each block in the access module 200E will be described in detail with reference to FIG. 39B. The performance data is generated in response to an operation such as strike of the external master keyboard 300 and taken into the CPU part 230E via the input/output part 210E. The access module 200E is connected with the Internet 310, enabling downloading of necessary data according to user's downloading instruction. The input/output part 210E includes a terminal that inputs the performance data from the master keyboard 300, DA converter that digital-analog converts the musical sound generated by the signal processor 220 and audio data generated by the signal processor 222, respectively, amplifier that amplifies the converted musical sound and line-out terminal that externally outputs the output. The input/output part 210E is a block that acquires the musical sound data and audio data via the Internet 310, as well as outputs the musical sound and background sound (audio data).

The signal processor 220 is the same as that in embodiment 3. The signal processor 222 is a block that performs decompression processing in reproducing the audio data. Any decompression processing that conforms to an audio data compression method may be used. When the audio data is an uncompressed data, the decompression processing is not performed.

The CPU part 230E is a block that performs channel assign processing of the performance data received by the input/output part 210E, transfers reading instruction information to the nonvolatile storage module 100E via the driver 250 and supplies part of the musical sound data and performance data that are read from the nonvolatile storage module 100E to the signal processor 220.

The musical sound data buffer 231, channel assign table 232, NN table 233C, performance data buffer 234, transfer monitor 235, file system part 236 and multiplexer 237 included in the CPU part 230E are the same as those in embodiment 3.

The contents identifier 238 included in the CPU part 230E is a block that identify which of the musical sound data and audio data the data fed from the outside is.

The audio data buffer 239 in the CPU part 230E is a block that temporarily holds the audio data.

Operations of the musical sound generation system thus configured in embodiment 5 of the present invention will be described.

[Initial State]

First, initialization performed by a manufacturer prior to shipment of the nonvolatile storage module 100E is the same as that in embodiment 3.

[Initializing Processing at Power-on]

Figure 40A:
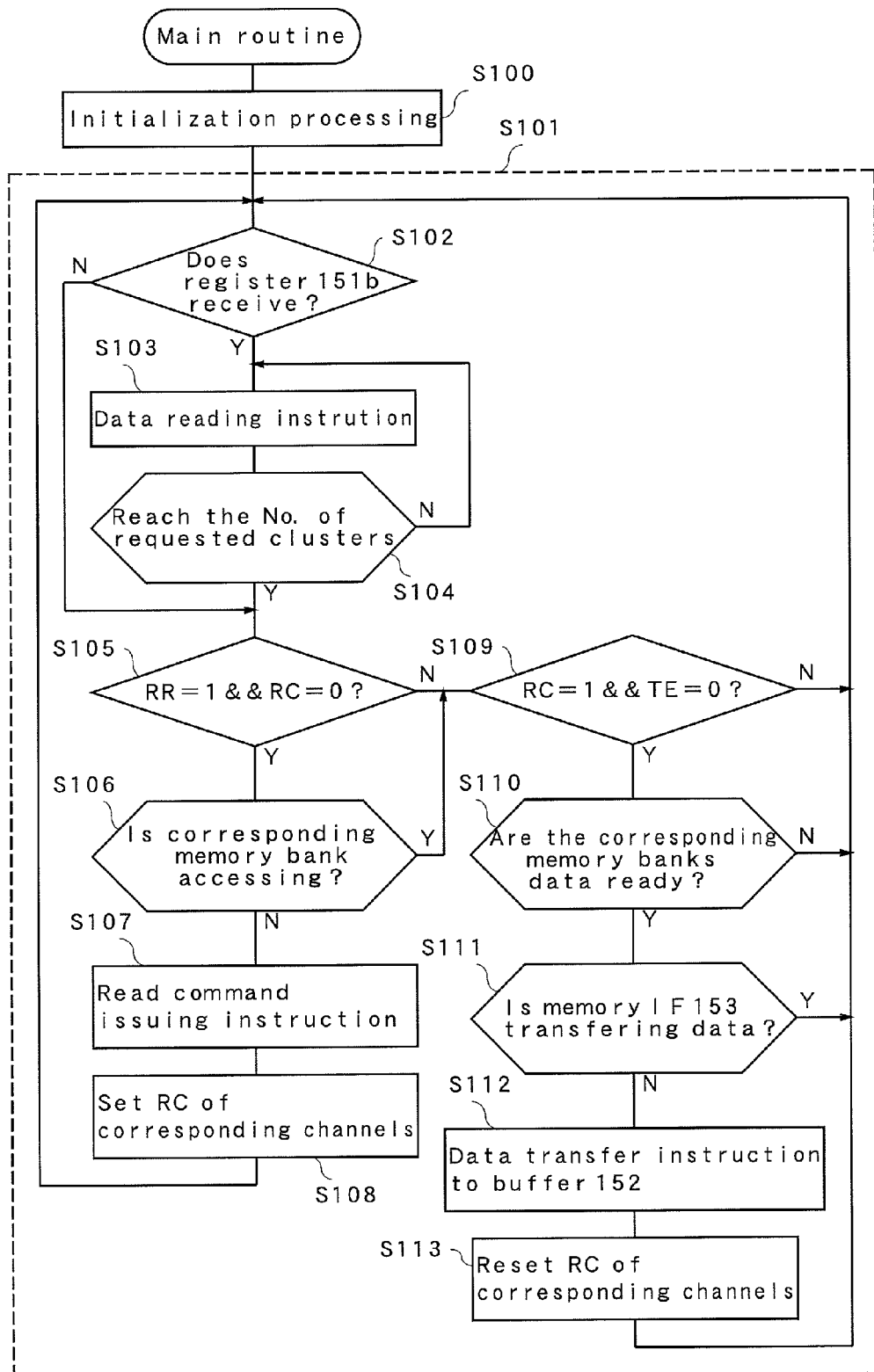
FIG. 40A is a flow chart illustrating normal processing of a CPU part 154.
Figure 40B:
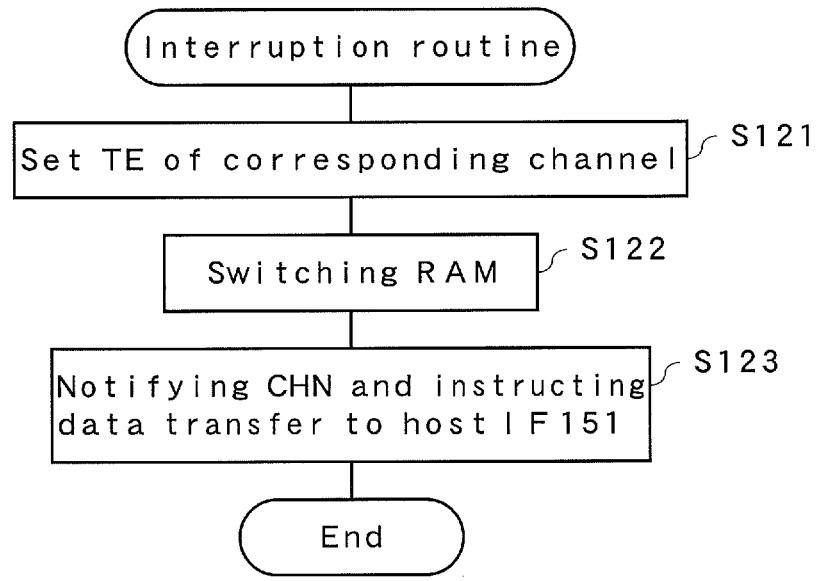
FIG. 40B is a flow chart illustrating interruption processing of the CPU part 154.
Figure 40C:
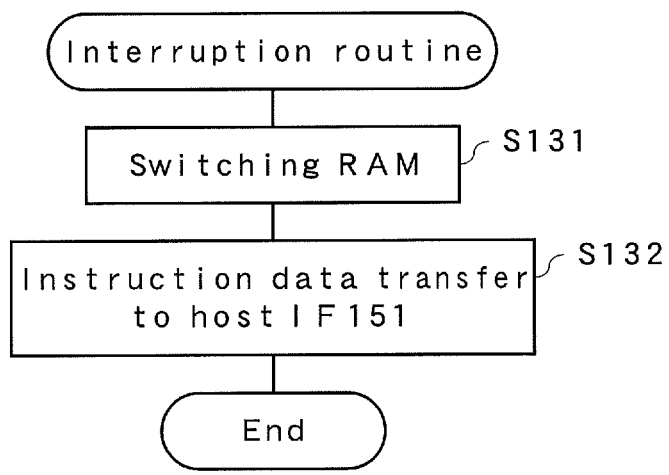
FIG. 40C is a flow chart illustrating interruption processing of the CPU part 154.

After power-on, each of the access module 200E and nonvolatile storage module 100E starts the initializing processing. FIG. 40A is a flow chart illustrating normal processing of the CPU part 154, and FIG. 40B and FIG. 40C are flow charts illustrating interruption processing of the CPU part 154.

As shown in the flow chart in FIG. 40A, the CPU part 154 of the nonvolatile storage module 100E performs the initializing processing in S100. In the initializing processing, the single port RAMs 152a, 152b in the buffer part 152 and registers 151a, 151b of the host interface 151E are cleared. The address manager 155 reads the logical-physical conversion table recorded in PB1023 of the nonvolatile memory bank 110 to the internal RAM. When reading of the logical-physical conversion table is completed, the nonvolatile storage module 100E notifies access permission to the access module 200E. After that, the nonvolatile storage module 100E notifies that initialization is completed via the host interface 151.

Figure 41A:
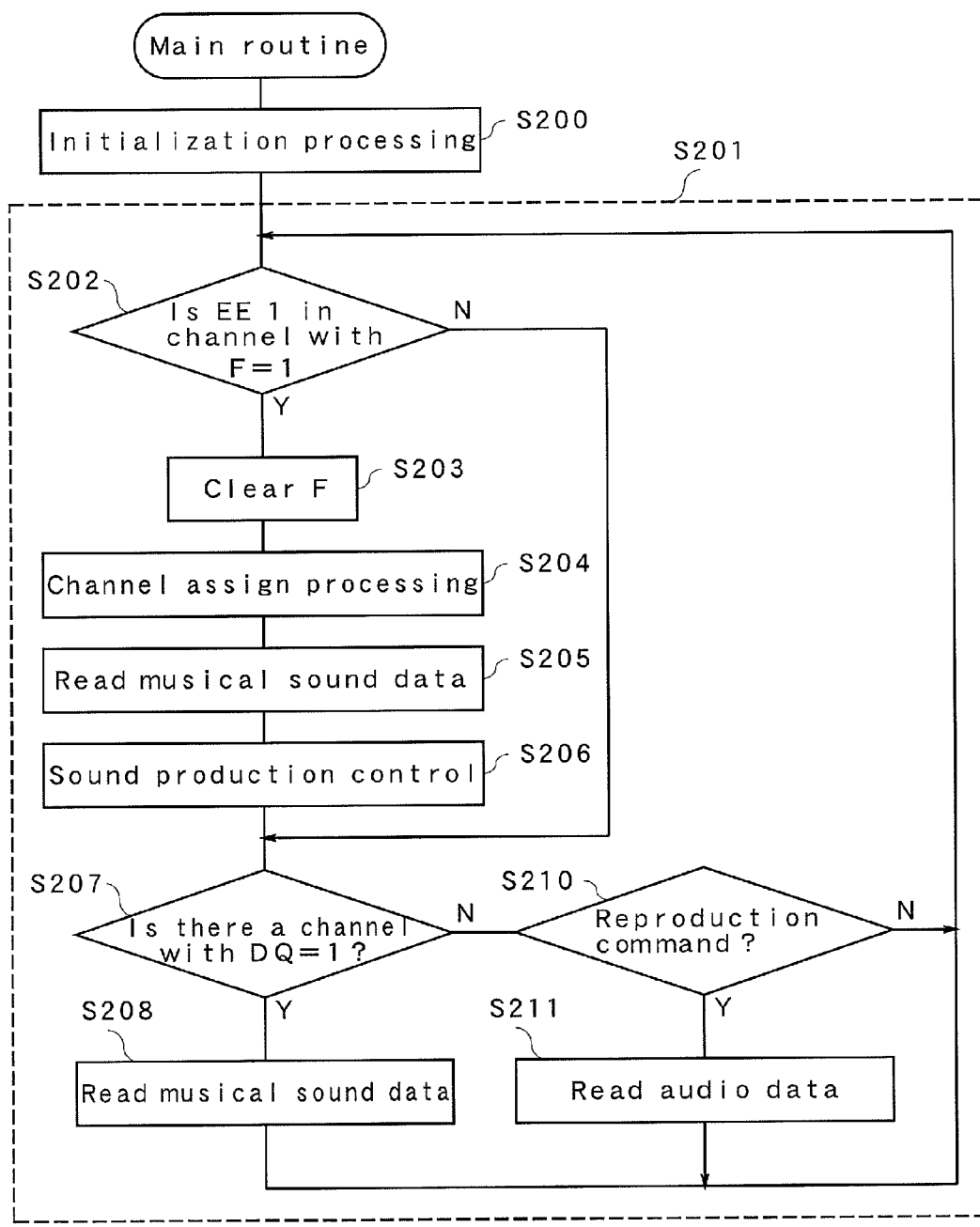
FIG. 41A is a flow chart illustrating normal processing of a CPU part 230E.

Meanwhile, as shown in the flow chart in FIG. 41A, the CPU part 230E of the access module 200E performs the initializing processing in S200. In the initializing processing, the CPU part 230E reads the FAT table and file entry that are recorded in PB0 of the nonvolatile memory banks 110 to 113 to the file system part 236, and the file system part 236 recognizes the starting cluster number (CL128) of the musical sound data stored in the nonvolatile storage module 100C.

Furthermore, after that, the access module 200E transfers the reading instruction information for the recorded data characteristic information and memory configuration information to the nonvolatile storage module 100E. Thus, the CPU part 230E reads the recorded data characteristic information stored in PB1022 of the nonvolatile memory bank 113 and memory configuration information stored in PB1023. FIG. 42A illustrates the reading instruction information for reading the memory configuration information. In FIG. 42A, b27 to b23 indicate a memory configuration information identification code. * is a sign indicating that any values are available. In the initializing processing, the CPU part 230E resets the signal processor 220 and clears the dual port RAMs 231a, 231b in the musical sound data buffer 231. By resetting the signal processor 220, the signal processor 220 starts count-up of a program counter of an internal DSP. Further, in the initializing processing, the CPU part 230E performs initial setting of the channel assign table 232.

(1) Set SON to a value 0, that is, set CH0 to 31 to the blank channels
(2) Set KON, PD, NN, TP, LD, F, SC, WE, DQ, M and D to a value 0
(3) Set EE to a value 1

When acquiring the recorded data characteristic information shown in FIG. 11, the CPU part 230E sets a sampling cycle (22.7 μs) in a timer in the signal processor 220 and determines one cycle of the signal processing time slot in one sampling time. This timer functions as a timer that controls one cycle of the DSP in the signal processor 220. The CPU part 230C writes one sample capacity (2 Bytes) and flag assignment bit (b0) in the recorded data characteristic information as parameters of RAM in the signal processor 220, and uses the parameters to determine at which bit position in the bit format shown in FIG. 10 the musical sound data is located.

The CPU part 230E determines a channel frame of the channel assign table 232 according to the maximum number of sound production channels (32CH) in the recorded data characteristic information as well as the number of channels in the time slot of the signal processor 220. The signal processor 220 determines the effect processing by reverb and chorus. In the case shown, it is determined that only reverb is performed as the effect processing.

Further, when acquiring the memory configuration information shown in FIG. 12, the CPU part 230E finds the parallel number by calculating the expression (5) based on the number of buses (1) and the number of memory banks per bus (4). A bit format of LSN is determined by the parallel number thus obtained. In the present embodiment, since the parallel number is a value four, the number of bits of the bank select is two, and the bit format of the LSN is as shown in FIG. 29. For example, when the parallel number is a value two, the number of bits assigned to the bank select is one (b3) and accordingly, the page number is assigned to b11 to b4 and PBN is assigned to b21 to b12.

Relationship between CHN and bank select is given according to the expression (6). Since the parallel number is a value four in the present embodiment, the relationship between CHN and bank select has following four cases (a) to (d).
(a) CH0, 4, 8, 12, 16, 20, 24, 28
. . . bank select=0 (nonvolatile memory bank 110)
(b) CH1, 5, 9, 13, 17, 21, 25, 29
. . . bank select=1 (nonvolatile memory bank 111)
(c) CH2, 6, 10, 14, 18, 22, 26, 30
. . . bank select=2 (nonvolatile memory bank 112)
(d) CH3, 7, 11, 15, 19, 23, 27, 31
. . . bank select=3 (nonvolatile memory bank 113)

Since the bit format of LSN is as shown in FIG. 29, relationship between LSN and CHN at LS8192 to LS8223 in FIG. 27A has following cases (e) to (h).
(e) CH0, 4, 8, 12, 16, 20, 24, 28
. . . LS8192 to LS8199
(f) CH1, 5, 9, 13, 17, 21, 25, 29
. . . LS8200 to LS8207
(g) CH2, 6, 10, 14, 18, 22, 26, 30
. . . LS8208 to LS8215
(h) CH3, 7, 11, 15, 19, 23, 27, 31
. . . LS8216 to LS8223

Referring to the sector size (512 Bytes) in the memory configuration information shown in FIG. 12, the CPU part 230E manages a size of a data reader from the nonvolatile storage module 100E as 512 Bytes. By calculating the expression (7), the total number of samples per sector (hereinafter referred to as usn) is determined. Since a sector size is 512 Bytes, a size of one sample is 2 Bytes and the number of touches is two in the present embodiment, usn is 128 samples.

Further, the CPU part 230E calculates the number of necessary physical blocks per note by calculating the expression (8) based on an occupied capacity per note in the recorded data characteristic information in FIG. 11, and a page size and the number of pages per physical block TPN (in this case, 256) in the memory configuration information. Then, the CPU part 230E determines PBN corresponding to each of notes from the lowest sound $A_{-1}$ to the highest sound $C_7$ based on the starting cluster (CL128) of the musical sound data extracted from the file entry by the file system part 236 to generate the NN table 233C shown in FIG. 32.

In the above-described main routine, the CPU part 230E reads the recorded data characteristic information and memory configuration information and performs various parameters setting processing, thereby completing the initializing processing (S200). Then, the CPU part 230E shifts to the normal operation processing S201 and enables interruption to accept the performance data from the external master keyboard 300.

[Processing at Normal Operation]
(1) Description of General Operations

General operations from inputting of the performance data to generation of the musical sound and from reading of the audio data to generation of the audio data will be described with reference to mainly the flow charts of the CPU part 230E. It is assumed that any audio data is written to the area after CLN90240. The flow chart of the CPU part 230 includes two routines: a main routine shown in FIG. 41A and an interruption routine shown in FIG. 41B. The interruption routine is a routine activated when the performance data is transferred to the access module 200E by the performance operation of the master keyboard 300. When the master keyboard 300 performs the performance operation during processing of the main routine, the main routine is immediately shifted to the interruption routine. The interruption routine permits multiplex interruption, that is, even during the interruption routine, next interruption is accepted.

First, after shifting to the normal operation processing S201, when the master keyboard 300 does not perform the performance operation and a reproduction instruction is not issued, values of the forced sound-deadening flag F of all channels are 0 and a value of the reading request flag DQ is 0, and therefore, S202, S207, S210 branch to No and branch processing in S202, S207, S210 is permanently repeated.

Figure 41B:
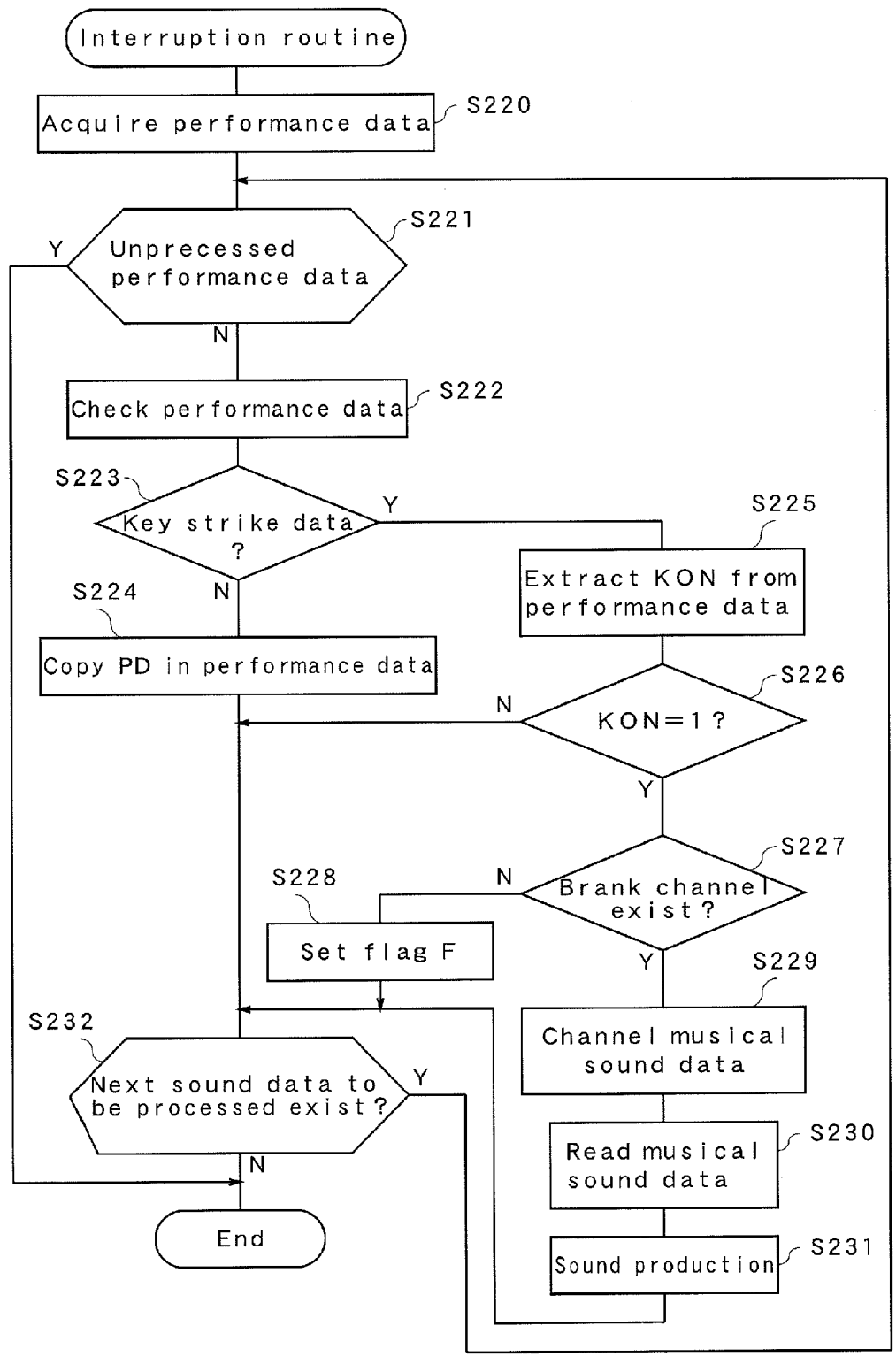
FIG. 41B is a flow chart illustrating interruption processing of the CPU part 230E.

When the master keyboard 300 performs the performance operation, the interruption routine shown in FIG. 41B is activated. Since this interruption processing is the same as that in embodiment 3, detailed description thereof is omitted.

Figure 42B:
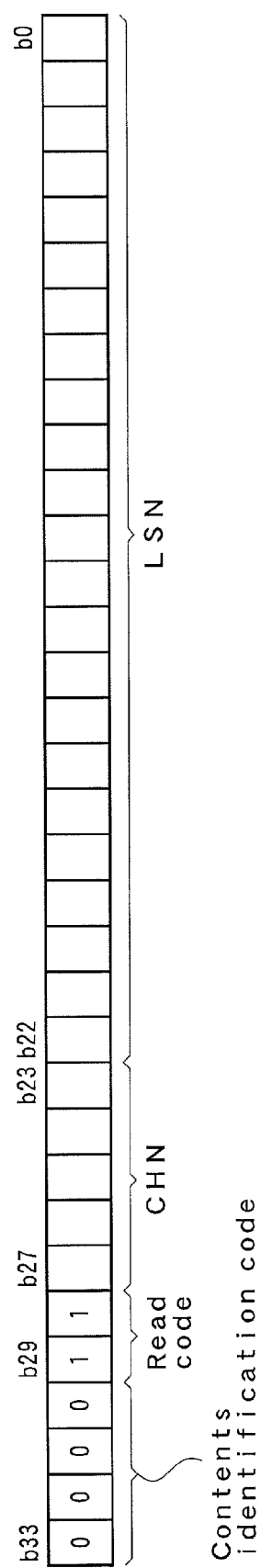
FIG. 42B is a bit format illustrating the reading instruction information of the musical sound data.

When determining LSN of a reading destination, the access module 200E transfers the reading instruction information in a format shown in FIG. 42B to the nonvolatile storage module 200E to read desired musical sound data (S230). Here, 0000 in a contents identification code at b33 to b30 represents that data is the musical sound data.

Figure 18:
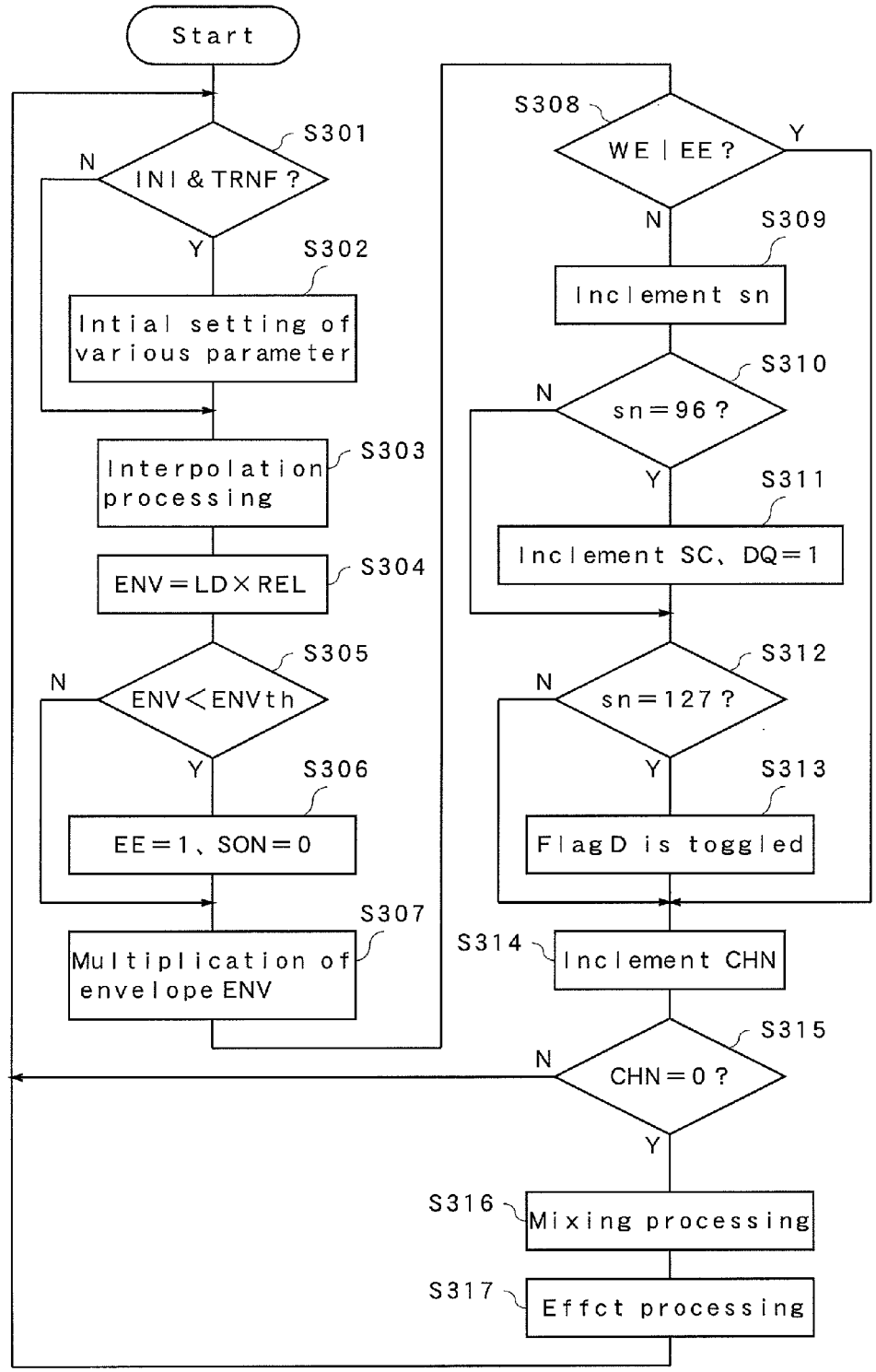
FIG. 18 is a flow chart illustrating processing of a signal processor 220.

Since operations of the signal processor 220 are the same as those in embodiment 1 shown in FIG. 18, description thereof is omitted. The signal processor 220 repeatedly performs the signal processing every sampling cycle (22.7 μs). A DA converter of the input/output part 210E digital-analog converts the processed musical sound data every 22.7 μs and outputs a result as desired musical sound to the outside via the line-out terminal. The musical sound is produced as the piano sound via an external amplifier and a speaker.

Now, returning to a description of the main routine of the CPU part 230E in FIG. 41A, processing in S202 and subsequent steps will be described. In S202, the CPU part 230E checks values of F of all channels in the channel assign table 232. When a channel with F having the value 1 and EE having a value 1 exists, the value of F of the channel is cleared to 0 (S203) and the channel assign processing of the channel is performed (S204).

Next, the reading instruction for the musical sound data is issued (S205) and sound production control is made in the signal processor 220 (S206). S205 and S206 are the same processing as S230 and S231.

Next, in S207, the channel with DQ having the value 1 is searched and when the channel exists, a reading instruction for the musical sound data of the channel is issued. Search of the channel assign table 232 in S207 and S202 is performed from CH0 in ascending order.

In the main routine shown in FIG. 41A, when the channel with DQ=1 does not exist, it is determined whether or not the reproduction instruction is issued. Whether the master keyboard 300 performs a performance operation or not, when a user issues a reproduction instruction via the input/output part 210E (S210), the process shifts to S211 and transfers the reading instruction information for the audio data to the nonvolatile storage module 100E.

Next, reading of the musical sound data in the nonvolatile storage module 100E will be described with reference to mainly the flow charts in FIGS. 40A, 40B, 43A and 43B. The CPU part 154 performs three routines: the main routine shown in FIG. 40A and interruption routines shown in FIG. 40B, FIG. 40C. The interruption routine does not permit the multiplex interruption. That is, any interruption is masked during processing of the interruption routine.

First, following the above-mentioned initializing processing (S100), the main routine shifts to the normal processing (S101). Since there is no reception at the register 151b while the reading instruction information is not transferred from the access module 200E, and all of the values of the reading instruction receipt flag RR and the read command issuance flag RC in the register 151a of the host interface 151E shown in FIG. 30 are 0, determination branch processing in S102, S105 and S109 is continuously repeated.

Figure 42C:
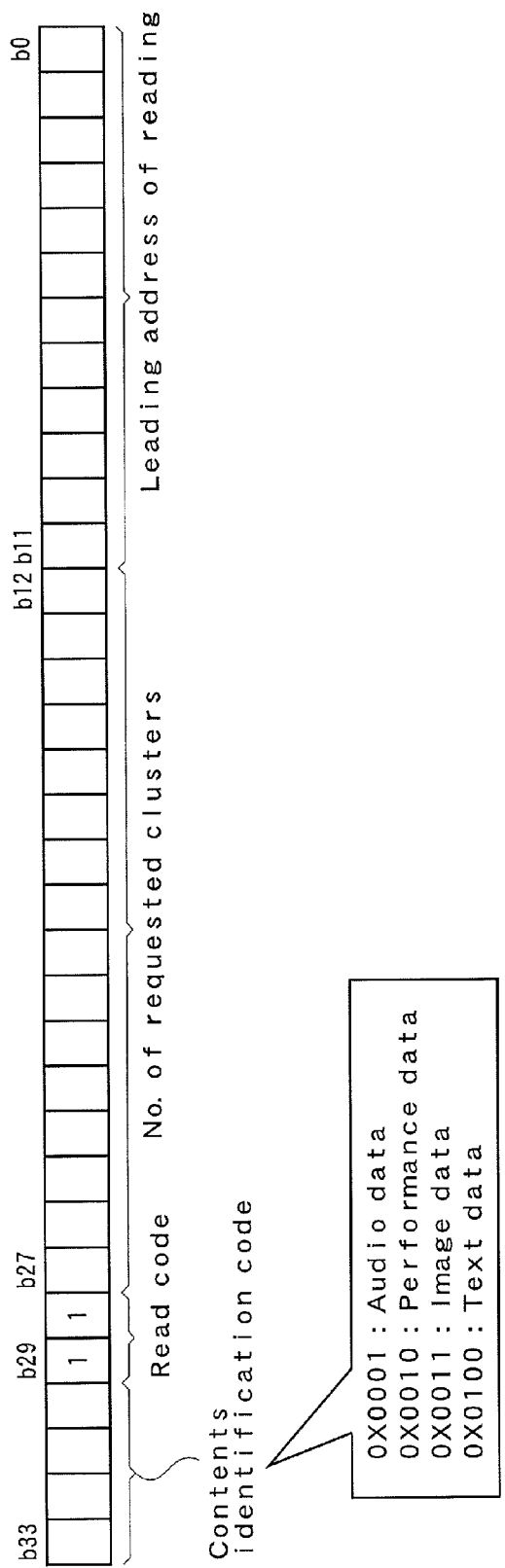
FIG. 42C is a bit format illustrating the reading instruction information such as audio data.

When the data reading instruction is sent from the access module, the process goes to Step S103 and instructs the buffer part 156 to read data. Then, it is determined whether or not a reading request cluster held in the buffer part 156 is reached, and reading is repeated until the cluster is reached. Next, when the reading request cluster is reached, the host interface 151E shifts from S430 to S431 in the main routine in FIG. 43A. As shown in FIG. 42C, the reading instruction information includes the contents identification code of b33 to b30, reading code of b29, b28, CHN of b27 to b23 and LSN of b22 to b0. The contents identification code is a four-bit code capable of identifying 16 types of contents. The contents identification code indicates reading of the musical sound data when it has a value 0000 (binary) and indicates reading of the audio data when it has a value 0001 (binary). In the case of reading the musical sound data, the process proceeds to Step S432 and the register 151a receives data. CHN and LSN of the reading instruction information are held in the register 151a. After that, in the register 151a, a value of RR corresponding to CHN given to the reading instruction information shown in FIG. 42B is set to 1 (S433). After that, the process returns to S430, and S430 is looped until a data transfer instruction to the CPU part 154, that is, data transfer instruction from the buffer part 152 to the access module 200E is issued. In the case of reading the audio data, the process proceeds to S434 and the register 151b receives data. Then, the process proceeds to Step S433 and data reception is notified to the CPU part 154. In the example shown in FIG. 30, the reading instructions of CH0 to 3 are issued and each flag changes as a result of processing described later. Specifically, the figure shows a time point until which issuance of the reading instructions of the CH0 to 3 and issuance of read commands to the nonvolatile memory banks 110 to 113 is completed, transfer of the musical sound data from the nonvolatile memory banks 110, 111 to the buffer part 152 is completed, and in only CH0, transfer of the musical sound data from the buffer part 152 to the access module 200E is completed. By these operations, the value of each flag in the register 151a changes.

In processing of the CPU part 154, since the value of RR in CH0 to 3 becomes 1, the process shifts from S102 to S103. Since the nonvolatile memory banks corresponding to CH0 to 3, that is, nonvolatile memory banks 110 to 113 do not read the musical sound data at this time, the access flag (value 0) is informed from the memory interface 153 to the CPU part 154. The CPU part 154 recognizes that the corresponding nonvolatile memory bank is not being accessed based on the access flag (value 0) and shifts to S104.

In S104, the CPU part 154 instructs the memory interface 153 to output the read command corresponding to CH0 to the nonvolatile memory bank 110. Further, the value of RC of the corresponding channel in the register 151a is set to 1 (S105). The above-mentioned processing is performed with respect to the channels with RR having the value 1 in the register 151a, that is, CH0 to 3.

A time chart of the read command issued from the data reader/writer 150E to the nonvolatile memory bank is the same as that in FIG. 23. The command 1 is a command to notify start of transfer of the physical address, and the command 2 is a command to instruct the I/O registers 110a to 113a to read the musical sound data stored at the physical address from the memory cell arrays 110b to 113b. This physical address designates the start address (byte unit) at which the musical sound data to be read is stored, and the musical sound data from the start address to a last address of the corresponding page is read to the corresponding I/O register in TR. After that, by giving 512 read clocks in a musical sound data transfer time TT, desired musical sound data of 512 Bytes is read from the I/O register to the buffer part 152.

The bank select is information corresponding to CHN as described above, is encoded in the memory interface 153 and functions as four CE signals (chip enable signals) for selecting the nonvolatile memory banks 110 to 113. The memory interface 153 feeds the CE signal to each of the nonvolatile memory banks 110 to 113 via the memory bus. As shown in FIG. 23, the access flag AF has a value 1 from the t1 when the command 1 is given to t4 when the musical sound data transfer period (TT) is finished.

When the read commands corresponding to CH0 to 3 have been issued to the nonvolatile memory banks 110 to 113, respectively, since all values of RC of CH0 to 3 are 0, the process shifts from S102 to S106. Then, processing of transferring the musical sound data read according to the read command (FIG. 23) to the buffer part 152 is performed.

In S106, it is checked whether or not the nonvolatile memory banks corresponding to the channels with the data transfer completion flag TE having the value 0, that is, all of CH0 to 3 are data ready (S107). The data ready means that, when the value of the data ready flag DRF managed by the memory interface 153 is 1, that is, data ready, desired musical sound data is already read from the memory cell array to the I/O register. Here, the value of the data ready flag DRF is set to 1 at the time t3 when the value of the busy signal changes from 1 to 0, and becomes 0 at the time t4 when the musical sound data of 512 Bytes is transferred from the I/O register to buffer part 152.

The above-mentioned CE signal and read clock are individually inputted to each of the nonvolatile memory banks 110 to 113 from the memory interface 153 via the memory bus, and the busy signal is individually inputted from each of the nonvolatile memory banks 110 to 113 to the memory interface 153 via the memory bus.

The process shift from S107 to S108 if data ready and returns to S102 if not data ready. The process shifts from S108 to S109 when the memory interface 153 is not transferring data and returns to S102 when the memory interface 153 is transferring data. In S109, the CPU part 154 issues a transfer instruction to the memory interface 153 so as to transfer the musical sound data from the nonvolatile memory bank with a DRF having the value 1 to the buffer part 152. After that, the value of the read command issuance flag RC of the corresponding channel is reset to 0 (S110) and the process returns to S102.

The reason why the process does not return to S106 after S110 is that when the nonvolatile memory bank that is not being accessed exists, the read command is issued in advance. The reason why existence or absence of data transfer of the memory interface 153 is checked in S108 is that since the nonvolatile memory banks 110 to 113 share the memory bus, the musical sound data cannot be read from different nonvolatile memory banks at the same time.

When the memory interface 153 has finished data transfer from any of the nonvolatile memory bank to the buffer part 152 after the data transfer instruction in S109, the CPU part 154 shifts to the interruption routine using the completion of data transfer as a trigger.

In the interruption routine shown in FIG. 40B, the value of TE of the corresponding channel in the register 151*a* is set to 1 (S121). Next, an input value to the RAM switching terminal 152*d* of the RAM switching circuit 152*c* is toggled and switched (S122). For example, by changing the value 0 to the value 1, the transfer destination from the memory interface 153 is switched to the single port RAM 152*b* and a transfer source to the host interface 151E is switched to the single port RAM 152*a*.

After that, the CPU part 104 notifies CHN that completes data transfer to the buffer part 152 to the host interface 151E, and instructs transfer of the musical sound data temporarily stored in the buffer part 152 to the access module 200E (S123).

Figure 43A:
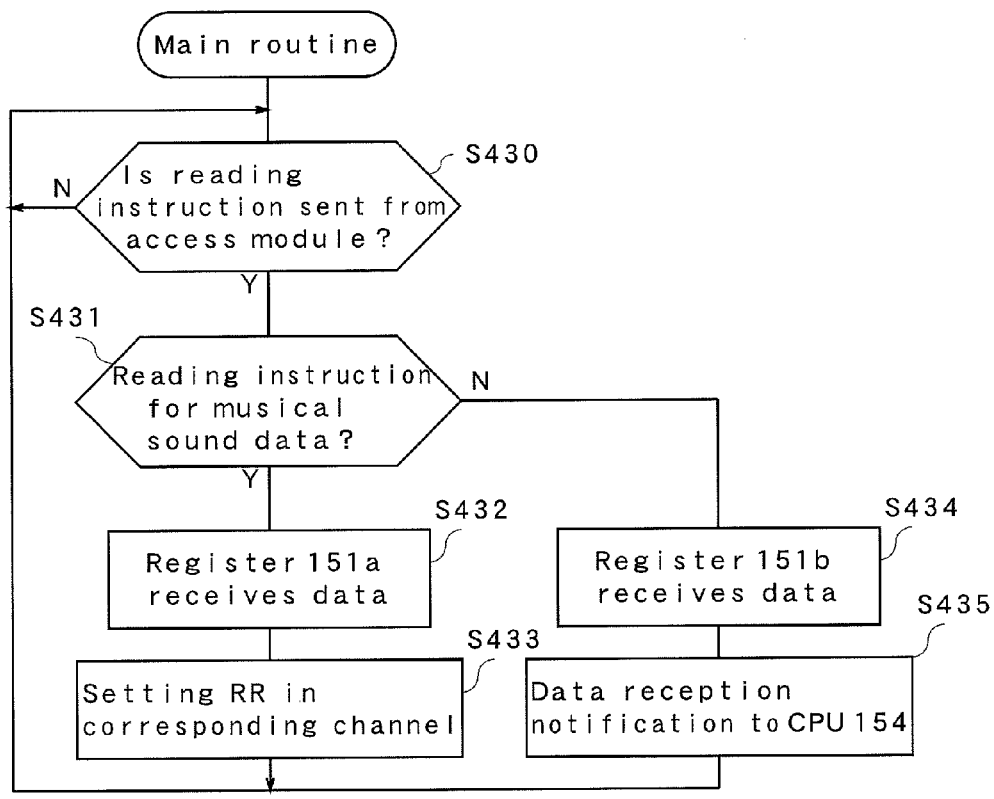
FIG. 43A is a flow chart illustrating a host interface 151E.
Figure 43B:
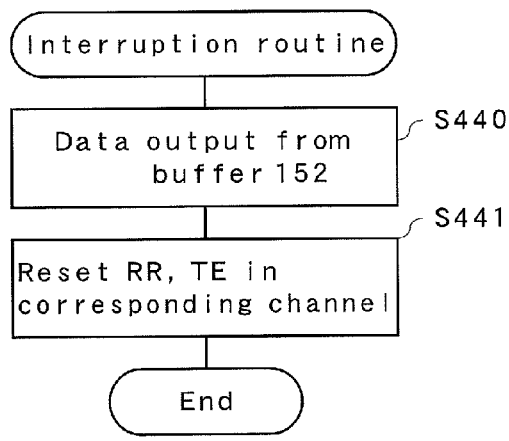
FIG. 43B is a flow chart illustrating interruption processing of the host interface 151E.

Next, the host interface 151E shifts to S440 in FIG. 43B due to interruption corresponding to the data transfer instruction of the CPU part 154 in S123, and transfers the musical sound data from the buffer part 152 to the access module 200E. At this time, in S123, CHN notified by the CPU part 154 is added to the musical sound data and transferred to the access module 200E (FIG. 17). After that, the values of RR and TE of the corresponding channel in the register 151*a* are reset to 0 (S441). An area where RR in the register 121*a* has the value 0 becomes a free area for next new reading instruction information. When RR has the value 0, RC also has the value 0 in S109 and TE also has the value 0 in S441. In temporarily storing the reading instruction information in the register 151*a*, the area is used from the top in order and, when reaching the bottom, it returns to the top, that is, the area is circularly used.

When receiving the musical sound data from the host interface 151E, the access module 200E temporarily stores the musical sound data in an area of the musical sound data buffer 231 that corresponds to CHN added to the musical sound data. Subsequent processing of the access module 200E is as described above. A transfer time of the musical sound data to the buffer part 152 or from the buffer part 152 is about 12.8 μs according to the expression (17).

Next, the case where the reading instruction relates to reading of audio data (Step S211 in FIG. 41A) will be described. The contents identification code of 0001 represents the audio data. In the case of reading of the audio data, the process proceeds to the interruption routine. In the interruption routine shown in FIG. 40C, an input value to the RAM switching terminal 152*d* of the RAM switching circuit 152*c* is toggled and switched (S131). For example, by changing the value from 0 to 1, a transfer destination from the memory interface 153 is switched to the single port RAM 152*b*, and the transfer source to the host interface 151E is switched to the single port RAM 152*a*. After that, the CPU part 154 instructs the host interface 151E to transfer the audio data temporarily stored in the buffer part 156 to the access module 200E (S132).

The audio data read from the nonvolatile storage module 100E by the reading instruction is buffered by the audio data buffer 239. The signal processor 222 decodes the audio data and outputs the decoded data as background sound via the input/output part 210E. Since the buffering control of the audio data buffer 239 and decoding processing of the signal processor 222 can be achieved according to common techniques, detailed description thereof is omitted.

In all of the cases where discrete key strike is performed, concentrated key strike is performed and concentrated key strike after rapid sound deadening is performed, as shown in the time charts in FIG. 24A to FIG. 24C, the sound production delay time is smaller than 1 ms that falls within an allowable scope of the sound production delay time. Therefore, the musical sound generation system in the present embodiment can be used as the musical sound generation system for electronic musical instruments and the like.

Figure 44:
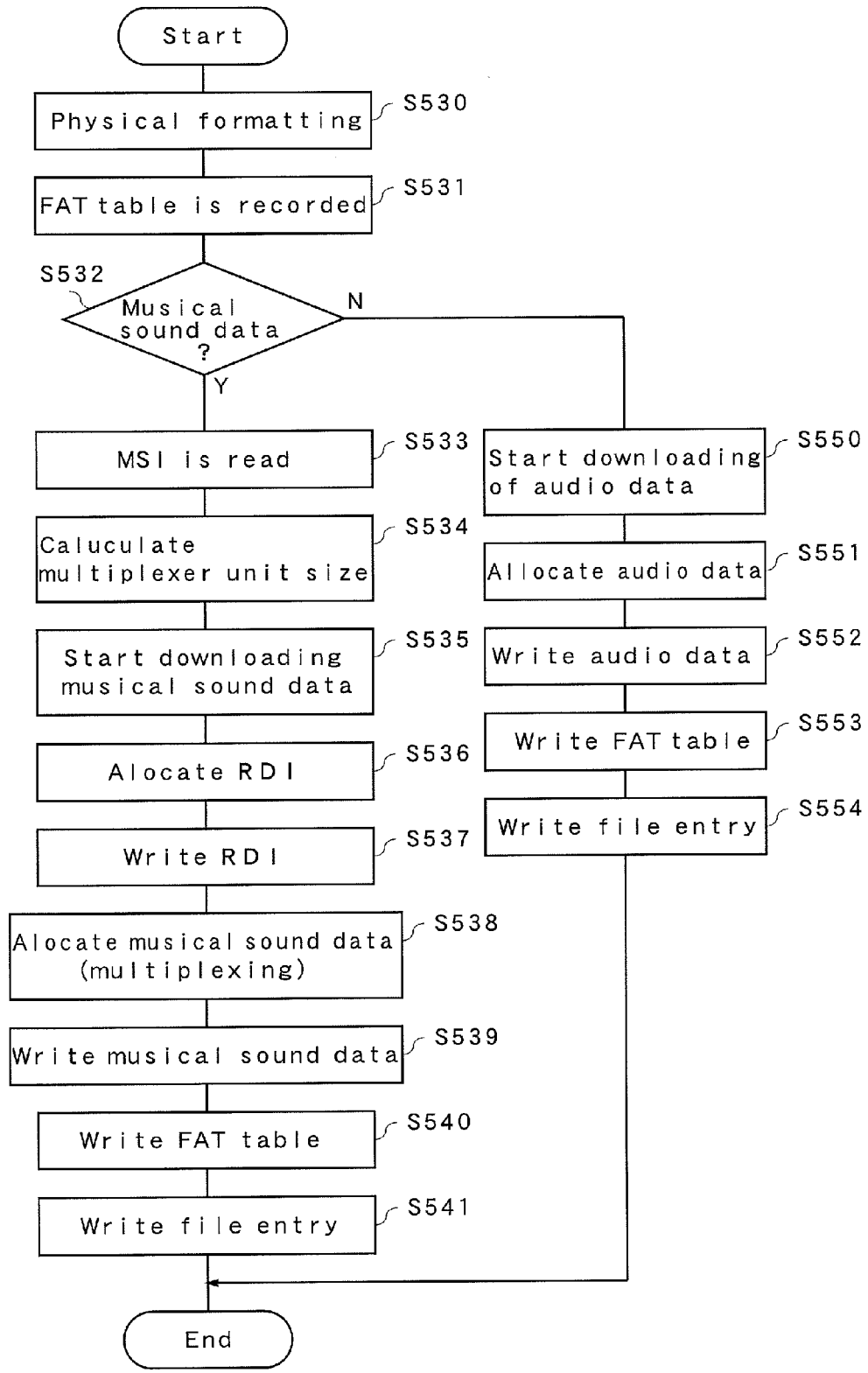
FIG. 44 is a flow chart illustrating musical sound data writing processing of an access module 200E.
Figure 45:
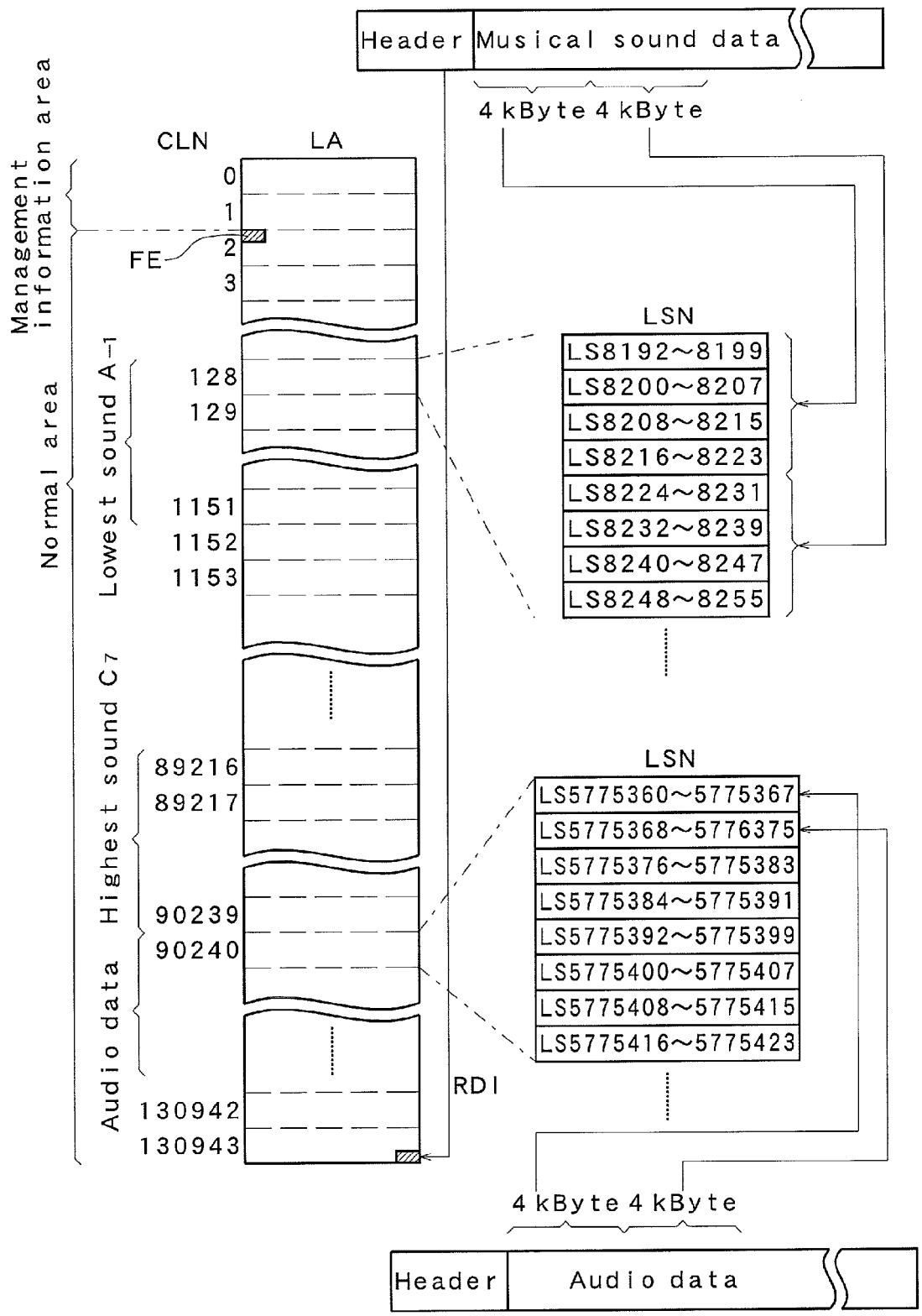
FIG. 45 is an explanatory diagram illustrating file allocation of the musical sound data acquired via the Internet 310.

Next, writing processing of the musical sound data and audio data by the access module will be described with reference to FIG. 44. FIG. 44 is a flow chart illustrating the writing processing of the musical sound data and audio data by the access module 200E. FIG. 45 is an explanatory diagram illustrating file allocation of the musical sound data acquired from the Internet 310.

First, prior to writing of the musical sound data, the access module 200E performs physical formatting (S530) to erase the data stored in the nonvolatile storage module 100E. By the physical formatting, the file system part 236 logically erases the logical address space once and transfers an erasure instruction to the nonvolatile storage module 100E via the driver 250. Detailed description of specification of the erasure instruction is omitted.

Here, for convenience, in FIG. 29, b22 to b13 of LSN correspond to b20 to b11 of PSN, respectively. Thus, according to the above-mentioned erasure instruction, PB0 to PB1022 of the nonvolatile memory banks 110 to 113 are physically erased. As described above, since PB1023 does not fall within a scope of the logical address, PB1023 is not physically erased. The FAT table or the like that indicates that the physical blocks PB0 to 1022 are erased is recorded in PB0 (S531).

FIG. 46A is an explanatory diagram illustrating a storage state of the nonvolatile memory banks 110 to 113 prior to writing of the musical sound data. In FIG. 46A, the FAT table and the like for managing that the whole of the normal area is logically erased by writing after the above-mentioned physical formatting (S530) is stored in PB0 of each of the nonvolatile memory banks 110 to 113. Accordingly, PB1 to PB1022 of the nonvolatile memory banks 110 to 113 are wholly erased.

Next, the contents identifier 238 of the CPU part 230E determines whether the user's downloading instruction acquired via the input/output part 210E is musical sound data downloading instruction and audio data downloading instruction (S532).

In the case of downloading of the musical sound data, the process proceeds to S533 and reads the memory configuration information (MSI) stored in PB1023 of the nonvolatile memory bank 113. The multiplexer 237 calculates the page size (4 k Bytes) in the memory configuration information as a multiplexer size (S534).

Next, CPU part 230E starts downloading of the musical sound data via the Internet 310 according to the user's downloading the instruction inputted via the input/output part 210E (S535).

As shown in FIG. 45, information downloaded via the Internet is formed of a header and musical sound data. The header includes the musical sound data length and a recorded data characteristic information RDI. Thus, the recorded data characteristic information (RDI) is allocated to the ending LSN of the CL130943 (S536) and written via the driver 250 according to the writing instruction information (S537).

The nonvolatile storage module 100E writes the transferred recorded data characteristic information to the ending PSN of P255 of PB1022 of the nonvolatile memory bank 113 by the data reader/writer 150E.

In writing by the data reader/writer 150E, when the physical block to which data is written becomes a bad block, the address manager 155 searches another free physical block, rewrites the information to the free block and registers the free block in the logical-physical conversion table. Such replacement of the physical block is performed for each of the nonvolatile memory banks 110 to 113. That is, replacement of the physical block is not performed between different nonvolatile memory banks.

Next, as shown in FIG. 45, the multiplexer 237 of the CPU part 230E multiplexes the parallel number (four) of musical sound data every multiplexer size (4 k Bytes) and allocates the data to the logical address space (S538). The multiplexer 237 passes the multiplexed musical sound data to the file system part 236. The file system part 236 allocates the multiplexed musical sound data to the logical address space. In FIG. 45, for convenience, the starting cluster to which the musical sound data is allocated is CL128, however, any free cluster may be used as the starting cluster.

Figure 47:
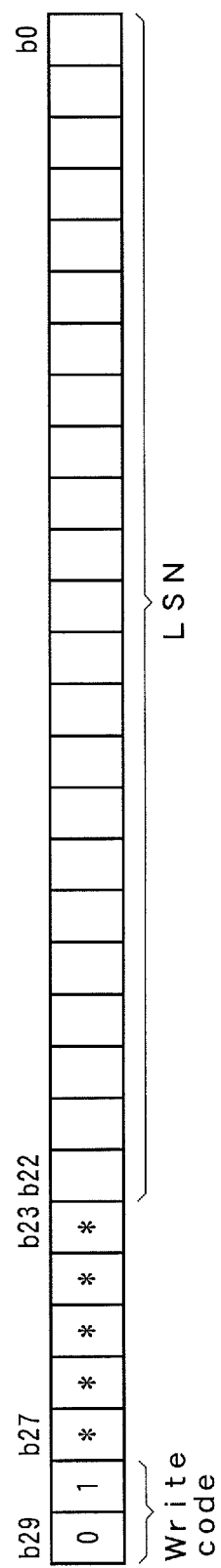
FIG. 47 is a bit map illustrating the writing instruction information of the musical sound data.

With the above-mentioned allocation, the CPU part 230E writes the musical sound data via the driver 250 according to the writing instruction information (S539). FIG. 47 is a bit map illustrating the writing instruction information for the sound data.

After that, to register a set of the musical sound data and recorded data characteristic information corresponding to the musical sound data as one musical sound data file, writing of the FAT table (S540) and writing of the file entry are performed (S541).

Figure 46B:
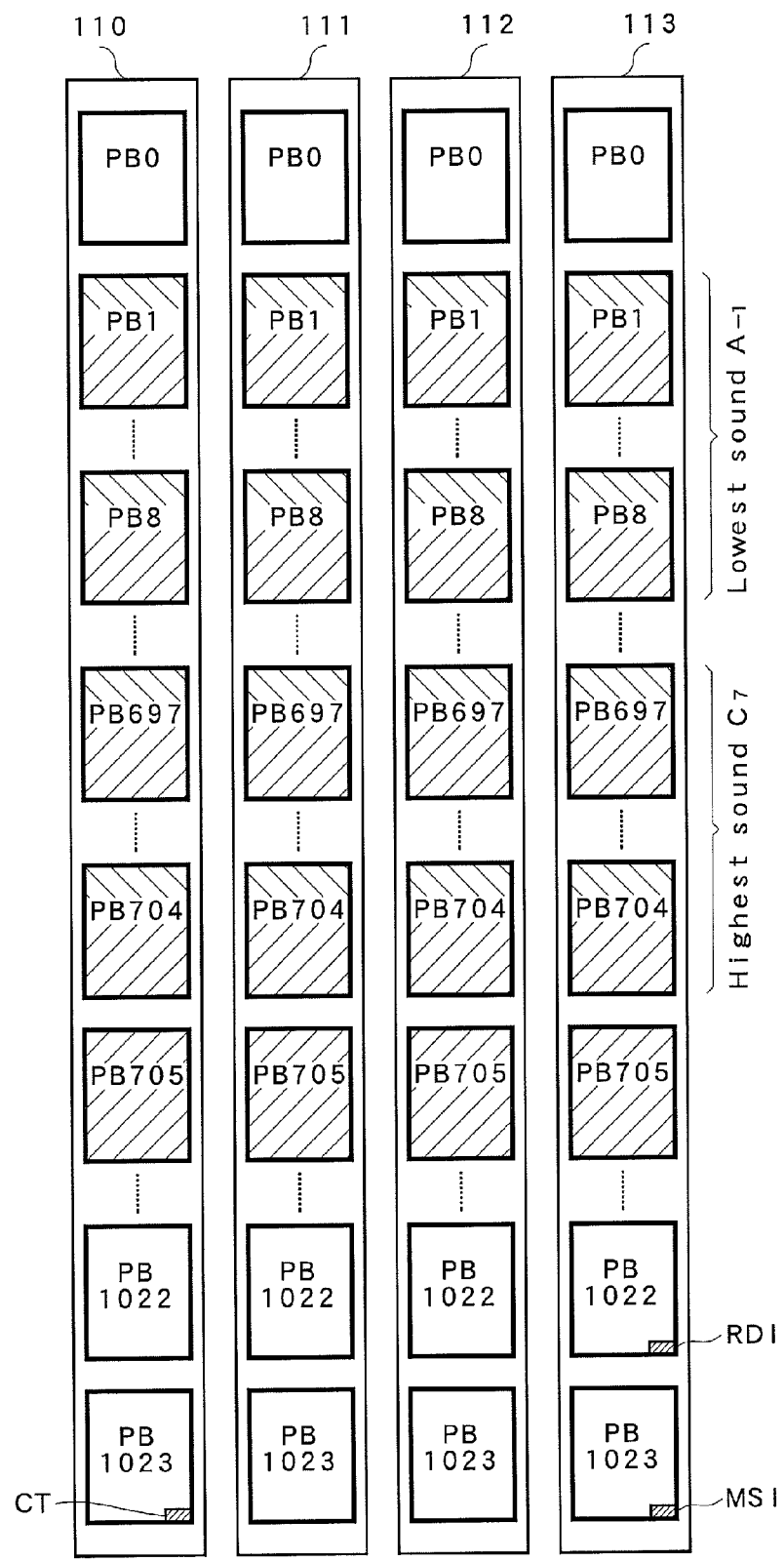
FIG. 46B is an explanatory diagram illustrating a storage state of the nonvolatile memory banks 110 to 113 after writing of the musical sound data.

By multiplexing the musical sound data from the lowest sound to the highest sound and writing the multiplexed data to the nonvolatile memory banks 110 to 113 in this manner, the storage state changes from a state shown in FIG. 46A to a state shown in FIG. 46B. FIG. 46B is an explanatory diagram illustrating the storage state of the nonvolatile memory banks 110 to 113 after writing of the musical sound data. In FIG. 46B, the musical sound data is stored in PB1 to PB704 of the nonvolatile memory banks 110 to 113, and the recorded data characteristic information is stored in PB1022 of the nonvolatile memory bank 113. Since the management information such as the FAT table and file entry is updated from the information stored in PB0 of the nonvolatile memory banks 110 to 113, the information is stored in PB705 in another physical block of the nonvolatile memory banks 110 to 113. Any free physical block other than PB705 may be used.

When the audio data downloading instruction is identified in S532, the process shifts to S550 and starts downloading of the audio data.

The downloaded audio data is passed to the file system part 236 without being multiplexed. As shown in FIG. 45, the file system part 236 allocates the audio data to the logical address space (S551). In FIG. 45, for convenience, although the starting cluster to which the audio data is allocated is CL90240 next to the musical sound data, any free cluster may be used as the starting cluster.

With the above-mentioned allocation, the CPU part 230E writes the audio data via the driver 250 according to the writing instruction information (FIG. 47) (S552). In writing of the audio data, the host interface 151E accepts the writing instruction information in the register 151*b* for audio data. The data reader/writer 150E writes or reads audio data via the buffer part 156 dedicated to audio data. In reading of the audio data, it is no need to hold a plurality of pieces of the reading instruction information as in reading of the musical sound data. That is, since it can be easily achieved by the method used in a conventional memory card, detailed description is omitted.

After that, to register the written audio data as an audio data file, the reader/writer 150E performs writing of the FAT table (S553) and writing of the file entry (S554). By the above-mentioned writing processing, the multiplexed musical sound data and unmultiplexed audio data are stored in the nonvolatile storage module 100E.

As described above, the musical sound data acquired by the access module 200E via the Internet is multiplexed and allocated to the logical address space based on the memory configuration information and, with the allocation, the musical sound data is written to the nonvolatile storage module. The audio data is also acquired from the outside and written to the nonvolatile module.

The contents identifier 238 identifies whether or not data acquired via the Internet or the like is the musical sound data or audio data, and accordingly, the file system part 236 multiplexes the musical sound data, manages the data in the logical address space, and manages the audio data in the logical address space without multiplexing. That is, since whether multiplexing or unmultiplexing in the storage method is varied depending on the types of contents, the storage capacity of the nonvolatile storage modules 100E can be reasonably used. The nonvolatile storage module that holds the musical sound data and audio data thus acquired is connected to the access module 200E. Then, by producing sound in response to strike of the master keyboard 300, it is possible to easily update the tone and reproduce the audio data. That is, the musical sound generation system in the present embodiment can be also applied to the electronic musical instrument using the audio data as background music.

Since the musical sound data stored in the nonvolatile storage module is managed by the file system part 236 as a musical sound data file, the musical sound data can be managed or edited by a device such as the personal computer using the same file system (FAT file system). Further, the musical sound data can be easily copied to other recording devices, recording media and the like.

In writing the musical sound data to the nonvolatile memory banks 110 to 113, when the bad block occurs, logical-physical conversion may be appropriately performed by the address manager 155, and the musical sound data may be written to a free normal block.

Although the access module 200E acquires the musical sound data to be written to the nonvolatile storage module 100E via the Internet 310, the access module 200E may acquire the musical sound data by other devices such as the personal computer.

As described above, in terms of reproduction of the musical sound data, the musical sound generation system in the present embodiment has the same effects as the musical sound generation system in embodiment 1. Further, the musical sound generation system in embodiment 5 is a system based on the FAT file system. The FAT file system is a versatile file system and the access module can write the musical sound data and audio data. Therefore, since the musical sound data and audio data rewritten according to user's preference can be used, the system can be said as a very versatile system.

The nonvolatile storage module 100E may be a removable storage device such as a memory card or a memory part incorporated into a device such as the electronic musical instruments. The access module 200E may be a device such as the electronic musical instrument or an access circuit part incorporated into the device such as the electronic musical instrument.

It is assumed that the musical sound generation system in the present embodiment uses the audio data as background sound of the performance sound (musical sound) generated by the master keyboard 300, and it is desired that the audio data is minus one source, that is, an audio source in which only one musical instrument sound (for example, piano sound) is not recorded.

Although the audio data is acquired via the Internet 310 in the present embodiment, the audio data may be acquired from commercial media such as CD, hard discs or the like.

Although the audio data is not multiplexed, it may be multiplexed if wastes of storage capacity of the nonvolatile storage module 100E do not matter.

The nonvolatile storage module 100E may be a removable storage device such as a memory card or a memory part incorporated into a device such as the electronic musical instruments. The access module 200E may be a device such as the electronic musical instrument or an access circuit part incorporated into the device such as the electronic musical instrument.

(Embodiment 6)

Figure 48:
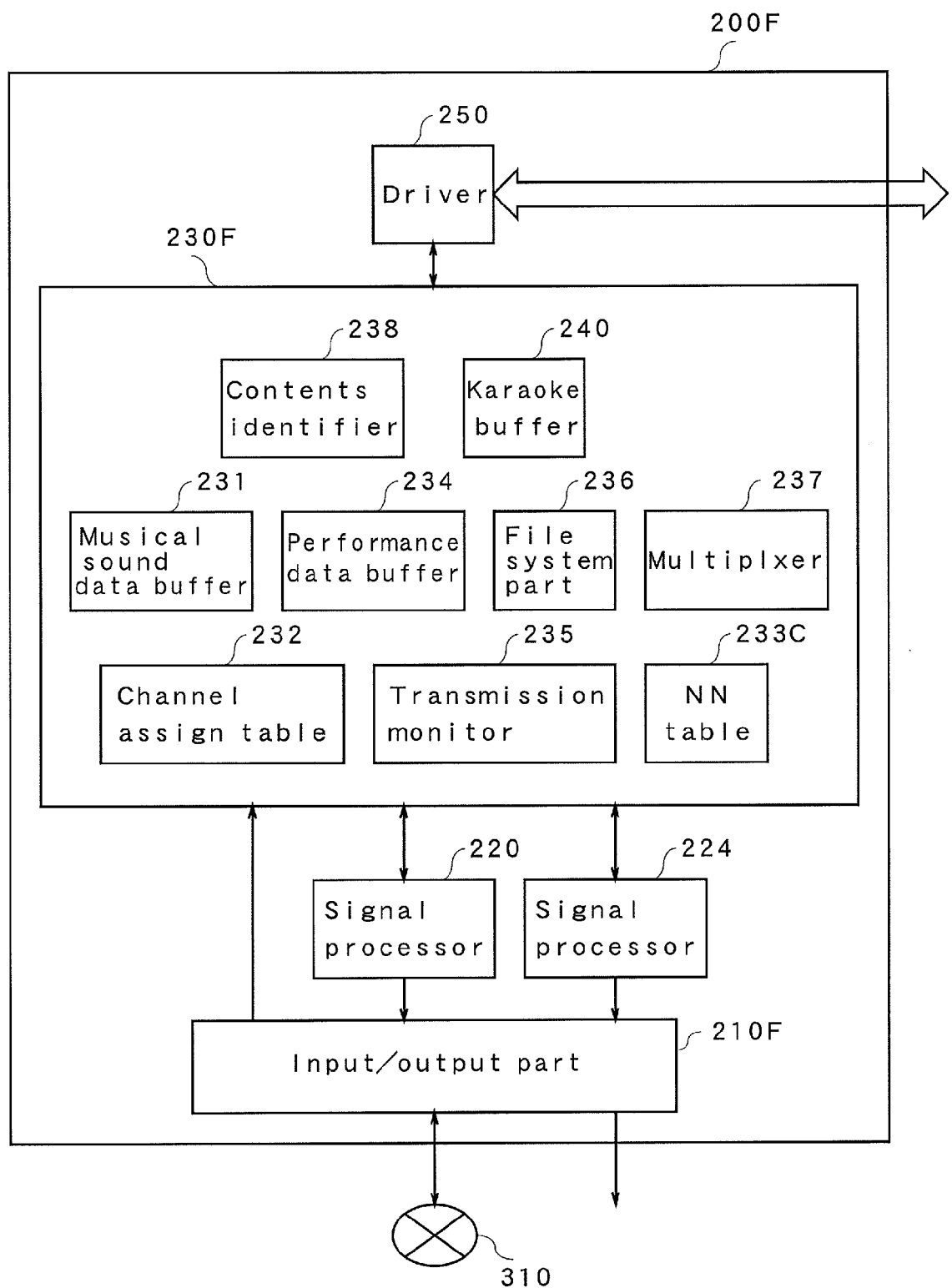
FIG. 48 is a block diagram illustrating an access module 200F of a musical sound generation system in embodiment 6 of the present invention.

FIG. 48 is a block diagram illustrating an access module of a musical sound generation system in embodiment 6 of the present invention. The musical sound generation system in embodiment 6 is different from the musical sound generation system in embodiment 5 in that it has a function to use karaoke data set acquired via the Internet 310, that is, performance data, background image data, lyrics text data or musical sound data, as a karaoke source. Performance data corresponds to the performance data acquired from the master keyboard 300 in the musical sound generation system in embodiment 5.

This musical sound generation system is configured of the nonvolatile storage module 100E and access module 200F shown in FIG. 48. The nonvolatile storage module 100E is the same as that in embodiment 5. However, in the present embodiment, the register 151b holds the reading instruction information of karaoke data, and the buffer part 156 acts as a buffer for karaoke data. The access module 200F includes an input/output part 210F, a signal processor 224, a CPU part 230F and the driver 250. The input/output part 210F is a block that acquires the karaoke data set via the Internet 310 and outputs the musical sound, a background image, lyrics and so on.

The signal processor 224 is a block that performs decompression processing and conversion processing when the image data and text data are compressed. Any decoding processing that conforms to an image data compression method may be used. When the image data is not compressed, the decompression processing is not performed.

The blocks 231 to 238 of the CPU part 230F are the same as those in embodiment 5, and the CPU part 230F further includes a karaoke buffer 240. The karaoke buffer 240 temporarily holds data other than the musical sound data in a karaoke data set.

Operations of the musical sound generation system thus configured in embodiment 6 of the present invention will be described. Basic operations are the same as those in embodiment 5. In embodiment 5, in the nonvolatile storage module 100E, the musical sound data is multiplexed and stored, while the audio data is stored without being multiplexed. Meanwhile, in contrast, in embodiment 6, the musical sound data is multiplexed and stored, while the performance data, image data and text data are stored without being multiplexed.

Figure 49:
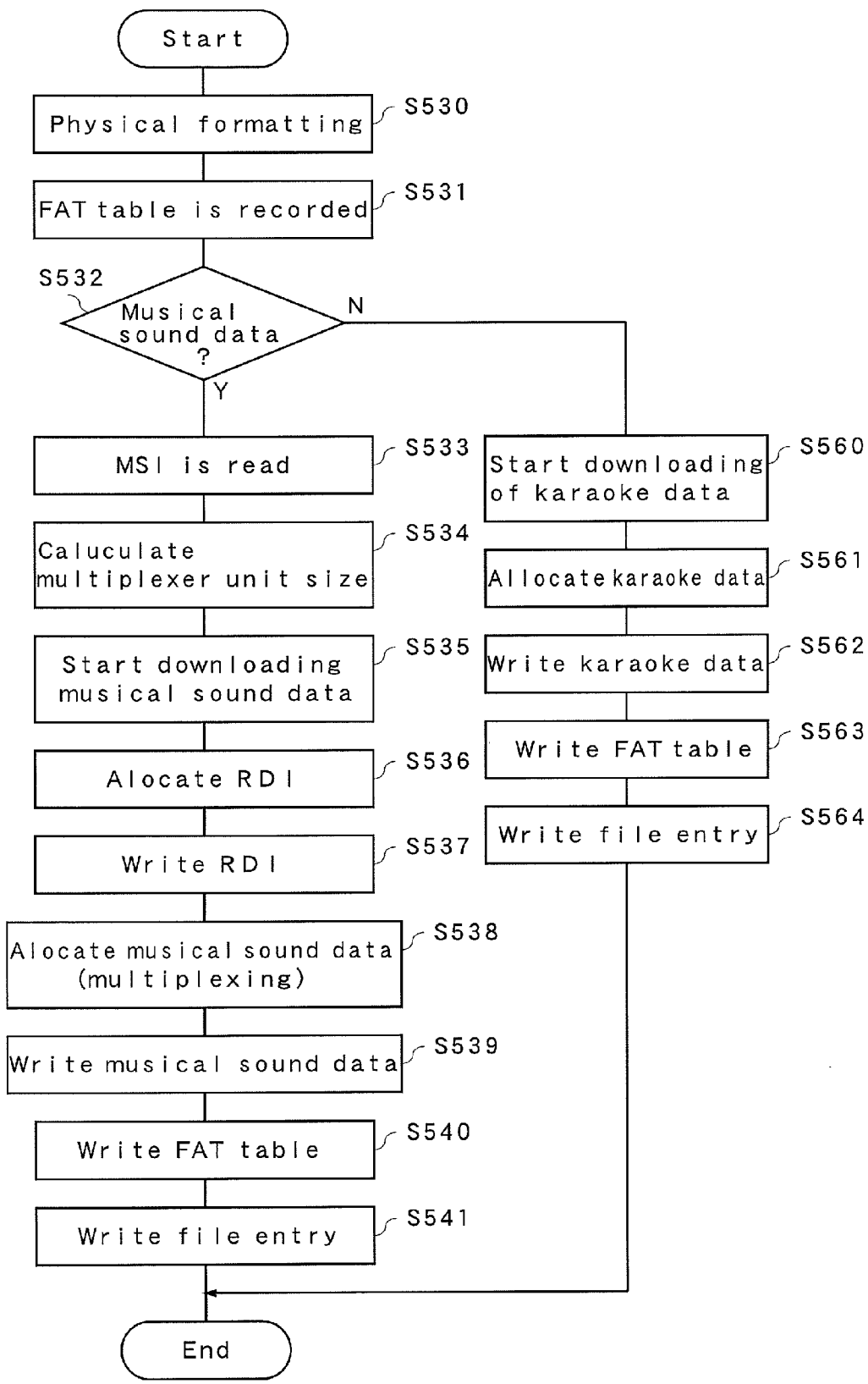
FIG. 49 is a flow chart illustrating writing processing of musical sound data and karaoke data set by the access module 200F.

FIG. 49 is a flow chart illustrating of writing processing of the karaoke data set by the access module 200F. In the writing processing, S530 to S541 are the same as in FIG. 44. In writing data other than the musical sound data, as shown in FIG. 49, the contents identifier 238 identifies the musical sound data and the other data based on the contents identification code shown in FIG. 42C. In writing the musical sound data, as that in embodiment 5, the musical sound data is multiplexed and allocated, and the karaoke data is allocated to the logical address in Steps S560 to S564 in an unmultiplexed form, and is managed by the FAT file system. Subsequent processing is the same as that in embodiment 5.

In the reading processing, only the performance data among the data temporarily stored in the karaoke buffer 240 is used for musical sound generation processing as in embodiment 5. The image data and text data are subjected to the decoding and conversion processing by the signal processor 224 and outputted to the outside as a background image and lyrics. Subsequent processing is the same as that in embodiment 5.

Figure 50:
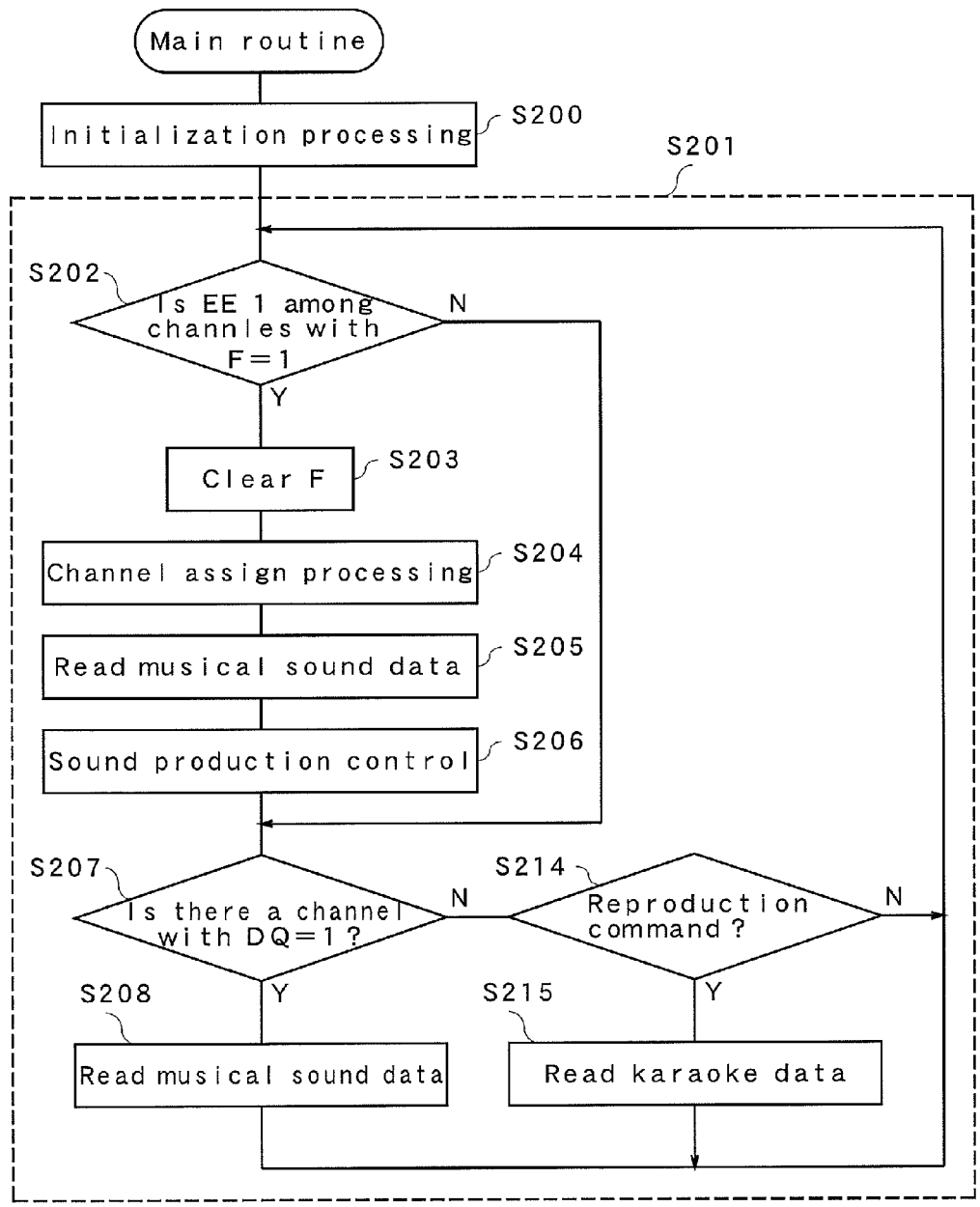
FIG. 50 is a flow chart illustrating a main routine of a CPU part 230F.

FIG. 50 is a flow chart illustrating a main routine of the CPU part 230F. An interruption routine of the CPU part 230F is the same as the interruption routine in FIG. 41B. S200 to S208 in the main routine of the CPU part 230F are the same as those in FIG. 41A. In FIG. 50, when the user's reproduction instruction is issued (S214), a reading instruction of the karaoke data set except for the musical sound data is issued (S215). Whereby, the karaoke data set acquired via Internet 310, that is, the performance data, background image data, lyrics text data and musical sound data, can be used as a karaoke source.

(Embodiment 7)

Next, a musical sound generation system in embodiment 7 of the present invention will be described. The musical sound generation system is configured of a nonvolatile storage module 100G shown in FIG. 51 and an access module 200E or 200F. In the musical sound generation system in embodiment 5 shown in FIG. 39, the nonvolatile memory banks 110 to 113 are each one flash memory (chip), however, in the present embodiment, the nonvolatile memory banks 110, 111 are built in one flash memory 131 and the nonvolatile memory banks 112, 113 are built in one flash memory 132. A data reader/writer 160A includes a memory interface 161 in addition to the host interface 151E, buffer parts 152, 156, CPU part 154 and address manager 155.

Generally, the flash memories are classified into a type that has only one memory bank in a flash memory chip and a type that has two or more memory banks in the flash memory chip. The musical sound generation system in embodiment 7 is a latter type. The nonvolatile memory banks 110, 111 included in the flash memory 131 and nonvolatile memory banks 112, 113 included in the flash memory 132 can individually read the musical sound data as in embodiment 1. However, embodiment 5 is different from embodiment 1 in that there are two flash memory chips and thus, the number of CE signals, read clocks and busy signals that are connected to the memory interface 161 via the memory bus is two.

In the bit format of LSN shown in FIG. 29, b3, LSB of the bank select is added at the head of b22 of LSN (b22 to b13) and used as a physical block address of the flash memory 131 or flash memory 132. In the bit format, b4, MSB of the bank select is encoded in the memory interface 161 and used as the two CE signals.

The busy signal of the flash memory 131 is shared by the nonvolatile memory banks 110, 111. A data ready flag of each of the nonvolatile memory banks 110, 111 may be generated by the busy signal. Similarly, the busy signal of the flash memory 132 is shared by the nonvolatile memory banks 112, 113. A data ready flag of each of the nonvolatile memory banks 112, 113 may be generated by the busy signal. As shown in FIG. 23, the access flag may be controlled so as to have a value 1 by the time when the transfer time (TT) of the musical sound data from the command 1 is finished as in embodiment 1.

As described above, since the musical sound generation system in embodiment 7 performs the same operations as those of the musical sound generation system in embodiment 5, the sound production delay time can be made smaller than 1 ms that falls within an allowable scope. In other words, even when a currently dominant large-capacity multi level NAND flash memory is used as a memory for musical sound data and karaoke data, an inexpensive and compact musical sound signal generation device can be realized.

As described above, the contents identifier 238 identifies whether or not the karaoke data set acquired via the Internet or the like is the musical sound data, and accordingly, the file system part 236 multiplexes the musical sound data and manages the data in the logical address space, and manages data other than the musical sound data without multiplexing. That is, whether multiplexing or unmultiplexing in the storage method is varied depending on the types of contents, the storage capacities of the nonvolatile storage modules 100E, 100F, 100G can be reasonably used. In other words, the musical sound generation system in the present embodiment can be also applied to the karaoke machine.

Although the karaoke data set is acquired via the Internet 310 in a unit, part of data such as the musical sound data may be previously stored in the nonvolatile storage modules 100E, 100F, 100G on a manufacturer's side and remaining data may be acquired via the Internet 310.

Although the karaoke data set is acquired via the Internet 310 in the present embodiment, the karaoke data set may be acquired from commercial media such as CD, hard discs or the like. In addition, MIDI data may be used as the performance data.

Although the karaoke data set other than the musical sound data is not multiplexed, it may be multiplexed if wastes of storage capacity of the nonvolatile storage module do not matter.

The nonvolatile storage module 100E may be a removable storage device such as a memory card or a memory part incorporated into a karaoke machine or the like. The access module 200F may be the karaoke machine or an access circuit part incorporated into the karaoke machine.

(Embodiment 8)

Figure 52A:
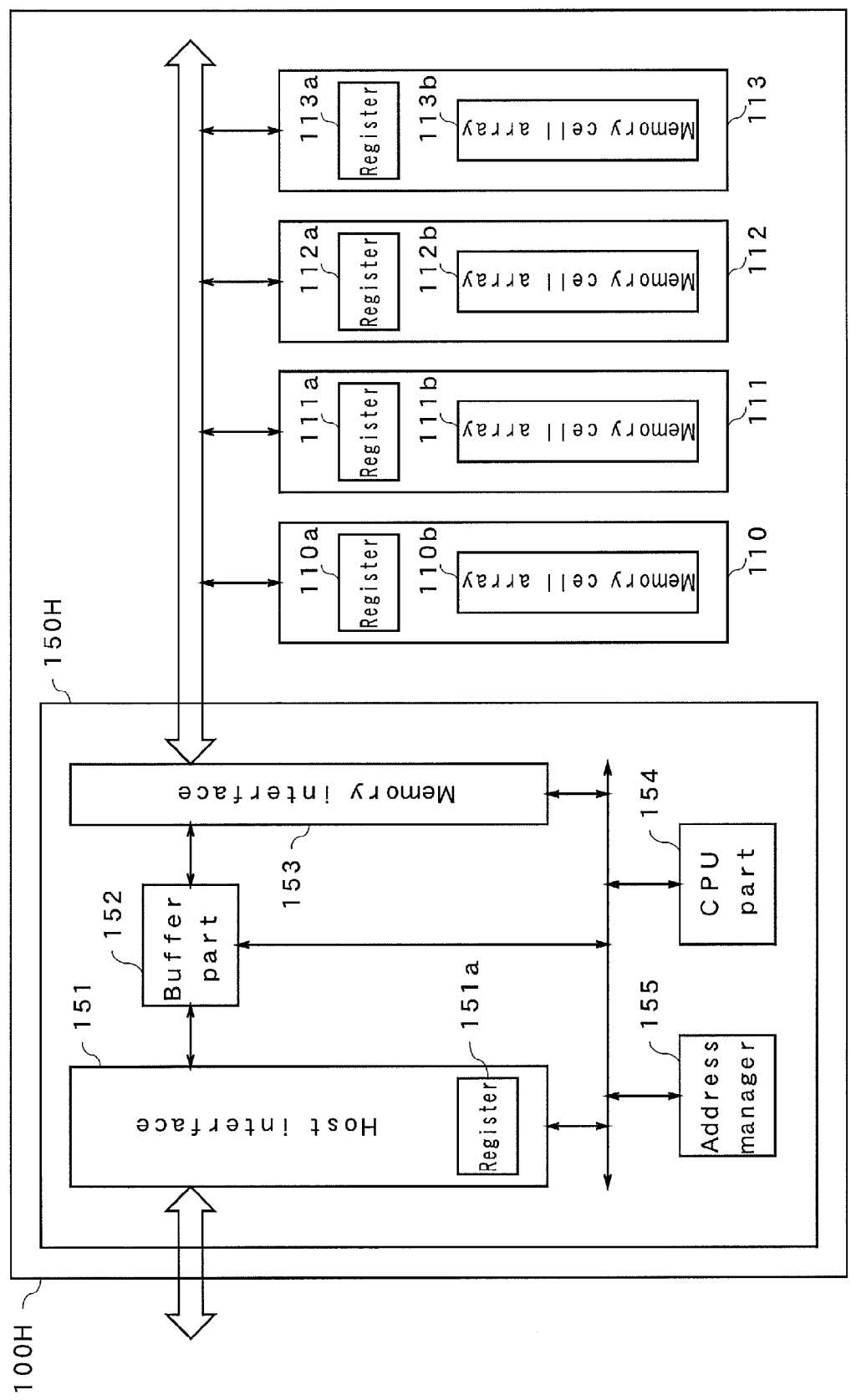
FIG. 52A is a block diagram illustrating a nonvolatile storage module 100H of a musical sound generation system in embodiment 8 of the present invention.

FIG. 52A, FIG. 52B are block diagrams illustrating a musical sound generation system in embodiment 8 of the present invention. The musical sound generation system includes a nonvolatile storage module 100H shown in FIG. 52A and an access module 200H shown in FIG. 52B. The nonvolatile storage module 100H includes the four nonvolatile memory banks 110 to 113 provided in parallel with each other and data reader/writer 150H. The data reader/writer 150H includes the host interface 151, buffer part 152, memory interface 153, CPU part 154 and address manager 155.

The access module 200H includes an input/output part 210H, the signal processor 220, a CPU part 230H and the driver 250, and can simultaneously output the musical sound of 32 channels. Hereinafter, channel number is referred to as CH0 to CH31. The CPU part 230H includes the musical sound data buffer 231, the channel assign table 232, the NN table 233C, the performance data buffer 234, the transfer monitor 235, the file system part 236, the multiplexer 237, a file editor 242 and a sampling part 243.

Next, the nonvolatile memory banks 110 to 113 of the nonvolatile storage module 100H are the same as those in embodiment 3.

Relationship among the logical address space, cluster number CLN and logical sector number LSN, logical sector number LSN and structures in the memory cell arrays 110b to 113b are the same as those in embodiment 3.

Since correspondence relationship between the record format, logical sector number LSN and physical sector number PSN in each page where the musical sound data is recorded is the same as that in embodiment 3 shown in FIGS. 28 and 29, description thereof is omitted.

However, the bit format of LSN in FIG. 29 is an example in the case where the parallel number of the nonvolatile memory banks is four, and the number of bits assigned to the bank select may be changed depending on the parallel number. When the parallel number is two, the number of bits assigned to the bank select is one (b3) and accordingly, the page number is assigned to b11 to b4 and LBN is assigned to b21 to b12. The in-page sector selection bits are bits corresponding to a quotient obtained by dividing the page by a sector size. In the present embodiment, the page size is 4096+128 Bytes and the sector size is 512 Bytes, that is, as shown in FIG. 28, one page is divided into eight sectors, and these sectors are selected according to low-order three bits of the above-mentioned physical address. The page size and sector size are not limited to the above-mentioned values, and the in-page sector selection bits may be changed depending on the values.

Next, the host interface 151, buffer part 152, memory interface 153, CPU part 154 and address manager 155 in the data reader/writer 150H are the same as those in embodiment 3 shown in FIGS. 26A and 26B.

Next, each block in the access module 200H will be described in detail with reference to FIG. 52B. The performance data is generated in response to the operation such as strike of the external master keyboard 300, and is taken into the CPU part 230H via the input/output part 210H. The access module 200H is connected with a microphone 320 for recording sound, data storage module 330 and hard disc 340, and can record necessary data according to a sound recording instruction by a user. The input/output part 210H includes a terminal that inputs the performance data from the master keyboard 300, a DA converter that digital-analog converts the musical sound generated by the signal processor 220, an amplifier that amplifies the converted musical sound, a line-out terminal that externally outputs the output, a microphone input terminal and hard disc interface.

The signal processor 220 is the same as that in embodiment 3. The signal processor 220 is configured of a digital signal processor (hereinafter referred to as DSP), a ROM that stores a program of the DSP and a RAM necessary for a delay element for effector processing or for temporarily storing a parameter.

The CPU part 230H is a block that performs the channel assign processing of the performance data received by the input/output part 210H, transfers the reading instruction information to the nonvolatile storage module 100H via the driver 250 and supplies the musical sound data and part of performance data read from the nonvolatile storage module 100H to the signal processor 220.

The musical sound data buffer 231, channel assign table 232, NN table 233C, performance data buffer 234, transfer monitor 235 included in the CPU part 230H are the same as those in embodiment 3.

The file system part 236 in the CPU part 230H functions to manage the musical sound data as a file. Details of the file system part 236 will be described later.

The multiplexer 237 in the CPU part 230H multiplexes the musical sound data when the musical sound data is written as the file. Details of the multiplexer 237 will be described later.

The file editor 242 in the CPU part 230H functions to edit and manage the musical sound data as the file. Details of the file editor 242 will be described later.

The sampling part 243 in the CPU part 230H samples the data recorded by the microphone and records the sampled data in the data storage module 330.

[Initial State]

First, contents of initialization performed by a manufacturer prior to shipment of the nonvolatile storage module 100H will be described. Although a manufacturer previously records the musical sound data before shipment in the present embodiment, there may be the case where the manufacturer does not record data before shipment and a user records the musical sound data file as described later.

The writing device on a side of the manufacturer, for example, a personal computer that conforms to a FAT file system, physically formats the nonvolatile storage module 100H. After that, as shown in FIG. 27A, a writing device allocates management information such as FAT and route directory entry in the management information area (CL0, CL1) in a logical address space, and allocates the musical sound data in the normal area (cluster CL2 and lower clusters). Subsequent writing processing is the same as that in embodiment 3.

Further, in initialization, as shown in FIG. 27B, the characteristic information of the piano musical sound data recorded in the nonvolatile storage module 100H is written to a last page of the physical block PB1022 of the nonvolatile memory bank 113 as recorded data characteristic information (RDI), and the memory configuration information (MSI) of the nonvolatile storage module 100H is written to a last page of the physical block PB1023. The recorded data characteristic information and memory configuration information are the same as those in embodiment 3.

Operations of the musical sound generation system thus configured in embodiment 8 of the present invention will be described.

[Initializing Processing at Power-On]

Upon power-on, each of the access module 200H and nonvolatile storage module 100H starts initializing processing. Since the normal processing and interruption processing of the CPU part 154 are the same as those in embodiment 3, description thereof is omitted.

[Processing at Normal Operation]

Operations from inputting of the performance data to generation of the musical sound are the same as those in embodiment 3.

In all of the cases where discrete key strike is performed, concentrated key strike is performed and concentrated key strike after the rapid sound deadening is performed, as shown in the time charts in FIGS. 24A to 24C, the sound production delay time is smaller than 1 ms that falls within the allowable scope of the sound production delay time. Therefore, the musical sound generation system in the present embodiment can be used as a musical sound generation system for electronic musical instruments and the like.

Figure 53:
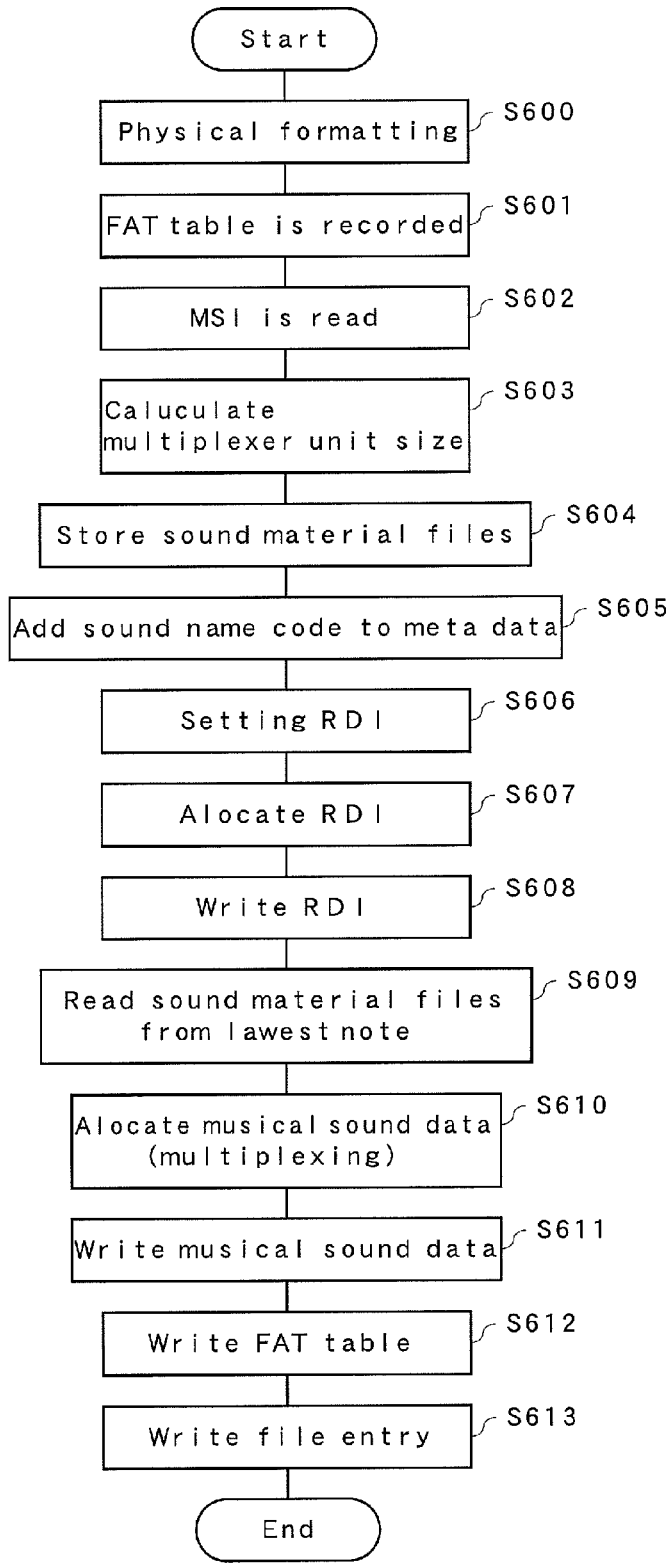
FIG. 53 is a flow chart illustrating musical sound data writing processing of the access module 200H.

Next, musical sound data writing processing of an access module will be described with reference to mainly FIG. 53. FIG. 53 is a flow chart illustrating the musical sound data writing processing of the access module 200H.

Figure 54:
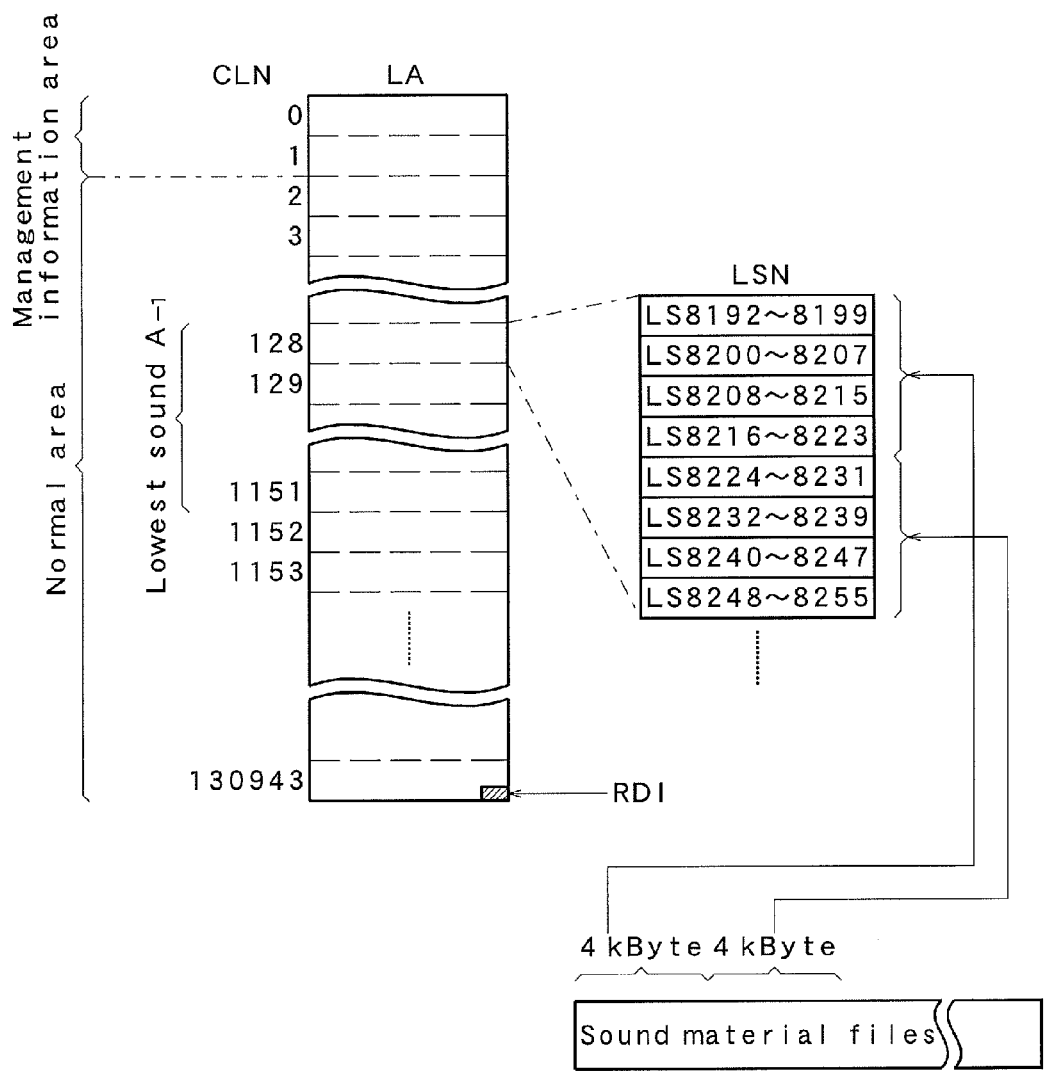
FIG. 54 is an explanatory diagram illustrating file allocation of recorded musical sound data.

First, prior to writing of the musical sound data, the access module 200H performs physical formatting (S600) to erase data stored in the nonvolatile storage module 100H. FIG. 54 is an explanatory diagram illustrating file allocation of the sound material file group. By the physical formatting, the file system part 236 logically erases a logical address space once and transfers the erasure instruction to the nonvolatile storage module 100H via the driver 250. Detailed description of specification of the erasure instruction is omitted.

Here, for convenience, in FIG. 29, b22 to b13 of LSN correspond to b20 to b11 of PSN, respectively. Thus, according to the above-mentioned erasure instruction, PB0 to PB1022 of the nonvolatile memory banks 110 to 113 are physically erased. As described above, since PB1023 does not fall within the scope of the logical address, PB1023 is not physically erased. The FAT table or the like that indicates that the physical blocks PB0 to 1022 are erased is recorded in PB0 (S601).

Figure 55A:
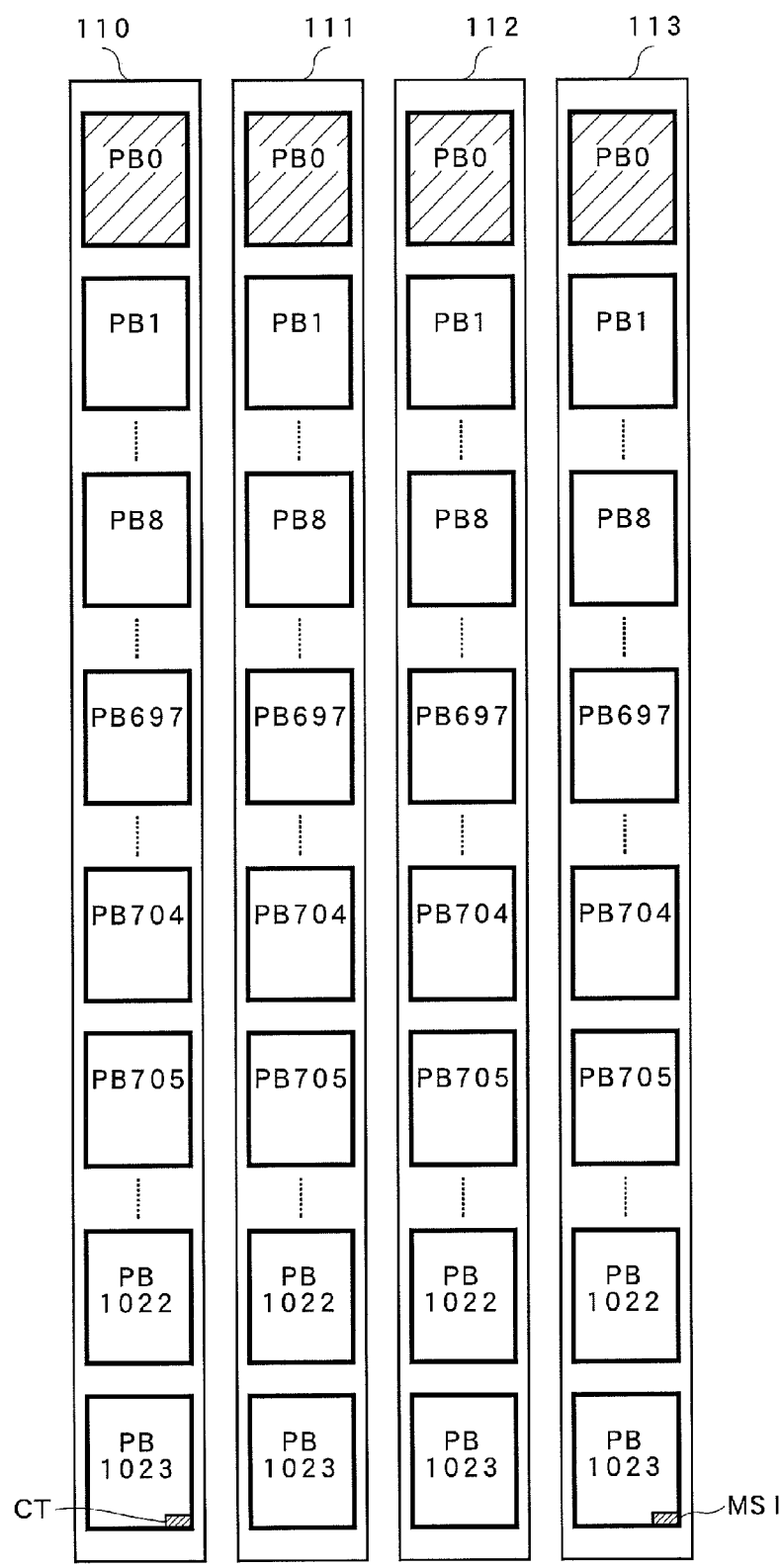
FIG. 55A is an explanatory diagram illustrating a storage state of the nonvolatile memory banks 110 to 113 prior to writing of the musical sound data.

FIG. 55A is an explanatory diagram illustrating a storage state of the nonvolatile memory banks 110 to 113 prior to writing of the musical sound data. In FIG. 55A, FAT for managing that the whole of the normal area has been logically erased by writing after the above-mentioned physical formatting (S600) in PB0 of each of the nonvolatile memory banks 110 to 113. Accordingly, PB1 to PB1022 of the nonvolatile memory banks 110 to 113 are wholly erased.

Next, the memory configuration information (MSI) stored in PB1023 of the nonvolatile memory bank 113 is read (S602). The multiplexer 237 sets the page size (4 k Bytes) of the memory configuration information to a multiplexer size (S603).

Next, a user plays the piano by one sound and records sound material data by use of the microphone 320. At this time, the sampling part 243 of the CPU part 230H samples the piano sound via the input/output part 210H. The file editor 242 holds the sampled data as a sound material file group in the data storage module 330 once, transfers the data to the hard disc 340 and stores the data therein (S604). Here, the sound material file is configured of sound data and meta data, and the meta data shows sound attribute information. Like the above-mentioned musical sound data file at shipment, the sound material file group records the sound of 88 keys that ranges from the lowest piano sound to highest piano sound for each of two types of a strong key strike and weak key strike to generate 176 files in total. It is desired that this file has a WAVE file format so as to be easily edited by a PC or the like.

Next, in response to a user's editing operation, a sound name code (lowest sound $A_{-1}$ to highest sound $C_7$) is assigned to each meta data in the sound material file group (S605). Further, the recorded data characteristic information shown in FIG. 56 is set (S606). Specifically, parameters of sections specified as "set by a user" or "automatically set by the CPU part 230H" in note columns in FIG. 56 are set. The other parameters are set in the meta data of the sound material file at recording, or determined based on the memory configuration information. Next, the CPU part 230H allocates the recorded data characteristic information to the ending LSN of CL130943 (S607) as well as writes the recorded data characteristic information via the driver 250 according to the writing instruction information (S608).

The nonvolatile storage module 100H writes the transferred recorded data characteristic information to the ending PSN of P255 of PB1022 of the nonvolatile memory bank 113 by the data reader/writer 150H.

In writing by the data reader/writer 150H, when the physical block to which data is written becomes a bad block, the address manager 155 searches another free physical block, rewrites the information to the free block and registers the free block in the logical-physical conversion table. Such replacement of the physical block is performed for each of the nonvolatile memory banks 110 to 113. That is, replacement of the physical block is not performed between different nonvolatile memory banks.

Next, the multiplexer 237 of the CPU part 230H sequentially reads the sound material file group from the lowest sound in order from the hard disc 340 (S609). As shown in FIG. 54, the multiplexer 237 multiplexes the musical sound data other than the meta data in each sound material file, that is, only data corresponding to sound, into parallel number (four) every multiplexer size (4 k Bytes) and allocates the multiplexed data to the logical address space (S610). The multiplexer 237 passes the multiplexed musical sound data to the file system part 236. The file system part 236 allocates the multiplexed musical sound data to the logical address space. In FIG. 54, for convenience, the starting cluster to which the musical sound data is allocated is CL128, however, any free cluster may be used as the starting cluster.

With the above-mentioned allocation, the CPU part 230H writes the musical sound data via the driver 250 according to the writing instruction information (S611).

After that, to register a set of the musical sound data and recorded data characteristic information corresponding to the musical sound data as one musical sound data file, writing of FAT (S612) and writing of the file entry are performed (S613). Whereby, the musical sound data file can be generated based on the sampled sound material file group.

In the case where one or more musical sound data files exist in the nonvolatile storage module 100H and another musical sound data file is additionally written, processing in S600, S601 becomes unnecessary.

Figure 55B:
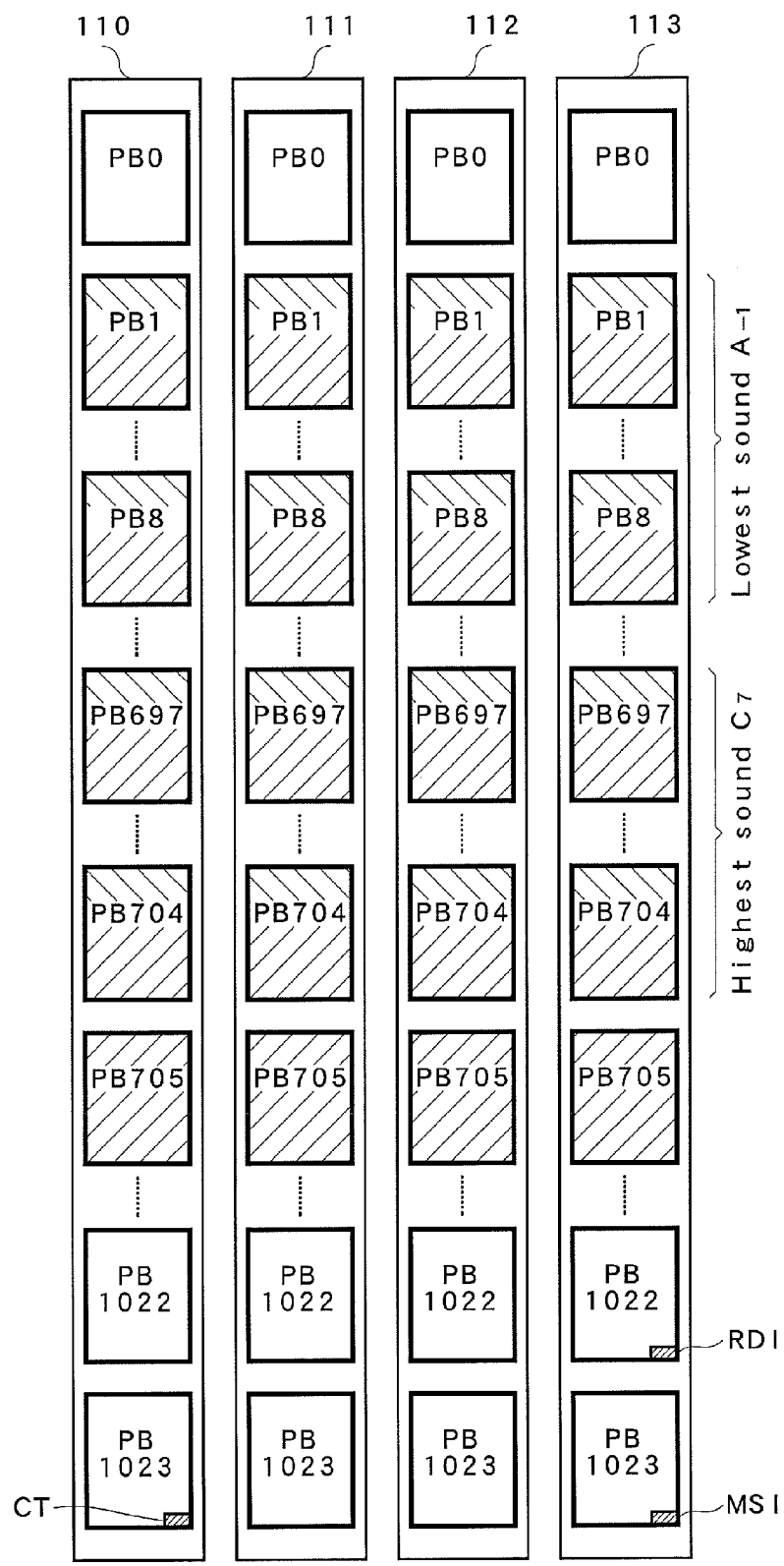
FIG. 55B is an explanatory diagram illustrating a storage state of the nonvolatile memory banks 110 to 113 after writing of the musical sound data.

By multiplexing the musical sound data from the lowest sound to the highest sound and writing the multiplexed data to the nonvolatile memory banks 110 to 113 in this manner, the storage state changes from a state shown in FIG. 55A to a state shown in FIG. 55B. FIG. 55B is an explanatory diagram illustrating the storage state of the nonvolatile memory banks 110 to 113 after writing of the musical sound data. In FIG. 55B, the musical sound data is stored in PB1 to PB704 of the nonvolatile memory banks 110 to 113, and the recorded data characteristic information is stored in PB1022 of the nonvolatile memory bank 113. Since the management information such as the FAT and file entry is updated from the information stored in PB0 of the nonvolatile memory banks 110 to 113, the information is stored in PB705 in another physical block of the nonvolatile memory banks 110 to 113. Any free physical block other than PB705 may be used.

As described above, a user records the sound material from a sound source such as piano and guitar prepared by the user himself/herself, multiplexes and allocates the sound material as the musical sound data based on the memory configuration information to the logical address space via the access module 200H, and according to the allocation, writes the musical sound data to the nonvolatile storage module. Whereby, the musical sound data file can be generated from the sound material file group.

The nonvolatile storage module that holds the musical sound data thus obtained is connected to the access module 200H. Then, by producing sound in response to strike of the master keyboard 300, desired musical sound can be generated based on the generated musical sound data file. Further, since the access module 200H has a sampling function, sound can be sampled from the outside.

Since the musical sound data stored in the nonvolatile storage module is managed by the file system part 236 as the musical sound data file, the musical sound data can be managed or edited by a device such as the personal computer using the same file system (FAT file system). Further, the musical sound data can be easily copied to other recording devices, recording media and the like.

In writing the musical sound data to the nonvolatile memory banks 110 to 113, when the bad block occurs, logical-physical conversion may be appropriately performed by the address manager 155 and the musical sound data may be rewritten to a free normal block.

If the nonvolatile storage module 100H has a sufficiently large recording capacity, the nonvolatile storage module 100H can hold a plurality of musical sound data files and read data from any of files according to playing of the master keyboard to generate the musical sound.

As described above, in the musical sound generation system in embodiment 8, as in embodiments 1, 3, the sound production delay time can be made smaller than 1 ms that falls within the allowable scope and, even when a large-capacity multi level NAND flash memory is used as a memory for musical sound data, an inexpensive and compact musical sound signal generation device can be realized.

Further, the musical sound generation system in embodiment 8 has following effects in addition to the effects of the musical sound generation systems in embodiments 1, 3. Since this musical sound generation system in the present embodiment is a system based on the versatile FAT file system, the musical sound data can be written by the access module. Therefore, since the musical sound data rewritten according to user's preference can be used, the system can be said as a very versatile system.

The nonvolatile storage module 100H may be a removable storage device such as a memory card or a memory part incorporated into a device such as the electronic musical instrument. The access module 200H may be the device such as the electronic musical instrument or an access circuit part incorporated into the device such as the electronic musical instrument.

Further, in the present embodiment, although sound from the microphone 320 is sampled and recorded in the data storage module 330 once and then, is transferred to the hard disc 340 as the sound material file group, the hard disc itself may be used as the data storage module. Alternatively, sampling data may be temporarily stored in a free area of the nonvolatile storage module 100H by using the area as the data storage module.

(Embodiment 9)

Figure 57:
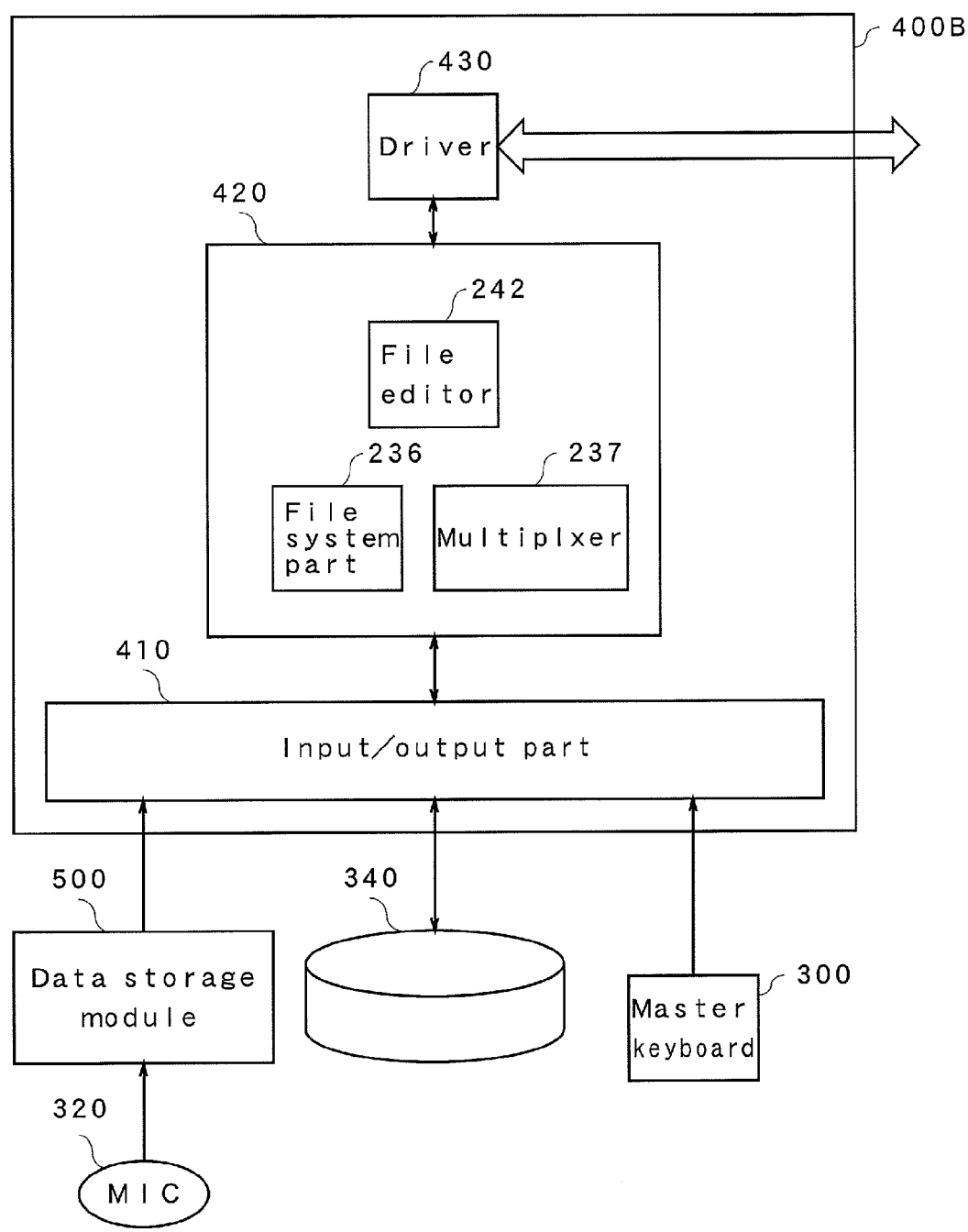
FIG. 57 is a block diagram illustrating a writing module of a musical sound data file generation system in embodiment 9 of the present invention.

Next, a musical sound data file generation system in embodiment 9 of the present invention will be described. The musical sound data file generation system in the present embodiment is configured of a musical sound data file generation module 400B shown in FIG. 57 and the nonvolatile storage module 100H in embodiment 8. The musical sound data file generation module 400B is an extract of the data writing function of the access module 200H in embodiment 8, and performs only data writing processing of the access module 200H. As shown in FIG. 57, the musical sound data file generation module 400B includes the input/output part 410, CPU part 420 and driver 430. The CPU part 420 includes the file system part 236, multiplexer 237 and file editor 242 in embodiment 8. A data storage module 500 in addition to the hard disc 340 are connected to the musical sound data file generation module 400B and can record necessary data according to a user's instruction to record sound from the sound source.

The data storage module 500 is a system, for example, a linear PCM recorder, which samples and records sound such as the musical instrument sound in advance and stores the sound as the sound material file. A nonvolatile memory such as a flash memory is built in the data storage module 500. A detachable recording medium such as a semiconductor memory card may be attached.

The data storage module 500 and hard disc 340 are connected to the musical sound data file generation system and the sound material file recorded in the data storage module 500 is copied to the hard disc 340 via the input/output part 410.

Figure 58:
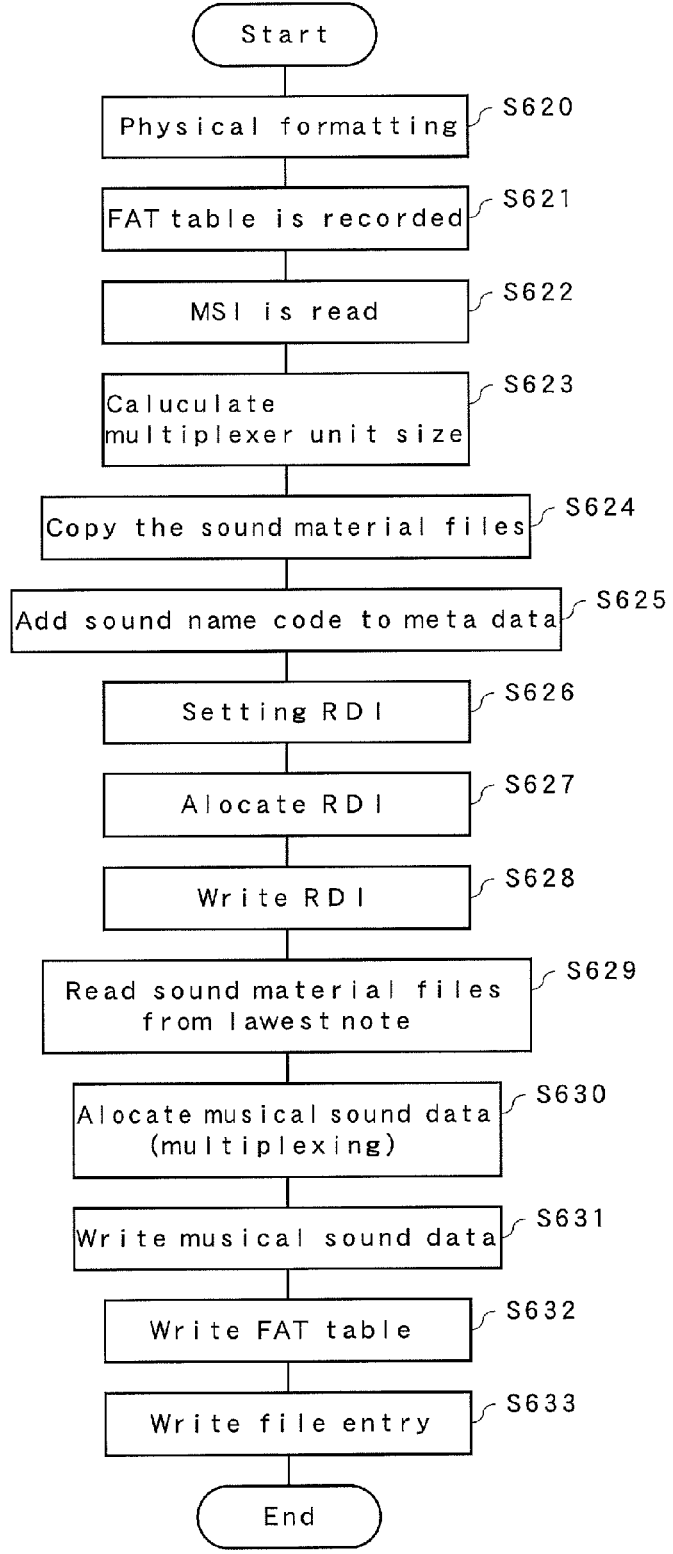
FIG. 58 is a flow chart illustrating processing of a CPU part 420 in embodiment 9 of the present invention.

Operations of the musical sound data file generation system thus configured in embodiment 9 of the present invention will be described with reference to mainly FIG. 58.

First, in S620 to S623, the physical formatting processing, reading of memory configuration information and calculation of the multiplexer size are performed. This processing is the same as the processing in S600 to S603 in embodiment 8.

Next, the sound material file group sampled by the data storage module 500 is copied from the data storage module 500 to the hard disc 340 (S624). Here, the sound material file group records the sound of 88 keys that ranges from a piano lowest sound to the highest sound for each of two types of a strong key strike and weak key strike, and includes 176 files in total. It is preferred that the file has a WAVE file format so as to be easily edited by a PC or the like.

The data storage module 500 may be merely a storage device having no sampling function, and may previously store the sound material sampled by a linear PCM recorder or the like therein. Alternatively, the storage device of the data storage module 500 may be an area of part of a nonvolatile storage module. Whereby, the nonvolatile storage module 100H can temporarily store and edit the sound material file group in the hard disc 340. However, in this case, since the sound material file group and musical sound data file need to be stored at the same time, it is needed to secure a sufficient capacity of the nonvolatile storage module 100H in advance.

The nonvolatile storage module 100H may be the removable storage device such as a memory card or a memory part incorporated into a data edition device such as a personal computer (PC). Further, the musical sound data file generation module 400B may be a data edition device such as the PC or a data editing circuit part incorporated into the data edition device.

(Embodiment 10)

Figure 59:
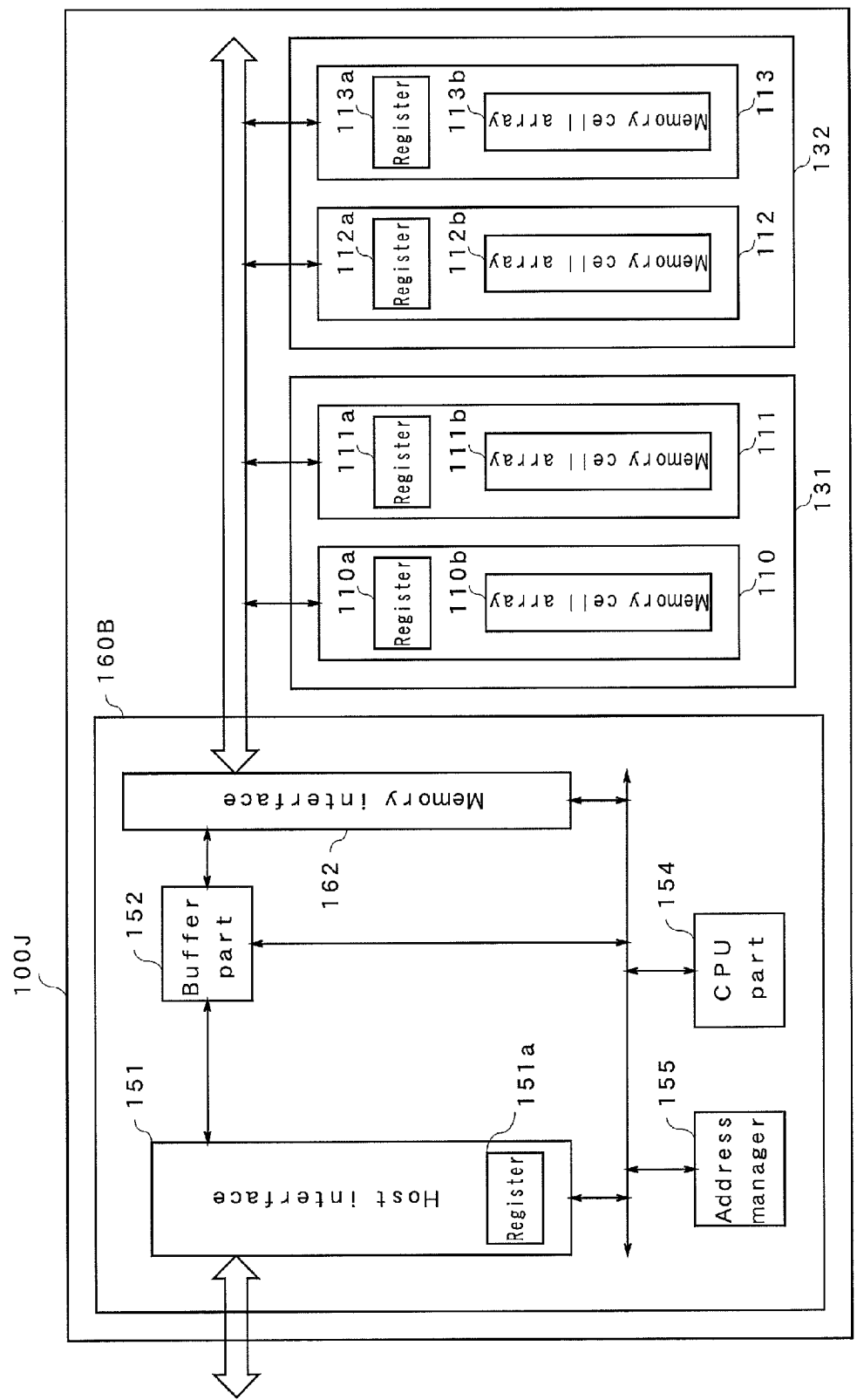
FIG. 59 is a block diagram illustrating a nonvolatile storage module of a musical sound generation system in embodiment 10 of the present invention.

FIG. 59 is a block diagram illustrating a nonvolatile storage module 100J in the musical sound generation system in embodiment 10 of the present invention. In the musical sound generation system in embodiment 10, the access module is the same as that in embodiment 8, and only the nonvolatile storage module is different. The nonvolatile memory banks 110 to 113 each are one flash memory (chip) in the nonvolatile storage module 100J in embodiment 8, while the nonvolatile memory banks 110, 111 are built in one flash memory 131 and the nonvolatile memory banks 112, 113 are built in one flash memory 132 in the nonvolatile storage module 100J in the present embodiment. A data reader/writer 160B includes a memory interface 162 in addition to the above-mentioned host interface 151, buffer part 152, 126, CPU part 154 and address manager 155.

Generally, the flash memories are classified into a type that has only one memory bank in a flash memory chip and a type that has two or more memory banks in the flash memory chip. The musical sound generation system in embodiment 10 is a latter type. The nonvolatile memory banks 110, 111 included in the flash memory 131 and nonvolatile memory banks 112, 113 included in the flash memory 132 can individually read the musical sound data as in embodiment 1. However, embodiment 10 is different from embodiment 1 in that there are two flash memory chips and thus, the number of CE signals, read clocks and busy signals that are connected to the memory interface 162 via the memory bus is two.

In the bit format of LSN shown in FIG. 29, b3, LSB of the bank select is added at the head of b22 of LSN (b22 to b13), and used as a physical block address of the flash memory 131 or flash memory 132. In the bit format, b4, MSB of the bank select is encoded in the memory interface 162, and used as the two CE signals.

The busy signal of the flash memory 131 is shared by the nonvolatile memory banks 110, 111. A data ready flag of each of the nonvolatile memory banks 110, 111 may be generated by the busy signal. Similarly, the busy signal of the flash memory 132 is shared by the nonvolatile memory banks 112, 113. A data ready flag of each of the nonvolatile memory banks 112, 113 may be generated by the busy signal. As shown in FIG. 23, the access flag may be controlled so as to have the value 1 by the time when the transfer time (TT) of the musical sound data from the command 1 is finished as that in embodiment 1.

As described above, since the musical sound generation system in embodiment 10 performs the same operations as those of the musical sound generation system in embodiment 8, the sound production delay time can be made smaller than 1 ms that falls within the allowable scope. That is, even when a currently dominant large-capacity multi level NAND flash memory is used as the musical sound data, an inexpensive and compact musical sound signal generation device can be realized.

(Embodiment 11)

Figure 60B:
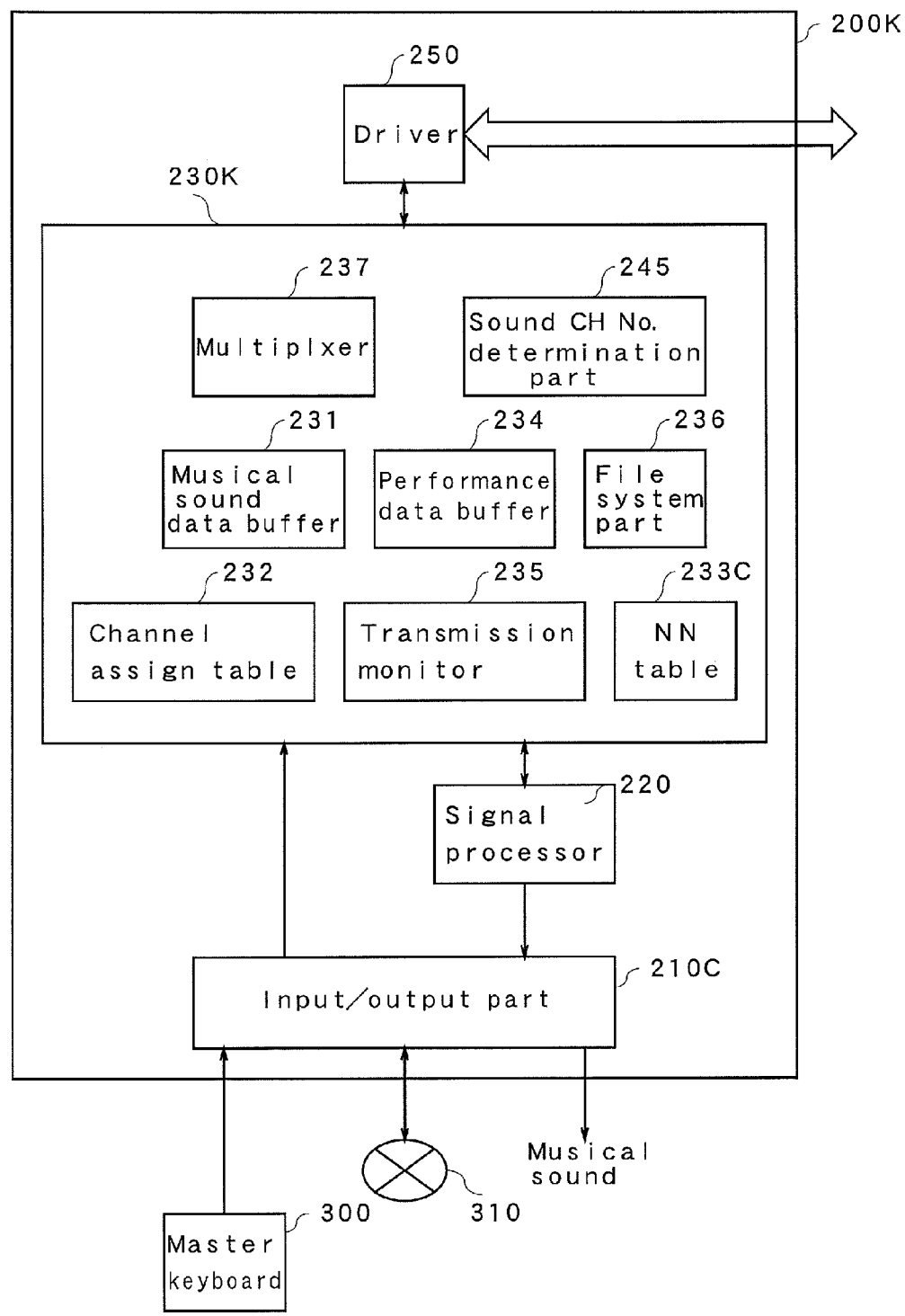
FIG. 60B is a block diagram illustrating an access module of the musical sound generation system in embodiment 11 of the present invention.

FIG. 60A, FIG. 60B are block diagrams illustrating a musical sound generation system in embodiment 11 of the present invention. The musical sound generation system includes a nonvolatile storage module 100K shown in FIG. 60A and an access module 200K shown in FIG. 60B. The nonvolatile storage module 100K includes the four nonvolatile memory banks 110 to 113 provided in parallel with each other and data reader/writer 150K. The data reader/writer 150K includes a reading performance notification part 157 in addition to the host interface 151, buffer part 152, memory interface 153, CPU part 154 and address manager 155.

The access module 200K includes the input/output part 210, signal processor 220, CPU part 230K and driver 250, and can simultaneously output the musical sound of 32 channels. The CPU part 230K has a sound production channel number determination part 245 in addition to the musical sound data buffer 231, channel assign table 232, NN table 233C, performance data buffer 234, transfer monitor 235, file system part 236 and multiplexer 237.

Next, blocks in the nonvolatile storage module 100K that are the same as those in the nonvolatile storage module 100C in embodiment 3 are given the same reference numerals, and detailed description thereof is omitted.

The reading performance notification part 157 holds performance information to read data from the nonvolatile storage module 100K in an internal ROM. For example, the reading performance is a value of "a random reading rate by 512 Bytes (hereinafter referred to as RR512)" and this information is notified to the access module 200K.

Next, blocks in the access module 200K that are the same as those in the access module 200C in embodiment 3 are given the same reference numerals, and detailed description thereof is omitted.

The sound production channel number determination part 245 in the CPU part 230K determines the number of sound production channels so that the sound production delay time is smaller than or equal to a predetermined time, here, 1 ms according to the reading performance of the nonvolatile storage module 100K. The number of channels thus determined is the number of frames used in the channel assign table 232.

[Initial State]

First, among the contents of initialization performed by a manufacturer prior to shipment of the nonvolatile storage module 100K, differences between the present embodiment and embodiment 3 will be described.

Prior to shipment of the nonvolatile storage module 100K by a manufacturer, the reading performance notification part 157 previously hold a value of "the random reading rate in units of 512 Bytes (hereinafter referred to as RR512)" in the internal ROM. Here, RR512 is a value that can be calculated based on the parameters in the memory configuration information shown in FIG. 11 and the like. To find RR512, first, the parallel number is obtained by calculating the following expression (19).

$$\text{Parallel number} = \text{the number of buses} \times \text{the number of memory banks per bus} \quad (19)$$

Next, RR512 is found according to the following expression (20).

$$RR512 = \{\text{sector size}/(TR+TT)\} \times \text{parallel number} \quad (20)$$

When the parallel number is a value four, for example, the value of RR512 becomes about 32 MBytes/seconds. This value is stored in a ROM in the reading performance notification part 157.

Operations of the musical sound generation system thus configured in embodiment 11 of the present invention will be described.

[Initializing Processing at Power-on]

Upon power-on, each of the access module 200K and nonvolatile storage module 100K starts the initializing processing. The normal processing and interruption processing of the CPU part 154 are the same as the flow charts in FIGS. 13A and 13B, respectively.

As shown in the flow chart in FIG. 13A, the CPU part 154 of the nonvolatile storage module 100K performs the initializing processing in S100. In the initializing processing, the single port RAMs 152*a*, 152*b* in the buffer part 152 and the register 151*a* in the host interface 151 are cleared. The address manager 155 reads the logical-physical conversion table stored in PB1023 of the nonvolatile memory bank 110 to the internal RAM. Upon completion of reading of the logical-physical conversion table, the nonvolatile storage module 100K notifies access permission to the access module 200K. After that, the nonvolatile storage module 100K notifies that initialization is completed via the host interface 151.

As shown in the flow chart in FIG. 14A, the CPU part 230K of the access module 200K performs the initializing processing in S200. In the initializing processing, the CPU part 230K reads a FAT table and file entry stored in PB0 of the nonvolatile memory banks 110 to 113 to the file system part 236, and the file system part 236 recognizes the starting cluster number (CL128) of the musical sound data already stored in the nonvolatile storage module 100K.

Further, after that, the access module 200K transfers the reading instructions of the recorded data characteristic information, memory configuration information and reading performance information to the nonvolatile storage module 100K. Whereby, the CPU part 230K reads the recorded data characteristic information recorded in PB1022 of the nonvolatile memory bank 113 and memory configuration information in PB1023 of the nonvolatile memory bank 113. FIG. 15A illustrates the reading instruction for the memory configuration information. In FIG. 15A, b27 to b23 represents the memory configuration information identification code. * is a sign indicating that any values are available. When the host interface 151 receives an instruction to acquire the reading performance information, the reading performance notification part 157 notifies the reading performance information RR512, here, 32 MBytes/seconds stored in the internal ROM to the access module 200K.

In the initializing processing, the CPU part 230K resets the signal processor 220 and clears the dual port RAMs 231*a*, 231*b* in the musical sound data buffer 231. By resetting the signal processor 220, the signal processor 220 starts count-up of a program counter of the internal DSP. Further, in the initializing processing, the CPU part 230K performs initial setting of the channel assign table 232.

When acquiring the recorded data characteristic information shown in FIG. 11, the CPU part 230K sets the sampling cycle (22.7 µs) in the timer in the signal processor 220, and determines one cycle of the signal processing time slot in one sampling time. This timer functions as a timer that controls one cycle of DSP in the signal processor 220. The CPU part 230K writes one sample capacity (2 Bytes) and a flag assignment bit (b0) in the recorded data characteristic information as parameters of a RAM in the signal processor 220, and uses the parameters to determine at which bit position in the bit format shown in FIG. 10 the musical sound data is located.

The sound production channel number determination part 245 determines the maximum number of sound production channels by calculating an expression (21) based on the reading performance information RR512 acquired from the nonvolatile storage module 100K, and a sampling cycle and a sample capacity in the already acquired recorded data characteristic information RDI.

$$\text{Maximum number of sound production channels} = RR512/(\text{sample capacity}/\text{sampling cycle}) \quad (21)$$

Here, in the expression (21), "sample capacity/sampling cycle" is a rate necessary for sound production processing per sound production channel.

FIG. 61 is an explanatory diagram illustrating relationship between the reading performance information, and the maximum number of sound production channels and the number of sound production channels.

Next, the sound production channel number determination part 245 finds the sound production delay time per parallel by calculating a following expression (22) based on TR and TT in the memory configuration information, the maximum number of sound production channels obtained according to the expression (21) and the parallel number obtained according to the expression (19).

$$\text{Delay time per parallel} = [\{(TR+TT) \times \text{the maximum number of sound production channels}\}/\text{parallel number}] \times (1+0.2) \quad (22)$$

In the present embodiment, the sound production delay time is about 678 µs, which is smaller than 1 ms that falls within the allowable scope, causing no problem. Therefore, the maximum number of sound production channels may be regarded as the number of sound production channels.

Here, in the expression (22), 0.2 is a margin ratio of the sound production delay time per parallel. The expression (22) corresponds to a value obtained by adding overhead (margin) to the front and rear of time required to read the musical sound data of eight channels CH0, 4, 8 . . . 28, for example, in the nonvolatile memory bank 110. In the present embodiment, estimating further margin, the number of sound production channels is defined as a value that is smaller than the maximum number of sound production channels and becomes a power of two. In the present embodiment, according to the definition, as shown in FIG. 61, the number of sound production channels is determined as 32.

In FIG. 61, when the parallel number is one, the maximum number of sound production channels is nine and the number of sound production channels is eight, however, because the number of sound production channels lacks in normal performance, a user can use this musical sound generation system in performance in consideration of this, such as, solo performance.

According to the number of sound production channels (32CH) thus determined, the CPU part 230K determines a channel frame of the channel assign table 232 as well as the number of channels in the time slot of the signal processor 220. The signal processor 220 determines the effect processing such as reverb and chorus. In the case shown, it is determined only reverb is performed as the effect processing.

Further, when acquiring the memory configuration information shown in FIG. 12, the CPU part 230K finds the parallel number by calculating the expression (19) based on the number of buses (1) and the number of memory banks per bus (4). The bit format of LSN is determined based on the found parallel number. Since the parallel number is four in the present embodiment, the number of bits of the bank select is two, and the bit format of LSN is as shown in FIG. 29. For example, when the parallel number is two, the number of bits assigned to the bank select becomes one (b3) and accordingly, the page number is assigned to b11 to b4 and PBN is assigned to b21 to b12.

Relationship between CHN and bank select is the same as that in embodiment 3. Since the bit format of LSN is as shown in FIG. 29, relationship between LSN and CLN in LS8192 to LS8255 in FIG. 27A and other initializing processing are the same as that in embodiment 3.

In the main routine, the CPU part 230K reads the recorded data characteristic information, memory configuration information and reading performance information, and sets various parameters, thereby completing the initializing processing (S200). Then, the CPU part 230K goes to the normal operation processing in S201 and enables interruption to accept the performance data from the external master keyboard 300.

[Processing at Normal Operation]
(1) Description of General Operations

Since general operations from inputting of the performance data to generation of the musical sound are almost the same as those in embodiment 1 and differences are the same as those in embodiment 3, description thereof is omitted.

Since the musical sound data writing processing of the access module is the same as that in embodiment 3, detailed description thereof is omitted.

As described above, the sound production channel number determination part 245 determines the number of sound production channels so that the sound production delay time is smaller than or equal to 1 ms based on the reading performance information acquired from the nonvolatile storage module 100K. Thus, even when the reading performance of the nonvolatile storage module 100K is low, it is possible to realize the musical sound generation system in which the number of sound production channels is reduced so that the sound production delay time does not exceed a predetermined value.

Although the random reading rate in units of 512 Bytes is stored in a ROM in the sound production channel number determination part 245, it may be stored in any of the nonvolatile memory banks 110 to 113.

The access module 200K may be provided with a display unit and the number of sound production channels determined by the sound production channel number determination part 245 may be displayed on the display unit. When the number of sound production channels is less than 1, that is, when the sound production delay time exceeds 1 ms even if the number of sound production channels is 1, an alarm that "musical sound cannot be generated" may be displayed on the display unit.

Although the nonvolatile storage module 100K transfers the reading performance information according to the instruction from the access module 200K, the nonvolatile storage module 100K may actively notify to the access module 200K.

A nonvolatile storage module of the present invention is a nonvolatile storage module that reads data according to an external reading instruction, and includes a plurality of nonvolatile memory banks that record musical sound data therein by multiplexing the data, and a data reader that reads data from any of the nonvolatile memory banks according to one external reading instruction and, when another reading instruction is issued before the reading is finished, reads data from the nonvolatile memory bank other than the nonvolatile memory bank that is being read in parallel.

Here, the nonvolatile memory bank may be a multi level NAND flash memory.

Here, an access module issues the reading instruction to the nonvolatile storage module and includes a signal processor that performs musical sound generation processing for a plurality of channels every sampling cycle by time division multiplexing processing.

Here, the nonvolatile storage module may have a nonvolatile memory that holds recorded data characteristic information including at least information on the sampling frequency of the musical sound data.

Further, the access module may be a module that issues the reading instruction to the nonvolatile storage module and performs the musical sound generation processing based on the recorded data characteristic information acquired from the nonvolatile storage module.

A musical sound generation system including these access modules and the nonvolatile storage module that reads data according to the reading instruction from the access module can be realized.

A nonvolatile storage module of the present invention is a nonvolatile storage module for reading and writing data according to an external access instruction, which includes a plurality of nonvolatile memory banks that record musical sound data therein by multiplexing the data, and a data reader/writer that reads data from any of the nonvolatile memory banks according to one external reading instruction and, when another reading instruction is issued before the reading is completed, reads data from the nonvolatile memory bank other than the nonvolatile memory bank that is being read in parallel, and reads memory configuration information representing the structures of the nonvolatile memory banks.

Here, the reading/writing controller has a register that holds a plurality of pieces of reading instruction information transferred from the outside and, before reading the musical sound data corresponding to one reading instruction information, holds reading instruction information next to the reading instruction information in the register.

Here, the reading/writing controller may have an address manager that converts between a logical address and a physical address of the nonvolatile memory bank.

The access module of the present invention is the access module that issues the writing and reading instructions to the nonvolatile module and issues the reading instruction, and the access module includes a signal processor that performs the musical sound generation processing for the plurality of channels every sampling cycle by the time division multiplexing processing.

The musical sound generation system of the present invention may include an access module and nonvolatile storage module that writes and reads data according to the writing and reading instructions from the access module.

Here, the data writing module is the data writing module that writes the musical sound data to the nonvolatile storage module, and may include a multiplexer that multiplexes musical sound data acquired from the outside based on the memory configuration information notified from the nonvolatile storage module and a file system part that writes the musical sound data multiplexed by the multiplexer to the nonvolatile storage module.

A nonvolatile storage module of the present invention is a nonvolatile storage module for reading and writing data according to the external access instruction, which includes a plurality of nonvolatile memory banks that record musical sound data by multiplexing the data and record at least one of audio data, performance data, image data and text data therein, and a data reader/writer that writes the musical sound data by multiplexing the data and write at least one of the audio data, performance data, image data and text data, as well as reads data from any of the nonvolatile memory banks according to one external reading instruction and, when another reading instruction is issued before the reading is completed, reads data from the nonvolatile memory bank other than the nonvolatile memory bank that is being read in parallel, and reads the memory configuration information representing the configurations of the nonvolatile memory banks.

Here, the reading/writing controller may has a register that holds a plurality of pieces of reading instruction information transferred from the outside and, before the musical sound data corresponding to one reading instruction information is read, the reading instruction information next to the reading instruction information may be held in the register.

Here, the reading/writing controller may have an address manager that converts between the logical address and the physical address of the nonvolatile memory bank.

The musical sound generation system of the present invention can include the access module and nonvolatile storage module that writes and reads data according to the writing and reading instructions from the access module.

The musical sound generation system of the present invention is a musical sound generation system including the access module and nonvolatile storage module that writes and reads data according to the writing and reading instructions from the access module, which includes a plurality of nonvolatile memory banks that record musical sound data therein by multiplexing the data, and a data reader/writer that reads data from any of the nonvolatile memory banks according to one external reading instruction and, when another reading instruction is issued before the reading is completed, reads data from the nonvolatile memory bank other than the nonvolatile memory bank that is being read in parallel, and reads the memory configuration information representing the structures of the nonvolatile memory banks, and the access module includes a file editor that edits the sound material file group stored in the data storage module as one musical sound data file, multiplexer that multiplexes the musical sound data and file system part that writes the musical sound data file multiplexed by the multiplexer to at least two nonvolatile memory banks of the nonvolatile storage module by multiplexing it and reads the musical sound data file.

An access module of the present invention is an access module connected to the nonvolatile storage module to read and write data, which includes a file editor that edits the sound material file group stored in the data storage module as one musical sound data file, a multiplexer that multiplexes the musical sound data, and a file system part that writes the musical sound data file multiplexed by the multiplexer to at least two nonvolatile memory banks of the nonvolatile storage module by multiplexing it and reads the musical sound data file.

Here, the access module may further include a sampling part that samples sound inputted from the outside.

Here, the access module may further include the signal processor that performs the musical sound generation processing for the plurality of channels every sampling cycle by the time division multiplexing processing.

A musical sound data file generation module of the present invention is a musical sound data file generation module for generating a musical sound data file in the nonvolatile storage module including a plurality of nonvolatile memory banks, which includes a file editor that edits a sound material file group recorded in the data storage module to the musical sound data file, a multiplexer that multiplexes the musical sound data based on the memory configuration information notified from the nonvolatile storage module, and a file system part that writes the musical sound data multiplexed by the multiplexer as the musical sound data file to at least two nonvolatile memory banks in the nonvolatile storage module.

Here, the data storage module and nonvolatile storage module may be the same storage module.

Here, the multiplexer may determine the number of multiplexing in multiplexing based on the memory configuration information acquired from the nonvolatile storage module.

A nonvolatile storage module of the present invention is a nonvolatile storage module for reading data according to an external access instruction, which includes a plurality of nonvolatile memory banks that record musical sound data therein by multiplexing the data, and a data reader that reads data from any of the nonvolatile memory banks according to one external reading instruction and, when another reading instruction is issued before the reading is finished, reads data from the nonvolatile memory bank other than the nonvolatile memory bank that is being read in parallel, and reads memory configuration information representing the structures of the nonvolatile memory banks and reading performance information.

Here, a nonvolatile memory that holds recorded data characteristic information including at least information on a sampling cycle and one sample capacity of the musical sound data and reading performance information on a reading rate may be provided.

An access module of the present invention is an access module for issuing a reading instruction to the nonvolatile storage module, which includes the sound production channel number determination part that determines the number of sound production channels so that a sound production delay time is smaller than or equal to a predetermined time based on the reading performance information and recorded data characteristic information that are acquired from the nonvolatile storage module, and issues the reading instruction to the nonvolatile storage module within the scope of the determined number of sound production channels.

Here, a displayer that displays the number of channels determined by the channel number determination part may be further provided.

Here, a signal processor that performs musical sound generation processing for a plurality of channels within the scope of the number of sound production channels determined every sampling cycle by time division multiplexing processing may be further provided.

A musical sound generation system of the present invention is a musical sound generation system including an access module and nonvolatile storage module that reads data according to a reading instruction from the access module, wherein said nonvolatile storage module includes a plurality of nonvolatile memory banks that record musical sound data therein by multiplexing the data, and data reader/writer that reads data from any of the nonvolatile memory banks according to one external reading instruction and, when another reading instruction is issued before the reading is completed, reads data from the nonvolatile memory bank other than the nonvolatile memory bank that is being read in parallel, and reads memory configuration information representing the structures of the nonvolatile memory banks and reading performance information, and the access module has the sound production channel number determination part that determines the number of sound production channels so that a sound production delay time is smaller than or equal to a predetermined time based on the reading performance information and recorded data characteristic information that are acquired from the nonvolatile storage module, and issues the reading instruction to the nonvolatile storage module within the scope of the determined number of sound production channels.

In each of the above-mentioned embodiments, although data obtained by digitally recording piano sound is recorded in the nonvolatile memory banks 110 to 113 as the musical sound data, sound of musical instruments other than piano, voice or the other data may be stored. The musical sound data may be artificial data rather than digitally recorded data. Alternatively, the musical sound data may be data compressed by a compression technique such as MP3. However, in this case, the signal processor 220 needs to perform processing of decompressing the compressed data, that is, decoding processing. Although two types of musical sound data corresponding to key strike strength are previously stored, one or three or more types of data may be stored. However, in the case of one type, the interpolation processing by the signal processor 220 is unnecessary. In the case of three or more types, the interpolation processing may be extended to linear interpolation among three points.

In each of the above-mentioned embodiments, although a time length of the musical sound data corresponding to one key is about 40 seconds, it is not limited to 40 seconds and may be varied depending on NN. Since a lower piano sound has a longer sound production time, a storage capacity can be reasonably used by making a time length of the musical sound data on a side of low sound relatively long and a time length of the musical sound data on a side of high sound relatively short, which is preferable.

In each of the above-mentioned embodiments, although the number of nonvolatile memory banks is four, it is not limited to four. As the number of nonvolatile memory banks is larger, a sound production delay time can be decreased. Further, although the musical sound data reading size per sector size, that is, at one time is 512 Bytes, it may be another value. Although the RAM capacity of a musical sound data buffer can be reduced as the size is smaller, when the size is decreased more than necessary, the musical sound generation processing fails. The number of memory buses may be increased to plural. Assuming that the number of memory buses is two and four nonvolatile memory banks are connected to one memory bus, eight pieces of data can be read from the nonvolatile memory banks in parallel. In this case, it is no need to prevent conflict in the bus as in embodiment 1. That is, since it is no need to shift the data transfer time from the I/O registers 110a to 113a, the sound production delay time can be further decreased.

Although the bank select is determined by CHN as represented by the expression (5), the bank select may be cyclically incremented, for example, 0, 1, 2, 3, 0, 1, . . . , in the order of issuance of the reading instruction information, that is, the order of transferring the reading instruction information from the access module to the nonvolatile storage module.

Although the musical sound data is continuously arranged in the page of the nonvolatile memory banks, it may be discontinuously arranged as long as the nonvolatile storage module and access module recognize regularity of the arrangement. Although the musical sound data is arranged in the order from the lowest sound using PB0 or PB1 as the starting block, the starting block is not limited to PB0 or PB1 and the musical sound data may be discontinuously arranged as long as the nonvolatile storage module and access module recognize regularity of the arrangement.

Although the flash memory is used as the nonvolatile memory bank, the present invention can be also applied to the case where other nonvolatile memories are used.

In each of the above-mentioned embodiments, although the nonvolatile memory bank holds the musical sound data characteristic information and memory configuration information, a volatile memory for holding the information may be provided.

Although the data reader and data reader/writer are provided in the nonvolatile storage module, they may be provided in the access module.

In each of the above-mentioned embodiments, performance information is inputted from the master keyboard, controllers of the other forms such as a guitar-type controller that outputs performance data by playing strings and a stick-type controller that outputs the performance data by hitting an object may be used. Alternatively, the performance data such as a standard MIDI file may be inputted to the access module from a device such as a personal computer or via a network.

Industrial Applicability

A musical sound generation system of the present invention provides a method of using a nonvolatile memory as a memory for musical sound data, and is effective in electronic musical instruments, karaoke machines, personal computers, mobile phones and game equipment that have a musical sound generation function (for example, sound card) and devices using recorded sound materials as the musical sound data.

The invention claimed is:

1. A nonvolatile storage module for reading data according to an external reading instruction comprising:
   a plurality of nonvolatile memory banks, each banks already recording the same musical sound data therein; and
   a data reader that reads data from any of said nonvolatile memory banks according to one external reading instruction and, when another reading instruction is issued before the reading is completed, reads data from a nonvolatile memory bank other than the nonvolatile memory bank that is being read in parallel.

2. The nonvolatile storage module according to claim 1, wherein
   said nonvolatile memory banks hold memory configuration information representing the configurations of said nonvolatile memory banks and reading performance information.

3. A nonvolatile storage module for reading and writing data according to an external access instruction comprising:

a plurality of nonvolatile memory banks, each banks recording the same musical sound data therein; and a data reader/writer that reads data from any of said nonvolatile memory banks according to one external reading instruction and, when another reading instruction is issued before the reading is completed, reads data from a nonvolatile memory bank other than the nonvolatile memory bank that is being read in parallel, reads memory configuration information representing structures of said nonvolatile memory banks as well as write the musical sound data by multiplexing the data to said nonvolatile memory bank.

4. The nonvolatile storage module according to claim 3, wherein said nonvolatile memory banks record at least one of audio data, performance data, image data and text data and memory configuration information representing configurations of said nonvolatile memory banks in addition to the multiplexed musical sound data; and said data reader/writer writes the musical sound data by multiplexing the data and writes at least one of the audio data, performance data, image data and text data.

5. The nonvolatile storage module according to claim 3, wherein said nonvolatile memory bank hold the memory configuration information representing the configurations of said nonvolatile memory banks and reading performance information.

6. An access module for issuing a reading instruction to a nonvolatile storage module, wherein said nonvolatile storage module includes:

a plurality of nonvolatile memory banks, each banks recording the same musical sound data therein; and a data reader that reads data from any of said nonvolatile memory banks according to one external reading instruction and, when another reading instruction is issued before the reading is completed, reads data from a nonvolatile memory bank other than the nonvolatile memory bank that is being read in parallel; and said access module further includes:

a signal processor that performs musical sound generation processing for a plurality of channels every sampling cycle by division multiplexing processing based on the musical sound data read from said nonvolatile storage module.

7. An access module for writing data to a nonvolatile storage module and issuing a reading instruction to the nonvolatile storage module, wherein said nonvolatile storage module includes:

a plurality of nonvolatile memory banks, each banks recording the same musical sound data therein;

a memory that holds memory configuration information representing configurations of said nonvolatile memory banks; and a data reader/writer that reads data from any of said nonvolatile memory banks according to one external reading instruction and, when another reading instruction is issued before the reading is completed, reads data from a nonvolatile memory bank other than the nonvolatile memory bank that is being read in parallel, reads the memory configuration information representing the configurations of said nonvolatile memory banks and writes the musical sound data by multiplexing the data to said nonvolatile memory banks; and wherein said access module further includes:

a file system part that manages the musical sound data held in said nonvolatile memory as a file; and a signal processor that performs musical sound generation processing for a plurality of channels every sampling cycle by time division multiplexing processing based on the musical sound data read from said nonvolatile storage module.

8. An access module for issuing a reading instruction to a nonvolatile storage module, wherein said nonvolatile storage module includes:

a plurality of nonvolatile memory banks, each banks recording the same musical sound data therein; and a data reader/writer that reads data from any of said nonvolatile memory banks according to one external reading instruction and, when another reading instruction is issued before the reading is completed, reads data from a nonvolatile memory bank other than the nonvolatile memory bank that is being read in parallel, reads the memory configuration information representing configurations of said nonvolatile memory banks and writes musical sound data by multiplexing the data to said nonvolatile memory banks; and said access module includes:

a sound production channel number determination part that determines the number of sound production channels so that a sound production delay time is smaller than or equal to a predetermined time based on reading performance information and recorded data characteristic information that are acquired from said nonvolatile storage module; and issues the reading instruction to said nonvolatile storage module within a scope of the determined number of sound production channels.

9. A musical sound generation system comprising an access module and a nonvolatile storage module for reading and writing data according to a reading/writing instruction from said access module, wherein said nonvolatile storage module includes:

a plurality of nonvolatile memory banks, each banks recording the same musical sound data therein; and a data reader/writer that reads data from any of said nonvolatile memory banks according to one external reading instruction and, when another reading instruction is issued before the reading is completed, reads data from a nonvolatile memory bank other than the nonvolatile memory bank that is being read in parallel, reads memory configuration information representing configurations of said nonvolatile memory banks and writes musical sound data by multiplexing the data to said nonvolatile memory banks; and said access module includes:

a multiplexer that multiplexes the musical sound data based on said memory configuration information read from said nonvolatile storage module;

a file system part that writes the same musical sound data file multiplexed by said multiplexer to at least two said nonvolatile memory banks in said nonvolatile storage module and reads said musical sound data file; and a signal processor that performs musical sound generation processing for a plurality of channels every sampling cycle by time division multiplexing processing based on the musical sound data read from said nonvolatile storage module.

10. The musical sound generation system according to claim 9, wherein said access module further includes a file editor that edits a sound material file group stored in a data storage module to one of the musical sound data file.

* * * * *